(12) United States Patent
Kouri et al.

(10) Patent No.: US 7,272,265 B2
(45) Date of Patent: Sep. 18, 2007

(54) METHODS FOR PERFORMING DAF DATA FILTERING AND PADDING

(75) Inventors: Donald K. Kouri, Houston, TX (US); David K. Hoffman, Ames, IA (US); Mark Arnold, Fayetteville, AR (US); Ioannis A. Kakadiaris, Bellaire, TX (US); Zhuoer Shi, Missouri City, TX (US); DeSheng Zhang, Houston, TX (US); Gemunu H. Gunaratne, Houston, TX (US); Haixiang Wang, Houston, TX (US); Guowei W. Wei, East Lansing, MI (US); Zheng Bao Xi'an, Shaanxi (CN)

(73) Assignee: The University of Houston System, Houston, TX (US)

( * ) Notice: Subject to any disclaimer, the term of this patent is extended or adjusted under 35 U.S.C. 154(b) by 764 days.

(21) Appl. No.: 10/454,373

(22) Filed: Jun. 4, 2003

(65) Prior Publication Data

US 2004/0071363 A1   Apr. 15, 2004

Related U.S. Application Data

(63) Continuation of application No. 09/266,963, filed on Mar. 12, 1999, now Pat. No. 6,847,737.

(60) Provisional application No. 60/077,860, filed on Mar. 13, 1998.

(51) Int. Cl.
  *G06T 5/00* (2006.01)
  *G06T 5/10* (2006.01)
  *G06K 9/40* (2006.01)

(52) U.S. Cl. .............. 382/260; 382/264; 382/275

(58) Field of Classification Search ............... 382/260, 382/264, 275, 300, 254, 276, 128; 708/300, 708/313
See application file for complete search history.

(56) References Cited

U.S. PATENT DOCUMENTS 5,025,404 A * 6/1991 Janssen et al. .............. 708/290
5,644,646 A * 7/1997 Du et al. .................... 382/128

FOREIGN PATENT DOCUMENTS

EP   336685 A2 * 10/1989

OTHER PUBLICATIONS

Shi, Z. et al, "Recent Improvements on Perceptual Processing using DAF Wavelets", IEEE International Conference on Acoustics, Speech, and Signal Processing, ICASSP Proceedings, vol. 1, 2000, pp. 496-499.*

* cited by examiner

*Primary Examiner*—Scott A. Rogers
(74) *Attorney, Agent, or Firm*—Robert W. Strozier

(57) ABSTRACT

A method for padding, filtering, denoising, image enhancing and increased time-frequency acquisition is described for digitized data of a data set is described where unknown data is estimated using real data by adding unknown data points in a manner that the padding routine can estimate the interior data set including known and unknown data to a given accuracy on the known data points. The method also provides filtering using non-interpolating, well-tempered distributed approximating functional (NIDAF)-low-band-pass filters. The method also provides for symmetric and/or anti-symmetric extension of the data set so that the data set may be better refined and can be filtered by Fourier and other type of low frequency or harmonic filters.

5 Claims, 106 Drawing Sheets

DUAL WINDOW SELECTIVE AVERAGING FILTER

FIG. 49(a)
 
FIG. 48(b)  FIG. 49(c)

FIG. 50(a)
 
FIG. 50(b)   FIG. 50(c)

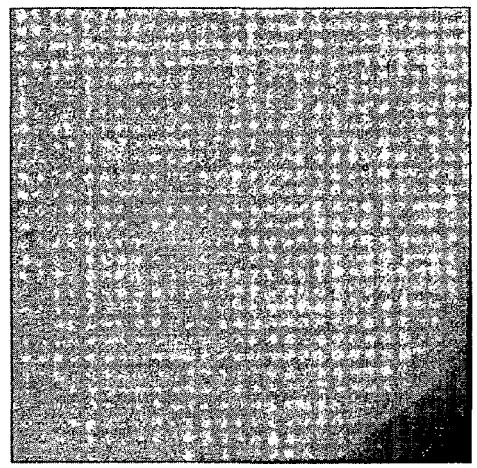
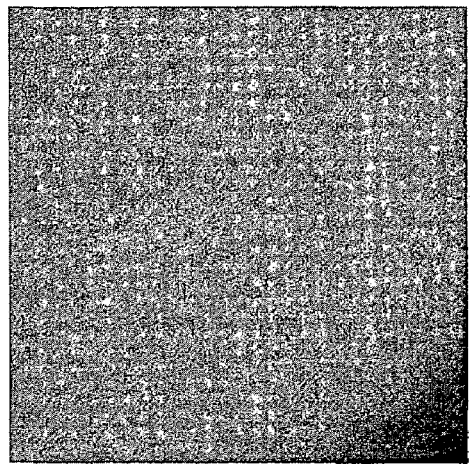
FIG. 51(a)  FIG. 51(b)
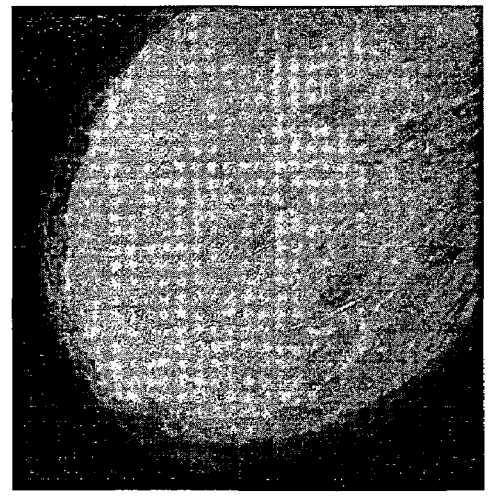
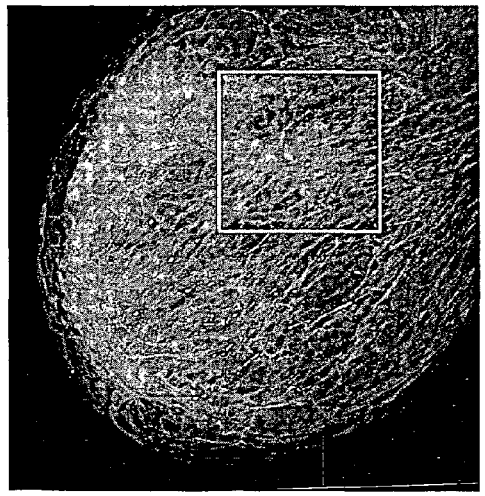
FIG. 52(a)  FIG. 52(b)

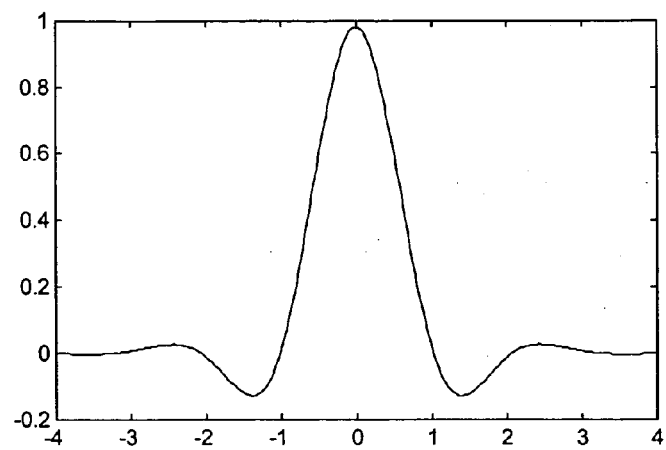
FIG. 57
 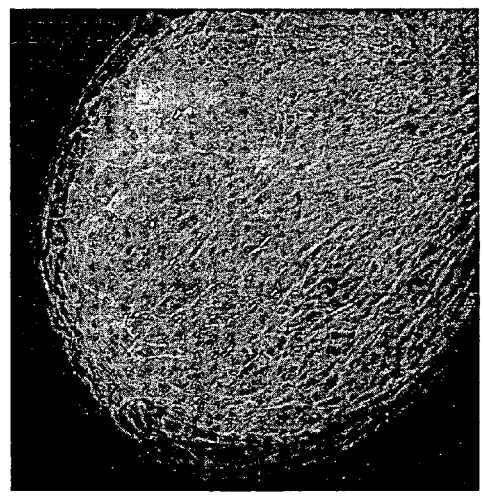
FIG. 58(a)          FIG. 58(b)

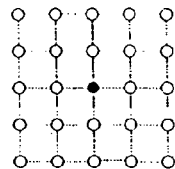 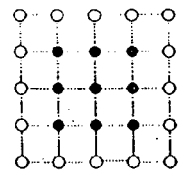 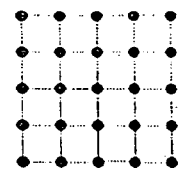
FIG. 61(a)    FIG. 61(b)   FIG. 61(c)
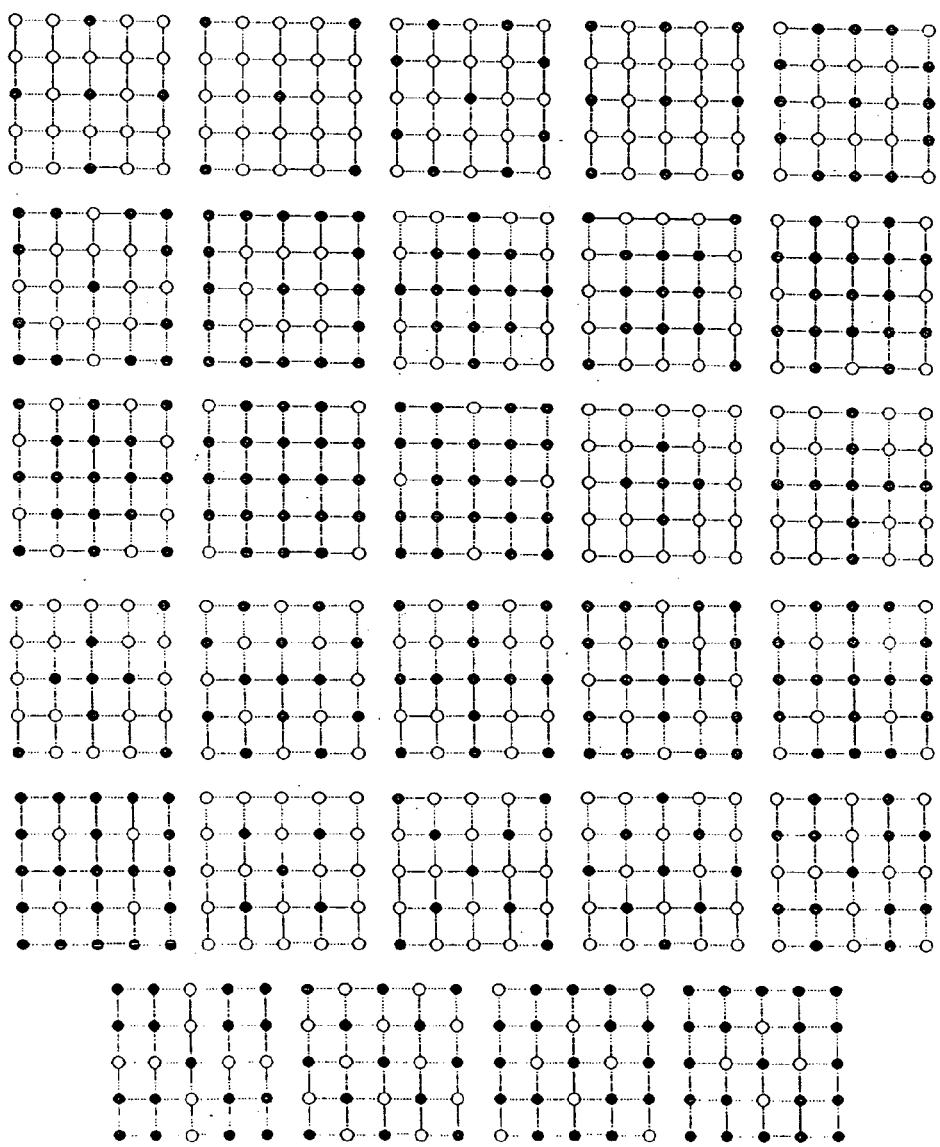
FIG. 62

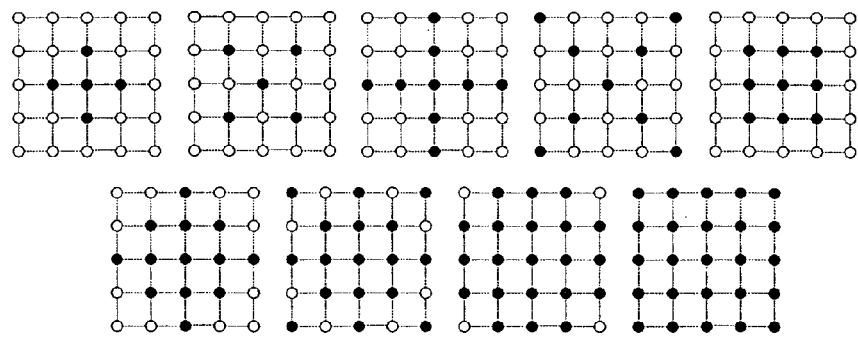
FIG. 63
FIG. 64(a)
FIG. 64(b)
  
FIG. 65(a)   FIG. 65(b)   FIG. 65(c)

FIG. 69(a)
 
FIG. 69(b)        FIG. 69(c)

FIG. 70(a)
 
FIG. 70(b)  FIG. 70(c)

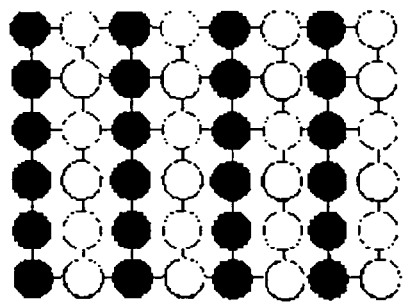
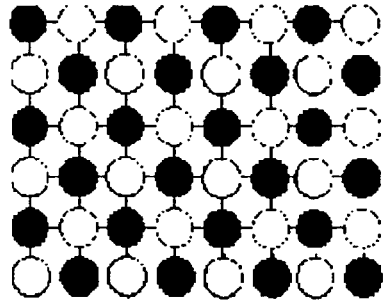
FIG. 90  FIG. 91
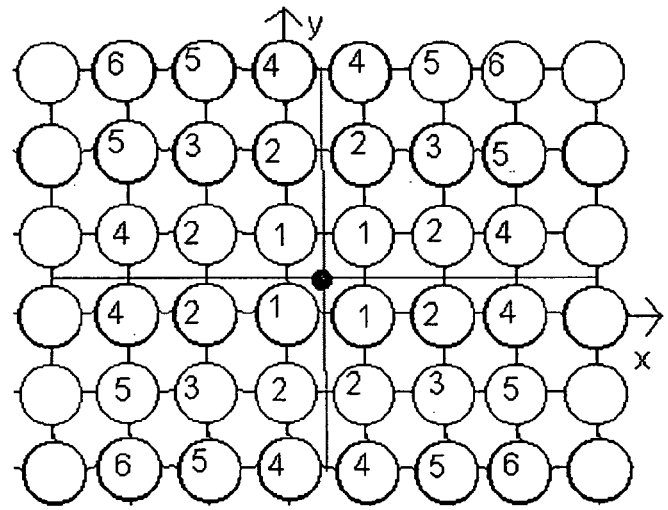
FIG. 92
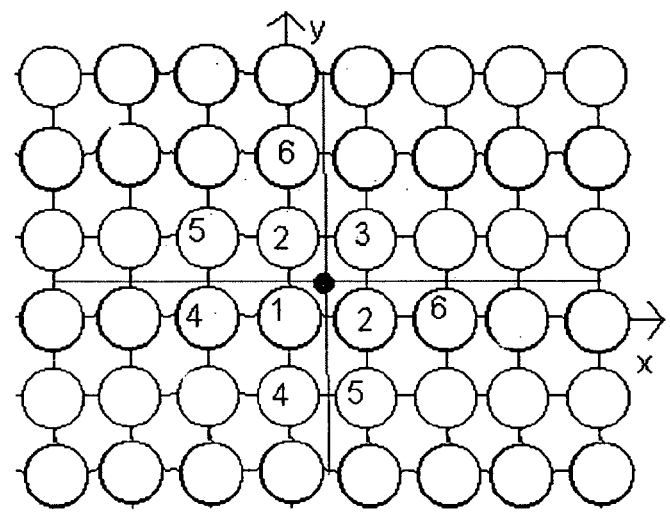
FIG. 93

METHODS FOR PERFORMING DAF DATA FILTERING AND PADDING

RELATED APPLICATIONS

This application is a continuation of U.S. patent application Ser. No.: 09/266,963, filed 12 Mar. 1999, now U.S. Pat. No. 6,847,737, issued 25 Jan. 2005, that claims provisional priority to U.S. Provisional Patent Application Ser. No. 60/077,860, filed 13 Mar. 1998.

GOVERNMENT SUPPORT

This invention was supported in whole or in part, by grant No. 1-5-51749 from the National Science Foundation and grant number N-00014-K-0613 from the Department of the Navy, Office of Naval Research. The Government has certain rights in this invention.

BACKGROUND OF THE INVENTION

1. Field of the Invention

The present invention relates to methods using distributed approximating functionals (DAF), DAF-wavelets and DAF-neural networks for filtering, denoising, processing, restoring, enhancing, padding, or other signal processing procedures directed to images, signals, 1D, 2D, 3D . . . nD spectra, X-ray spectra, CAT scans, MRI scans, NMR, and other applications that require data processing at or near the theoretical limit of resolutions.

More particularly, the present invention relates to the use of infinitely smooth DAFs in combination with other signal processing techniques to provide methods and apparatuses utilizing such methods that can enhance image, spectral, or other signal data and decrease the time need to acquire images, spectra or other signals.

2. Description of the Related Art

Many techniques currently exist for processing images, refining spectra, analyzing data or the like. Many of these techniques are well-known and used extensively. However, these techniques generally suffer from one or more limitation on their ability to enhance signal or image and construct or restore missing or lost data, especially if the user desires the error inherit in signal acquisition and the error introduced by the processing technique to be as small as possible, i.e., as close as possible to Heisenberg's uncertainty principle.

Thus, there is a need in the art for improved techniques for processing acquired data whether in the form on a image, a spectra, a multidimensional spectra or the like so that the error due to processing can be minimized which can increase resolution and decrease acquisition times.

SUMMARY OF THE INVENTION

The present invention provides a method implemented on a digital processing device or stored in a memory readable by a digital processing unit which uses distributed approximating functionals (DAFs) to enhance and improve signal, image and multi-dimensional data constructs processing and to decrease acquisition time of real world spectrometric techniques that operate on square wave type frequency domains which require a large acquisition time to capture the signal from noise. Shorten the acquisition time, the more noise and less resolution and definition the spectra will have. The limit for simultaneously acquiring frequency information in time is given by a variant of Heisenberg's uncertainty principle, i.e., $\Delta\omega\Delta t \leq 1$. The methods of the present provides methods for image and signal processing where the accuracy and precision of the final signal and image closely approaches the uncertainty principles maximum accuracy and precision. The methods can be made to approach uncertainty principle accuracy via increased computational cost, but the real power of the methods of this invention is to yield improved measurements at a given $\Delta\omega$ and $\Delta t$ product.

The present invention also provides methods for improving X-ray and magnetic imaging techniques, especially mammogram images using the DAF and DAF processing techniques set forth herein.

The present invention also provides a mammogram imaging system of conventional design, the X-ray data derived thereform is then enhanced via DAF processing in an associated digital processing unit.

DESCRIPTION OF THE DRAWINGS

The invention can be better understood with reference to the following detailed description together with the appended illustrative drawings in which like elements are numbered the same.

DAF Treatment of Noisy Signals

Generalized Symmetric Interpolating Wavelets

Figure 10A:
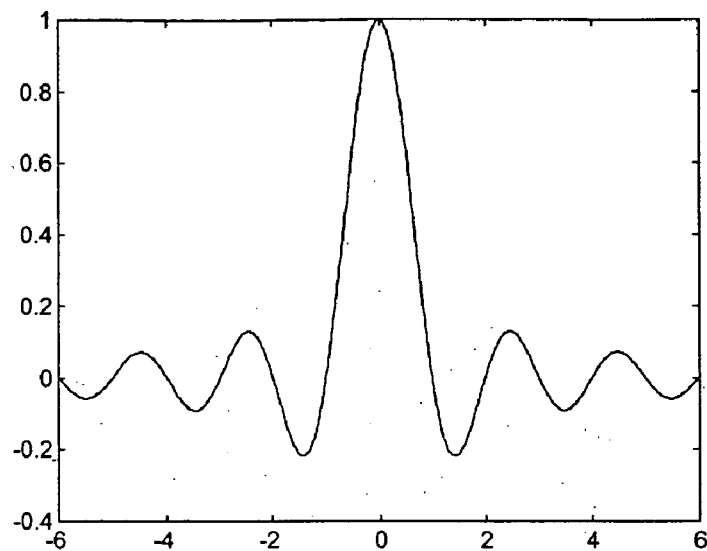
Figure 10B:
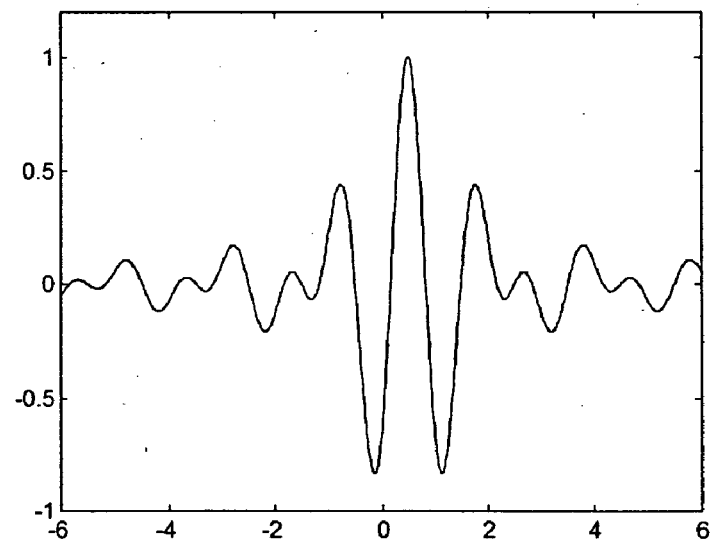

FIGS. 10(a–b) depict π band-limited interpolating wavelets (a) Sinc function and (b) depicts the Sinclet wavelet.

Figure 11:
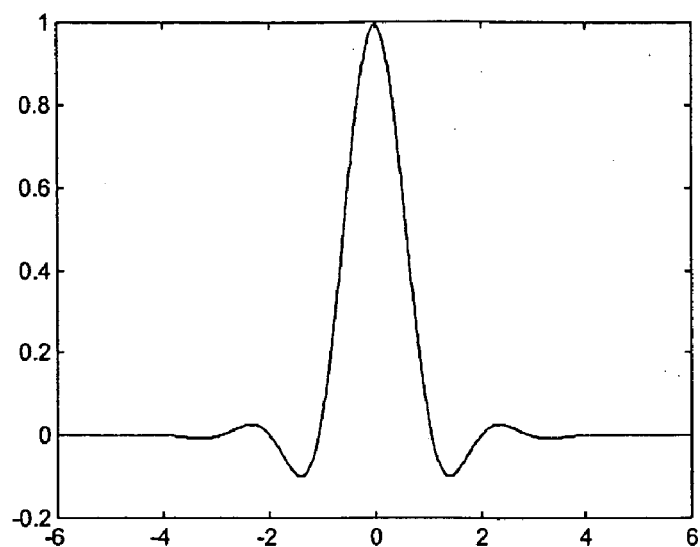

FIG. 11 depicts interpolating Cardinal Spline (D=5).

Figure 12A:
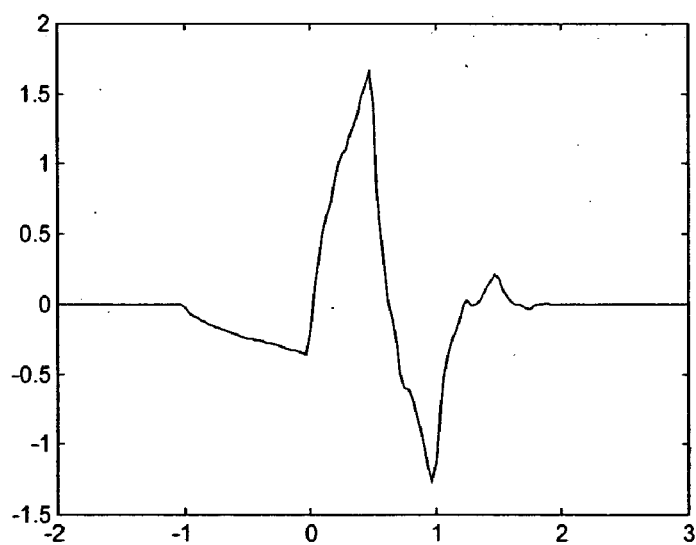
Figure 12B:
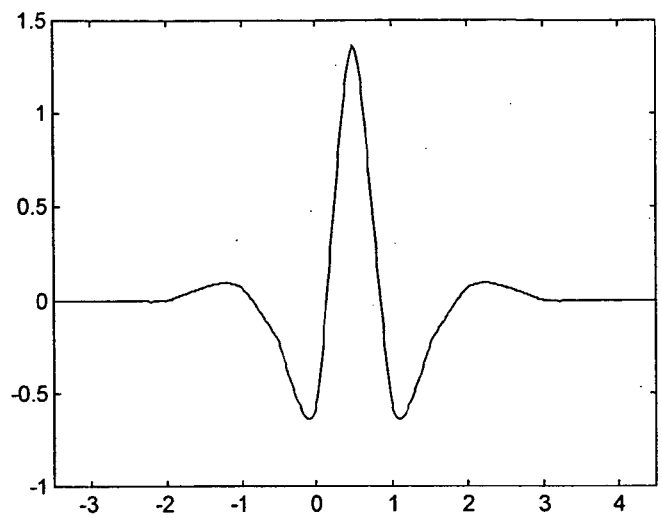

FIGS. 12(a–b) depict interpolating wavelets by auto-correlation shell (D=3) with (a) Daubechies wavelet (b) Dubuc wavelet.

Figure 13:
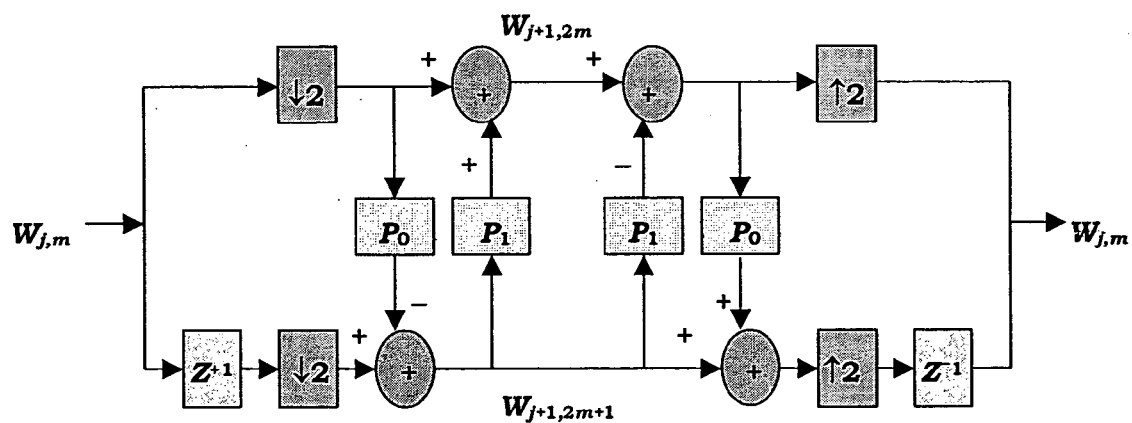
Figure 14A:
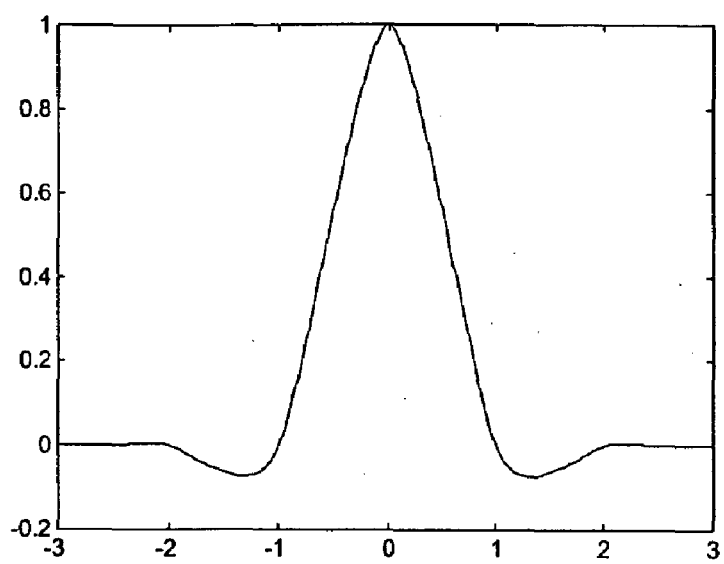
Figure 14B:
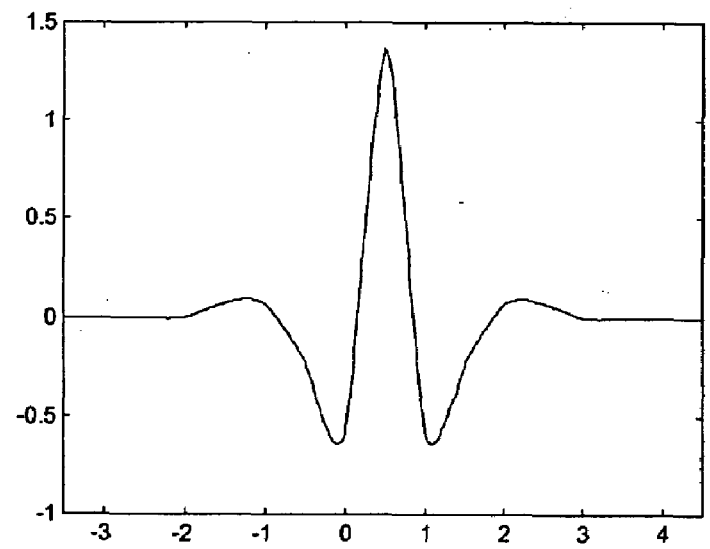
Figure 14C:
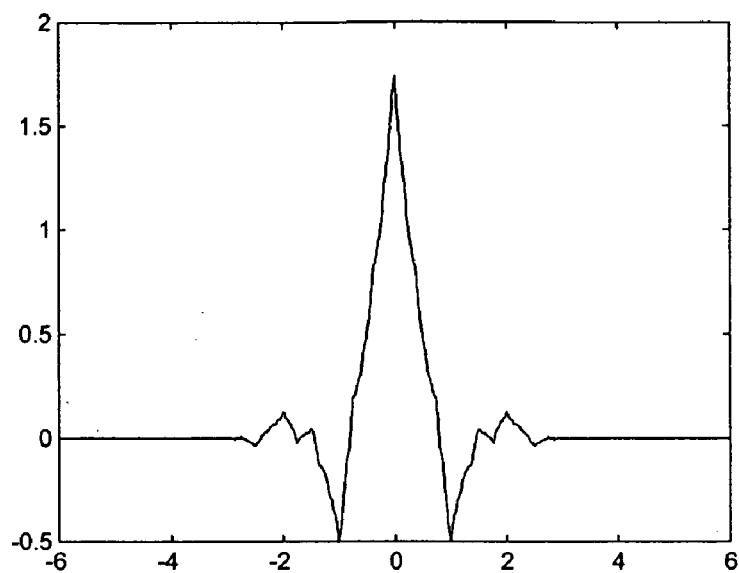
Figure 14D:
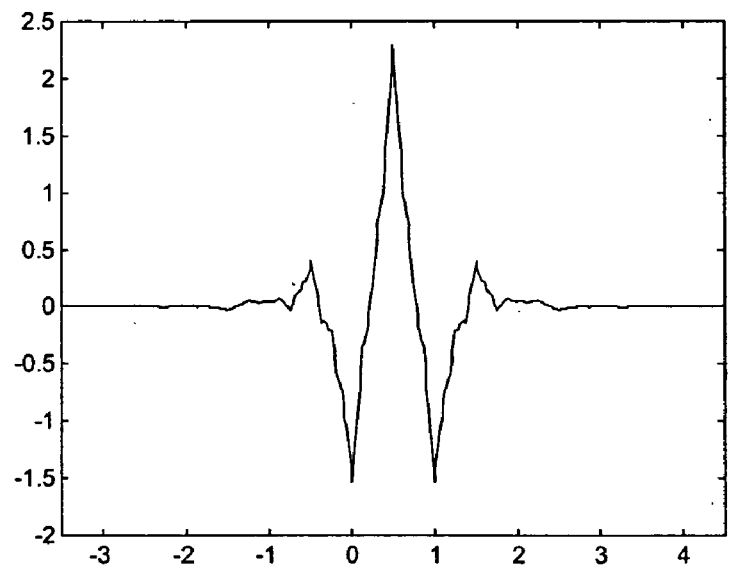

FIG. 13 depicts a Lifting scheme.

FIGS. 14(a–b) depict Lagrange Wavelets with D=3 (a) Scaling function, (b) Wavelet, (c) Dual scaling function, and (d) Dual wavelet.

Figure 15A:
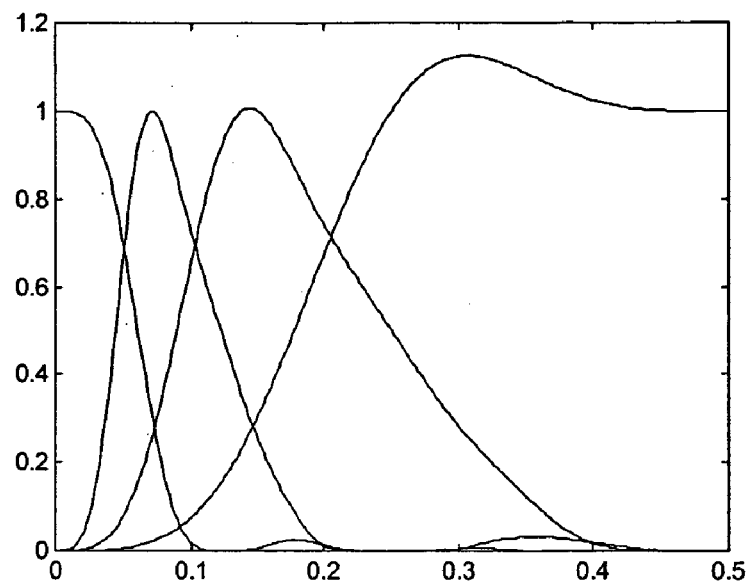
Figure 15B:
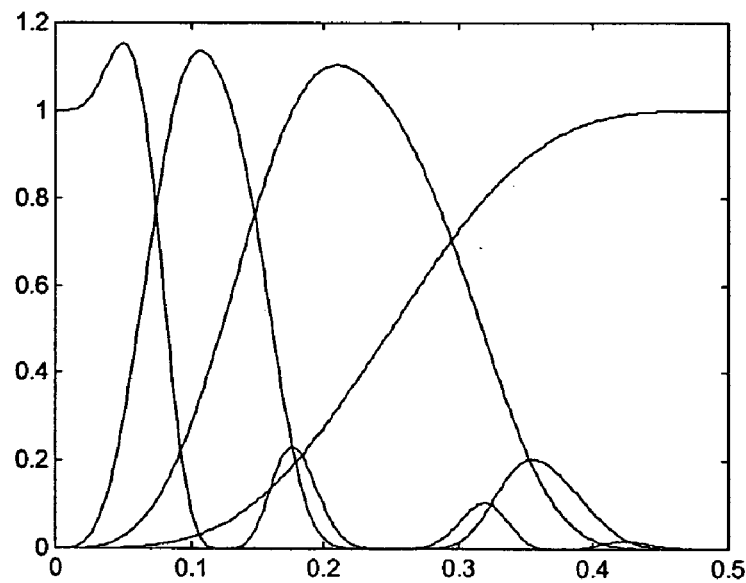
Figure 16A:
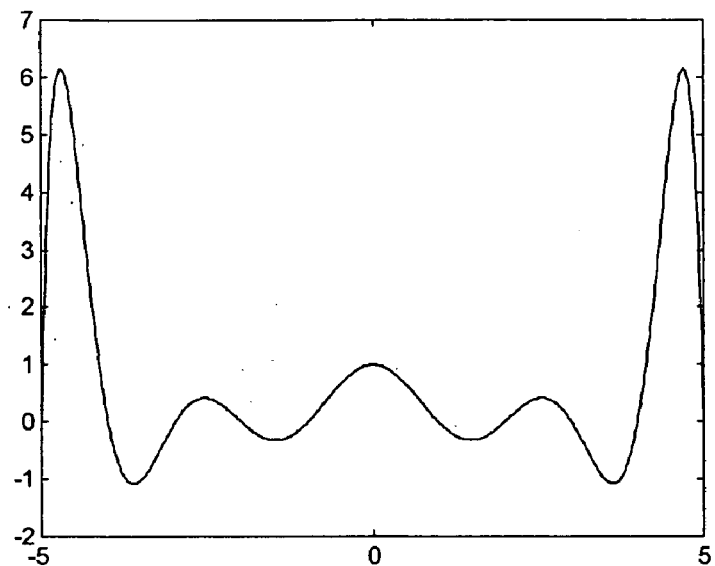
Figure 16B:
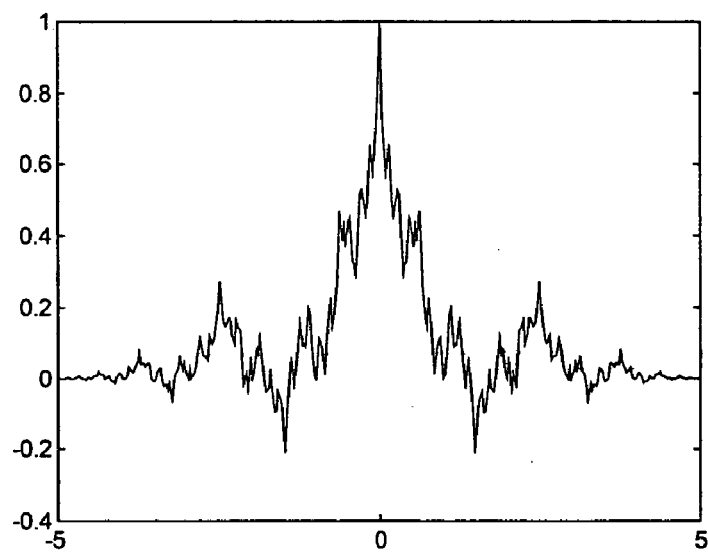
Figure 16C:
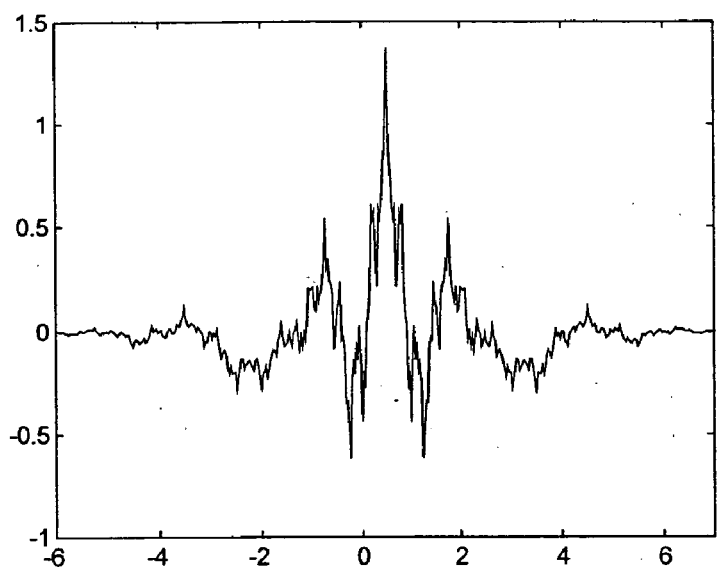
Figure 16D:
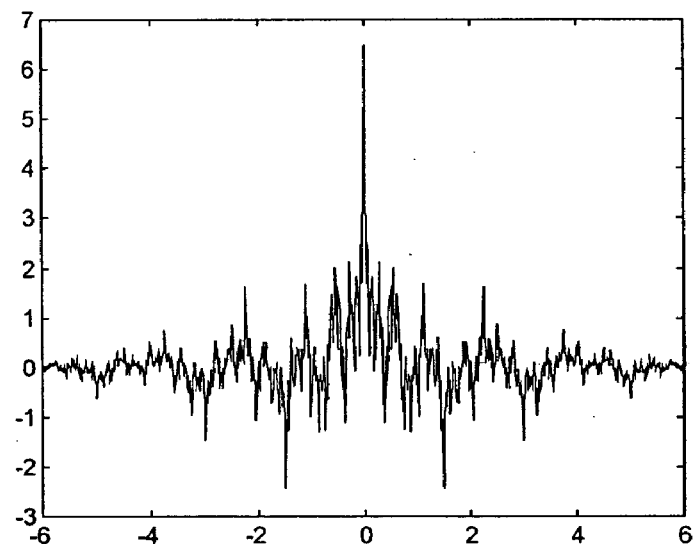
Figure 16E:
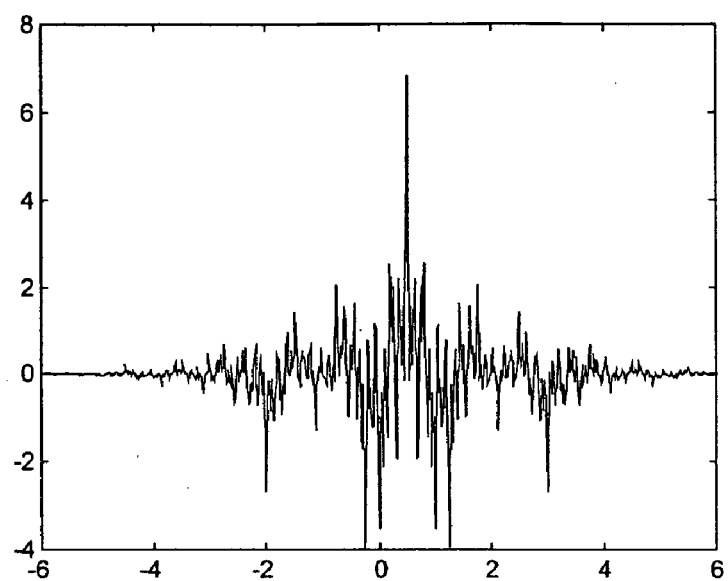
Figure 17A:
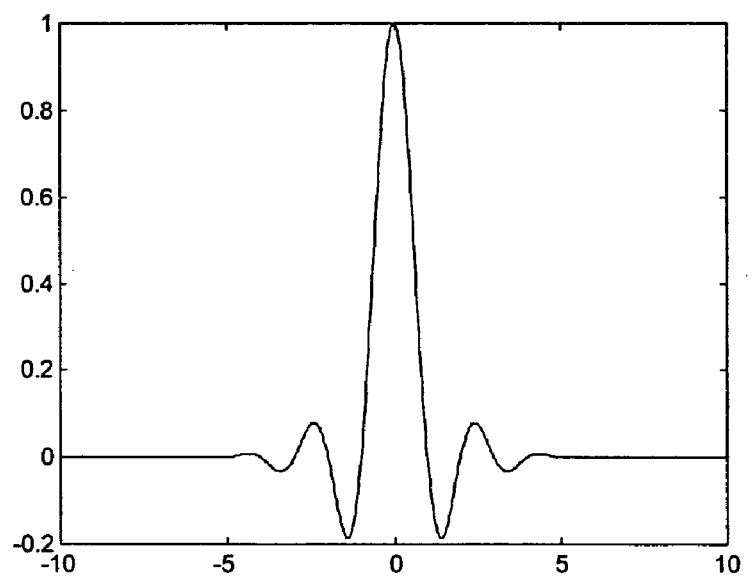
Figure 17B:
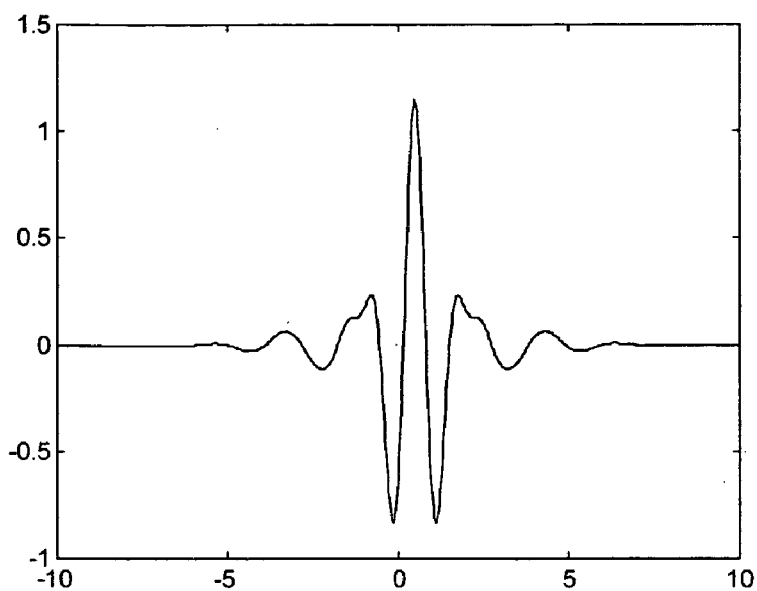
Figure 17C:
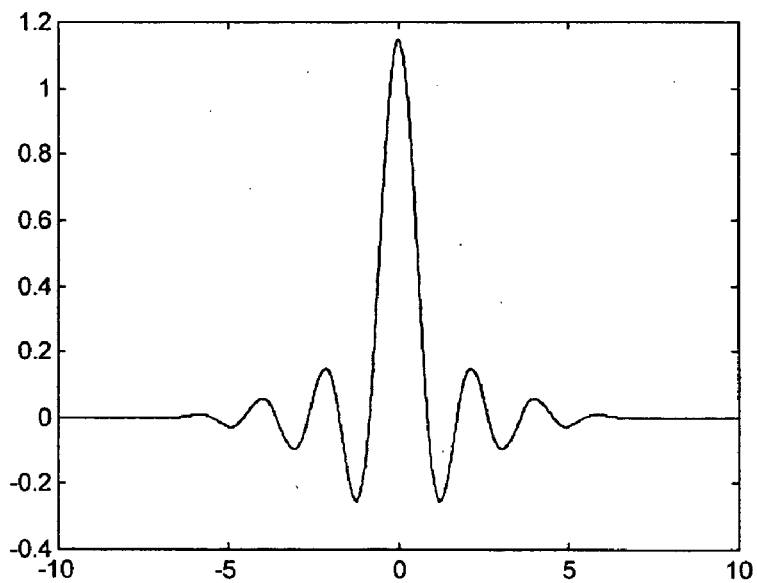
Figure 17D:
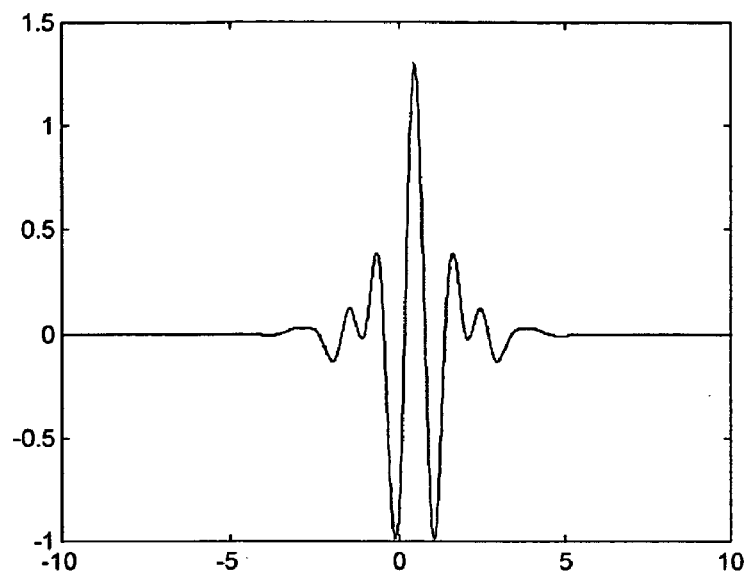

FIGS. 15(a–b) depict Frequency Response of Equivalent Filters (D=3) (a) Decomposition and (b) Reconstruction.

FIGS. 16(a–e) depict non-regularized Lagrange Wavelets (M=5) (a) Lagrange polynomial, (b) Scaling function, (c) Wavelet, (d) Dual scaling function, and (e) Dual wavelet.

FIGS. 17(a–d) depict B-Spline Lagrange DAF Wavelets (N=4, η=2) (a) Scaling function, (b) Wavelet, (c) Dual scaling function, and (d) Dual wavelet.

Figure 18A:
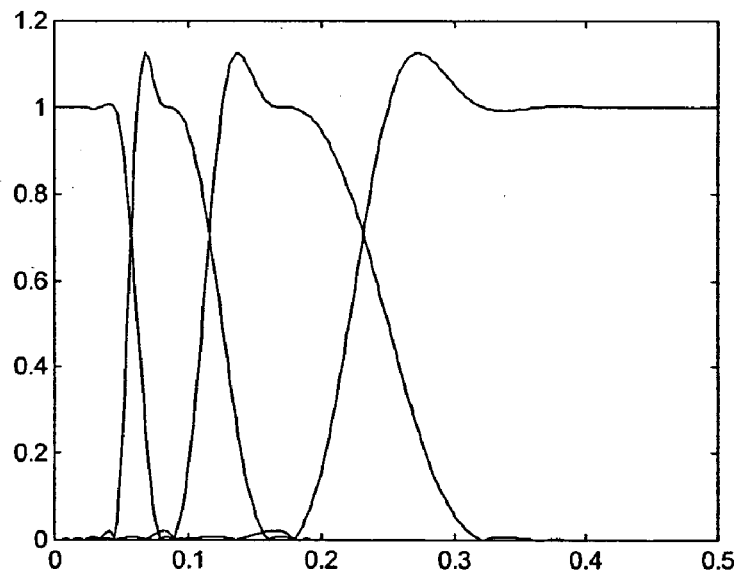
Figure 18B:
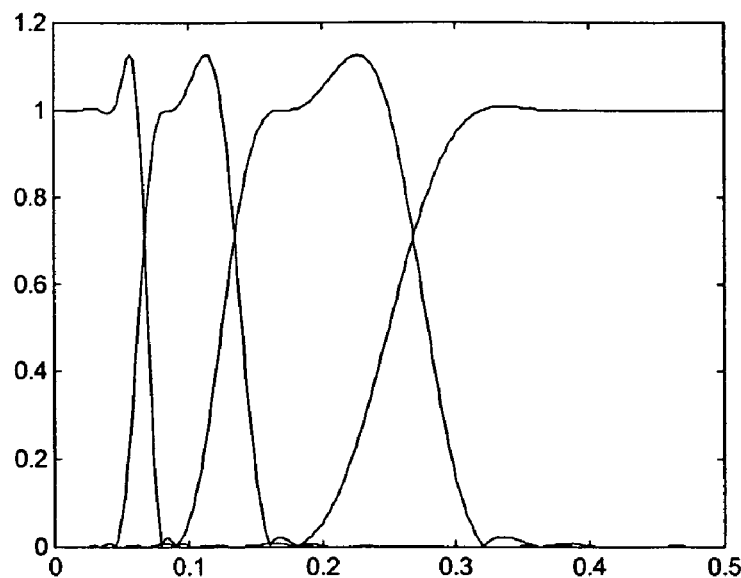

FIGS. 18(a–b) depict Frequency Response of Equivalent Filters (N=4, η=2) (a) Decomposition and (b) Reconstruction.

Figure 19:
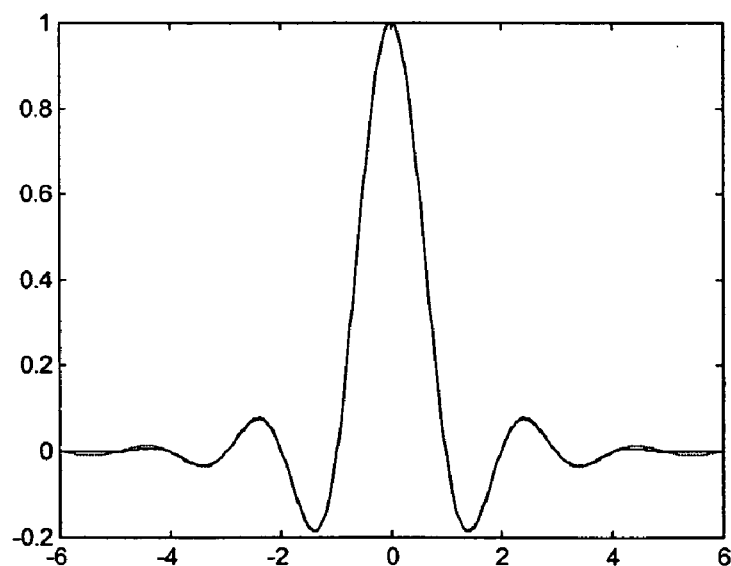

FIG. 19 depicts a Mother wavelet comparison (N=4,η=2) Solid: B-spline Lagrange; dotted: Gaussian-Lagrange.

Figure 20:
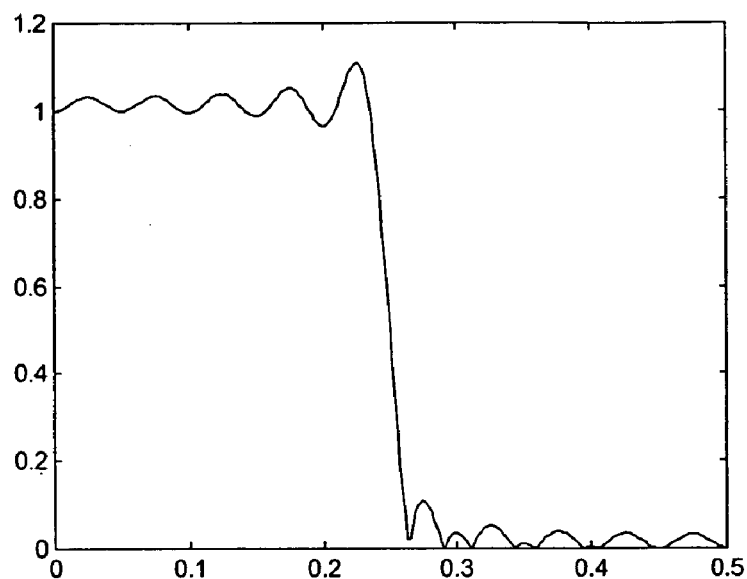
Figure 21A:
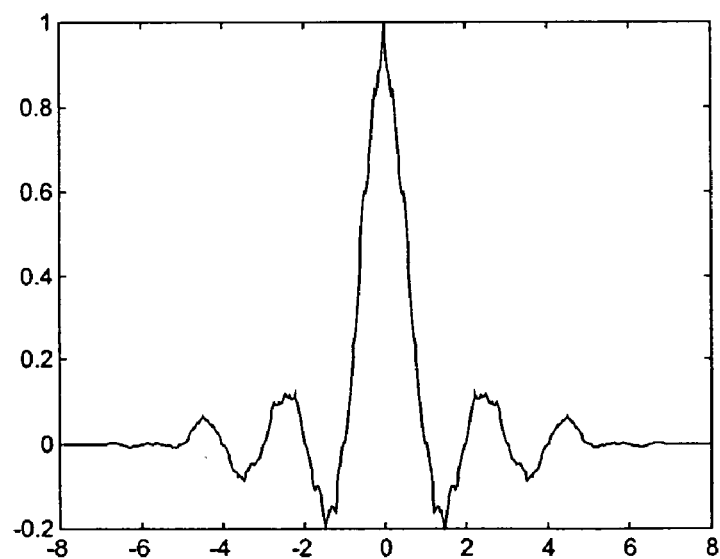
Figure 21B:
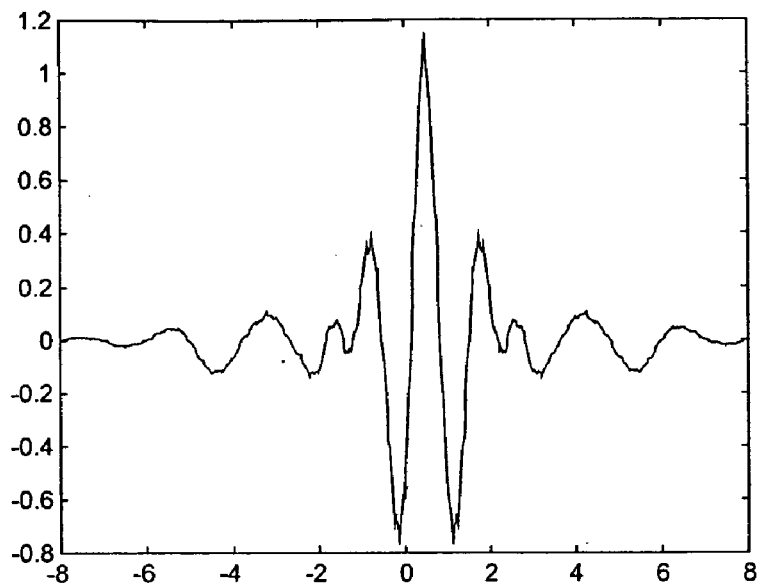
Figure 21C:
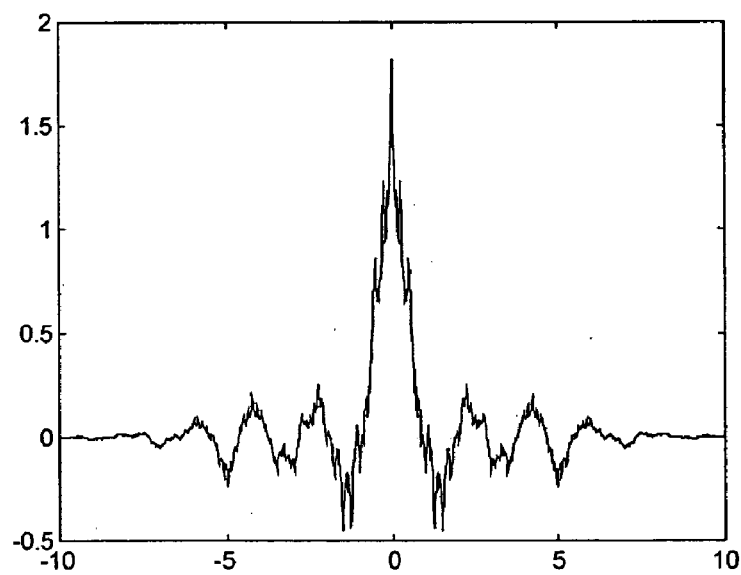
Figure 21D:
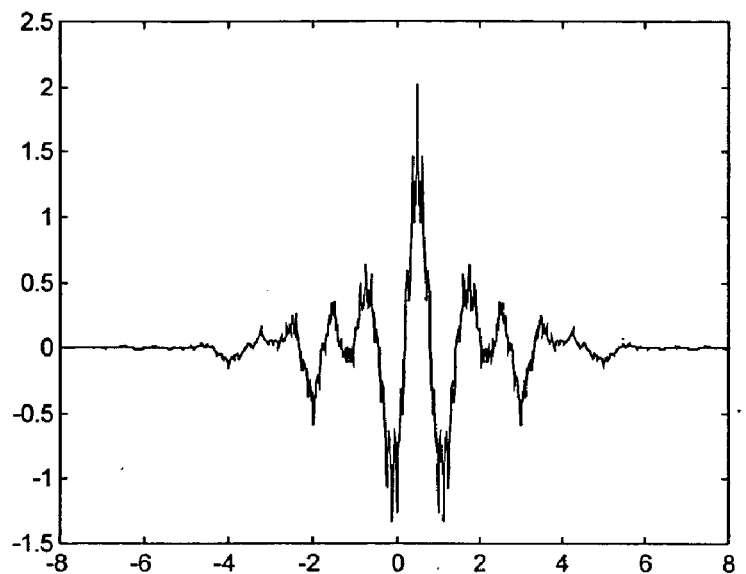
Figure 22A:
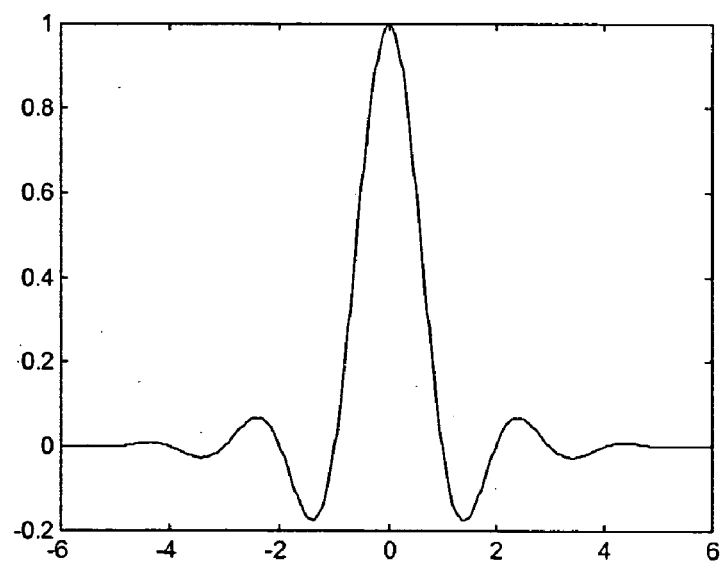
Figure 22B:
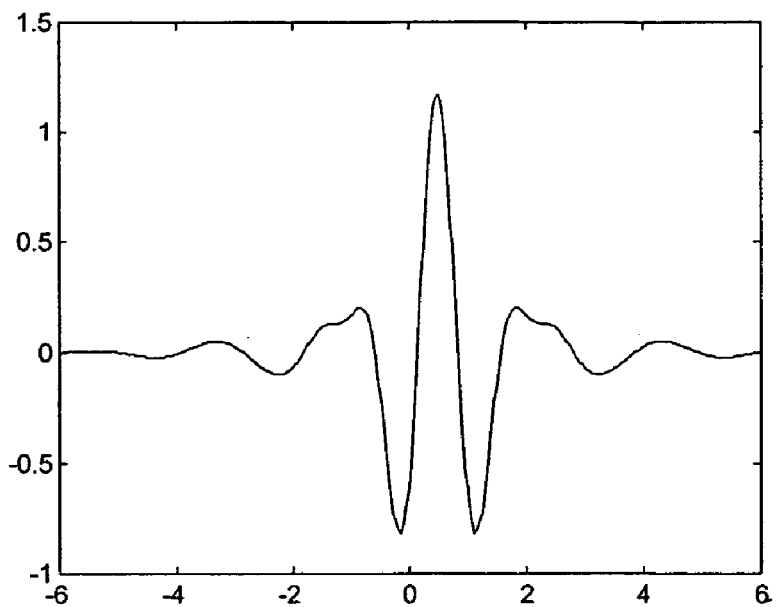
Figure 22C:
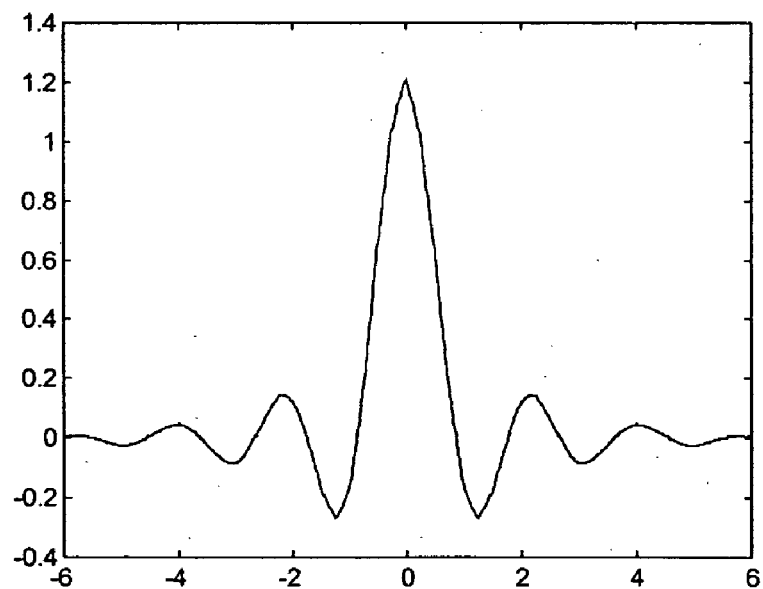
Figure 22D:
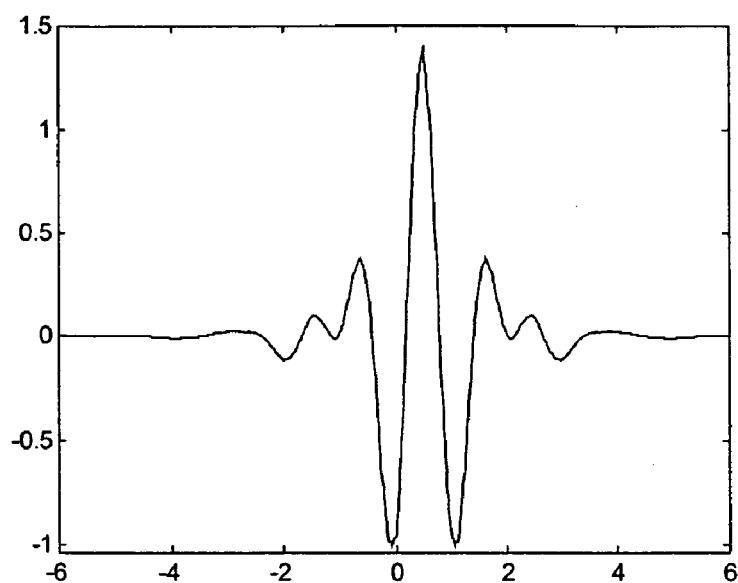

FIG. 20 depicts a Gibbs overshoot of the Sinc FIR.

FIGS. 21(a–d) depict Sine Cutoff Wavelets (M=9) (a) Scaling, (b) Wavelet, (c) Dual scaling, and (d) Dual wavelet.

FIGS. 22(a–d) depicts B-Spline Lagrange DAF Wavelets (N=5, η32 3) (a) Scaling, (b) Wavelet, (c) Dual scaling, and (d) Dual wavelet.

Figure 23A:
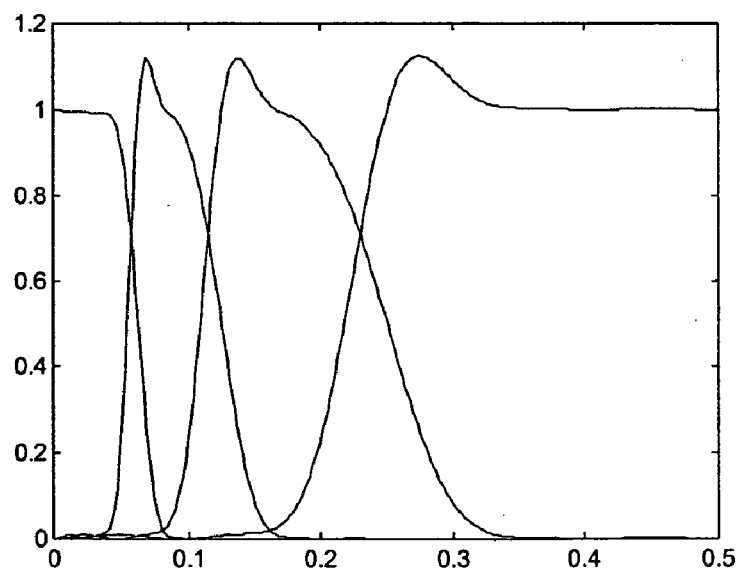
Figure 23B:
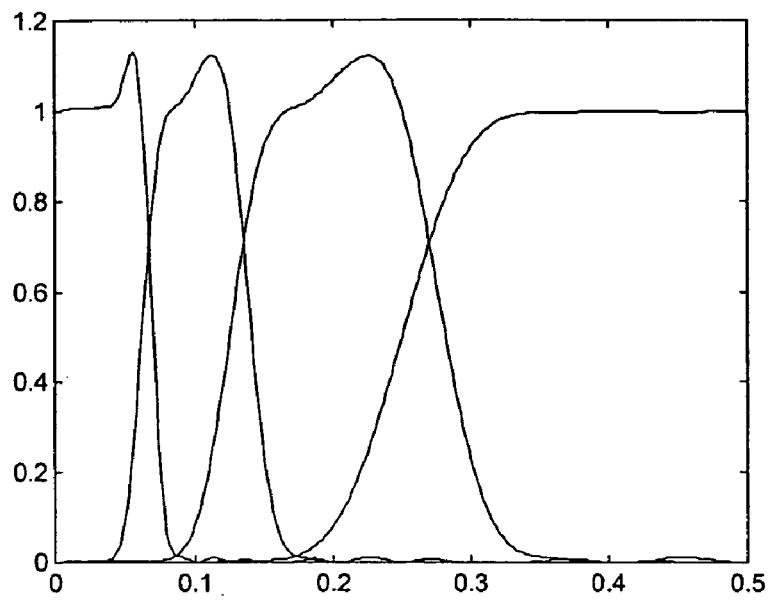

FIGS. 23(a–b) depicts Frequency Response of Equivalent Filters (N=5, η=3) (a) Decomposition and (b) Reconstruction.

Figure 24:
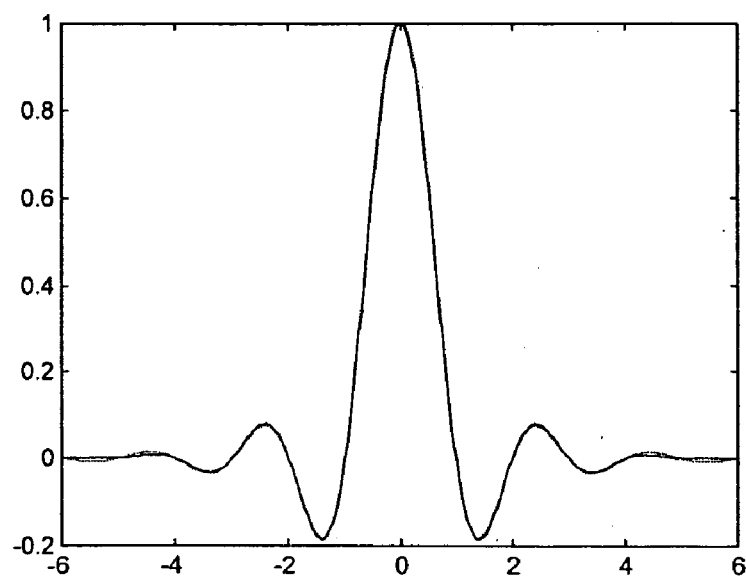

FIG. 24 depicts a Mother Wavelet Comparison (N=4, η=2) Solid: B-spline Sinc; dotted: Gaussian Sinc.

Figure 25A:
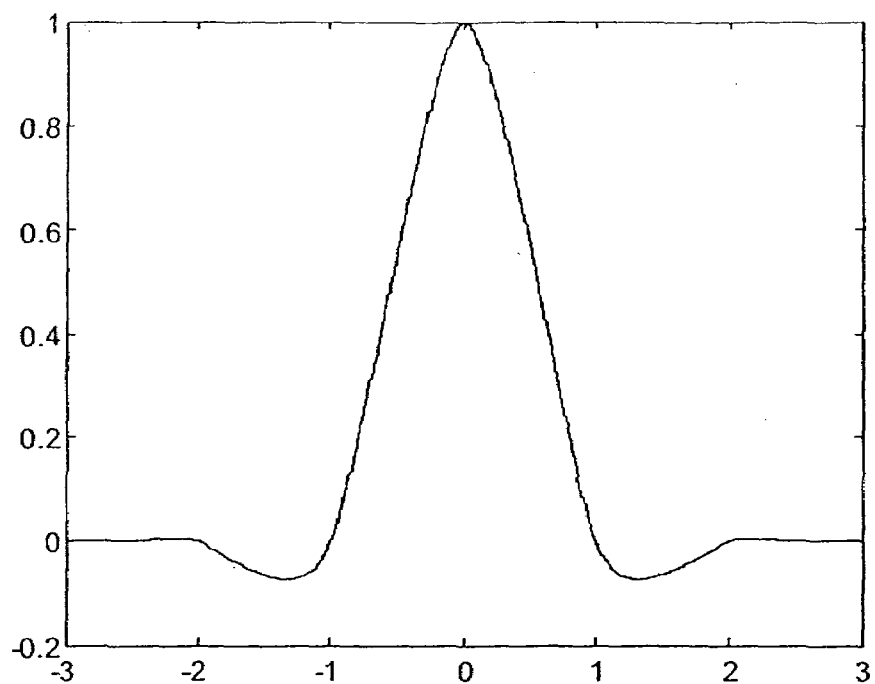
Figure 25B:
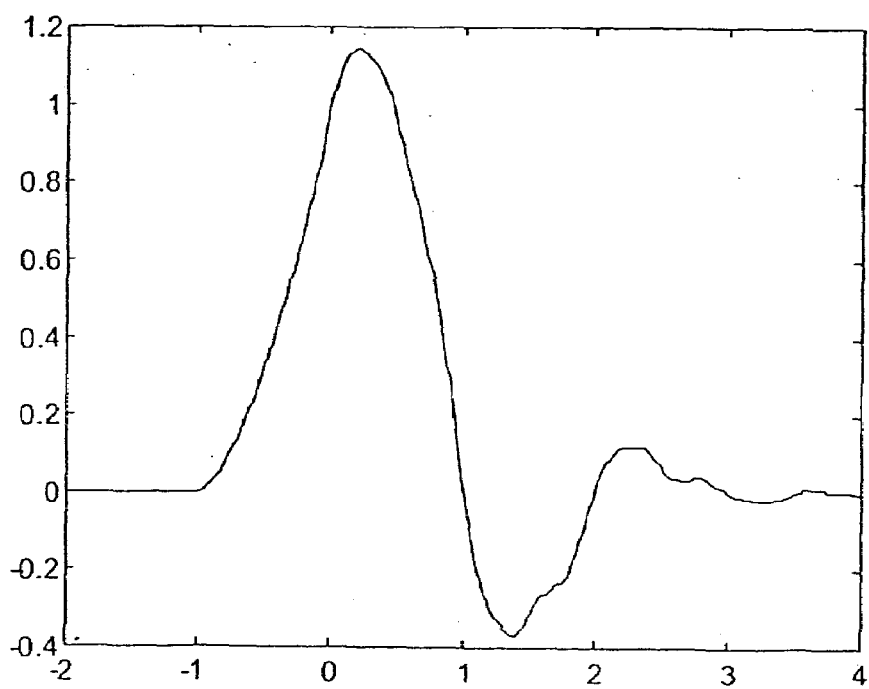

FIGS. 25(a–b) depict Dubuc wavelets (D=3) (a) Inner scaling and (b) Boundary scaling.

Figure 26A:
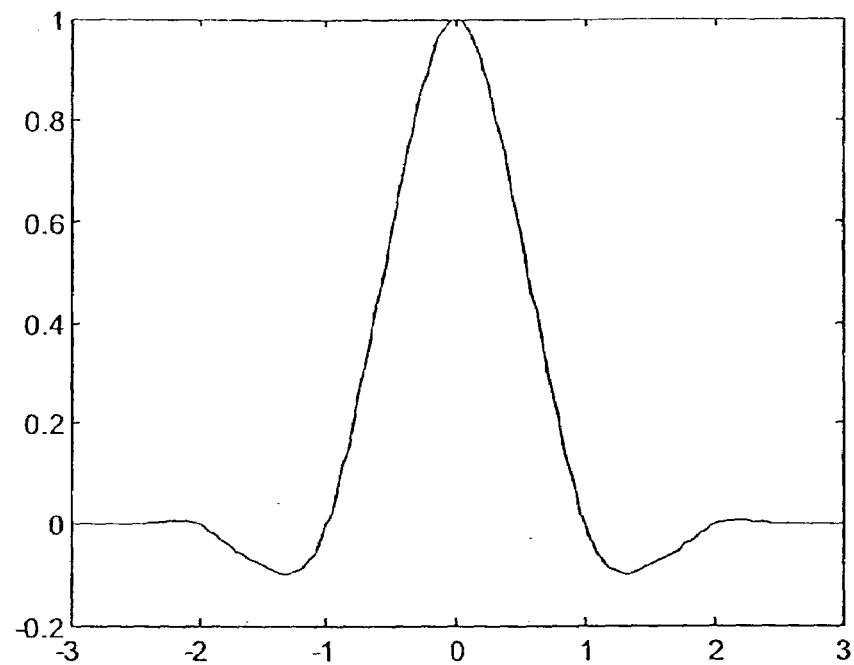
Figure 26B:
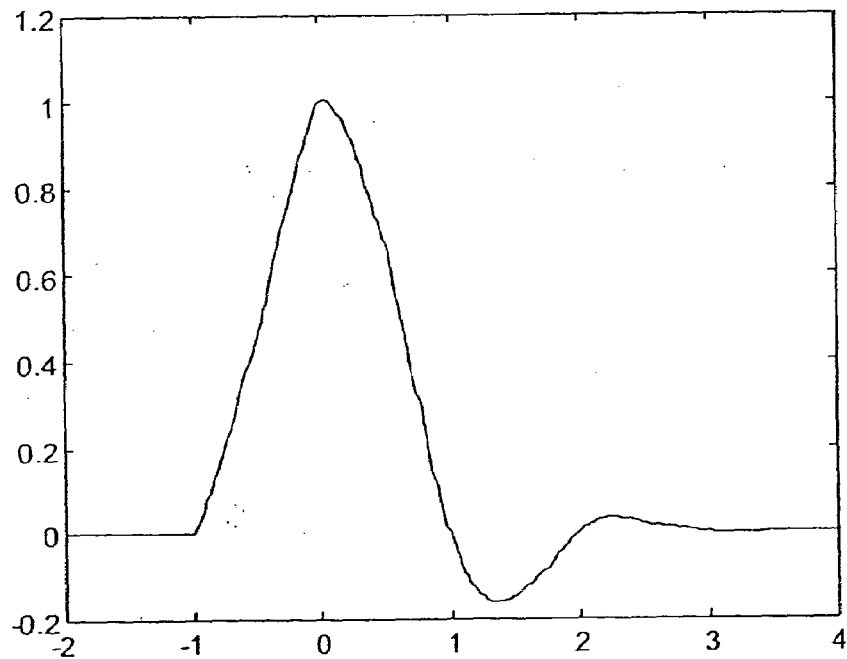

FIGS. 26(a–b) depict Generalized Sinc wavelets (N=2, η=2) (a) Inner scaling and (b) Boundary scaling.

Figure 27A:
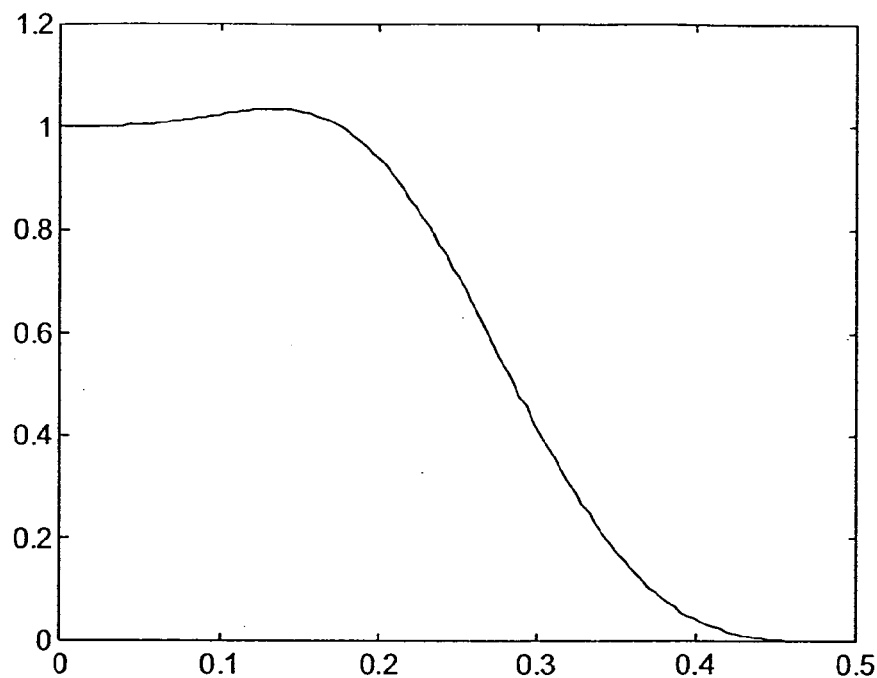
Figure 27B:
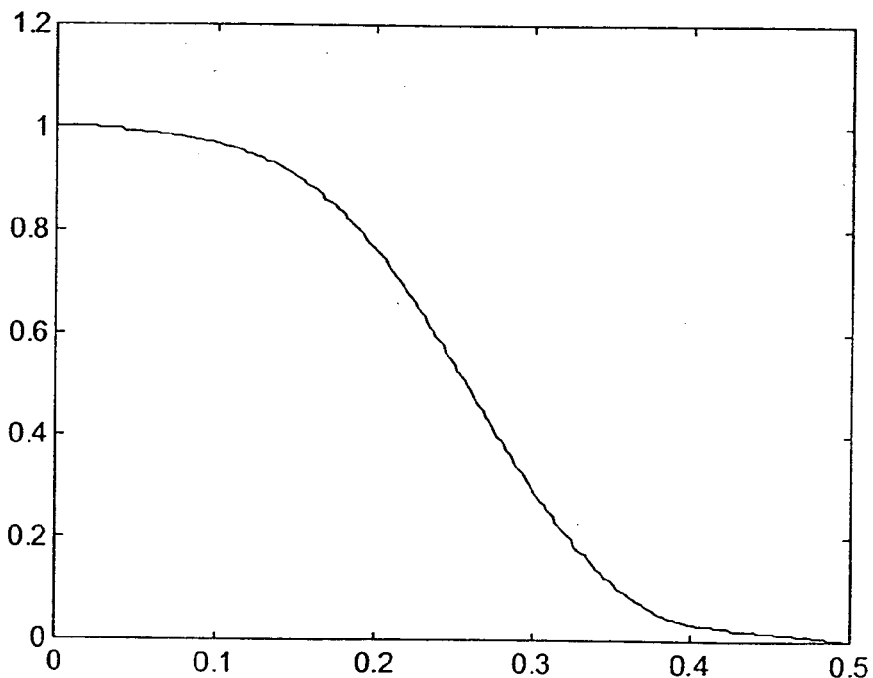

FIGS. 27(a–b) depict Frequency response comparison of boundary filters (a) Halfband Lagrange wavelet and (b) Sinc-DAF wavelet.

Figure 28A:
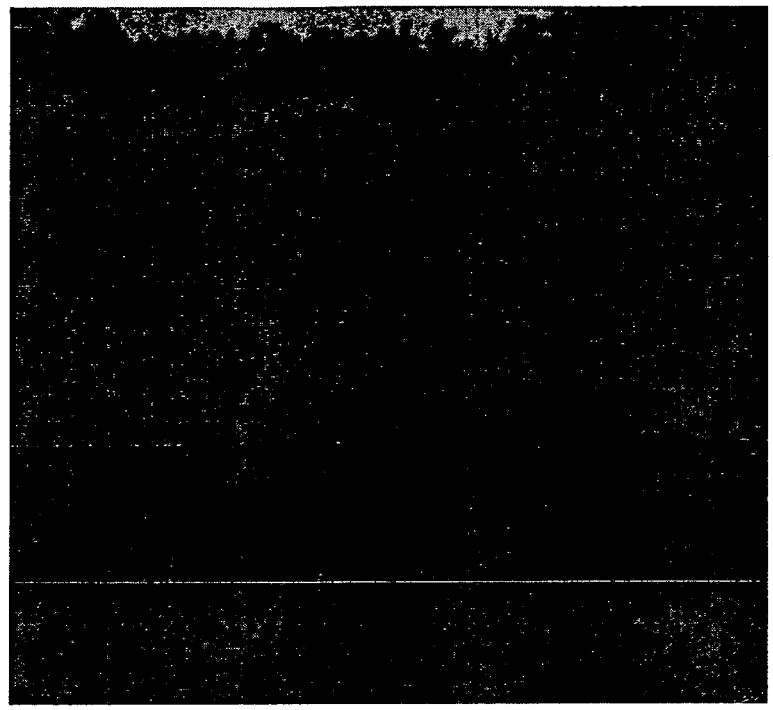
Figure 28B:
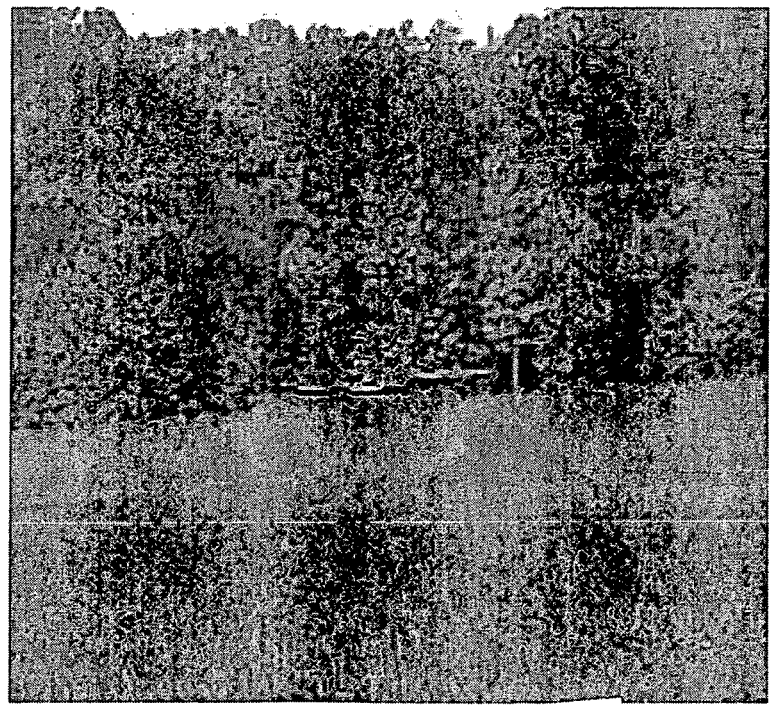

FIGS. 28(a–b) depict Target extractions from color background (a) Original pilot view and (b) DAF-wavelet restoration.

Figure 29B:
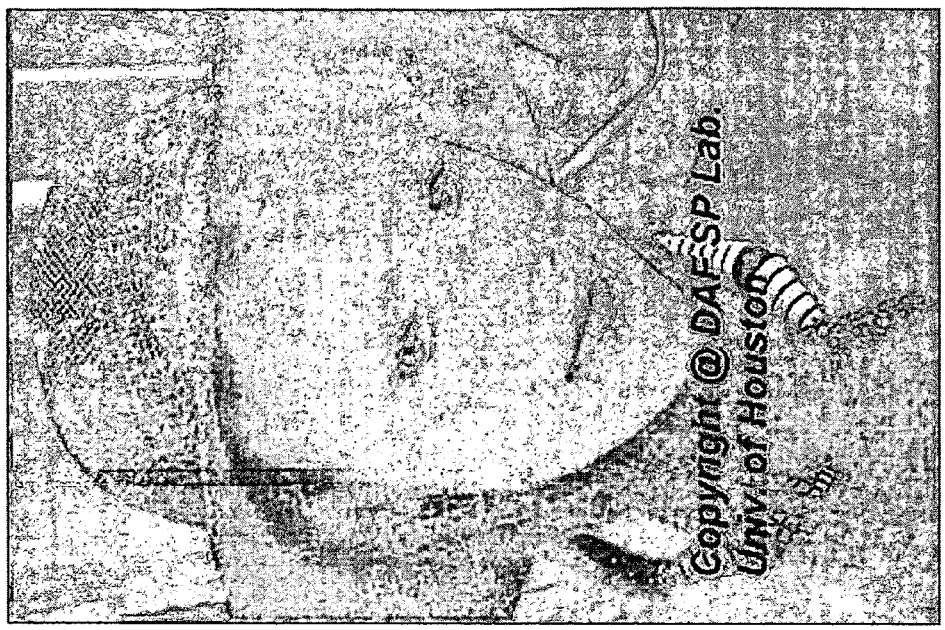
Figure 29A:
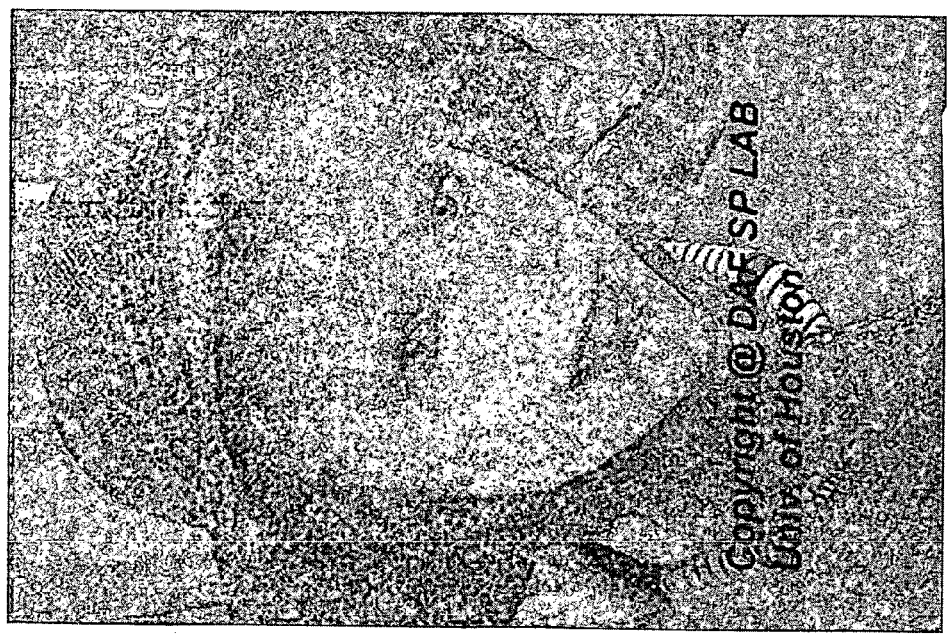

FIGS. 29(a–b) depicts a Visual Color Image Restoration (a) Noisy girl and (b) Our restoration.

FIGS. 30(a–c) depicts an enhancement of Database 1 (a) Original Mammogram, (b) Linear enhancement and (c) Non-linear enhancement.

FIGS. 31(a–b) depict an enhancement of Database 2 (a) Original mammogram and (b) Enhancement.

Dual Window Selective Averaging Filter

Figure 32A:
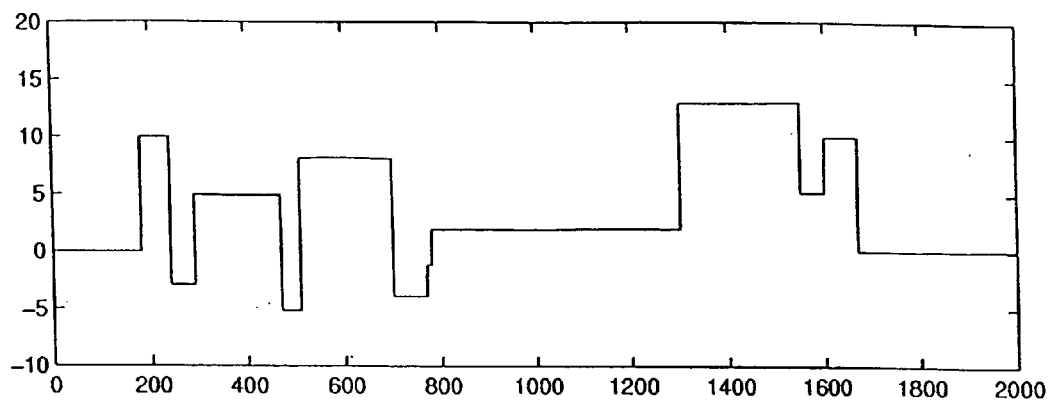
Figure 32B:
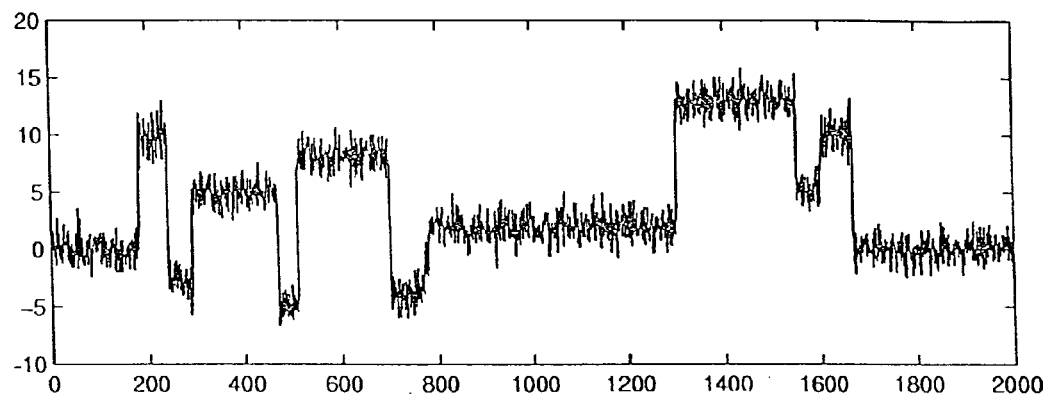

FIGS. 32(a–c) depict the filtering of blocked signals corrupted by Gaussian noise: (a) noise-free blocks signal; (b) noisy signal (MSE=1.00, MAE=0.80); and (c) filtered signal by DWSAF (MSE=6.19E-2, MAE=6.49E-3).

FIGS. 33(a–b) depict image restorations from lower noise Lena image: (a) corrupted image (PSNR=22.17 dB) and (b) restored image by DWSAF (PSNR=30.69 dB).

FIGS. 34(a–b) depict image restorations from higher noise Lena image: (a) corrupted image (PSNR=18.82 dB) and (b) restored image by DWSAF (PSNR=28.96 dB).

Lagrange Wavelets for Signal Processing

Figure 35A:
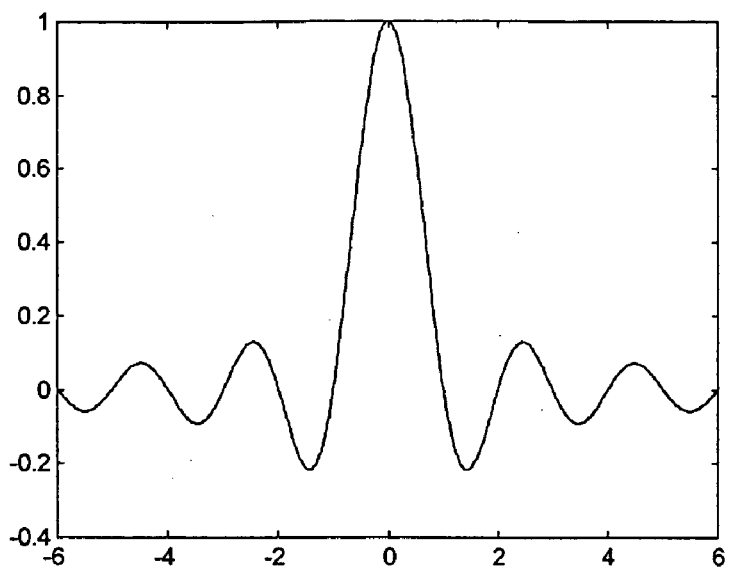
Figure 35B:
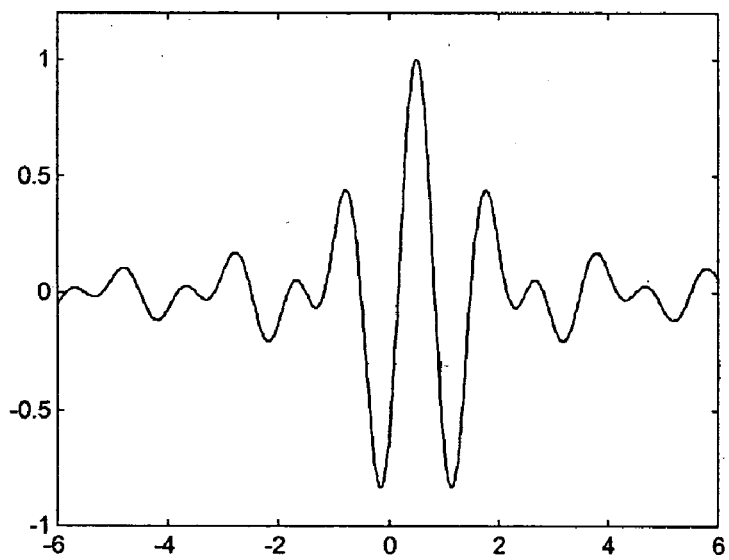

FIGS. 35(a–b) depict π band-limited interpolating wavelets (a) Sinc function and (b) Sinclet wavelet.

Figure 36:
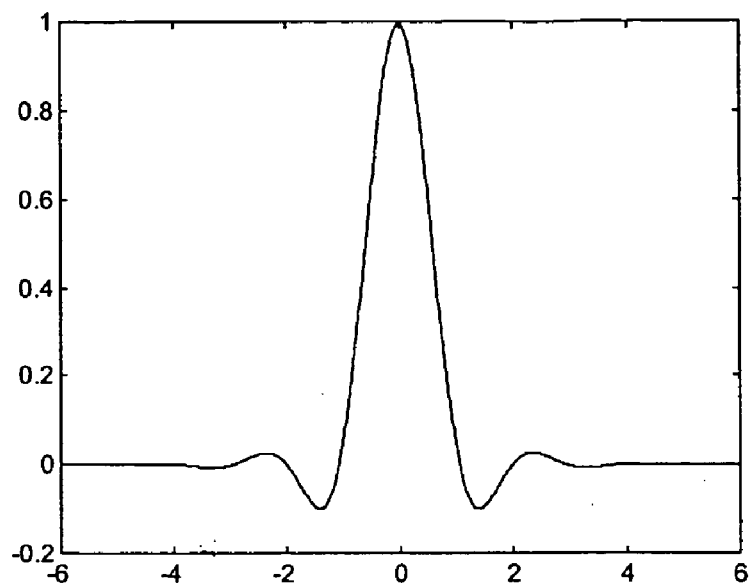

FIG. 36 depicts an Interpolating Cardinal Spline (D=5).

Figure 37A:
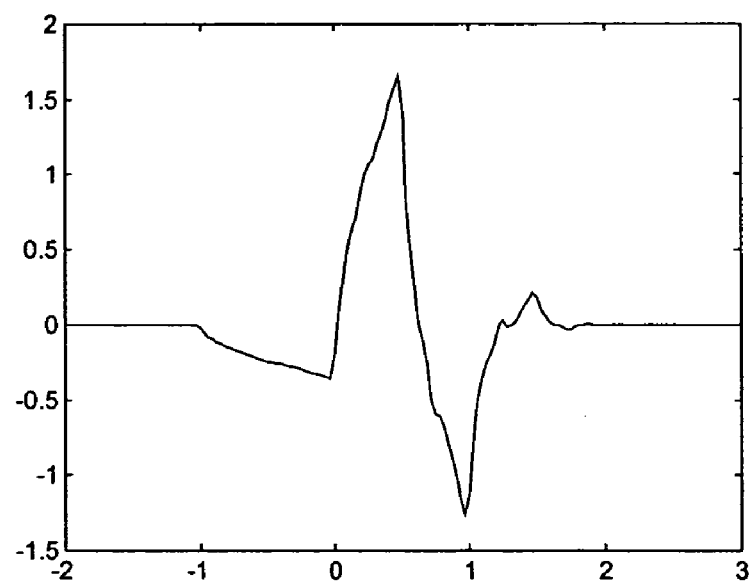
Figure 37B:
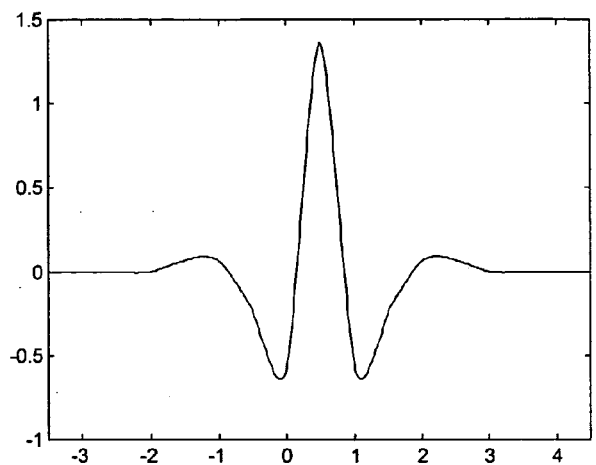

FIGS. 37(a–b) depict Interpolating wavelets by auto-correlation shell (D=3) (a) Daubechies wavelet and (b) Dubuc wavelet.

Figure 38:
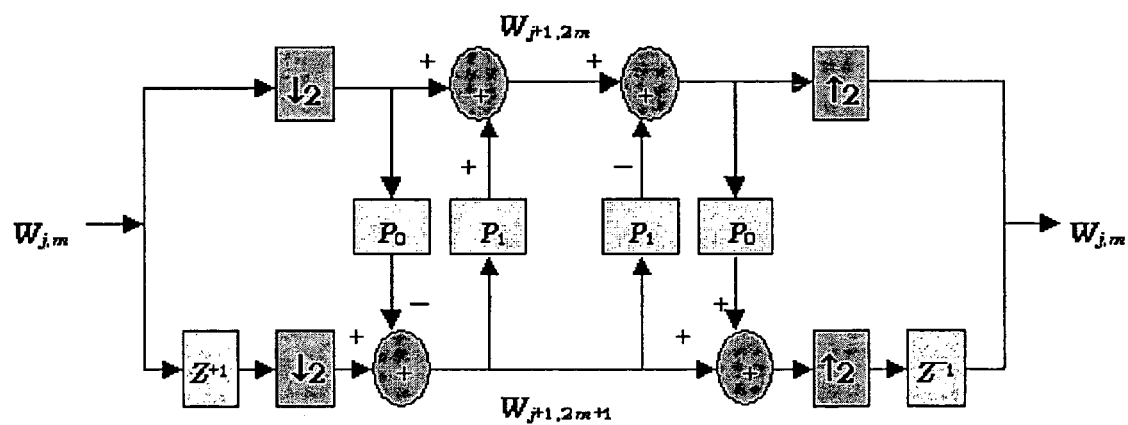
Figure 39A:
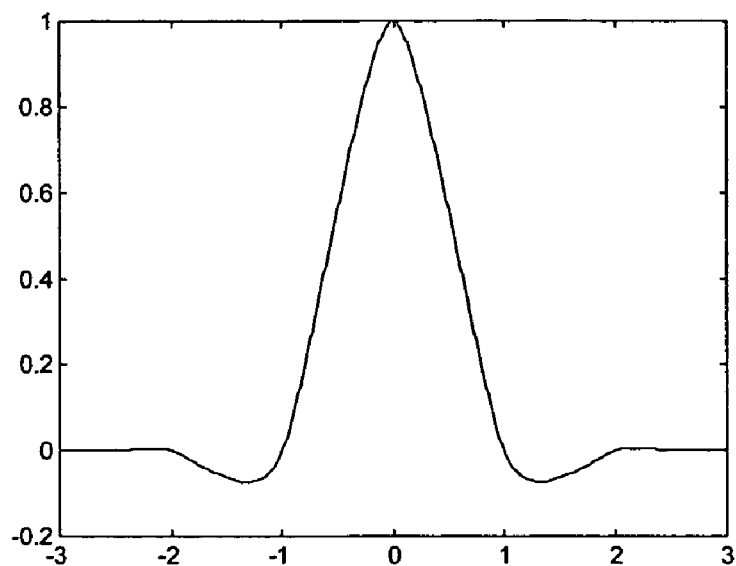
Figure 39B:
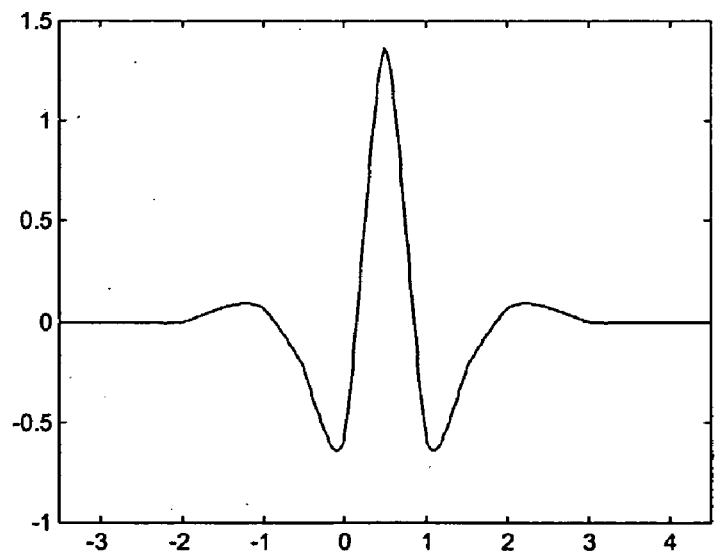
Figure 39C:
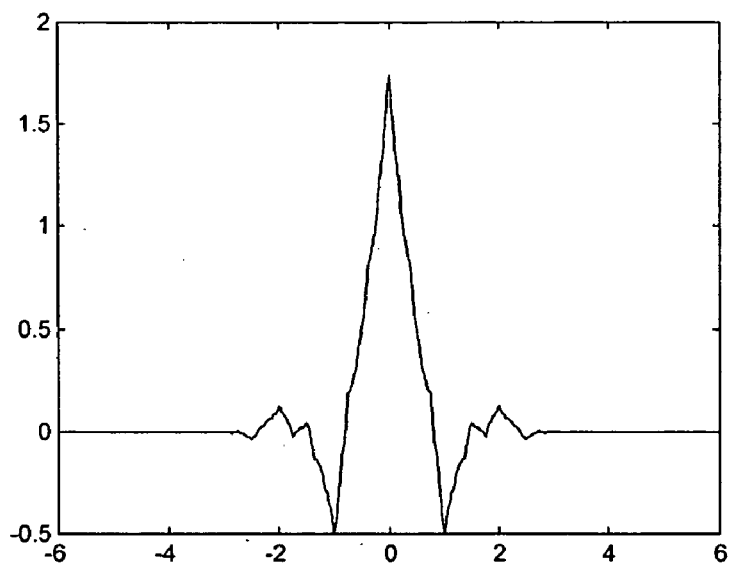
Figure 39D:
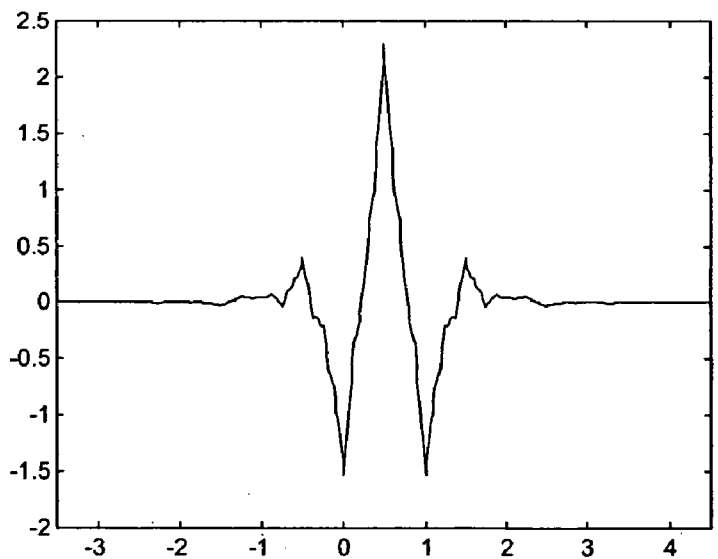

FIG. 38 depicts a Lifting scheme.

FIGS. 39(a–d) depict Lagrange Wavelets with D=3 (a) Scaling, (b) Wavelet, (c) Dual scaling, and (d) Dual wavelet.

Figure 40A:
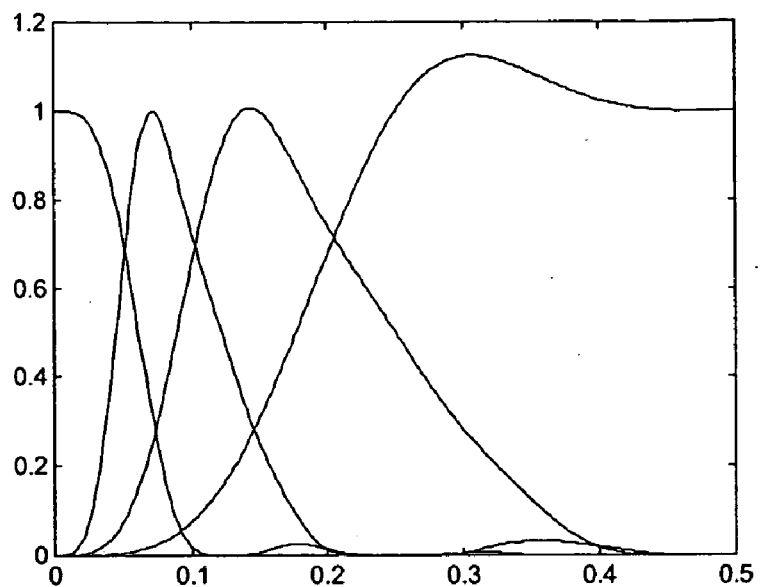
Figure 40B:
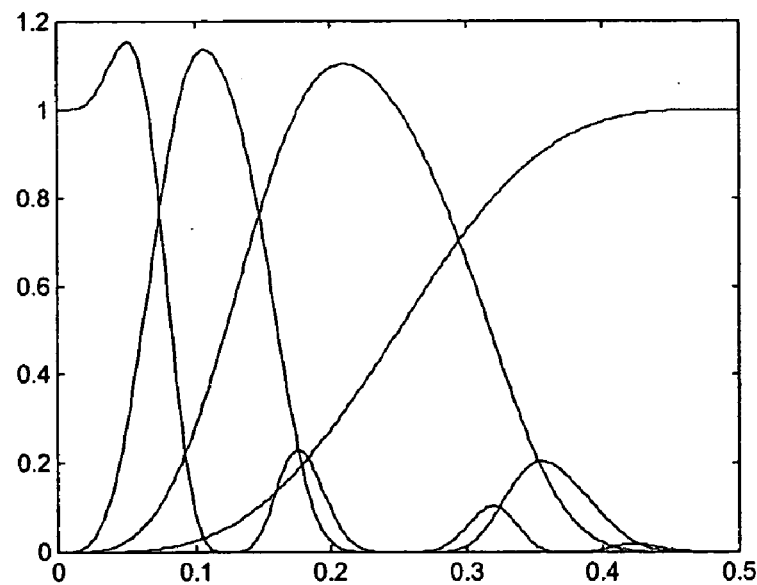

FIGS. 40(a–b) depict Frequency Response of Equivalent Filters (D=3) (a) Decomposition and (b) Reconstruction.

FIGS. 41(a–d) depict Lagrange Wavelets with D=9 (a) Scaling, (b) Wavelet, (c) Dual scaling, and (d) Dual wavelet.

Figure 42A:
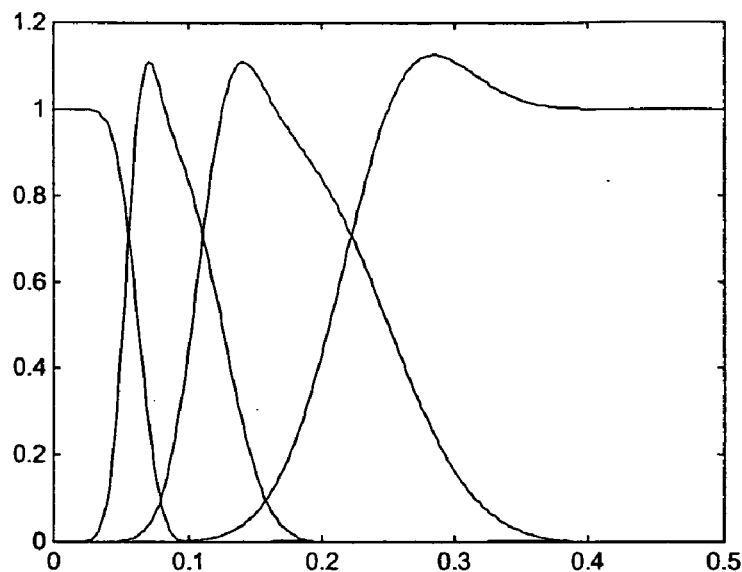
Figure 42B:
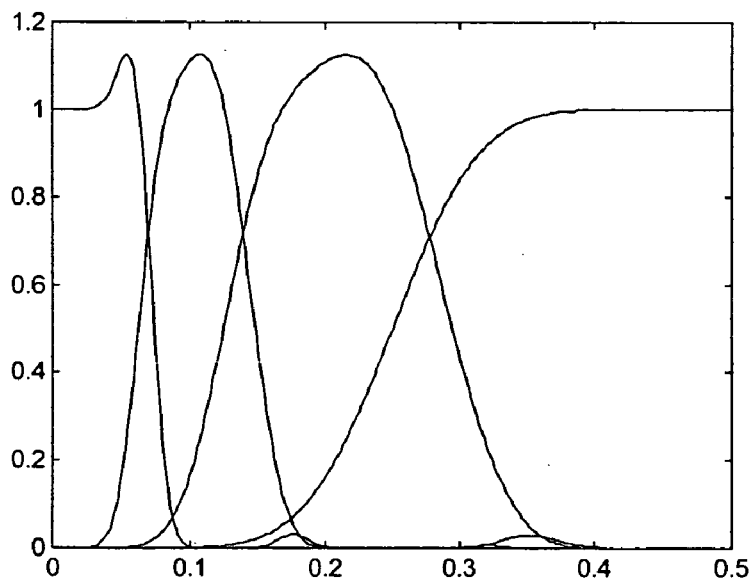
Figure 43A:
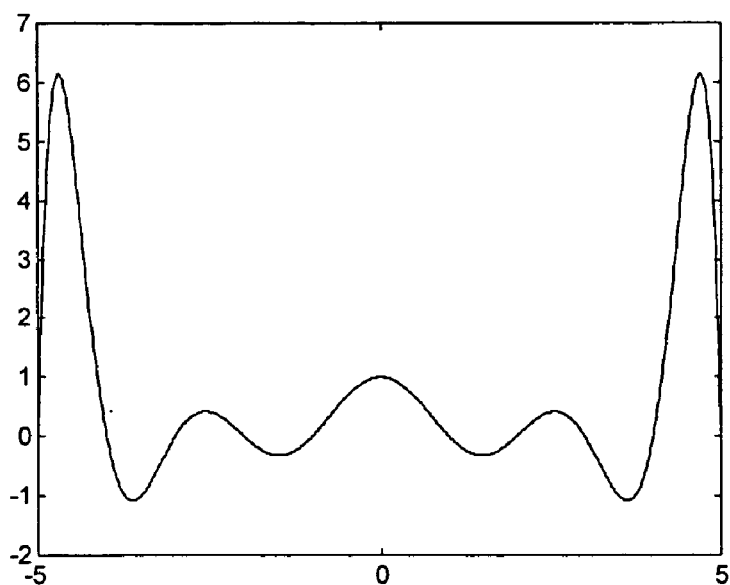
Figure 43B:
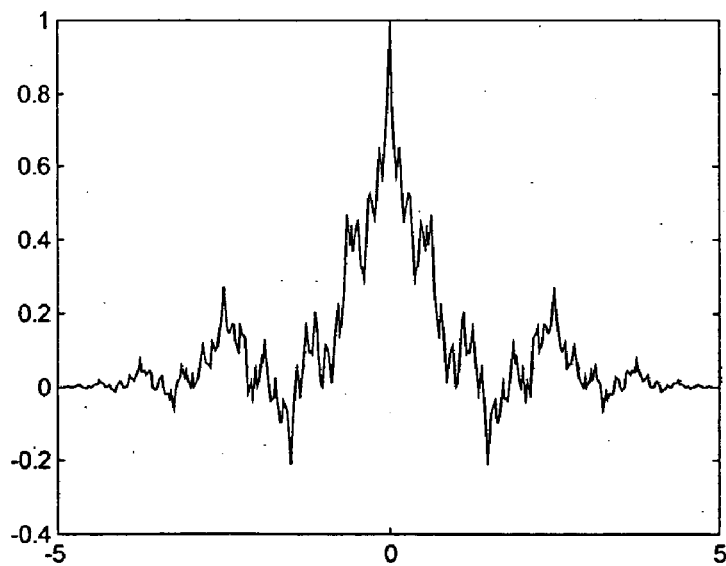
Figure 43C:
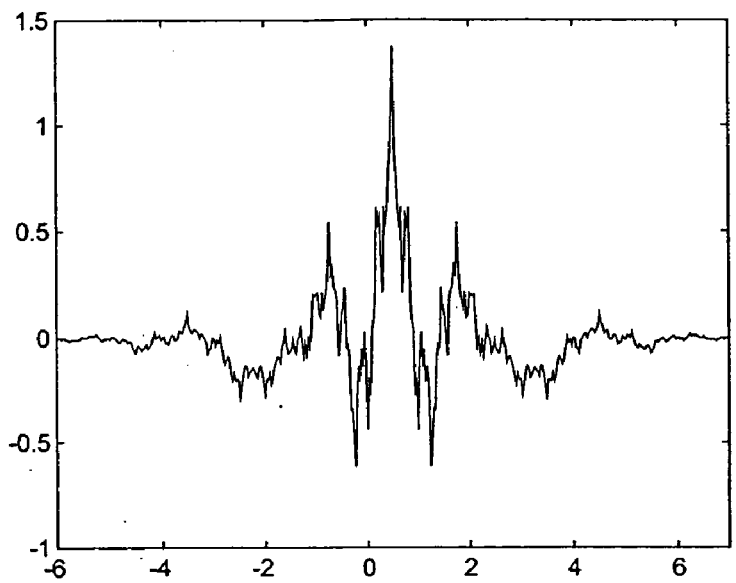
Figure 43D:
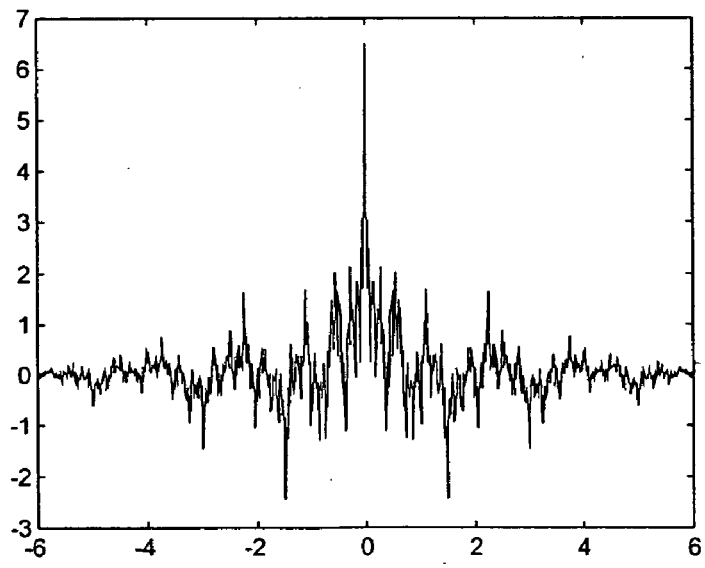
Figure 43E:
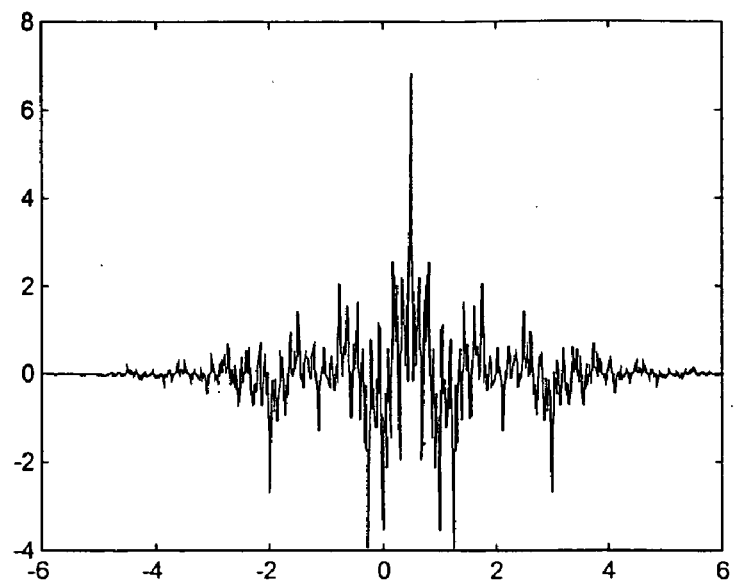
Figure 44A:
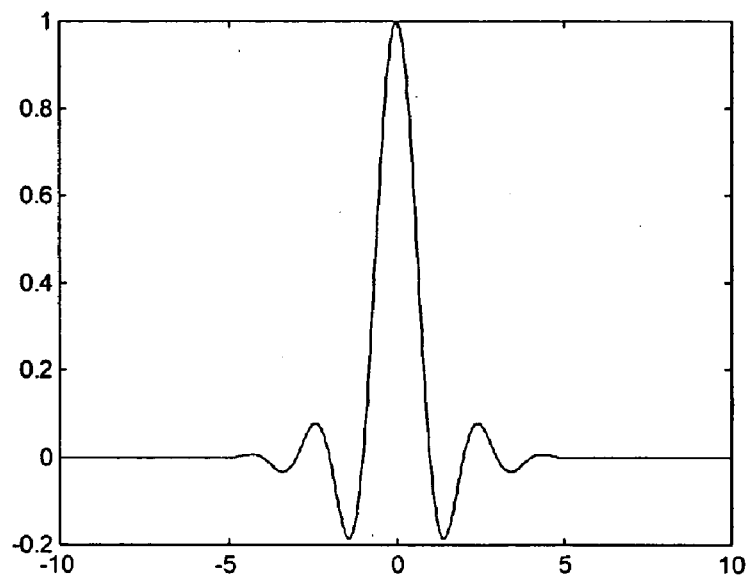
Figure 44B:
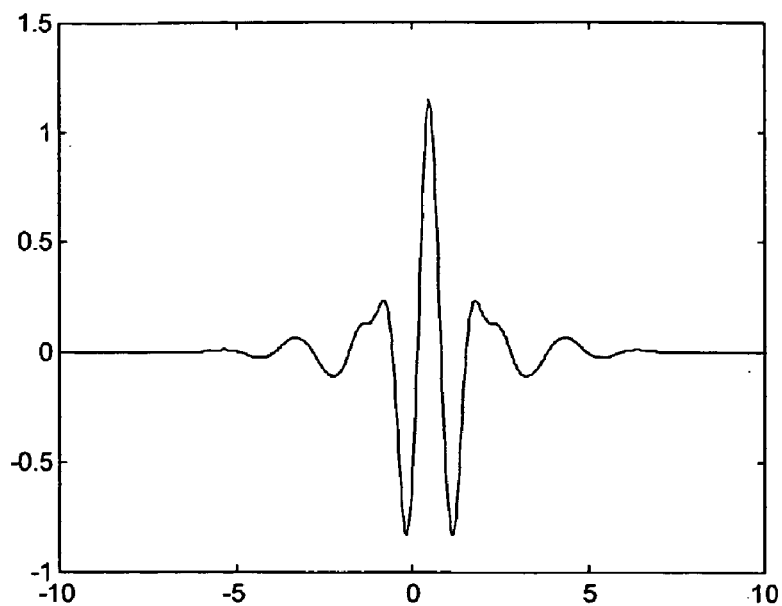
Figure 44C:
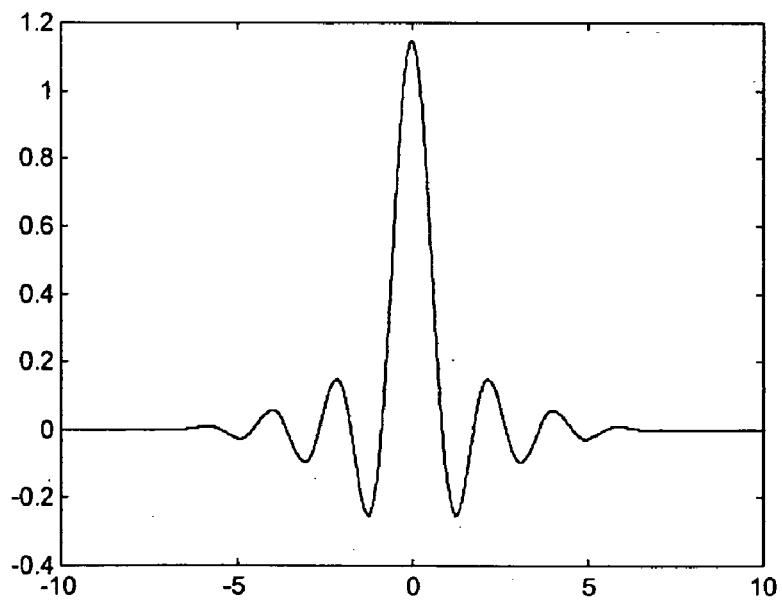
Figure 44D:
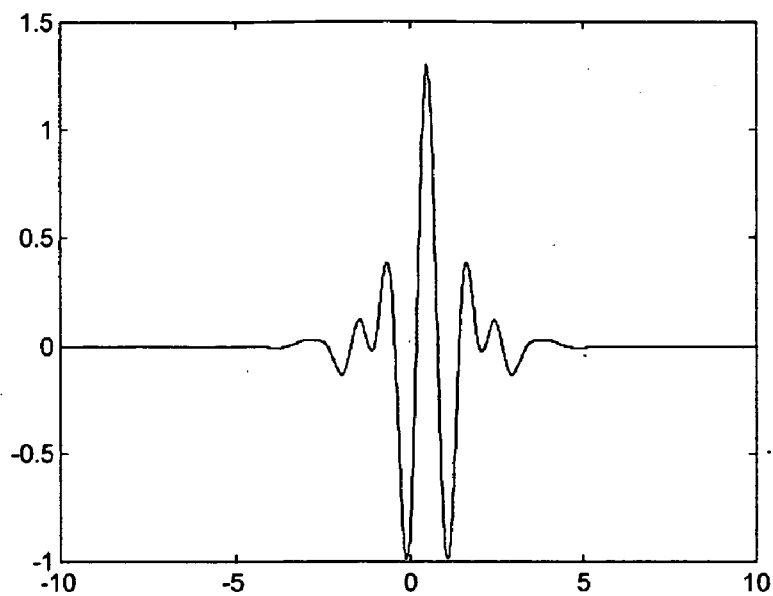

FIGS. 42(a–b) depict Frequency Response of Equivalent Filters (D=9) (a) Decomposition and (b) Reconstruction.

FIGS. 43(a–e) depict Non-regularized Lagrange Wavelets (M=5) (a) Lagrange polynomial, (b) Scaling, (c) Wavelet, (d) Dual scaling, and (e) Dual wavelet.

FIGS. 44(a–c) depict B-Spline Lagrange DAF Wavelets (N=4, η2) (a) Scaling, (b) Wavelet, (c) Dual scaling, and (d) Dual wavelet.

Figure 45A:
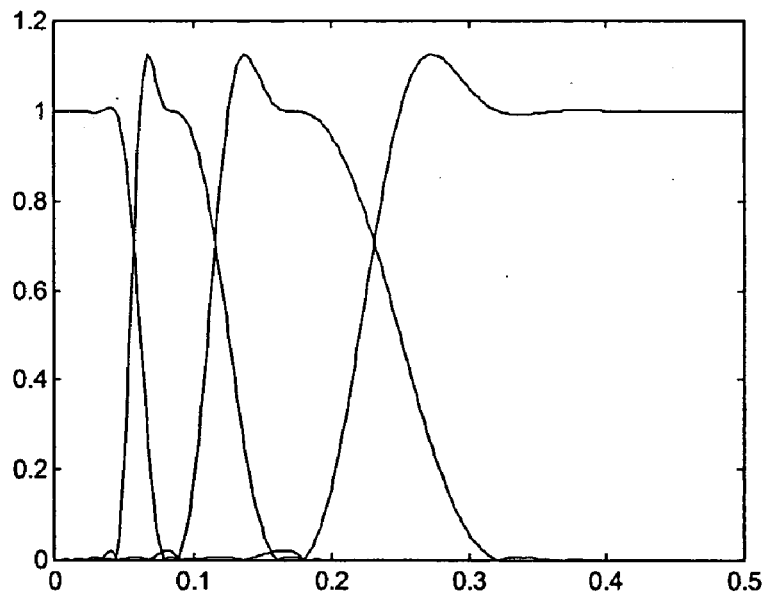
Figure 45B:
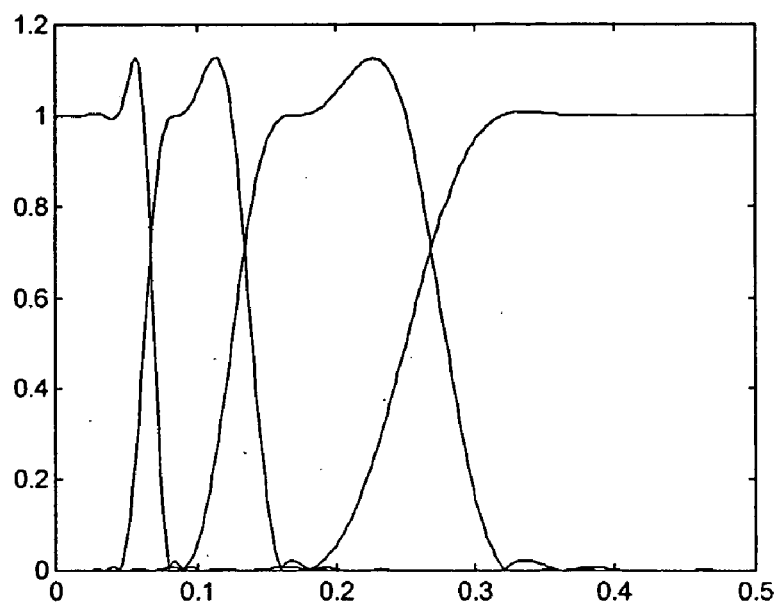

FIGS. 45(a–b) depict Frequency Response of Equivalent Filters (N=4, η=2) (a) Decomposition and (b) Reconstruction.

Figure 46:
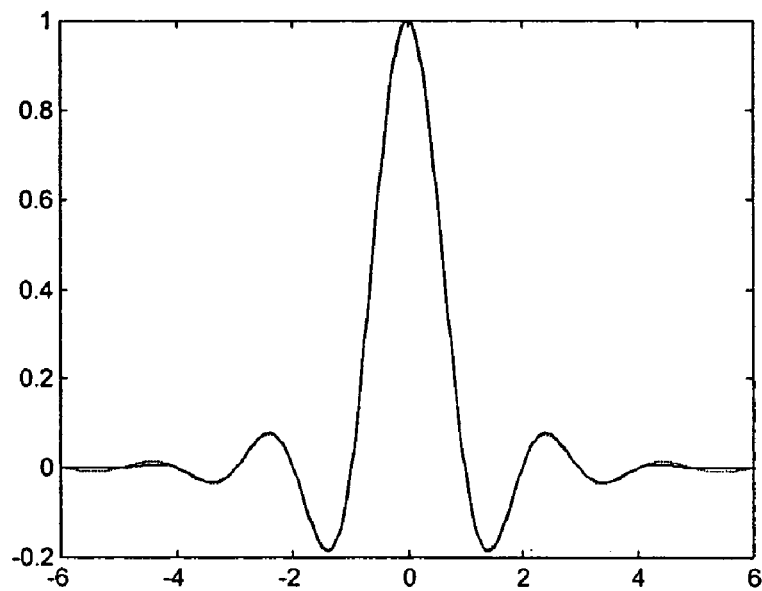

FIG. 46 depicts Mother Wavelet Comparison (N=4, η=2) Solid: B-spline Lagrange; dotted: Gaussian Lagrange.

Figure 47A:
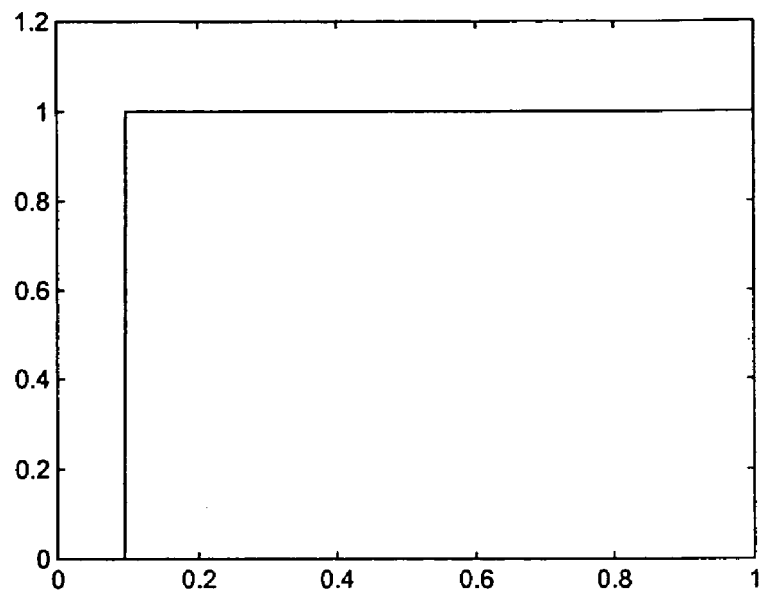
Figure 47B:
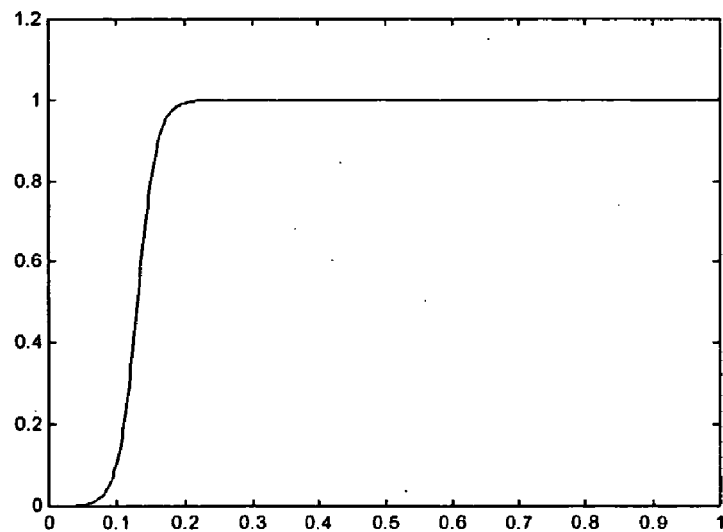
Figure 48A:
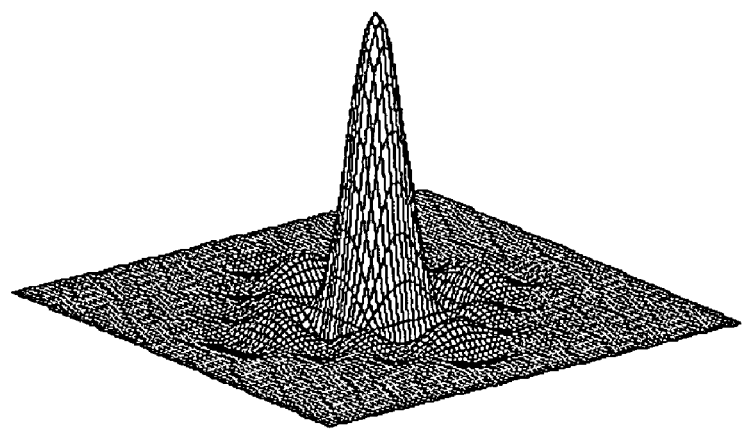
Figure 48B:
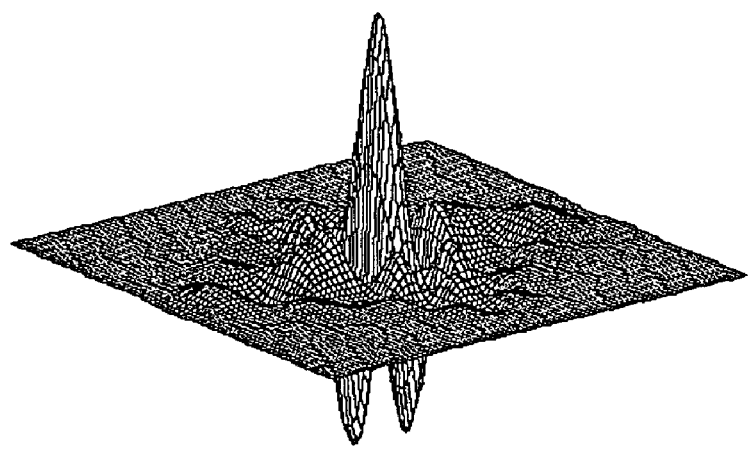
Figure 48C:
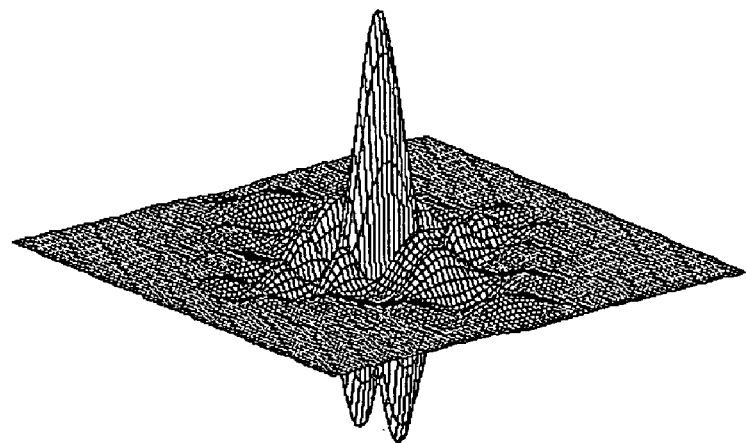
Figure 48D:
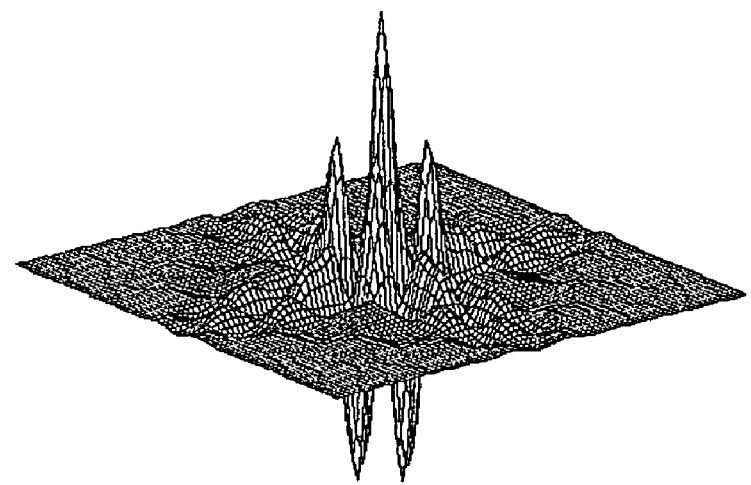

FIGS. 47(a–b) depict Nonlinear Masking Functionals (a) Donoho Hard Logic Nonlinearity and (b) Softer Logic Nonlinearity.

FIGS. 48(a–c) depict 2D Lagrange wavelets for image processing (a) Scaling, (b) Vertical, (c) Horizontal and (d) Diagonal wavelets.

FIGS. 49(a–c) depict VGN image processing for Lena (a) Noisy Lena, (b) Median filtering result and (c) our method.

FIGS. 50(a–c) depict VGN processing for Barbara (a) Noisy Barbara, (b) Median filtering result, and (c) Our method.

Image Enhancement Normalization

FIGS. 51(a–b) depicts (a) an Original Mammogram and (b) depicts an Enhanced result.

FIGS. 52(a–b) depicts (a) an Original Mammogram and (b) depicts an Enhanced result.

Figure 53:
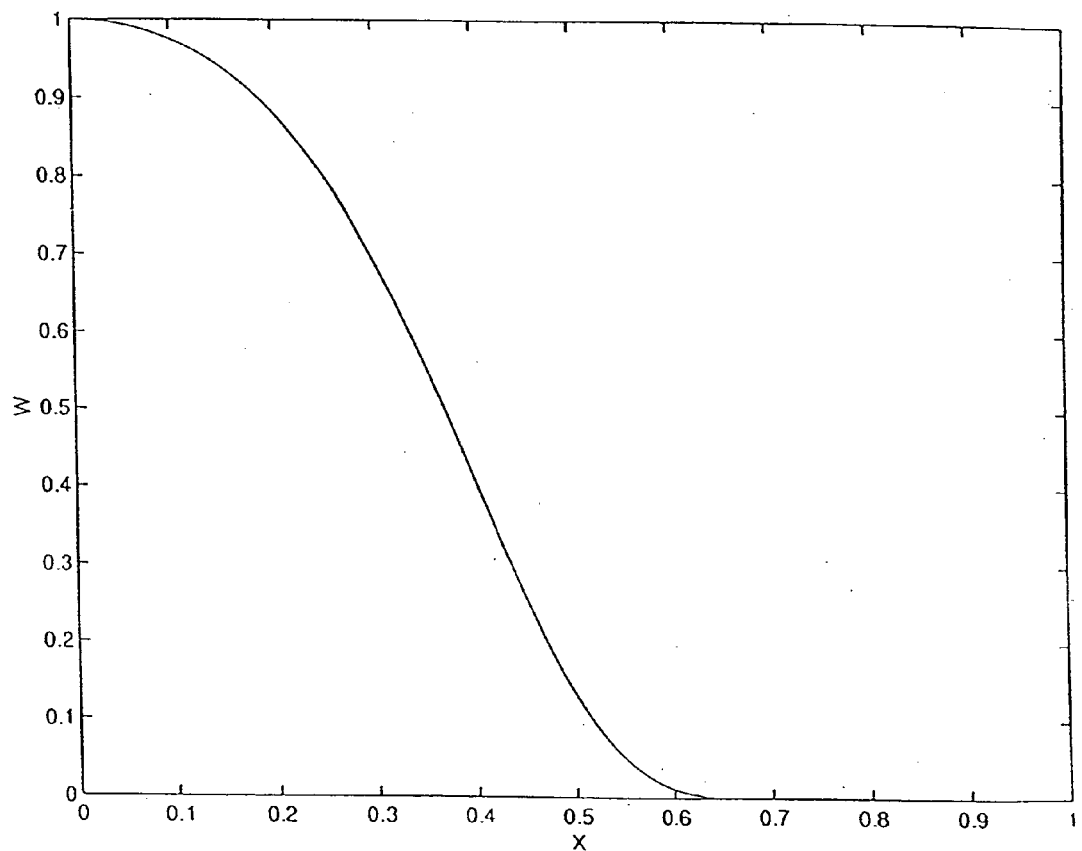
Figure 54A:
Figure 54B:
Figure 54C:
Figure 54D:
Figure 54E:
Figure 54F:

Varying Weight Trimmed Mean Filter for the Restoration of Impulse Corrupted Images FIG. 53 depicts the weight function of Equation (166) for A=2;

FIGS. 54(a–f) depicts image restorations from 40% impulse noise corrupted Lena image; (a) shows the original Lena picture; (b) shows noise image; (c) shows median Filtering (3×3), PSNR=28.75; (d) α-TMF (3×3), PSNR=27.49; (e) VWTMF (3×3), PSNR=29.06; and (f) VWTMF switch (3×3), PSNR=31.43.

A New Nonlinear Image Filtering Technique

FIGS. 55(a–d) Image restorations from 60% impulse noise: (a) Corrupted image, (b) Filtering by Sun and Nevou's median switch scheme, (c) Our filtering, and (d) Our modified filtering.

FIGS. 56(a–d) Image restorations from 40% impulse noise: (a) Corrupted image, (b) Median filtering (3×3), (c) Median filtering (5×5), and (d) Our filtering.

Biomedical Signal Processing Using a New Class of Wavelets

FIG. 57 depicts a Hermite DAF (M=8 and σ=1).

FIG. 58(a) depicts an original mammogram.

FIG. 58(b) depicts an enhanced mammogram using the DAF of FIG. 57.

Figure 59:
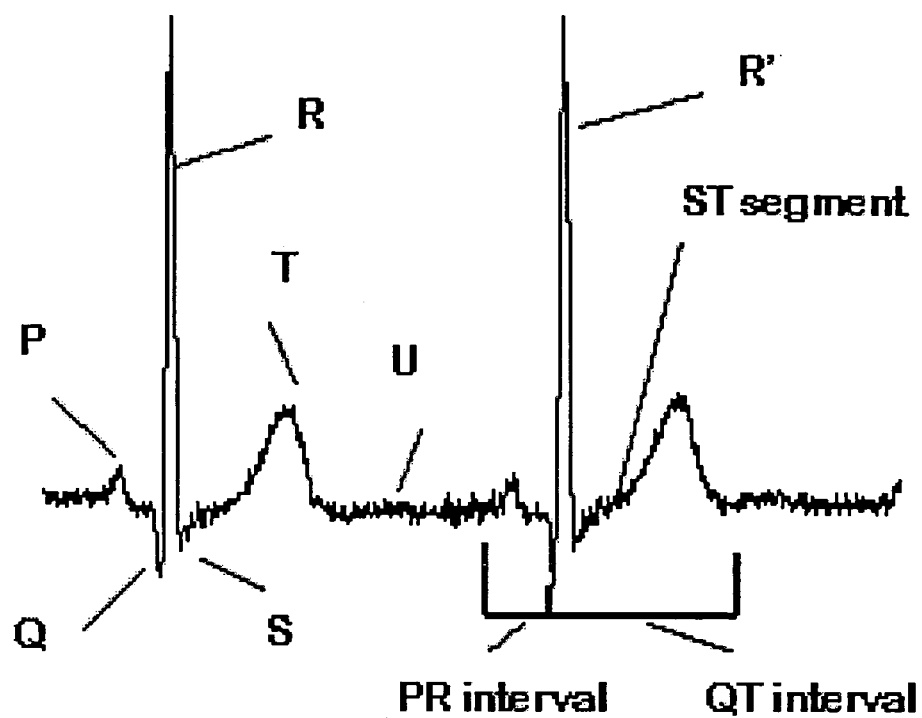

FIG. 59 depicts an ECG criterion Characteristic for Diagnosis.

Figure 60A:
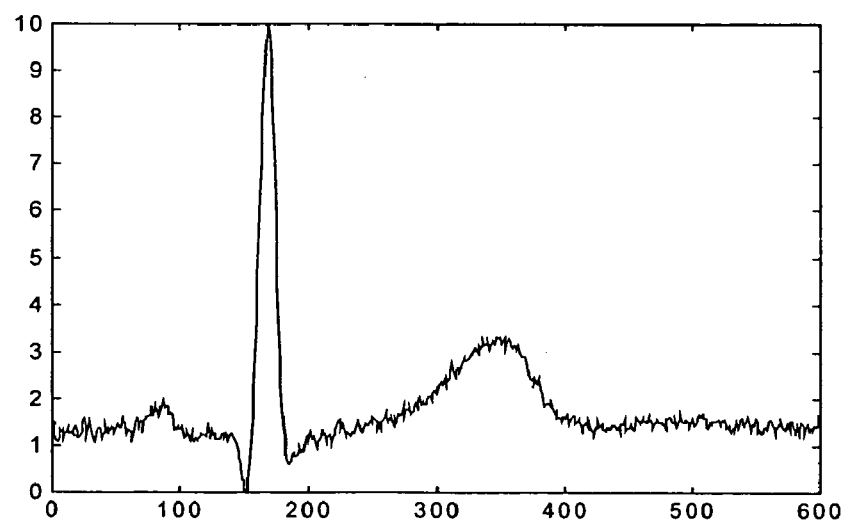
Figure 60B:
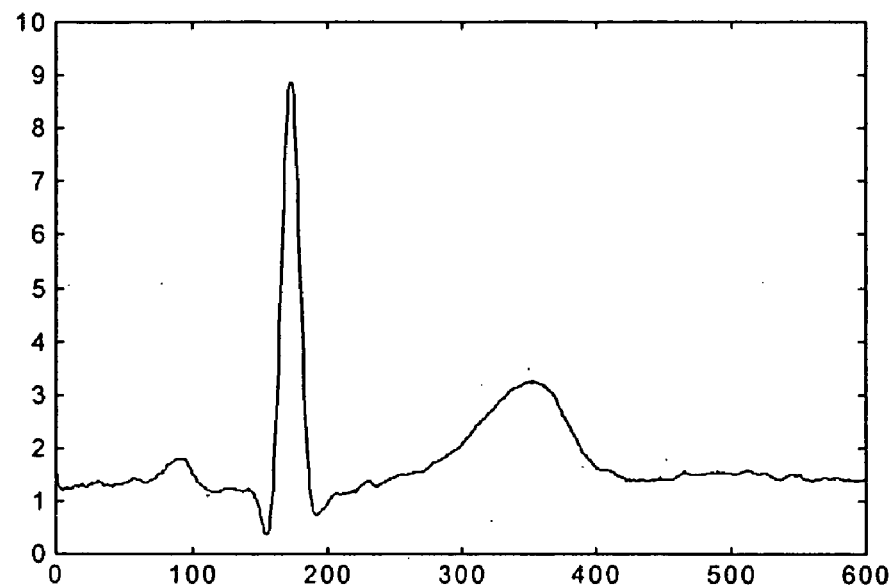
Figure 60C:
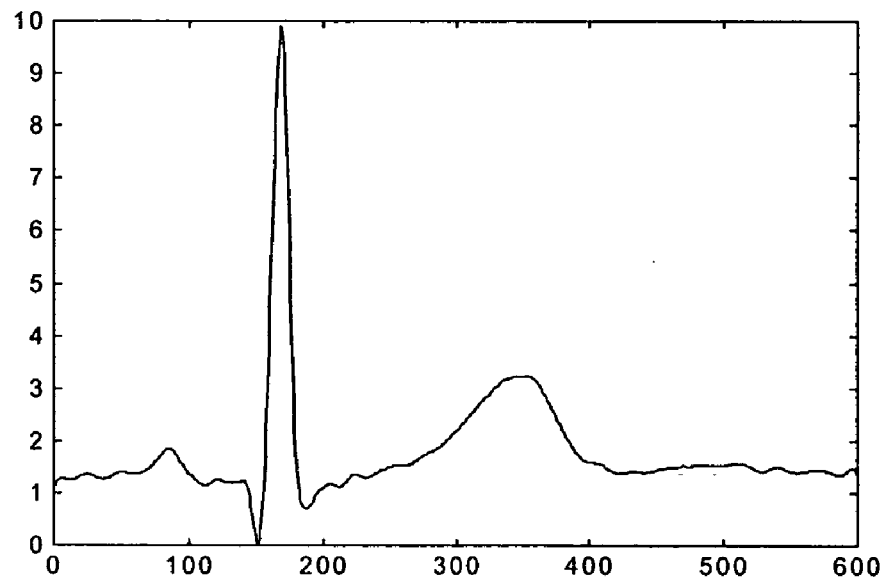

FIGS. 60(a–c) depicts a ECG filtering: (a) original ECG, (b) low-pass filtering, and (c) our filtering.

Nonlinear Quincunx Filters

FIGS. 61(a–c) depict traditional trivial windows: (a) 1×1 window (single pixel), (b) 3×3 window, and (c) 5×5 window.

FIG. 62 depicts arbitrary quincunx extension of symmetric neighboring basket windows.

FIG. 63 depicts quincunx basket selection for the filtering.

FIGS. 64(a–b) depict image restorations from 40% impulse noise: (a) corrupted image and (b) our filtering.

FIGS. 65(a–c) depict wavelet noise removal: (a) Gaussian-degraded Lena, (b) DAF wavelet thresholding, and (c) DAF wavelet+quincunx filtering.

Visual Multiresolution Color Image Restoration

Figure 66:
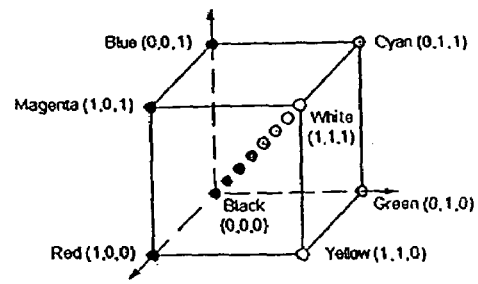

FIG. 66 depicts a cube model of RGB color.

Figure 67:
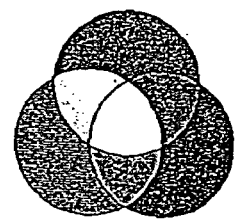

FIG. 67 depicts an alternate representation.

Figure 68:
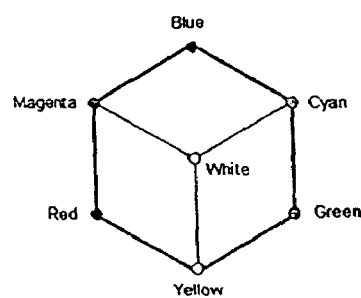

FIG. 68 depicts a hexagon projections of color tube.

FIGS. 69(a–c) depict test results from restoration: (a) Noisy Lena, (b) Median filtering, and (c) VGN restoration.

FIGS. 70(a–c) depict test Results from restoration: (a) Noisy girl, (b) Median filtering, and (c) VGN restoration.

Mammogram Enhancement Using Generalized Sinc Wavelets

Figure 71A:
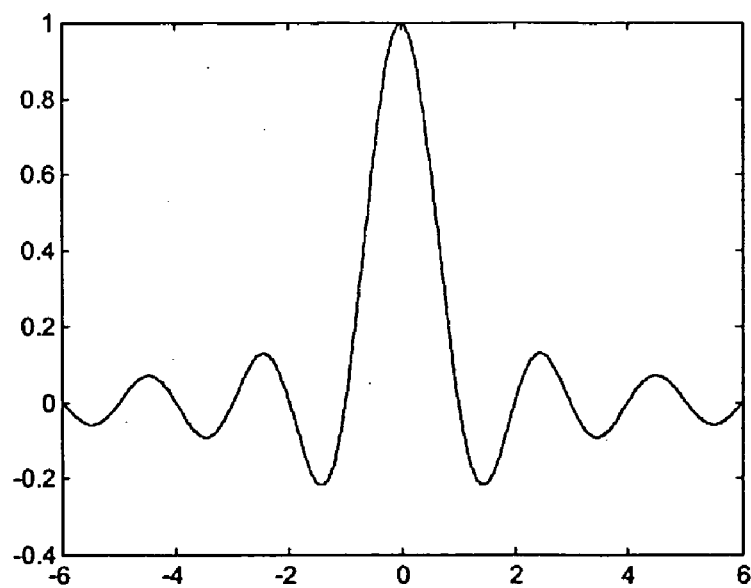
Figure 71B:
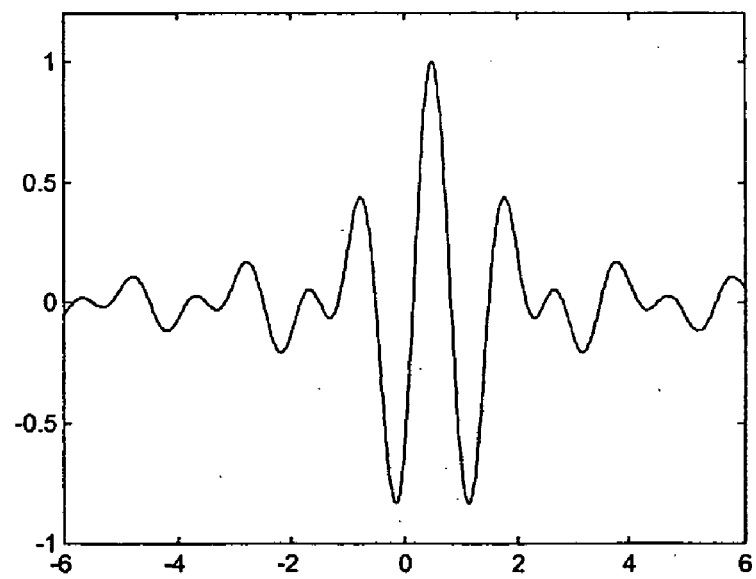

FIGS. 71(a–b) depict π band-limited interpolating wavelets; (a) Sinc function and (b) Sinclet wavelet.

Figure 72:
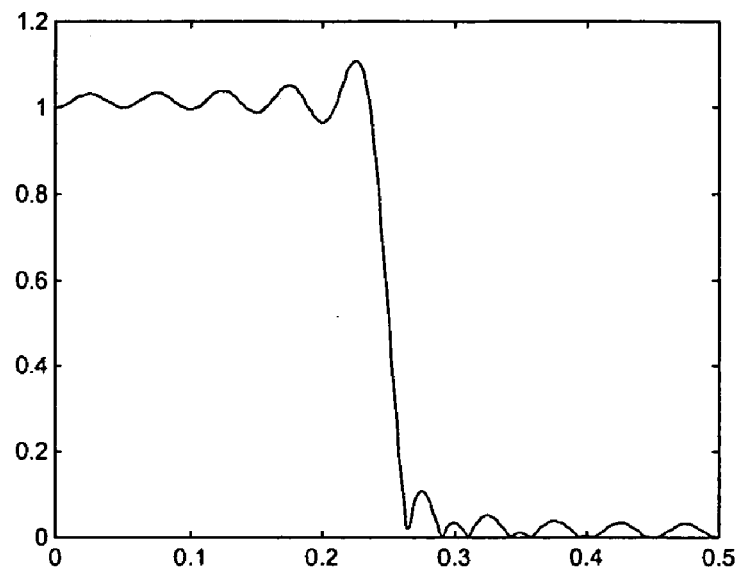
Figure 73A:
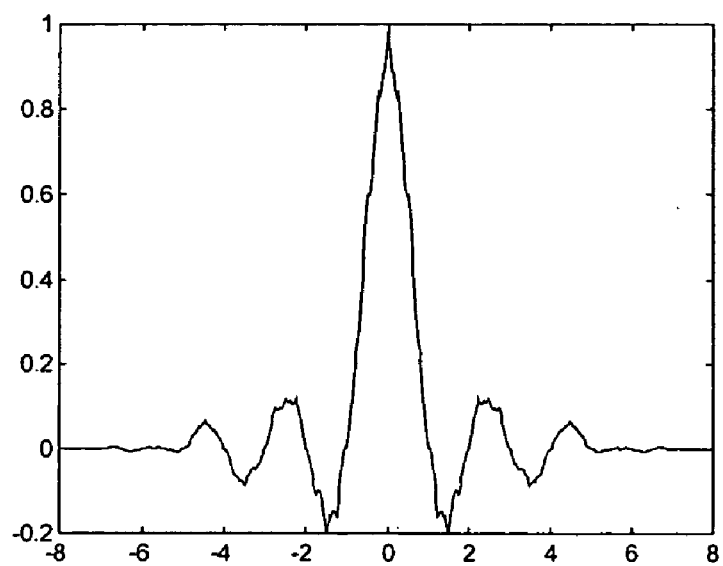
Figure 73B:
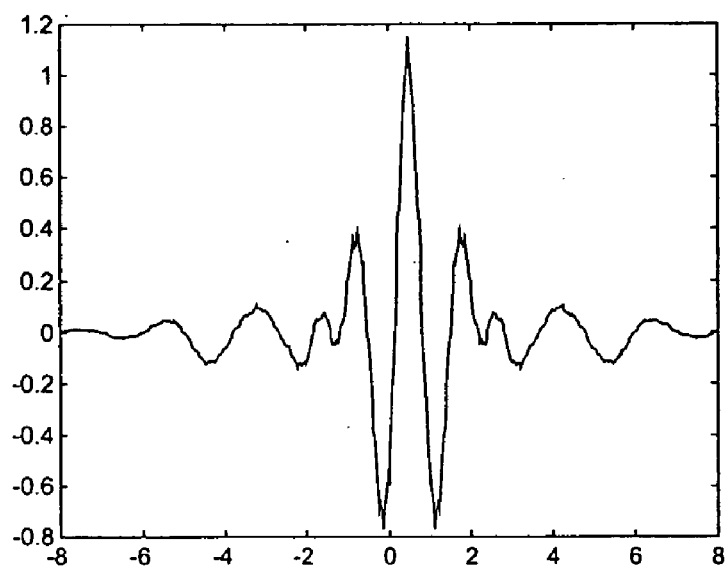
Figure 73C:
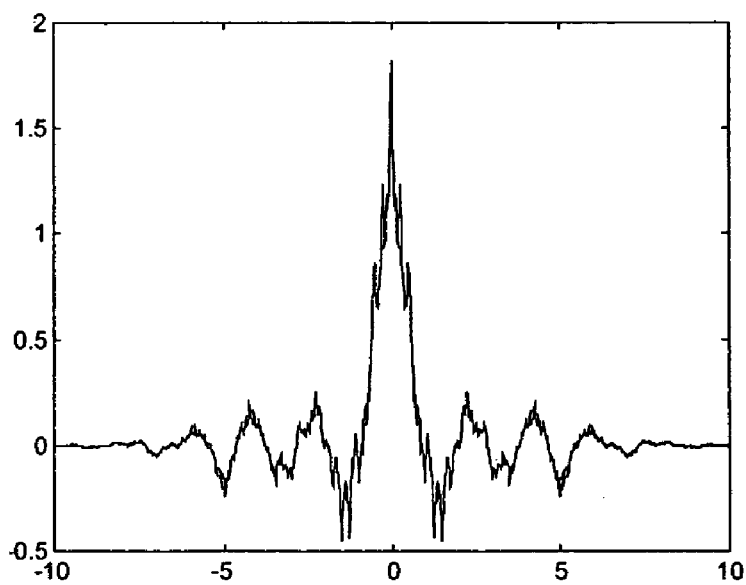
Figure 73D:
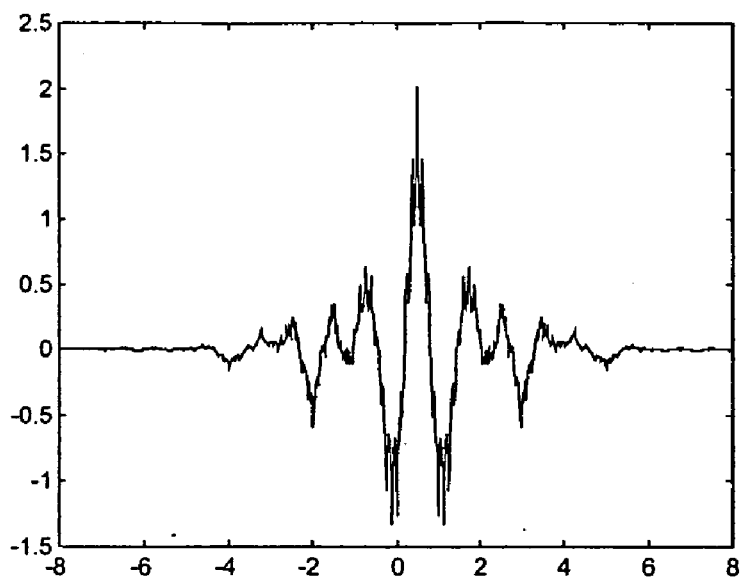
Figure 74A:
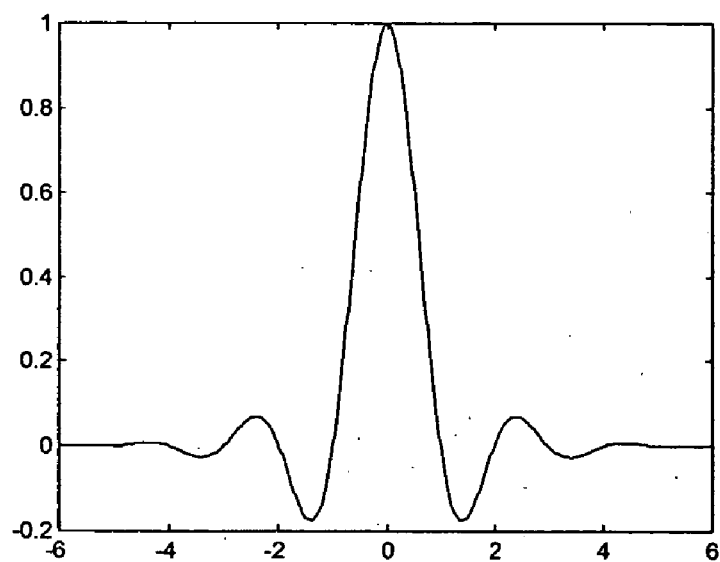
Figure 74B:
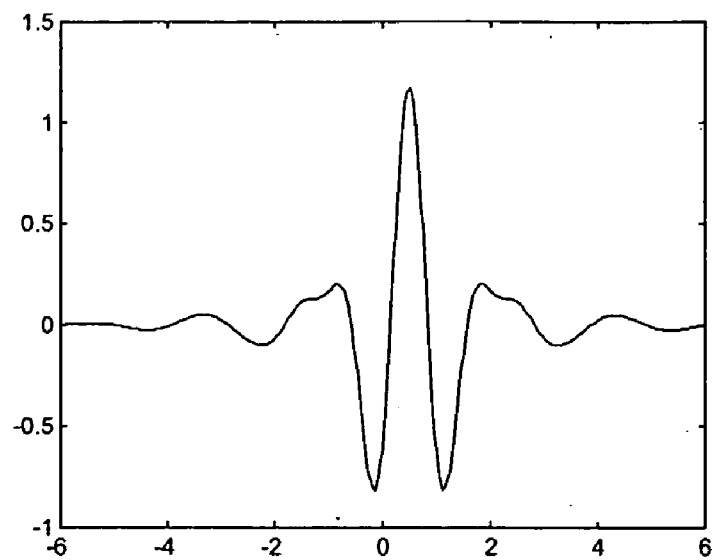
Figure 74C:
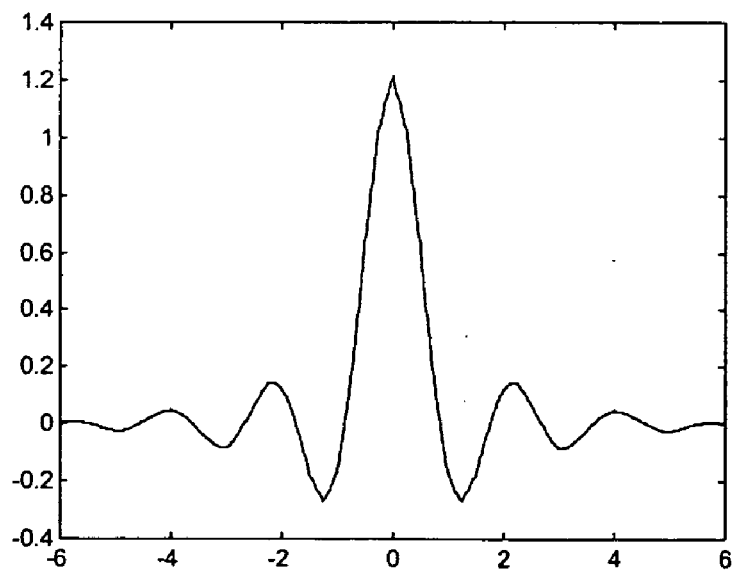
Figure 74D:
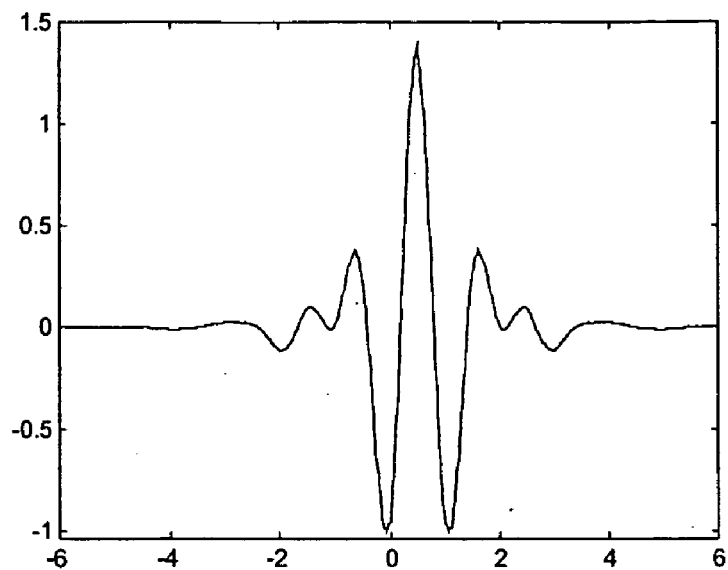

FIG. 72 depicts a Fourier Gibbs overshot of Sinc FIR implementation.

FIGS. 73(a–d) depict Sinc Cutoff Wavelets (M=9): (a) Scaling, (b) Wavelet, (c) Dual scaling, and (d) Dual wavelet.

FIGS. 74(a–d) depict B-Spline Lagrange DAF Wavelets (N=5, η=3): (a) Scaling, (b) Wavelet, (c) Dual scaling, and (d) Dual wavelet.

Figure 75A:
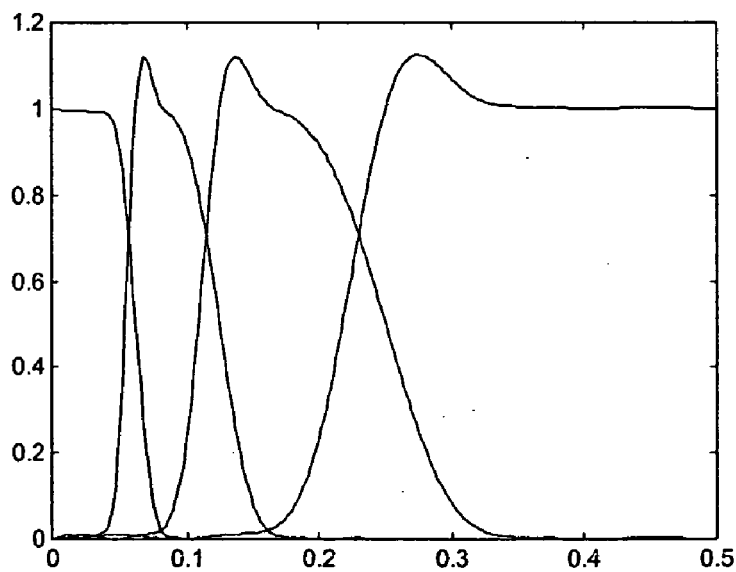
Figure 75B:
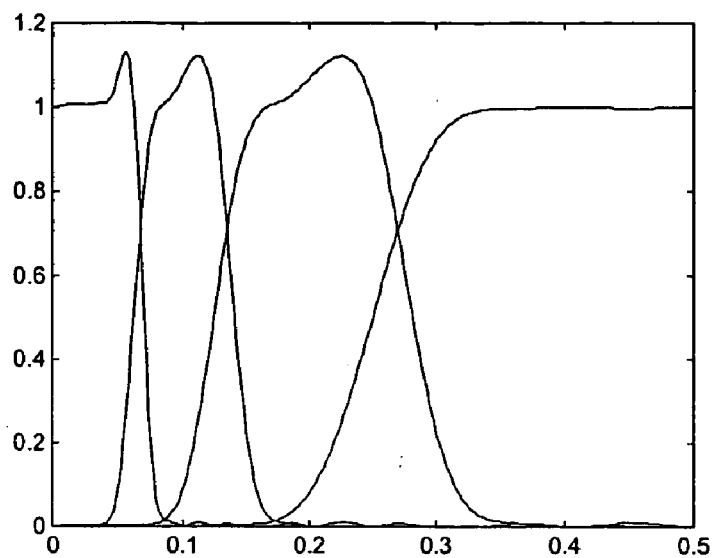

FIGS. 75(a–b) depict Frequency Response of Equivalent Filters (N=5, η=3): (a) Decomposition and (b) Reconstruction.

Figure 76:
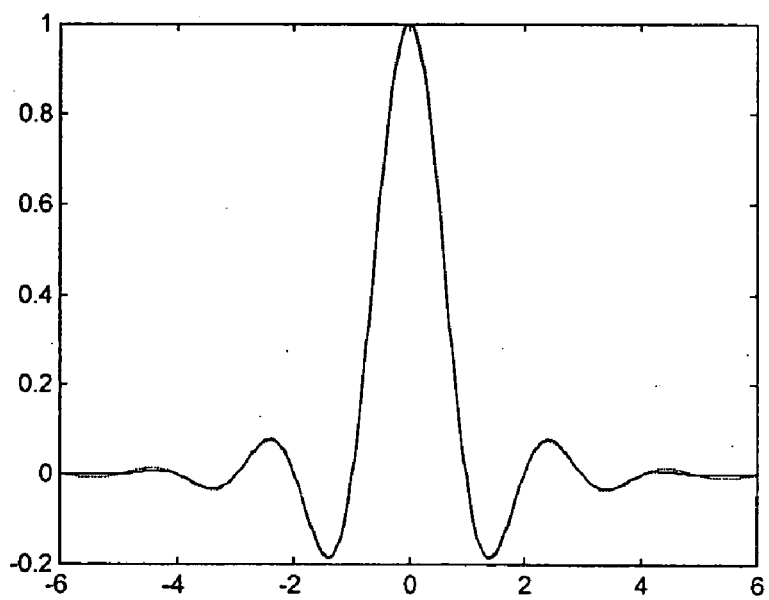

FIG. 76 depicts a Mother Wavelet Comparison (N=4, η=2) Solid: B-spline Sinc: dotted: Gaussian Sinc.

Figure 77A:
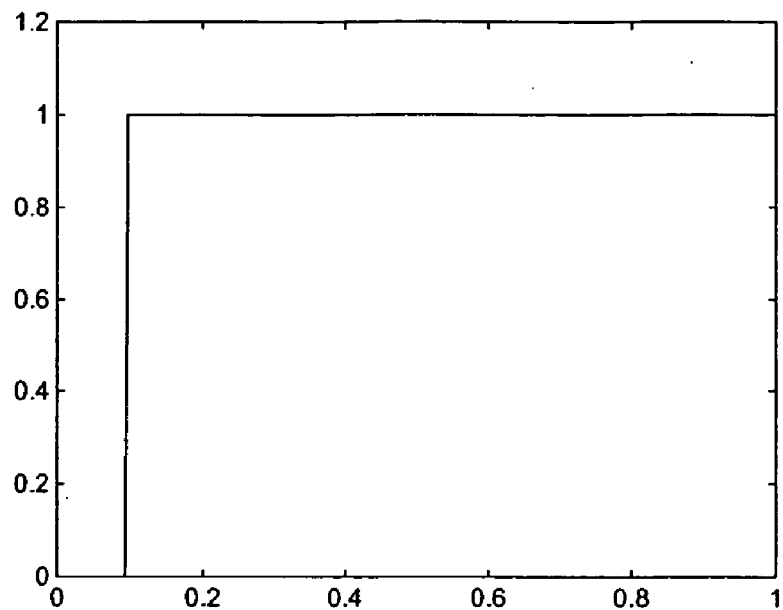
Figure 77B:
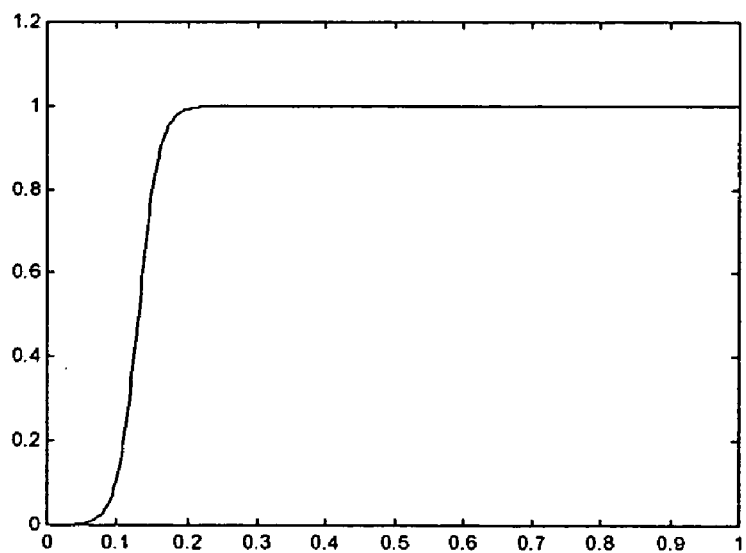

FIGS. 77(a–b) depict Nonlinear Masking Functionals: (a) Donoho Hard Logic Nonlinearity and (b) Softer Logic Nonlinearity.

FIGS. 78(a–b) depict Mammogram enhancement: (a) Original mammogram and (b) Multiresolution enhancement by DAF-wavelet.

Dual Propagation Inversion of Fourier and Laplace Signals

Figure 79:
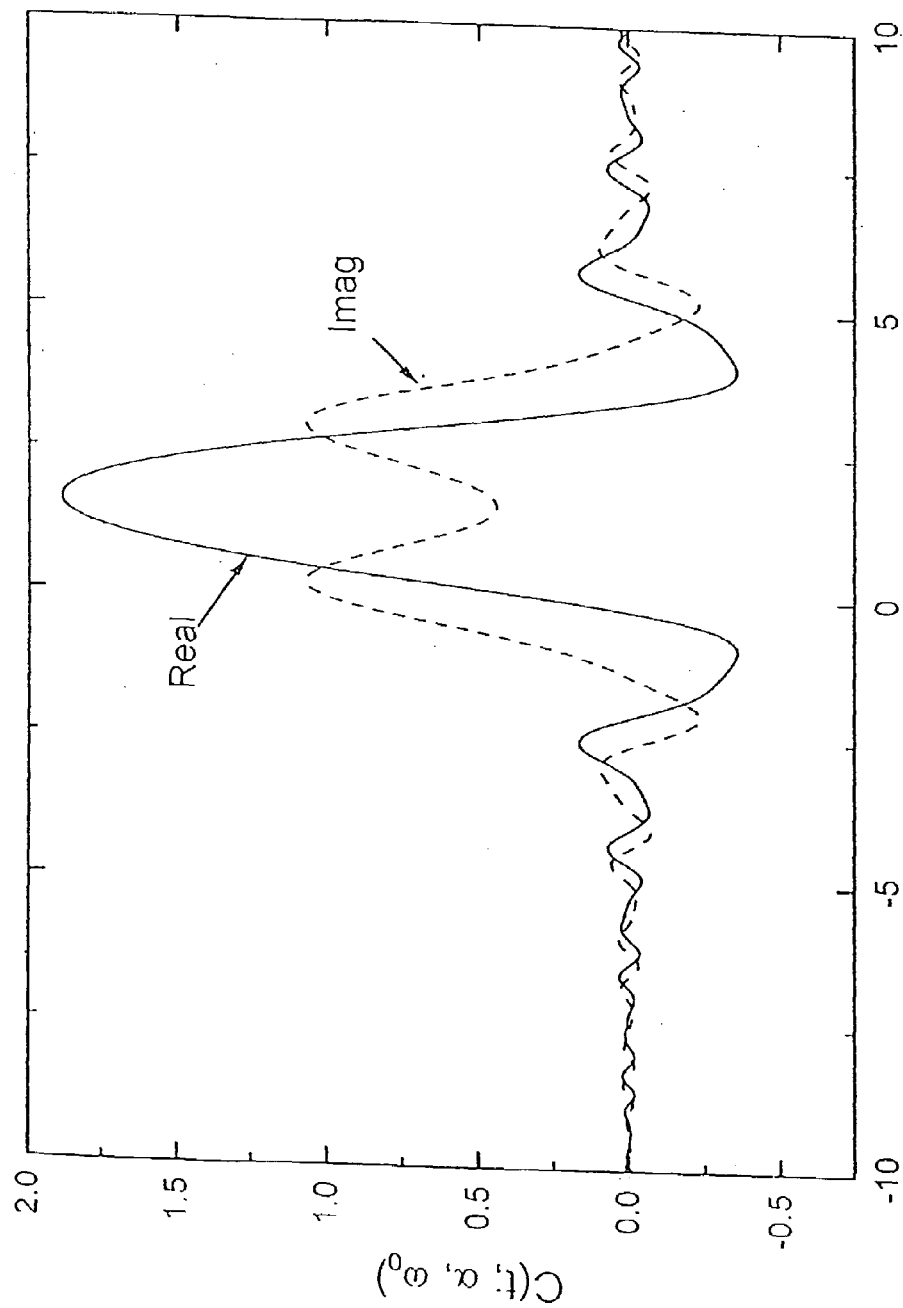

FIG. 79 depicts the auxiliary function, $C(t; \alpha, \omega_0)$, at $t=0$, as a function of the frequency $\omega_0$.

Figure 80:
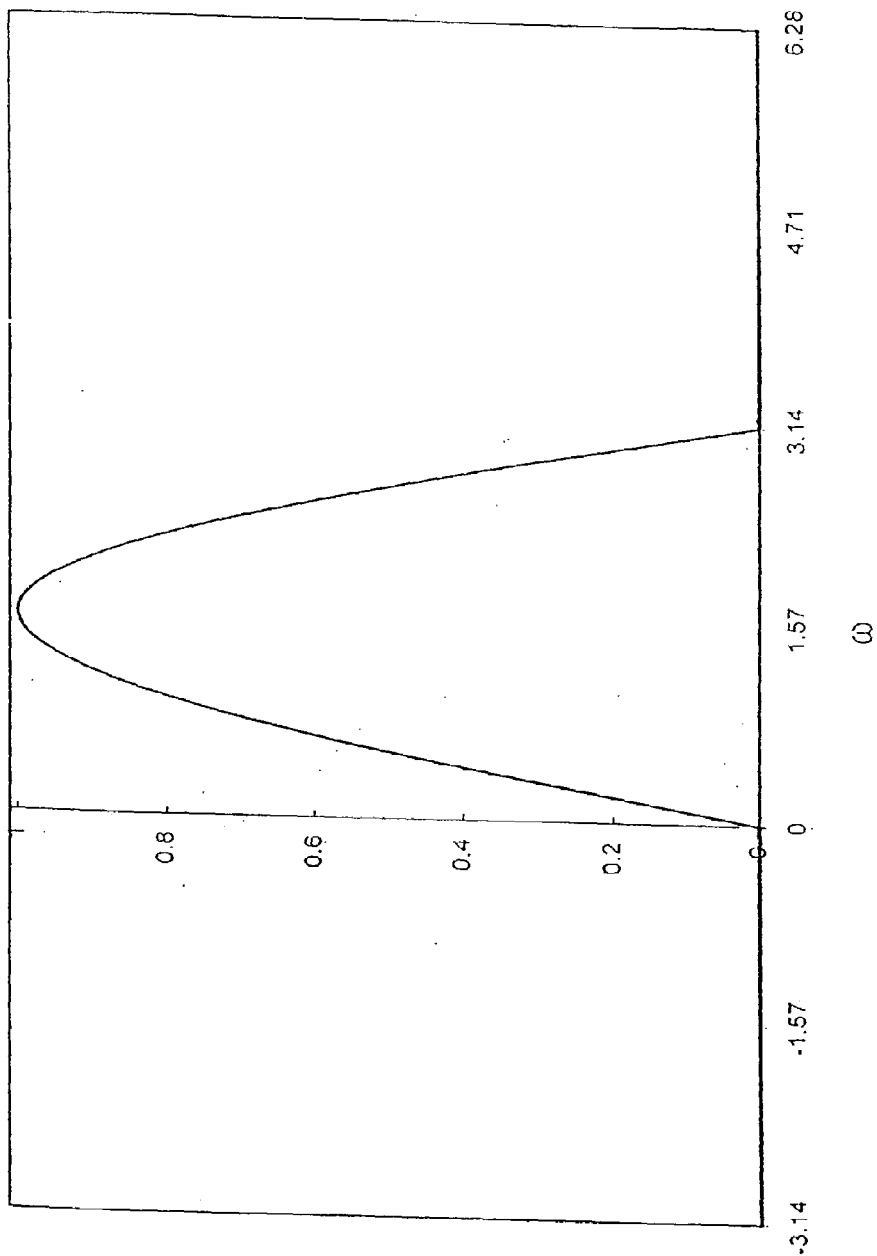

FIG. 80 depicts the truncated sine function $f(\omega)=\sin(\omega)$; $0 \leq \omega \leq \pi$, and the calculated spectrum obtained by the dual propagation inversion procedure. The noiseless time domain signal was sampled between $-45 \leq t \leq 45$. The two are visually indistinguishable.

Figure 81:
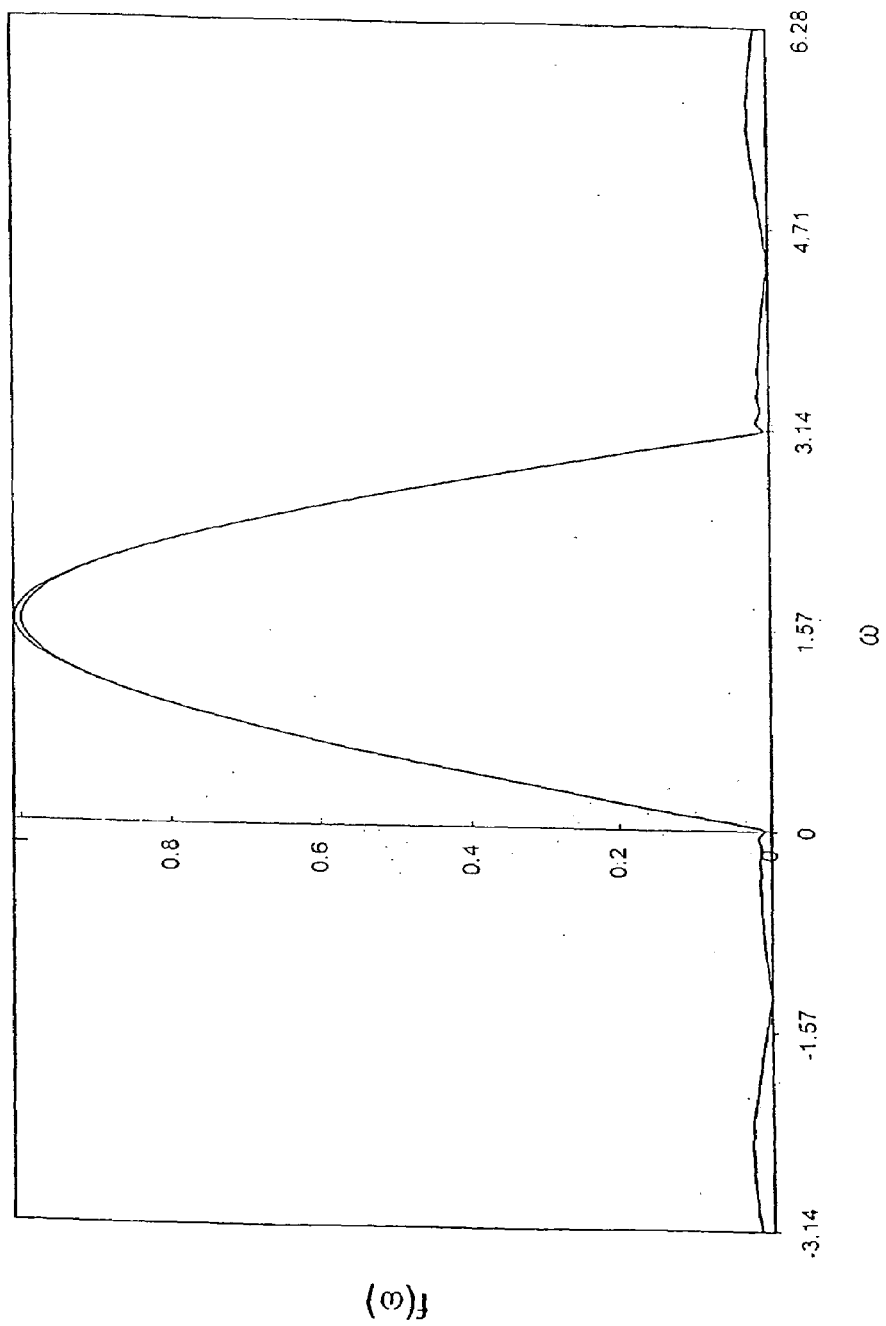

FIG. 81 depicts with dotted line: The calculated spectrum $f(\omega)$ obtained from the time signal corrupted by random noise of 20%; with solid line: The calculated spectrum obtained from the noise-free time signal. Both clean and corrupted signals were sampled between $-45 \leq t \leq 45$.

Figure 82:
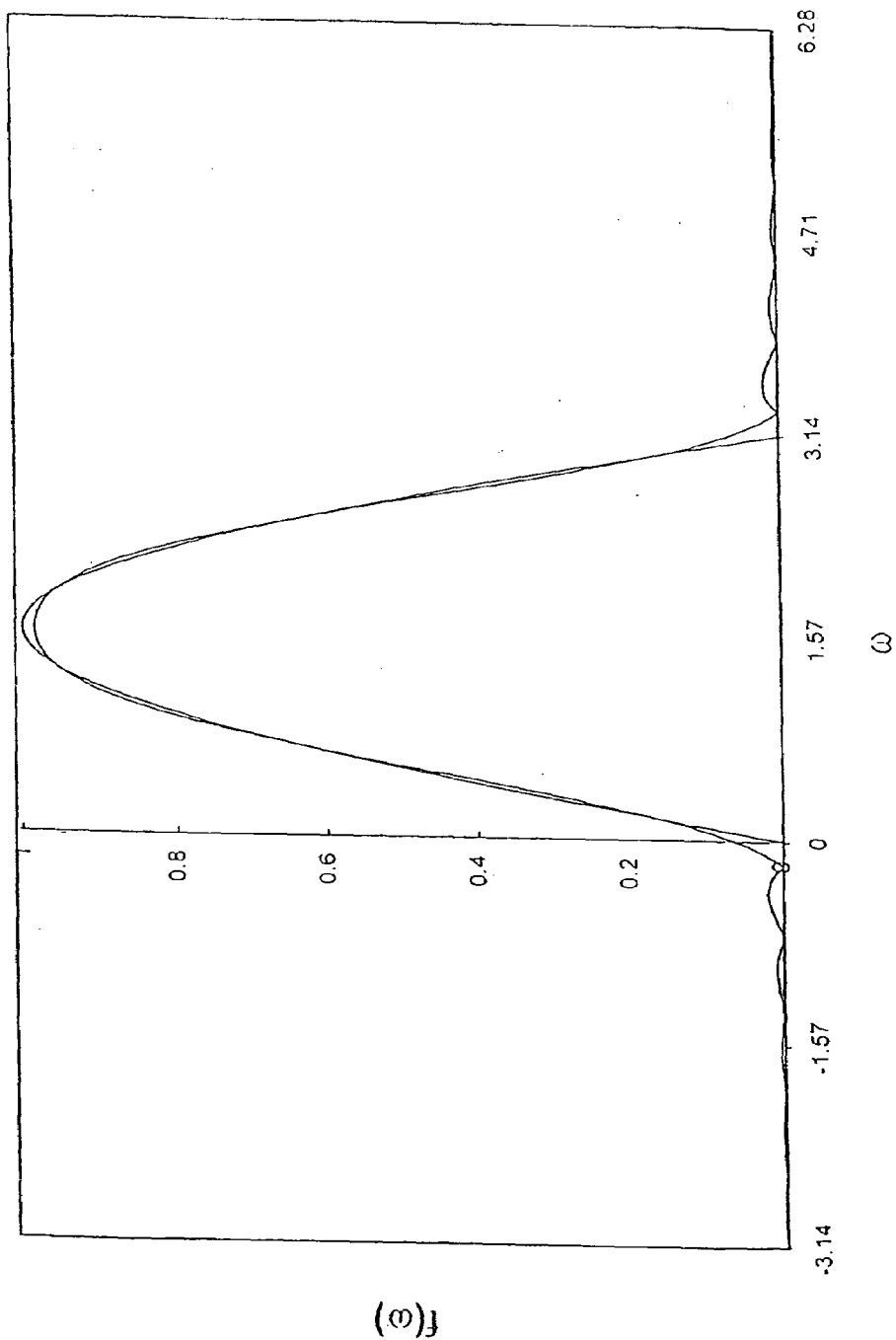

FIG. 82 depicts a Cross-hatched line: the calculated spectrum $f_{DPI}(\omega)$ obtained from the noise-free time domain signal, sampled between $-5 \leq t \leq 5$. Solid line is the original truncated sine function.

Figure 83:
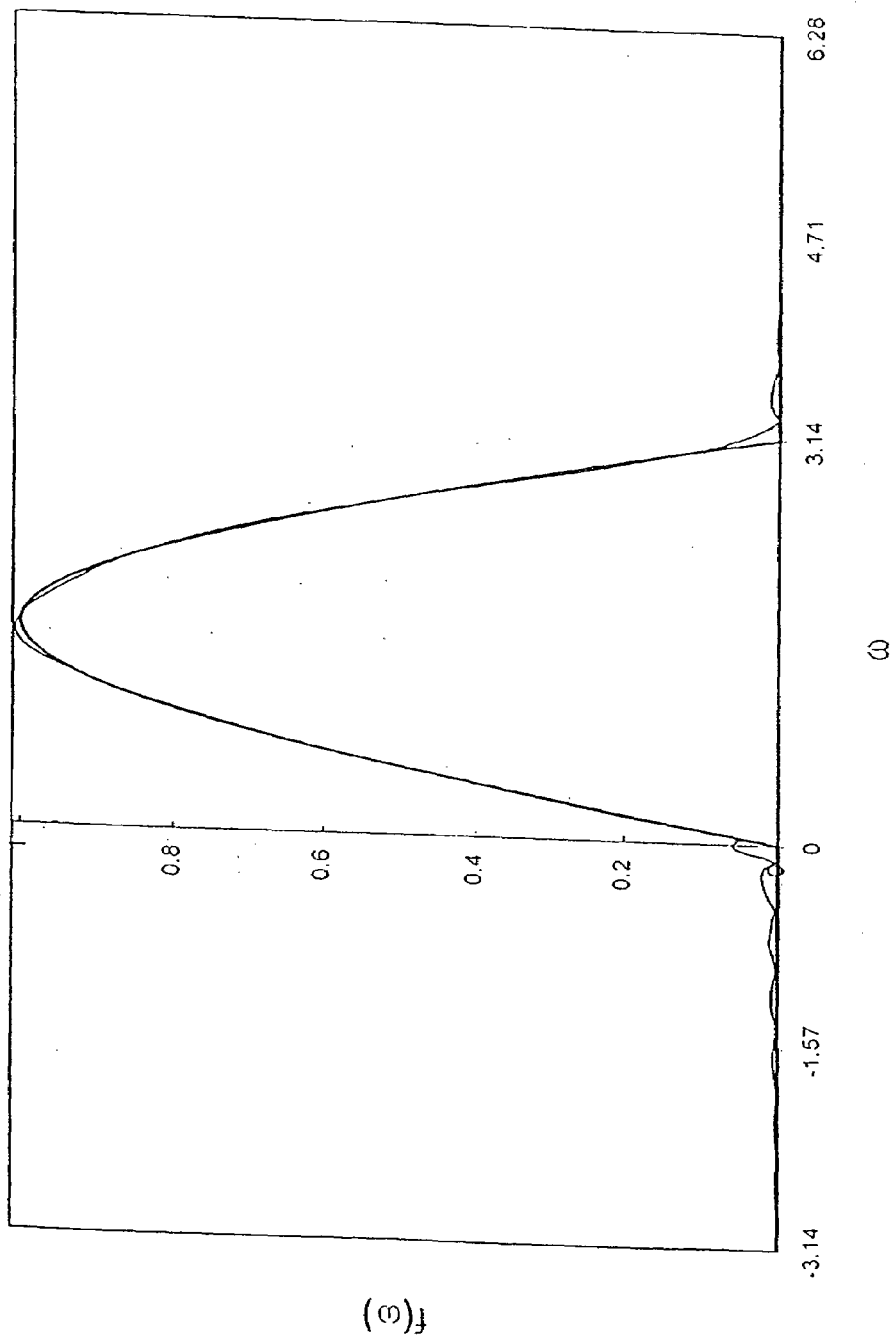

FIG. 83 depicts a Cross-hatched line: the calculated spectrum $f_{DPI}(\omega)$ obtained using the DAF-padding values for $5 \leq |t| \leq 7.5$, joined smoothly to the analytical tail-function (see text). Careful comparison with FIG. 82 shows a reduction of the aliasing due to signal truncation.

Distributed Approximating Functional Wavelet Nets

Figure 84:
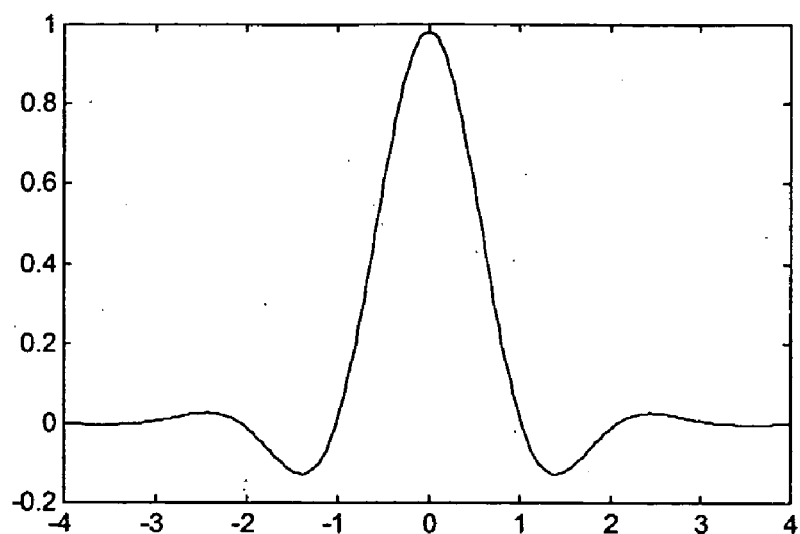

FIG. 84 depicts a Hermite DAF (M=8 and σ=1).

Figure 85:
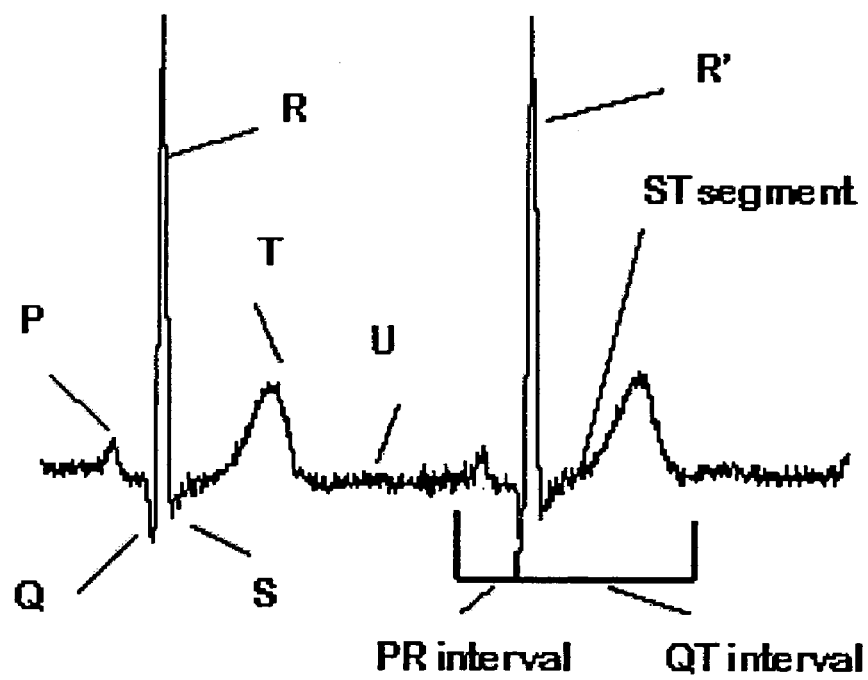

FIG. 85 depicts an ECG criterion Characteristic for Diagnosis.

FIGS. 86(a–c) depicts an ECG filtering: (a) original ECG, (b) low-pass filtering; and (c) DAF wavelet net filtering.

Figure 87A:
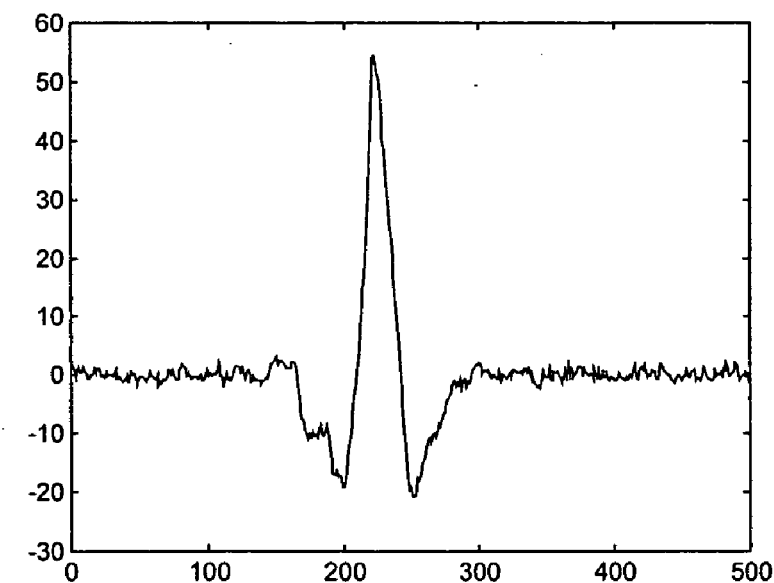
Figure 87B:
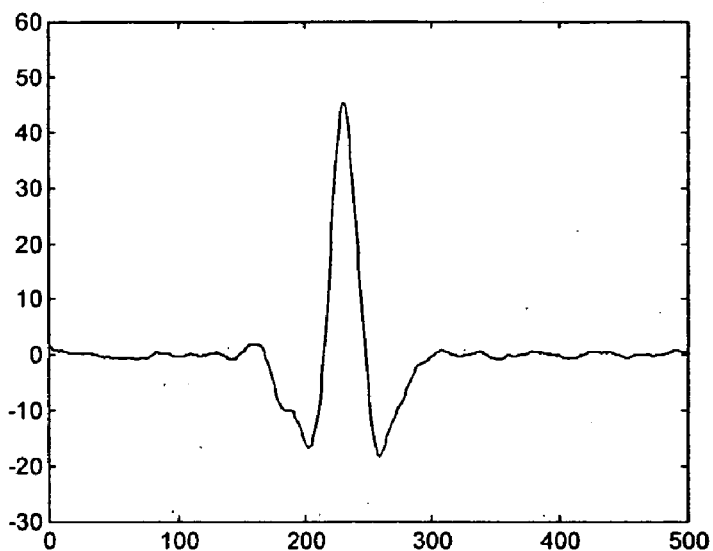

FIGS. 87(a–c) depicts an EMG filtering: (a) original EMG, (b) low-pass filtering; and (c) DAF wavelet net filtering.

Perceptual Normalized Subband Image Restoration

Figure 88:
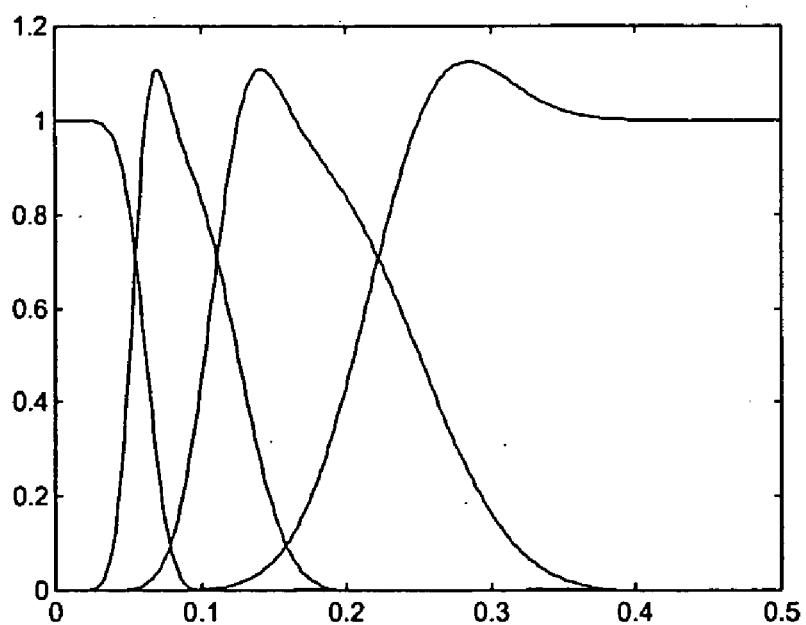
Figure 89A:
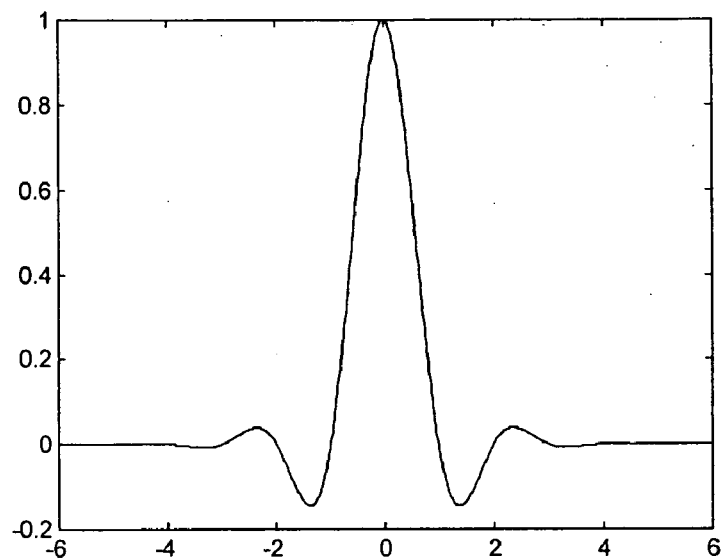
Figure 89B:
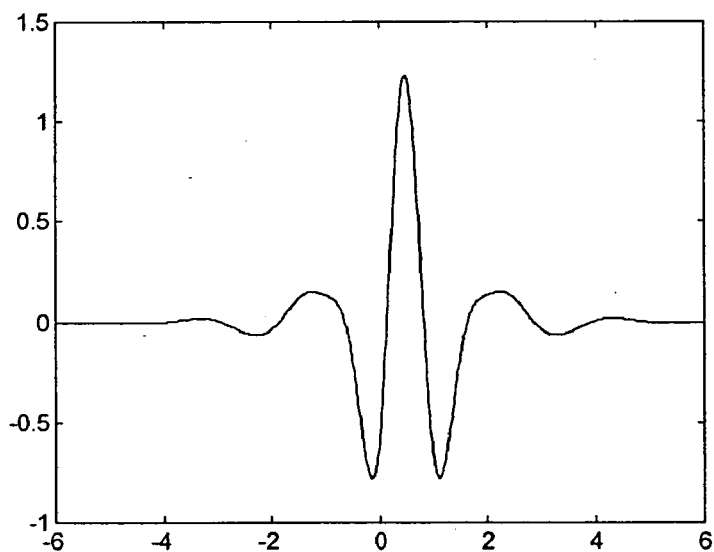
Figure 89C:
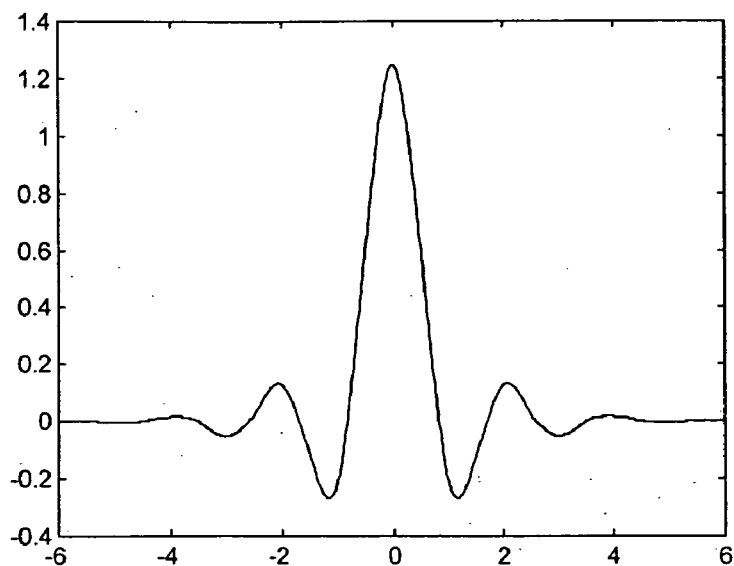
Figure 89D:
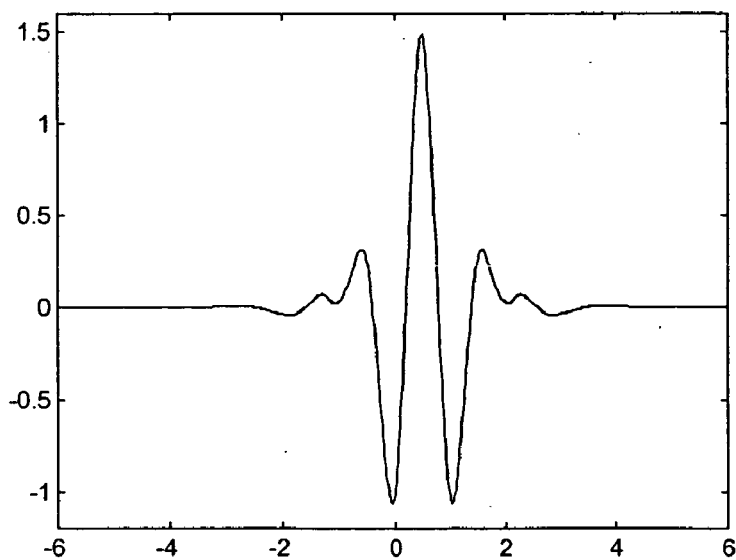

FIG. 88 depicts a frequency response of GLDAF equivalent filters.

FIGS. 89(a–d) depict Lagrange DAF Wavelets: (a) GLDAF, (b) GLDAF wavelet, (c) dual GLDAF and (d) dual GLDAF wavelet.

Distributed Approximating Functional Approach to Image Restoration

FIGS. 90(a–c) depict a Hermite DAF: (a) in coordinate space; (b) in frequency space; and the first order derivative in coordinate space. The solid line is for σ=3.54 and M=120 and the dashed line is for σ=2.36 and M=130.

FIG. 91 depicts the original Lena Image (240×240).

FIGS. 92(a–b) depict image restoration: (a) degraded Lena image, PSNR=22.14 dB and (b) restored Lena image, PSNR=30.14 dB.

FIGS. 93(a–b) depict image restoration: (a) degraded Lena image, PSNR=18.76 dB and (b) restored Lena image, PSNR=29.19 dB.

Quincunx Interpolation 2D AND 3D Wavelet DAFS

Figure 94A:
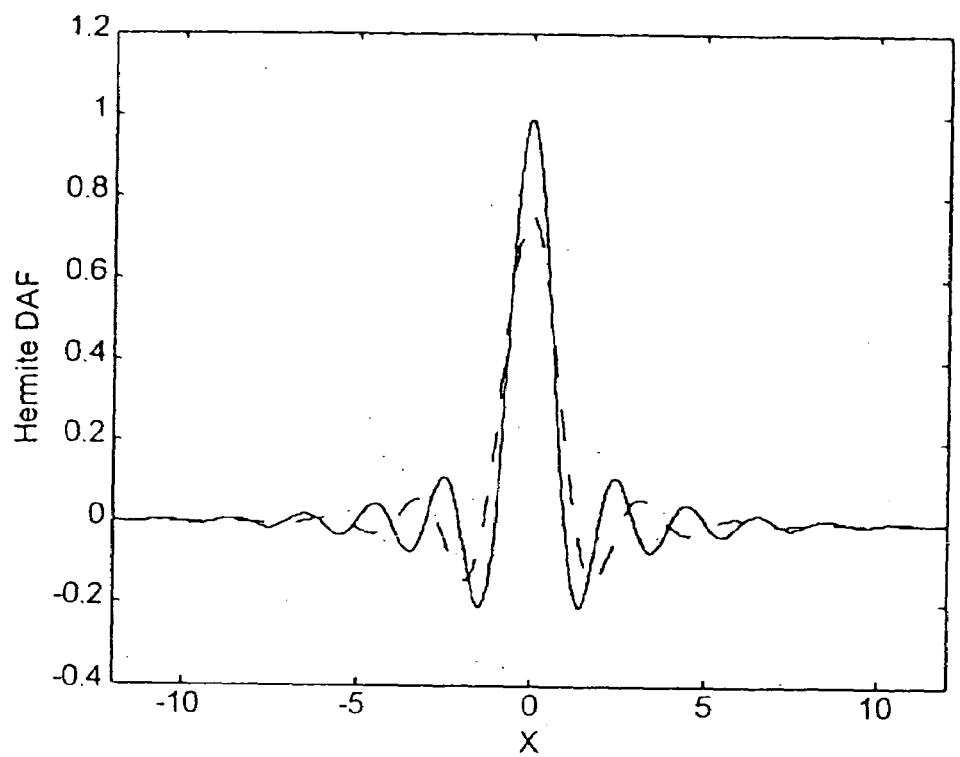
Figure 94B:
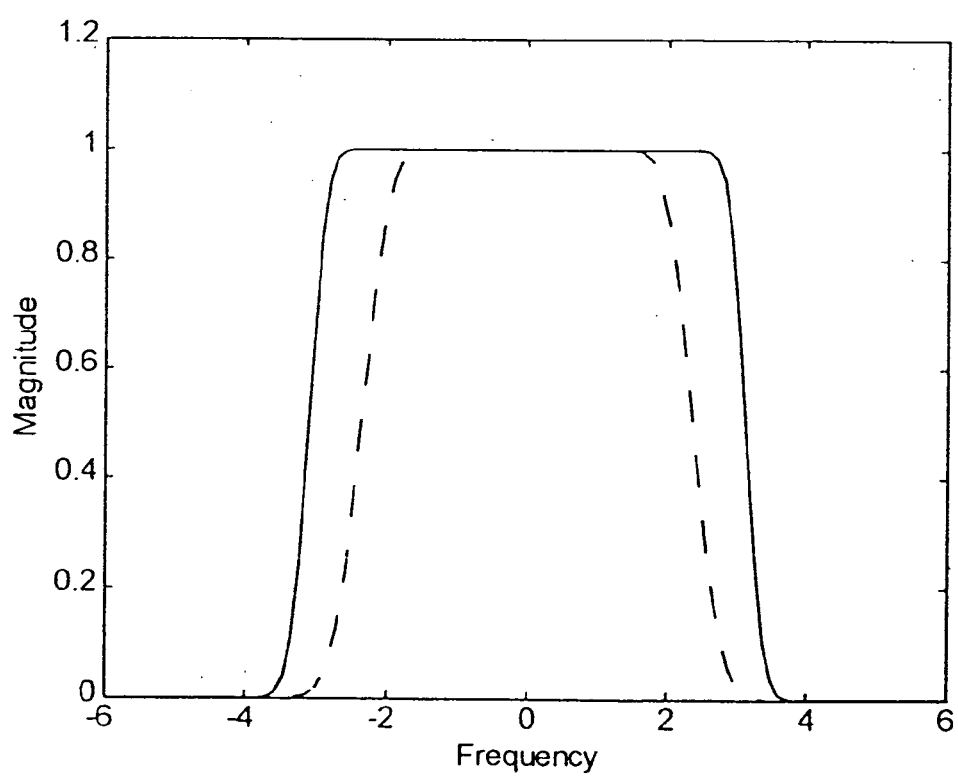
Figure 94C:
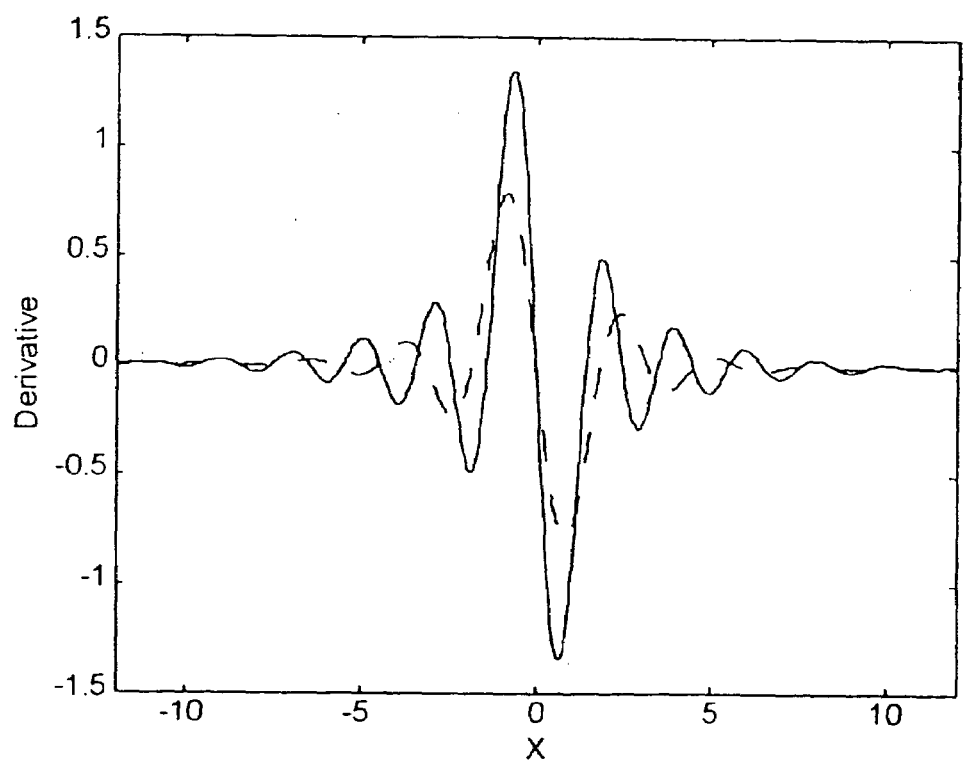

FIG. 94 depicts a quincunx interpolation schemes.

Figure 95:

FIG. 95 depicts another quincunx interpolation scheme.

Figure 96A:

FIG. 96 depicts another quincunx interpolation scheme.

Figure 97A:

FIG. 97 depicts another quincunx interpolation scheme.

DETAILED DESCRIPTION OF THE INVENTION

The inventors have found that a signals, images and multidimensional imaging data can be processed at or near the uncertainty principle limits with DAFs and various adaptation thereof which are described in the various section of this disclosure.

DAF Treatment of Noisy Signals

INTRODUCTION

Experimental data sets encountered in science and engineering contain noise due to the influence of internal interferences and/or external environmental conditions. Sometimes the noise must be identified and removed in order to see the true signal clearly, to analyze it, or to make further use of it.

Signal processing techniques are now widely applied not only in various fields of engineering but also in physics, chemistry, biology, and medicine. Example problems of interest include filter diagonalization, solvers for eigenvalues and eigenstates [1–3], solution of ordinary and partial differential equations [4–5], pattern analysis, characterization, and denoising [6–7], and potential energy surface fitting [8]. One of the most important topics in signal processing is filter design. Frequency-selective filters are aparticularlyimportant class of linear, time-invariant (LTI) analyzers [9]. For a given experimental data set, however, some frequency selective finite impulse response (FIR) filters require a knowledge of the signal in both the unknown "past" and "future" domains. This is a tremendously challenging situation when one attempts to analyze the true signal values near the boundaries of the known data set. Direct application of this kind of filter to the signal leads to aliasing; i.e., the introduction of additional, nonphysical frequencies to the true signal, a problem called "aliasing"[9]. Additionally, in the implementation of the fast Fourier transform (FFT) algorithm [9], it is desirable to have the number of data values or samples to be a power of 2. However, this condition is often not satisfied for a given set of experimental measurements, so one must either delete data points or augment the data by simulating in some fashion, the unknown data.

Determining the true signal by extending the domain of experimental data is extremely difficult without additional information concerning the signal, such as a knowledge of the boundary conditions. It is an even tougher task, using the typical interpolation approach, when the signal contains noise. Such interpolation formulae necessarily return data values that are exact on the grids; but they suffer a loss of accuracy off the grid points or in the unknown domain, since they reproduce the noisy signal data exactly, without discriminating between true signal and the noise. In this disclosure, an algorithm is introduced that makes use of the well-tempered property of "distributed approximating functionals" (DAFs) [10–13]. The basic idea is to introduce a pseudo-signal by adding gaps at the ends of the known data, and assuming the augmented signal to be periodic. The unknown gap data are determined by solving linear algebraic equations that extremize a cost function. This procedure thus imposes a periodic boundary condition on the extended signal. Once periodic boundary conditions are enforced, the pseudo-signal is known everywhere and can be used for a variety of numerical applications. The detailed values in the gap are usually not of particular interest. The advantage of the algorithm is that the extended signal adds virtually no aliasing to the true signal, which is an important problem in signal processing. Two of the main sources of aliasing are too small a sampling frequency and truncation of the signal duration. Another source of error is contamination of the true signal by numerical or experimental noise. Here we are concerned only with how to avoid the truncation induced and noisy aliasing of the true signal.

Distributed approximating functions (DAFs) were recently introduced [10–11] as a means of approximating continuous functions from values known only on a discrete sample of points, and of obtaining approximate linear transformations of the function (for example, its derivatives to various orders). One interesting feature of a class of commonly-used DAFs is the so-called well-tempered property [13]; it is the key to the use of DAFs as the basis of a periodic extension algorithm. DAFs differ from the most commonly used approaches in that there are no special points in the DAF approximation; i.e., the DAF representation of a function yields approximately the same level of accuracy for the function both on and off the grid points. However, we remark that the approximation to the deriva-tives is not, in general quite as accurate as the DAF approximation to the function itself because the derivatives of $L^2$-functions contain an increased contribution from high frequencies. By contrast, most other approaches yield exact results for the function on the grid points, but often at the expense of the quality of the results for the function else-where [13]. DAFs also provide a well-tempered approximation to various linear transformations of the function. DAF representations of derivatives to various orders will yield approximately similar orders of accuracy as long as the resulting derivatives remain in the DAF class. The DAF approximation to a function and a finite number of derivatives can be made to be of machine accuracy with a proper choice of the DAF parameters. DAFs are easy to apply because they yield integral operators for derivatives. These important features of DAFs have made them successful computational tools for solving various linear and nonlinearpartial differential equations (PDEs) [14–17], for pattern recognition and analysis [6], and for potential energy surface fitting [8]. The well-tempered DAFs also are low-pass filters. In this disclosure, the usefulness of DAFs as low pass filters is also studied when they are applied to a periodically extended noisy signal. For the present purpose, we assume that the weak noise is mostly in the high frequency region and the true signal is bandwidth limited in frequency space, and is larger than the noise in this same frequency region. To determine when the noise is eliminated, we introduce a signature to identify the optimum DAF parameters. This concept is based on computing the root-mean-square of the smoothed data for given DAF parameters. By examining its behavior as a function of the DAF parameters, it is possible to obtain the overall frequency distribution of the original noisy signal. This signature helps us to periodically extend and filter noise in our test examples.

The first example is a simple, noisy periodic signal, for which the DAF periodic extension is a special case of extrapolation. The second is a nonperiodic noisy signal. After performing the periodic extension and filtering, it is seen that the resulting signal is closely recreates the true signal.

Distributed Approximating Functionals

DAFs can be viewed as "approximate identity kernels" used to approximate a continuous function in terms of discrete sampling on a grid [10–13). One class of DAFs that has been particularly useful is known as the well-tempered DAFs, which provide an approximation to a function having the same order of accuracy both on and off the grid points. A particularly useful member of this class of DAFs is constructed using Hermite polynomials, and prior to discretization, is given by $$\delta_M(x-x'|\sigma) = \frac{1}{\sigma}\exp\left(-\frac{(x-x')^2}{2\sigma^2}\right)\sum_{n=0}^{M/2}\left(-\frac{1}{4}\right)^n\frac{1}{\sqrt{2\pi}\,n!}H_{2n}\left(\frac{(x-x')}{\sqrt{2}\,\sigma}\right), \quad (1)$$

where $\sigma$, M are the DAF parameters and $H_{2n}$, is the usual (even) Hermite polynomial. The Hermite DAF is dominated by its Gaussian envelope, $\exp(-(x-x')^2/2\sigma^2)$, which effectively determines the extent of the function. The continuous, analytic approximation to a function $f(x)$ generated by the Hermite DAF is $$f(x) \approx f_{DAF}(x) = \int_{-\infty}^{\infty} \delta_M(x-x'|\sigma)f(x')dx'. \quad (2)$$

Figure 1A:
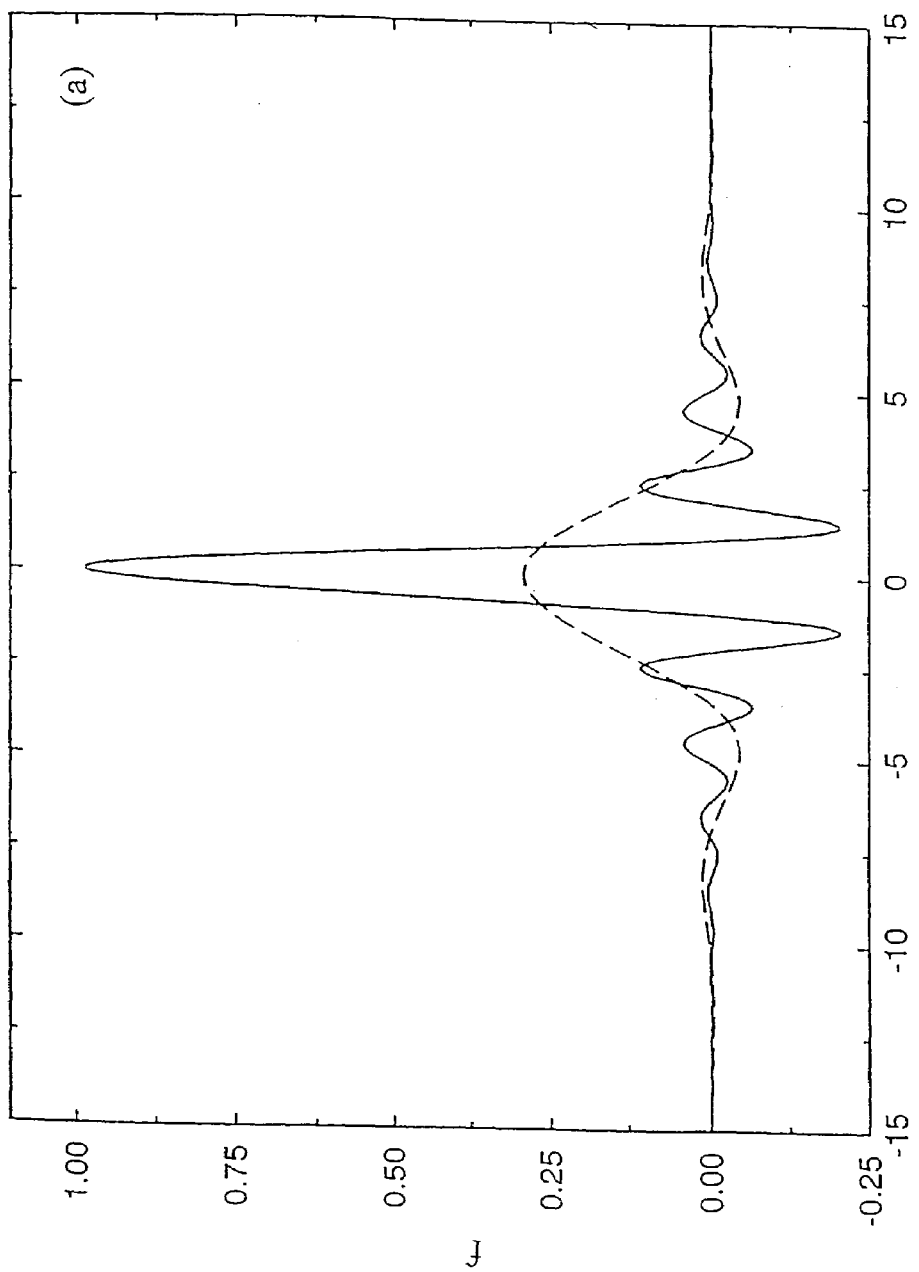
FIG. 1(a) depicts the Hermite DAF in coordinate space and FIG. 1(b) depicts the frequency space, respectively. The solid line is for M=88, $\sigma$=3.05 and the dashed line is for M=12, ~$\sigma$=4. The solid line is close to the interpolation region and the dashed line is in the low pass filtering region. The frequency in FIG. 1(b) has been multiplied by a factor of the grid spacing.

Given a discrete set of functional values on a grid, the DAF approximation to the function at any point x (on or off the grid) can be obtained by $$f_{DAF}(x) = \Delta \sum_j \delta_M(x-x_j|\sigma)f(x_j). \quad (3)$$

where $\Delta$ is the uniform grid spacing (non-uniform and even random sampling can also be used by an appropriate extension of the theory). The summation is over all grid points (but only those close to x effectively contribute). Similarly, for a two-dimensional function f(x,y), one can write $$f_{DAF}(x, y) = \quad (4)$$
$$\Delta_x \Delta_y \sum_{j_1,j_2} \delta_{M_1}(x-x_{j_1}|\sigma_1)\delta_{M_2}(y-y_{j_2}|\sigma_2)f(x_{j_1}, y_{j_2}),$$

using a simple direct product. In FIG. 1, we plot Hermite DAFs obtained with two different sets of parameters, in (a) coordinate space, and (b) frequency space. The solid line ($\sigma$=3.05, M=88) is more interpolative compared to the DAF given by the dashed line ($\sigma$=4, M=12). The latter is more smoothing when applied to those functions whose Fourier composition lies mostly under the $\sigma$=3.05, M=88 DAF window. This results from the $\sigma$=4, M=12 DAF window being narrower in Fourier space than that of the DAF with $\sigma$=3.05, M=88. The discretized Hermite DAF is highly banded in coordinate space due to the presence of the Gaussian envelope, which means that only a relatively small number of values are needed on both sides of the point x in Equation (3), as can be clearly seen from FIG. 1(a). This is in contrast to the sinc function $$\frac{\sin(\omega x)}{\pi x}.$$

Figure 1B:
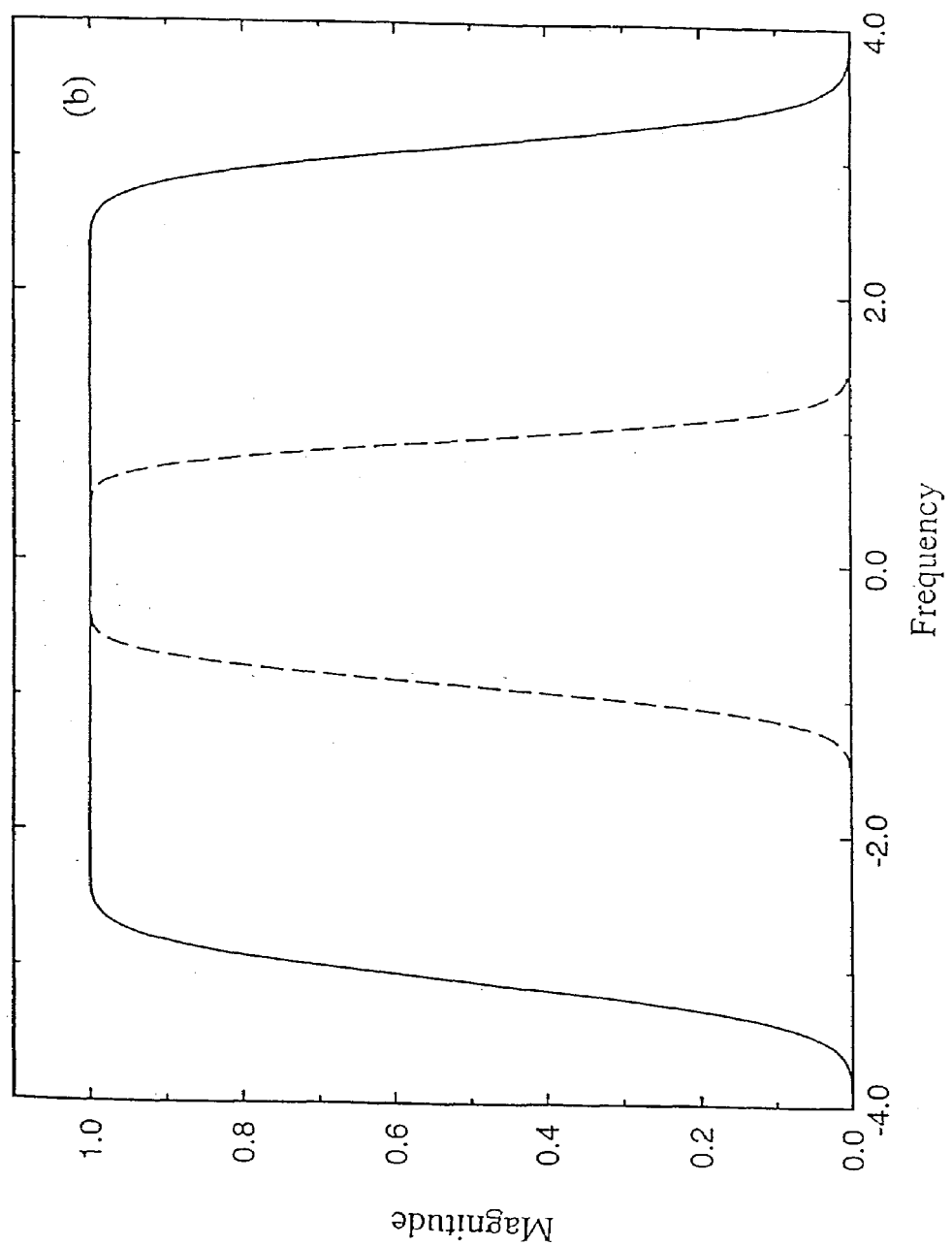

From FIG. 1(b), we see that the Hermite DAF is also effectively bandwidth-limited in frequency space. With a proper choice of parameters, the Hermite DAF can produce an arbitrarily good filter (see the dashed line in FIGS. 1(a–b)). Once the boundary condition is fixed for a data set, Equation (3) or (4) can then be used to eliminate the high frequency noise of that data set. As long as the frequency distribution of the noise lies outside the DAF plateau (FIG. 1(b)), the Hermite DAF will eliminate the noise regardless of its magnitude.

The approximate linear transformations of a continuous function can also be generated using the Hermite DAF. One particular example is derivatives of a function to various orders, given by $$f^{(l)}(x) \approx f_{DAF}^{(l)} = \int_{-\infty}^{\infty} \delta_M^{(l)}(x-x'|\sigma)f(x')dx', \quad (5)$$

where $\delta_M^{(l)}(x-x'|\sigma)$ is the lth derivative of $\delta_M(x-x'|\sigma)$, with respect to x, and is given explicitly by $$= \frac{2^{-\frac{l}{2}}}{\sigma^{l+1}} \exp\left(\frac{-(x-x')^2}{2\sigma^2}\right) \quad (6)$$

$$\wedge \sum_{n=0}^{\frac{1}{2}} \left(-\frac{1}{4}\right)^n (-1)^l \frac{1}{\sqrt{2\pi} n!} H_{2n+l}\left(\frac{x-x'}{\sqrt{2}\sigma}\right).$$

When uniformly discretized by quadrature, Equation (5) gives $$f^{(l)}(x) \approx f_{DAF}^{(l)}(x) = \Delta \sum_j \delta_M^{(l)}(x-x_j|\sigma)f(x_j) \quad (7)$$

Expressions (5) and (7) are extremely useful in solving linear and nonlinear partial differential equations (PDEs) [14–17] because the differential operation has been expressed as an integration. With a judicious choice of the DAF parameters, it is possible to provide arbitrarily high accuracy for estimating the derivatives.

Method of Data Extrapolation

Case I. Filling a Gap

Suppose we have a set of uniformly spaced grid points on the infinite line, and a continuous function, f(x), known on all grid points except for the set $\{X_J, \ldots, X_K\}$. Assuming that f(x) is in the DAF-class, we can estimate the unknown values by minimizing the cost function, $$C \equiv \sum_{p=-\infty}^{\infty} W_p(f(x_p) - f_{DAF}(x_p))^2 \quad (8)$$

where, $W_p$ is a weight assigned to the point $x_p$, and in this disclosure it is chosen to be 1 on a finite grid and 0 elsewhere; $f_{DAF}$(xp) is the DAF approximation to the function at the point $x_p$. From Equations (3) and (8), we have $$C \equiv \sum_{p=-\infty}^{\infty} W_p\left(f(x_p) - \sum_{t=p-w}^{p+w} \delta_M(x_p - x_t|\sigma)f(x_t)\right)^2, \quad (9)$$

where w is the half DAF bandwidth. We minimize this cost function with respect to the unknown values, $\{f(x_J), \ldots, f(x_K)\}$, according to $$\frac{\partial C}{\partial f(x_l)} = 0, \ J \leq l \leq K, \tag{10}$$

to generate the set of linear algebraic equations, $$\sum_{p=-\infty}^{\infty} 2W_p(f(x_p) - \sum_{t=p-w}^{p+w} \delta_M(x_p - x_t|\sigma)f(x_t))(\delta_{pl} - \delta_M(x_p - x_l|\sigma)) = 0,$$

$$J \leq l \leq K, \tag{11}$$

where the unknowns are $f(x_p)$ and $f(x_t)$ for p=1 or t=1. The symbol $\delta_{pl}$ is the kronecker delta. Solving these equations yields the predicted values of f(x) on the grid points in the gap.

Case II. Extrapolation

A more challenging situation occurs when $f(x_l)$, l>J are all unknown. In this case, for points $x_p$ beyond $x_K$, we specify a functional form for the unknown grid values, including some embedded variational parameters. It is simplest to choose linear variational parameters, e.g., $$f(x) \approx \sum_{\mu=1}^{L} \alpha_\mu \phi_\mu(x), \tag{12}$$

but this is not essential, and nonlinear parameters can also be embedded in the $\phi_\mu(x)$. The choice of functions, $\phi_\mu(x)$, can be guided by any intuition or information about the physical behavior of the signal, but even this is not necessary. This introduces additional variations of the cost function with respect to the additional parameters, so we impose $$\frac{\partial C}{\partial \alpha_\beta} = 0, \ 1 \leq \beta \leq L,$$

and therefore obtain additional equations. We must also specify the choice of the $W_p$ when one introduces both a gap and a "tail function". There is enormous freedom in how this is done, and e.g., one can choose which points are included and which are not. In the present study, we shall take $W_p=1$ for $1 \leq p \leq K$ (i.e., all known data points, plus all gap-points), and $W_p \equiv 1$ for all other points(including tail-function points). Again, we emphasize that other choices are possible and are under study.

For case I, our procedure leads to Equation (11) and for case II, to the equations, $$\sum_{p=l-w}^{\min(l+w,K)} 2W_p(f(x_p) - \sum_{t=p-w}^{p+w} \delta_M(x_p - x_t|\sigma)f(x_t)) \times$$

$$(\delta_{pl} - \delta_M(x_p - x_l|\sigma)) = 0, \ J \leq l \leq K, \tag{13}$$

-continued $$\sum_{p=K+l-w}^{K} -2W_p(f(x_p) - \sum_{t=p-w}^{p+w} \delta_M(x_p - x_t|\sigma)f(x_t)) \times$$

$$\sum_{t=K+1}^{p+w} \delta_M(x_p - x_t)\phi_\beta(x_t) = 0, \ 1 \leq \beta \leq L \tag{14}$$

These linear algebraic equations can be solved by any of a variety of standard algorithms [18]. Note that it is the well-tempered property of the DAFs that underlies the above algorithms. For standard interpolation algorithms, the value on each grid point is exact and does not depend on the values at other grid points, which means that the cost function is always zero irrespective of functional values.

The suitability of using Hermite DAFs to pad two isolated data sets has been tested for fitting one dimensional potential energy surfaces [8]. To explore further the algorithm in the case where only one data set is known, we show in FIG. 2 the extrapolation results for the arbitrarily chosen DAF-class function, $$f(x) = 4 + 2\sum_{j=1}^{4} \cos(jx) + 5\exp(-(x-1)^2). \tag{15}$$

Figure 2:
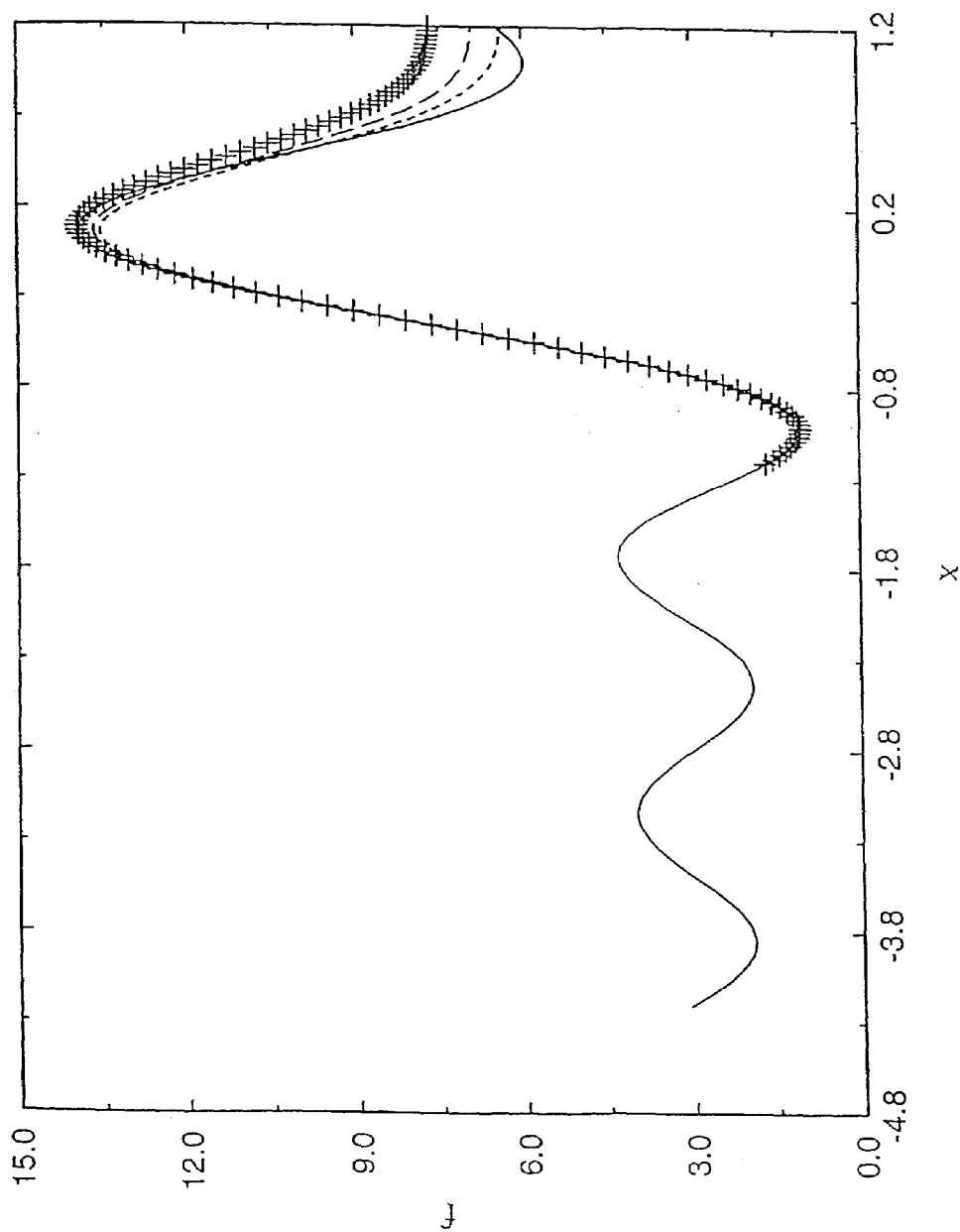
FIG. 2 depicts extrapolation results for the function in Equation (15). The solid line is the exact function. The long dashed line, the short dashed line and the plus symbols are the extrapolation results for Hermite DAF parameters $\sigma/\Delta$=7.6, ~7.8, and 8.0 respectively. In our numerical application, only the values at the grid points less than −1.2 are assumed to be known.

Using values of the function on a discrete grid with uniform spacing, $\Delta 26$ 0.024, on the domain shown in FIG. 2 (solid line), we attempt to determine the function at 100 uniformly distributed grid points in the range [−1.2, 1.2]. The tail function used is f(x)≡1, multiplied by a linear variational parameter. From FIG. 2, it is seen that the predicted results are in almost total agreement with the actual function, for all three DAF parameters employed, for the points between −1.2≦x≦0.2. Larger errors occur for those x values which are further away from the known data boundary. The source of error simply is that one is forcing the function to join smoothly with a constant tail function, even though the constant is variationally determined. Had one employed the correct form for the tail function, with a multiplicative variational factor, the result would be visually indistinguishable for all three DAF parameters and the tail-variational constant would turn out to be essentially unity. It must be noted that, although we have discussed the algorithm in the context of one dimension, extending it to two or more dimensions is straightforward. One way to do this is with a direct product form, as given in Equation (4). However, such a direct two dimensional calculation is a time and memory consuming procedure because of the large number of simultaneous algebraic equations that must be solved. One alternative is to consider the two dimensional patterns as a grid constructed of many one dimensional grids, and then extrapolate each line separately. We expect this procedure may be less accurate than the direct two dimensional extrapolation algorithm because it only considers the influence from one direction and neglects cross correlation. However, for many problems it produces satisfactory results and it is a very economical procedure. Additionally, cross correlation can be introduced by DAF-fitting the complete (known plus predicted) data set using the appropriate 2D DAF.

The well-tempered property makes the DAFs powerful computational tools for extrapolation of noisy data, since DAFs are low-pass filters and therefore remove high frequency noise. In the next section, we will explore the use of the algorithm presented here for periodically extending a finite, discrete segment of data which may contain noise.

Periodic Extension

As described in the introduction to this disclosure, sometimes it is necessary to know the boundary conditions for a data set in order to apply noncausal, zero-phase FIR filters without inducing significant aliasing. Certain other numerical analyses require that the signal contain a number of samples equal to an integer power of 2. However, it is most often the case that the boundary conditions for the experimental data are unknown and the length of the data stream is fixed experimentally and typically not subject to adjustment.

A pseudo-signal is introduced outside the domain of the nonperiodic experimental signal in order to force the signal to satisfy periodic boundary conditions, and/or to have the appropriate number of samples. The required algorithm is similar to that for filling a gap, as discussed above. One can treat the period-length as a discrete variational parameter but we don't pursue this here. For a given set of experimental data $\{f_1, f_2, \ldots, f_{J-1})\}$, we shall force it to be periodic, with period K, so that K−J+1 values $\{f_J, f_{J+1}, \ldots, f_K\}$ must be determined. Since the extended signal is periodic, the values $\{f_{K+1}, f_{K+2}, \ldots, f_{K+J-1}\}$ are also, by fiat, known to be equal to $\{f_1, f_2, \ldots f_{J-1}\}$. Once the gap is filled in, the resulting signal can, of course, be infinitely extended as may be required for various numerical applications.

The pseudo-signal is only used to extend the data periodically retaining essentially the same frequency distributions. The utility of the present periodic extension algorithm is that it provides an artificial boundary condition for the signal without significant aliasing. The resulting signal can be used with any filter requiring information concerning the future and past behavior of the signal. In this disclosure, we also employ a Hermite DAF to filter out the higher frequency noise of the periodic, extended noisy signal. For doing this, we assume that the true signal is bandwidth limited and that the noise is mostly concentrated in the high frequency region.

As shown in the test example extrapolation in section III, there are infinitely many ways to smoothly connect two isolated signals using DAFs with different choices of the parameters. We require a procedure to determine the optimum DAF parameters in a "blind" manner. Fourier analysis is one way to proceed, but due to the structure of the Hermite DAF, we prefer to optimize the parameters while working in physical space rather than Fourier space. To accomplish this, we introduce a generalized signature for both noisy data extension and filtering, which we define to be $$S_M(\sigma/\Delta) = \sqrt{\frac{\sum_n (f_{DAF}(x_n) - \overline{f_{DAF}})^2}{N}} \quad (16)$$

where, M and $\sigma$ are Hermite DAF parameters, and $\overline{f_{DAF}}$ is the arithmetic average of the $f_{DAF}(x_n)$ (the $\sigma/\Delta \to \infty$ of $f_{DAF}(x_n)$). The signature essentially measures the smoothness of the DAF filtered result.

Figure 4A:
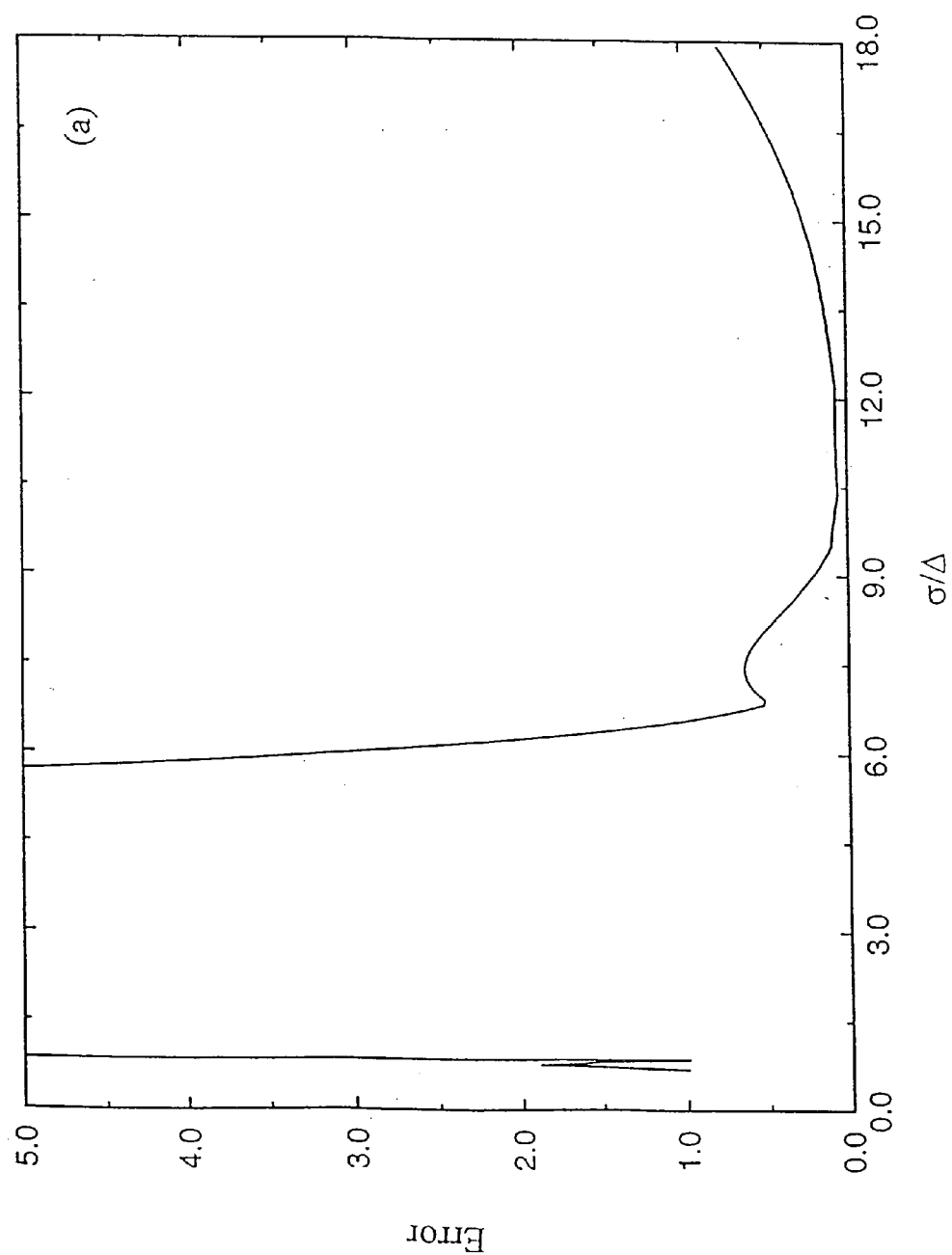
FIG. 4( ) depicts the $L_\infty$ error and FIG. 4(b) the signature of the periodic padding of the noisy sine function as a function of DAF parameter a/A. The M is fixed to be 6.
Figure 4B:
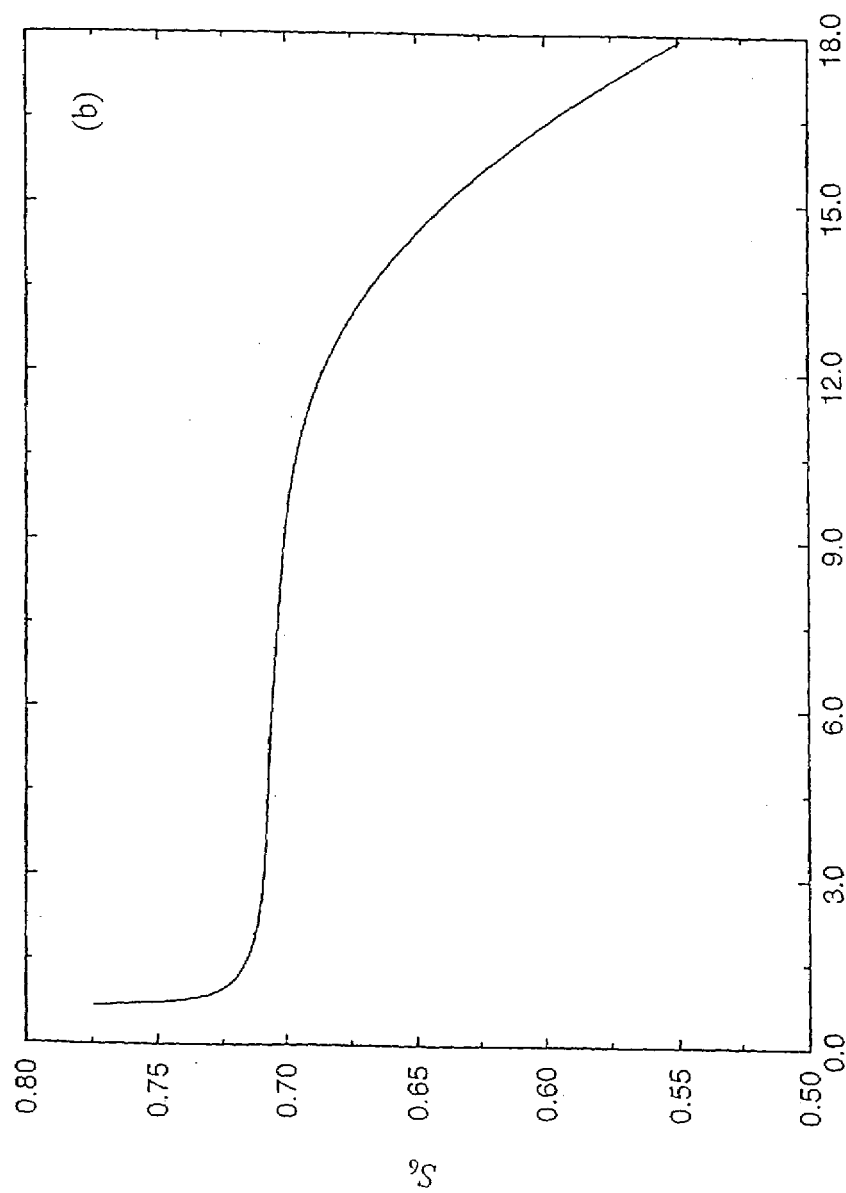

A typical plot of $S_M(\sigma/\Delta)$ is shown in FIG. 4(b). We first note that it is monotonically decreasing. This is to be expected since increasing $\sigma/\Delta$ results in a smoother, more highly averaged signal. The second major feature of interest is the occurrence of a broad plateau. In this region most of the noise has been removed from the DAF approximation; however, the dominant portion of the true signal is still concentrated under the DAF frequency window. As a consequence the DAF approximation to the function is very stable in this region. As of $\sigma/\Delta$ increases beyond the plateau the width of the DAF window in frequency no longer captures the true signal and as a result, the true DAF signal begins to be severely averaged. In the extreme, only the zero frequency remains and $f_{DAF}(x_n) = \overline{f_{DAF}}$ and hence $S_M(\sigma/\Delta) \to 0$. As we discuss below, one can usefully correlate the transition behavior with the best DAF-approximation. The first extremely rapid decrease is due to the fact the DAF is interpolating and not well tempered. It is the region beyond the initial rapid decrease that is important (i.e., of $\sigma/\Delta \geq 1.5$). To understand the behavior in this region, we write $S_M(\sigma/\Delta)$ in the form $$S_M(\sigma/\Delta) = \sqrt{\frac{\sum_n ((\Delta f(x_n))_{DAF}^2 + 2(\Delta f(x_n))_{DAF}}{(f_{DAF}^{(p)}(x_n) - \overline{f_{DAF}}) + (f_{DAF}^{(p)}(x_n) - \overline{f_{DAF}})^2}{N}} \quad (17)$$

where $$f_{DAF}^{(p)}(x_n)$$

is the DAF approximation using $\sigma/\Delta$ in the middle of the plateau and $$(\Delta f(x_n))_{DAF} = f_{DAF}(x_n) - f_{DAF}^{(p)}(x_n).$$

The cross term averages to zero because the DAF approximation is interpolating and hence the $(\Delta f(x_n))_{DAF}$ fluctuate rapidly reflecting the presence of noise. Thus $$S_M(\sigma/\Delta) = \sqrt{\frac{\sum_n (\Delta f(x_n))_{DAF}^2 + (f_{DAF}^{(p)} + (x_n) - \overline{f_{DAF}})^2}{N}} \quad (18)$$

which decreases rapidly since $\Sigma_n(\Delta f(x_n))^2_{DAF}$ is positive and rapidly decreasing as the high frequency noise is eliminated from the signal. The transition into the plateau reflects a change from an interpolative to a well tempered behavior. Although the algorithm presented in this section only refers to periodic extensions, we stress that this is only one possibility out of many.

Numerical Examples

Two numerical examples are presented in this section to show the usefulness of our algorithm.

Case I

Figure 3:
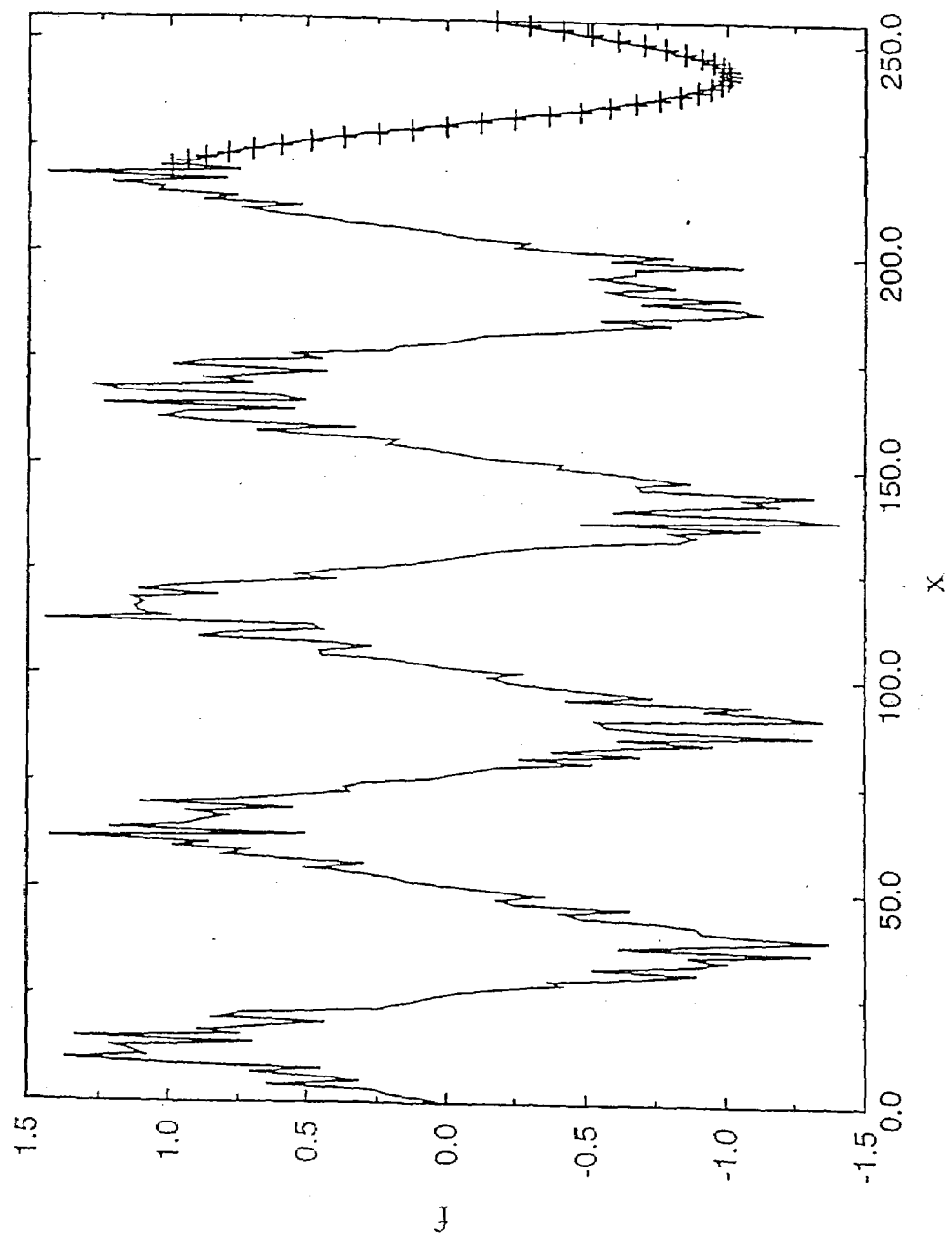
FIG. 3 depicts sine function in Equation (17) with 50% random noise added to the values at even spaced grids from 0 to 219 (solid line) and the periodically extended 36 function values (plus symbols) with $\sigma/\Delta$=10.5. The exact values in the extended domain are also plotted (solid line) in this figure.

The first one is the extrapolation of $f(x)=\sin(5\pi x/128)$, to which noise has been added. The Hermite DAF parameters are M=6 for padding/extension and M=1 for smoothing in our numerical examples. The weight $W_p$, was taken as discussed above. The values at 220 evenly spaced grid points are input over the range [0,219], with 50% random noise added (f=f×[1+random(−0.5,0.5)]. The continuation of the solid curve from points $x_{220}$ to $x_{256}$ shows the function without noise. We shall predict the remaining 36 points (excluding $x_{256}$ because the function there must equal the function at $x_0$) by the periodic extension algorithm presented in this disclosure. Because the original continuous function without noise is truly periodic, with period 256, this extension corresponds to filling the gap using noisy input data. The $L_\infty$ error and the signature for periodic extension are plotted with respect to $\sigma/\Delta$ in FIGS. 4(a) and 4(b) respectively. From FIG. 4(b), we see that at $\sigma/\Delta \approx 10.5$, the transition from the plateau to smoothing of the true signal occurs. As is evident from FIG. 4(a), the minimum extension error also occurs at $\sigma/\Delta$ around 10.5. In FIG. 3, we see the comparison of the true function (solid line)from the 220th to the 256th grid point, along with the periodic extension result ("+" symbols). It is clearly seen that they agree very well.

Figure 5A:
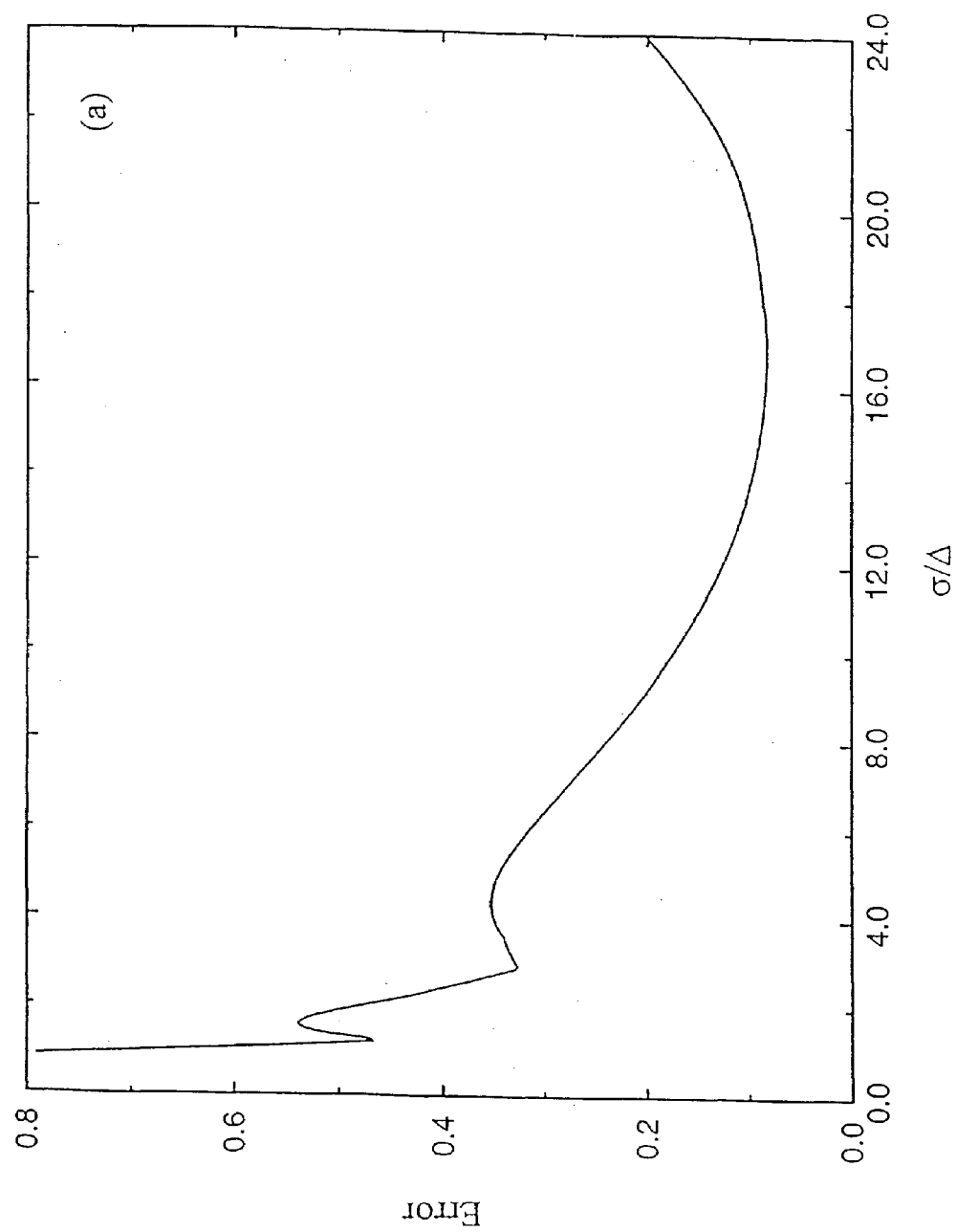
FIG. 5(a) depicts the $L_\infty$ error and FIG. 5(b) the signature of the DAF smoothing to the periodically extended noisy sine function as a function of $\sigma/\Delta$. The M is fixed to be 12.
Figure 5B:
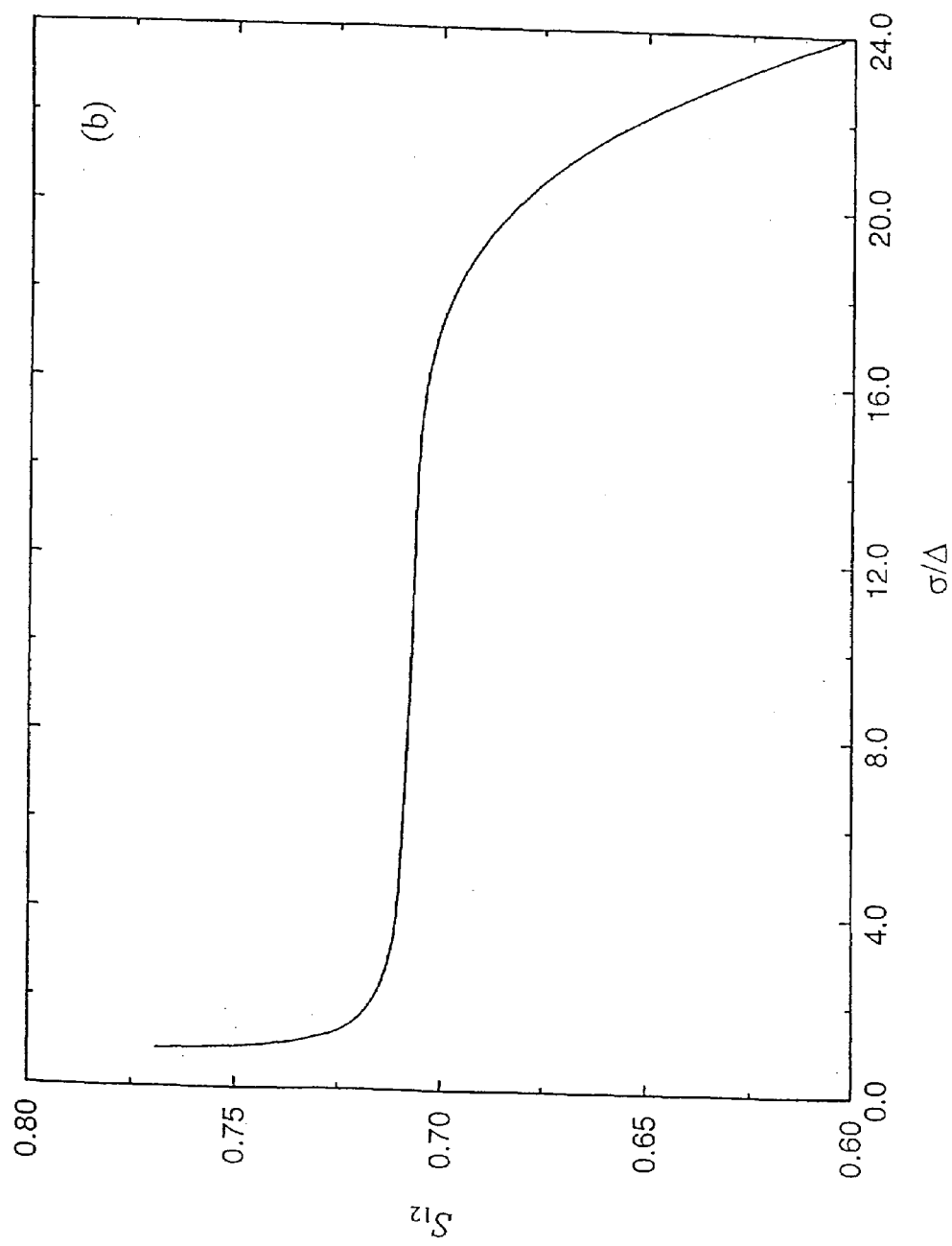

We next use the padded, extended signal for low pass filtering. We plot in FIGS. 5(a) and 5(b) the $L_\infty$ error and the signature of the filtered result for one complete period as a function of $\sigma/\Delta$ using M=12 rather than M=6 in the DAF. This is done for convenience for reasons not germane to the subject. The result is that the $\sigma/\Delta$ range for which the DAF is well-tempered changes and the transition from denoising to signal modifying smoothing occurs at $\sigma/\Delta=17$ (FIG. 5(b)). However, we see from FIG. 5(a) that the $L_\infty$ minimum error also occurs at about the same $\sigma/\Delta$, showing the robustness of the approach with respect to the choice of DAF parameters. In FIG. 5(c), we show the resulting smoothed, denoised sine function compared to the original true signal. These results illustrate the use of the DAF procedure in accurately extracting a band-limited function using noisy input data. Because of the relatively broad nature of the $L_\infty$ error near the minimum, one does not need a highly precise value of $\sigma/\Delta$.

Case II

We now consider a more challenging situation. It often happens in experiments that the boundary condition of the experimental signal is not periodic, and is unknown, in general. However, the signal is approximately band-limited (i.e., in the DAF class).

Figure 6A:
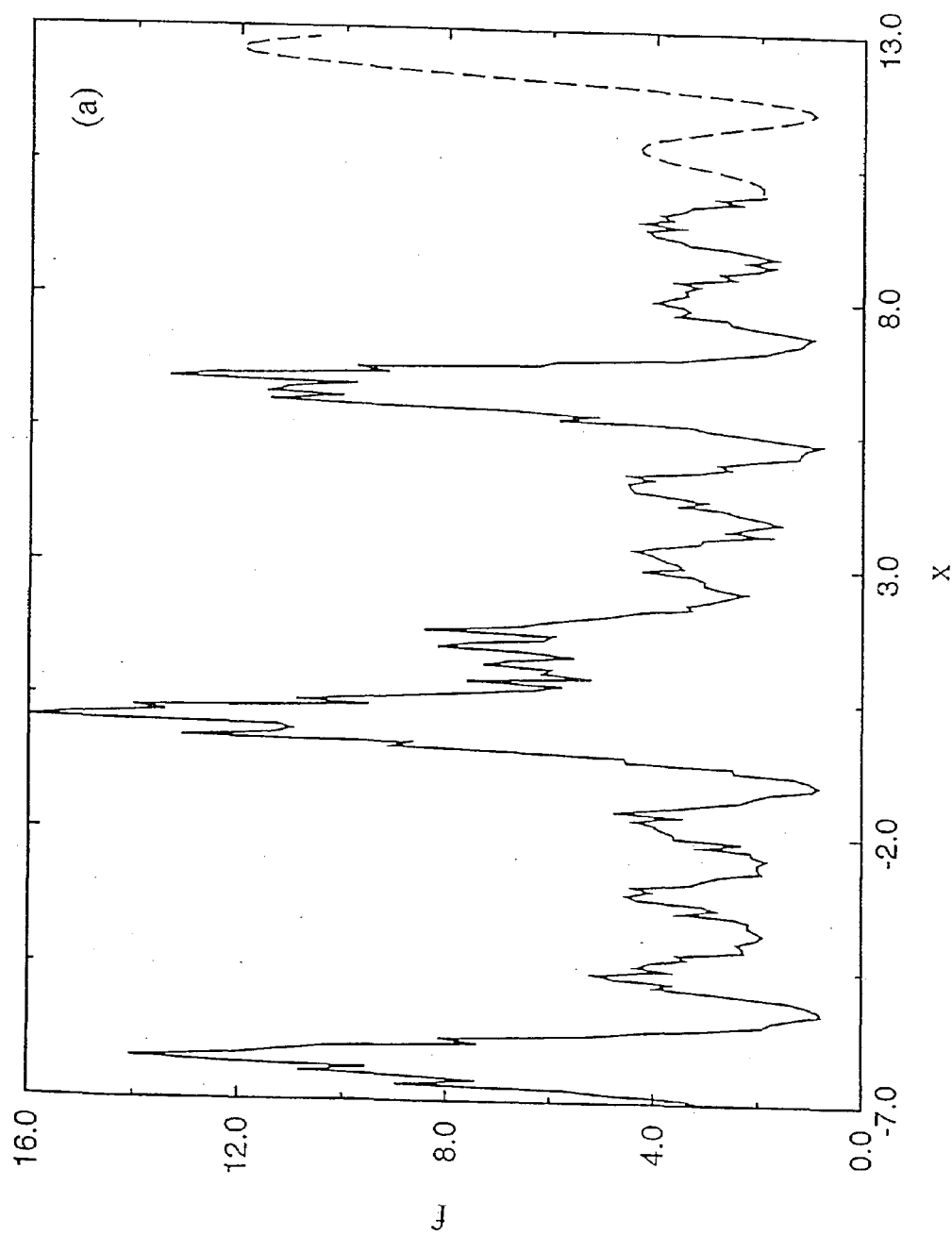
FIG. 6 depicts periodic extension of the nonperiodic function (with noised added) in Equation (15). (a) The 220 known values of the function in the range [−7,10] with 20% random noise (solid line) and the 36 exact values of the function(dashed line). Note that the function is not periodic at all in the range of 256 grid points. (b) The periodically extended function with $\sigma/\Delta$=5.2. Note the smoothness and periodic property of the function.

To test the algorithm for this case, we use the function given in Equation (15) as an example. FIG. 6(a) shows the function, with 20% random noise in the range (−7,10) (solid line). These noisy values are assumed known at only 220 grid points in this range. Also plotted in FIG. 6(a) are the true values of the function (dashed line) on the 36 points to be predicted. In our calculations, these are treated, of course, as unknown and are shown here only for reference. It is clearly seen that the original function is not periodic on the range of 256 grid points. We force the noisy function to be periodic by padding the values of the function on these last 36 points, using only the known, noisy 220 values to periodically surround the gap.

Figure 6B:
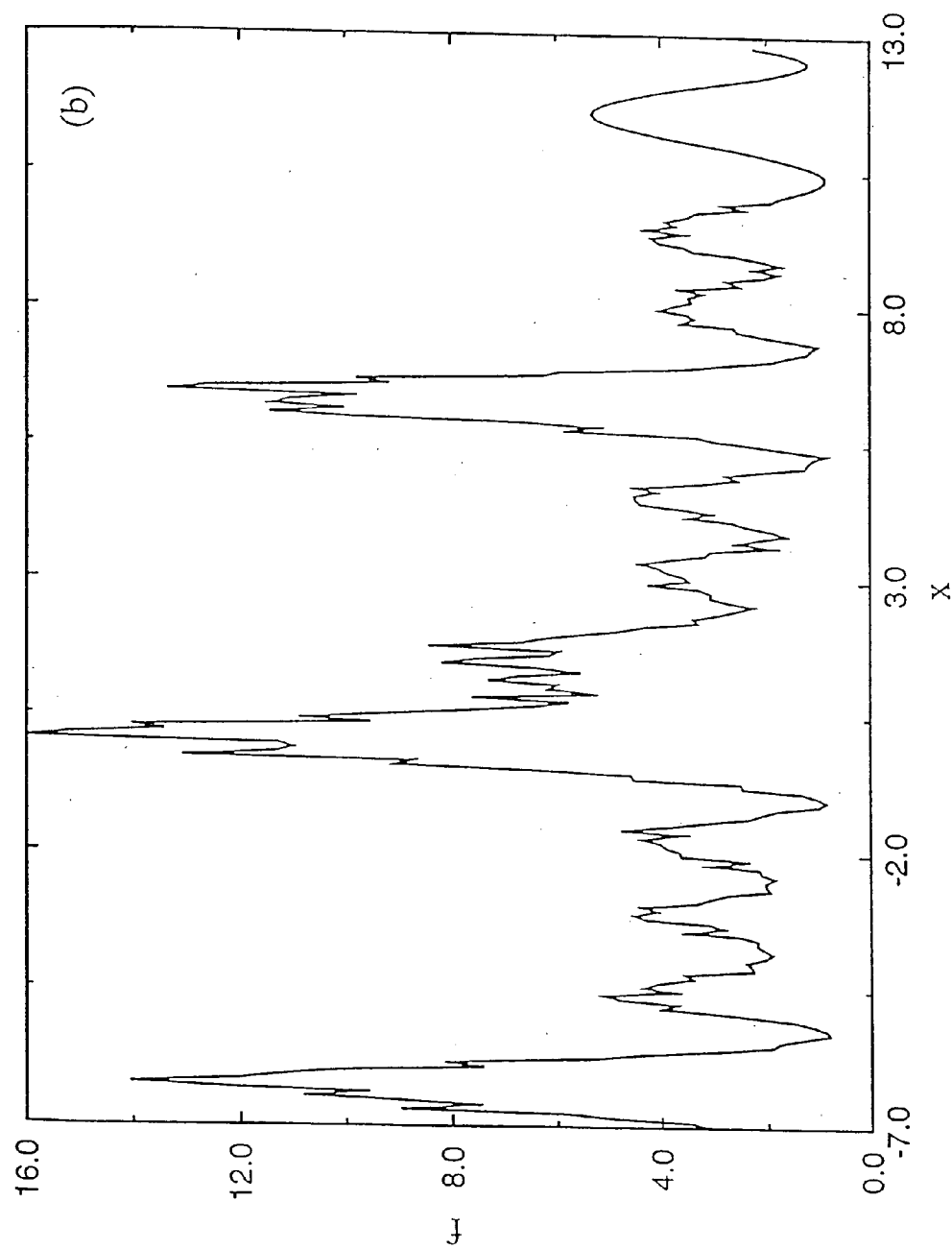
Figure 7:
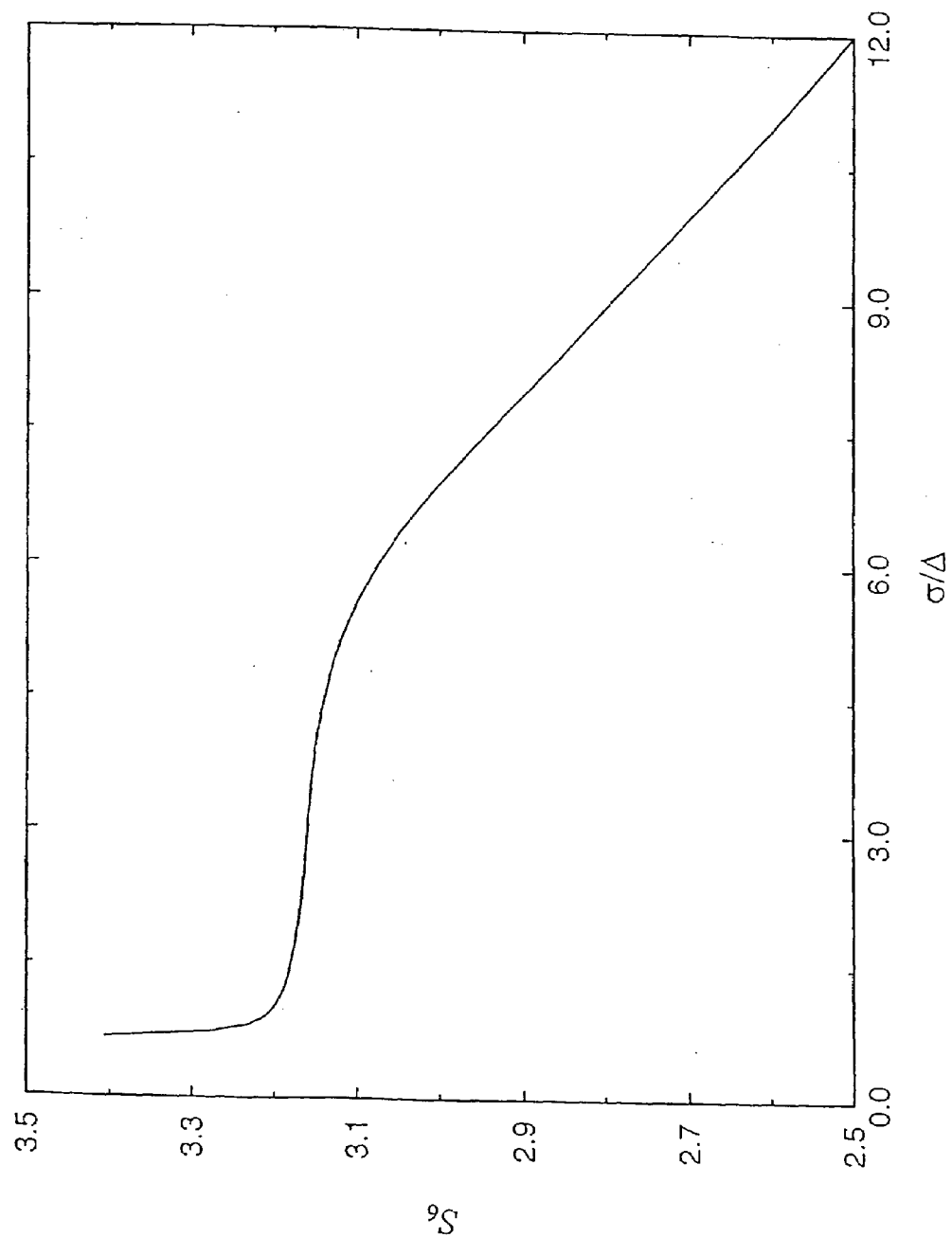
FIG. 7 depicts the periodic extension signature of the noisy function in FIG. 5 as a function of $\sigma/\Delta$. The M is fixed to be 6.
Figure 8A:
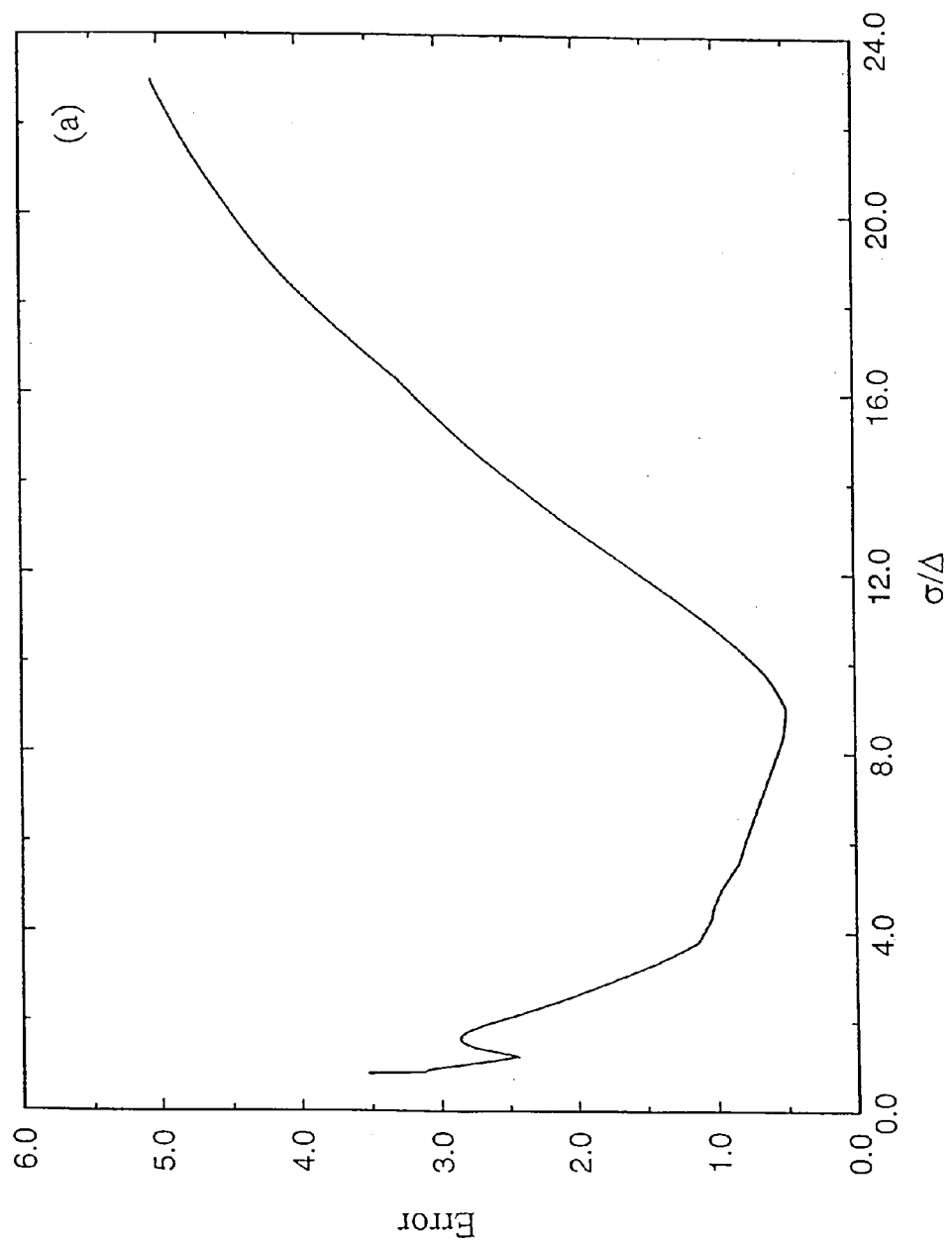
FIG. 8(a) depicts the $L_\infty$ error and FIG. 8(b) the signature of the DAF SMOOTHING to the periodically extended noisy function in FIG. 6(b) as a function of $\sigma/\Delta$. The M is fixed to be 12 for the DAF-smoothing.
Figure 8B:
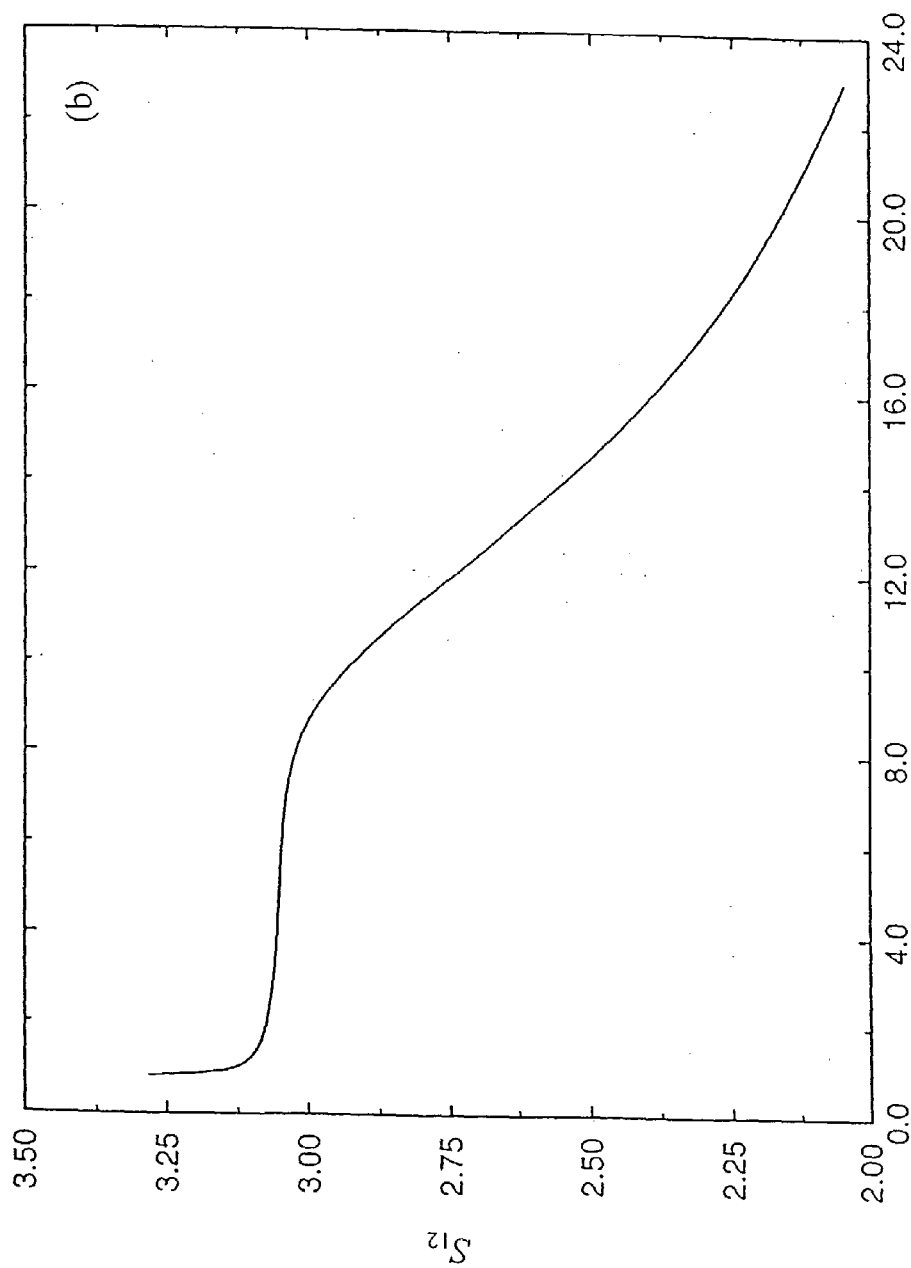
Figure 9:
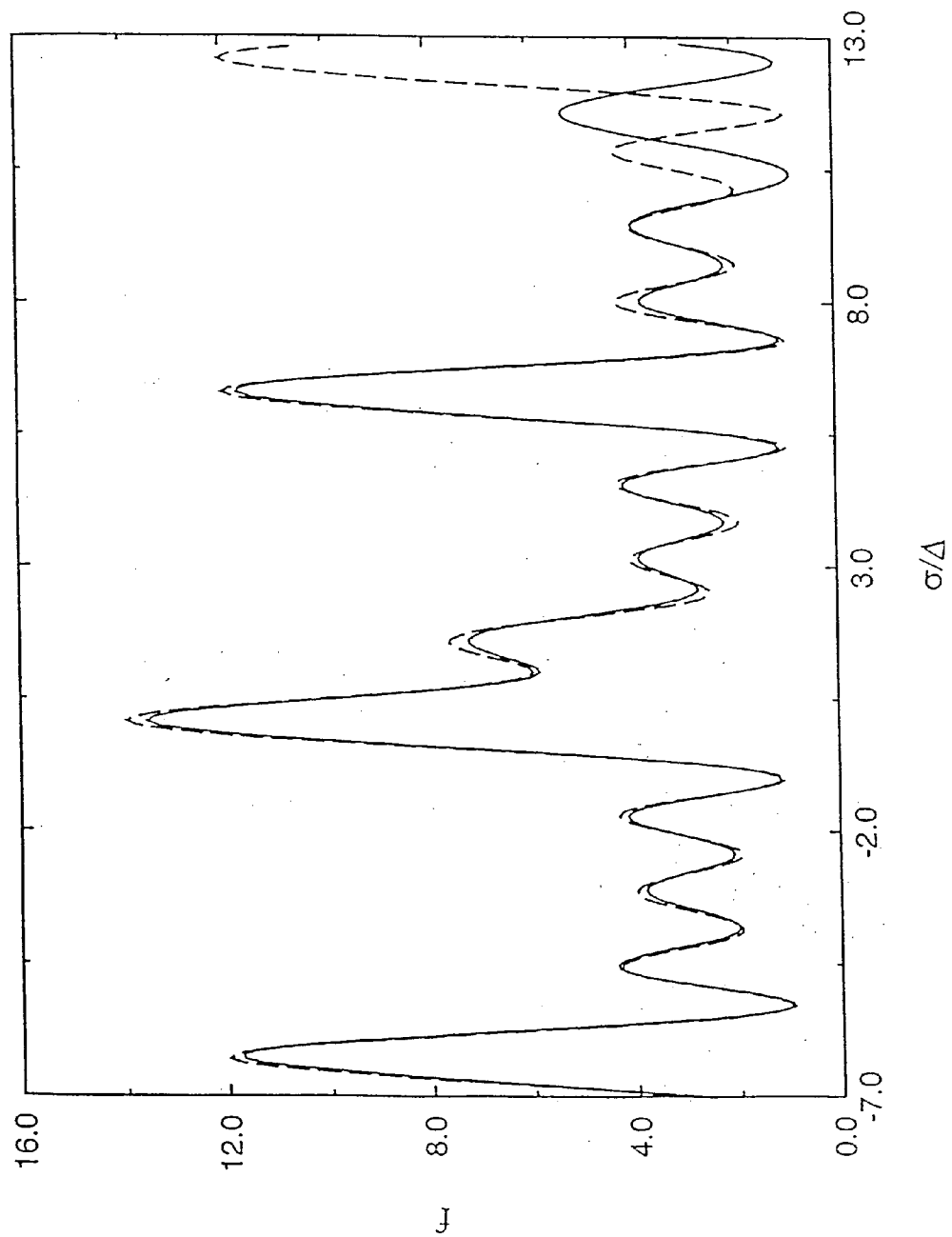
FIG. 9 depicts a comparison of DAF smoothed result to the signal in FIG. 6(b) at σ/Δ=9 (solid line), and with the exact function (dashed line) in Equation (15).

As mentioned in section IV, for nonperiodic signals, the periodic extension is simply a scheme to provide an artificial boundary condition in a way that does not significantly corrupt the frequency distribution of the underlying true signal in the sampled region. The periodic padding signature is shown in FIG. 7. Its behavior is similar to that of the truly periodic signal shown in FIG. 4(b). The second rapid decrease begins at about $\sigma/\Delta=5.2$ and the periodic padding result for this DAF parameter is plotted in FIG. 6(b) along with the original noisy signal. Compared with the original noisy signal, it is seen that the signal in the extended domain is now smoothed. In order to see explicitly the periodic property of the extended signal and the degree to which aliasing is avoided, we filter the noise out of the first 220 points using an appropriate Hermite DAF. The $L_\infty$ error and the signature of the DAF-smoothed results are plotted in FIGS. 8(a) and 8(b), respectively. Again they correlate with each other very well. Both the minimum error and the starting point of the second rapid decrease occur at about $\sigma/\Delta=9.0$, which further confirms our analysis of the behavior of the signature. In FIG. 9, we present the smoothed signal (solid line) along with true signal (dashed line), without any noise added. It is seen that in general, they agree with each other very well in the original input signal domain.

Application of the pseudo-signal in the extended domain clearly effectively avoids the troublesome aliasing problem. The minor errors observed occur in part because of the fact that the random noise contains not only high frequency components but also some lower frequency components. However, the Hermite DAF is used only as a low pass filter here. Therefore, any low frequency noise components are left untouched in the resulting filtered signal. Another factor which may affect the accuracy of filtering is that we only use M=12. According to previous analysis of the DAF theory, the higher the M value, the greater the accuracy [12], but at the expense of increasing the DAF bandwidth ($\sigma/\Delta$ increases). However, as M is increased, combined with the appropriate $\sigma/\Delta$, the DAF-window is better able to simulate an ideal band-pass filter (while still being infinitely smooth and with exponential decay in physical and Fourier space.) Here we have chosen to employ M=12 because our purpose is simply to illustrate the use of our algorithm, and an extreme accuracy algorithm incorporating this principles is directly achievable.

CONCLUSIONS AND DISCUSSIONS

This paper presents a DAF-padding procedure for periodically extending a discrete segment of a signal (which is nonperiodic). The resulting periodic signal can be used in many other numerical applications which require periodic boundary conditions and/or a given number of signal samples in one period. The power of the present algorithm is that it essentially avoids the introduction of aliasing into the true signal. It is the well-tempered property of the DAFs that makes them robust computational tools for such applications. Application of an appropriate well-tempered DAF to the periodically extended signal shows that they are also excellent low pass filters. Two examples are presented to demonstrate the use of our algorithm. The first one is a truncated noisy periodic function. In this case, the extension is equivalent to an extrapolation.

Our second example shows how one can perform a periodic extension of a nonperiodic, noisy finite-length signal. Both examples demonstrate that the algorithm works very well under the assumption that the true signal is continuous and smooth. In order to determine the best DAF parameters, we introduce a quantity called the signature. It works very well both for extensions and low pass filtering. By examining the behavior of the signature with respect to $\sigma/\Delta$, we can determine the overall frequency distribution of the original noisy signal working solely in physical space, rather than having to transform to Fourier space.

REFERENCES

[1] A. Nauts, R. E. Wyatt, Phys. Rev. Lett. 51, 2238 (1983).
[2] D. Neuhauser, J. Chem. Phys. 93, 2611 (1990).
[3] G. A. Parker, W. Zhu, Y. Huang, D. K. Hoffman, and D. J. Kouri, Comput. Phys. Commun. 96, 27 (1996).
[4] B. Jawerth, W. Sweldens, SIAM Rev. 36, 377 (1994).
[5] G. Beylkin, J. Keiser, J. Comput. Phys. 132, 233 (1997).
[6] G. H. Gunaratne, D. K. Hoffman, and D. J. Kouri, Phys. Rev. E 57, 5146 (1998).
[7] D. K. Hoffman, G. H. Gunaratne, D. S. Zhang, and D. J. Kouri, in preparation.
[8] A. M. Frishman, D. K. Hoffman, R. J. Rakauskas, and D. J. Kouri, Chem. Phys. Lett. 252, 62 (1996).
[9] A. V. Oppenheim and R. W. Schafer, "Discrete-Time Signal Processing" (Prentice-Hall, Inc., Englewood Cliffs, New Jersey, 1989).
[10] D. K. Hoffman, N. Nayar, O. A. Sharafeddin, and D. J. Kouri, J. Phys. Chem. 95,8299 (1991).
[11] D. K. Hoffman, M. Arnold, and D. J. Kouri, J. Phys. Chem. 96, 6539 (1992).
[12] J. Kouri, X. Ma, W. Zhu, B. M. Pettitt, and D. K. Hoffman, J. Phys. Chem. 96,9622(1992).
[13] D. K. Hoffman, T. L. Marchloro II, M. Arnold, Y. Huang, W. Zhu, and D. J. Kouri, J. Math. Chem. 20, 117 (1996).
[14] G.W. Wei, D. S. Zhang, D. J. Kouri, and D. K. Hoffman, J. Chem. Phys. 107,3239(1997).
[15] D. S. Zhang, G. W. Wei, D. J. Kouri, and D. K. Hoffnan, Phys. Rev. E. 56, 1197(1998).
[16] G. W. Wei, D. S. Zhang, D. J. Kouri, and D. K. Hoffman, Comput. Phys. Commun. 111, 93(1998).
[17] D. S. Zhang, G. W. Wei, D. J. Kouri, D. K. Hoffman, M. Gorman, A. Palacios, and G. H. Gunaratne, Phys. Rev. E, Submitted.
[18] W. H. Press, B. P. Flannery, S. A. Teukosky, and W. T. Vetterling, "Numerical Recipes—The Art of Scientific Computing" (Cambridge University Press, Cambridge, 1988).

Generalized Symmetric Interpolating Wavelets

Introduction

The theory of interpolating wavelets based on a subdivision scheme has attracted much attention recently [1, 9, 12, 13, 17, 22, 27, 29, 40, 42, 45, 46, 47, 48, 49, 54, 55, 56, 65 and 66]. Because the digital sampling space is exactly homomorphic to the multi scale spaces generated by interpolating wavelets, the wavelet coefficients can be obtained from linear combinations of discrete samples rather than from traditional inner product integrals. This parallel computational scheme significantly decreases the computational complexity and leads to an accurate wavelet decomposition, without any pre-conditioning or post-conditioning processes. Mathematically, various interpolating wavelets can be formulated in a biorthogonal setting.

Following Donoho's interpolating wavelet theory [12], Harten has described a kind of piecewise biorthogonal wavelet construction method [17]. Swelden independently develops this method as the well-known "lifting scheme" [56], which can be regarded as a special case of the Neville filters considered in [27]. The lifting scheme enables one to construct custom-designed biorthogonal wavelet transforms by just assuming a single low-pass filter (a smooth operation) without iterations. Theoretically, the interpolating wavelet theory is closely related to the finite element technique in the numerical solution of partial differential equations, the subdivision scheme for interpolation and approximation, multi-grid generation and surface fitting techniques.

A new class of generalized symmetric interpolating wavelets (GSIW) are described, which are generated from a generalized, window-modulated interpolating shell. Taking advantage of various interpolating shells, such as Lagrange polynomials and the Sinc function, etc., bell-shaped, smooth window modulation leads to wavelets with arbitrary smoothness in both time and frequency. Our method leads to a powerful and easily implemented series of interpolating wavelet. Generally, this novel designing technique can be extended to generate other non-interpolating multiresolution analyses as well (such as the Hermite shell). Unlike the biorthogonal solution discussed in [6], we do not attempt to solve a system of algebraic equations explicitly. We first choose an updating filter, and then solve the approximation problem, which is a rth-order accurate reconstruction of the discretization. Typically, the approximating functional is a piecewise polynomial. If we use the same reconstruction technique at all the points and at all levels of the dyadic sequence of uniform grids, the prediction will have a Toplitz-like structure.

These ideas are closely related to the distributed approximating functionals (DAFs) used successfully in computational chemistry and physics [20,21,22,65,66,67], for obtaining accurate, smooth analytical fits of potential-energy surfaces in both quantum and classical dynamic calculations, as well as for the calculation of the state-to-state reaction probabilities for three-dimension (3-D) reactions. DAFs provide a numerical method for representing functions known only on a discrete grid of points. The underlying function or signal (image, communication, system, or human response to some probe, etc.) can be a digital time sequence (i.e., finite in length and 1dimensional), a time and spatially varying digital sequence (including 2-D images that can vary with time, 3-D digital signals resulting from seismic measurements), etc. The general structure of the DAF representation of the function, $f_{DAF}(x,t)$, where x can be a vector (i.e., not just a single variable), is $$f_{DAF}(x,t_p) \Sigma_j \phi(x-x_j)|\sigma/\Delta) f(x_j,t_p)$$

where $\phi(x-x_j)|\sigma/\Delta)$ is the "discrete DAF", $f(x_j,t_p)$ is the digital value of the "signal" at time $t_p$, and M and $\sigma/\Delta$ will be specified in more detail below. They are adjustable DAF parameters, and for non-interpolative DAF, they enable one to vary the behavior of the above equation all the way from an interpolation limit, where $$f_{DAF}(x_j,t_p) \equiv f(x_j,t_p)$$

(i.e., the DAF simply reproduces the input data on the grid to as high accuracy as desired) to the well-tempered limit, where $$f_{DAF}(x_j,t_p) \neq f(x_j,t_p)$$

for function $f(x,t_p) \in L^2(R)$. Thus the well-tempered DAF does not exactly reproduce the input data. This price is paid so that instead, a well-tempered DAF approximation makes the same order error off the grid as it does on the grid (i.e., there are no special points). We have recently shown that DAFs (both interpolating and non-interpolating) can be regarded as a set of scaling functionals that can used to generate extremely robust wavelets and their associated biorthogonal complements, leading to a full multiresolution analysis [22, 46, 47, 48, 49, 54, 55, 66, 67]. DAF-wavelets can therefore serve as an alternative basis for improved performance in signal and image processing.

The DAF wavelet approach can be applied directly to treat bounded domains. As shown below, the wavelet transform is adaptively adjusted around the boundaries of finite-length signals by conveniently shifting the modulated window. Thus the biorthogonal wavelets in the interval are obtained by using a one-sided stencil near the boundaries. Lagrange interpolation polynomials and band-limited Sinc functionals in Paley-Wiener space are two commonly used interpolating shells for signal approximation and smoothing, etc. Because of their importance in numerical analysis, we use these two kinds of interpolating shells to introduce our discussion. Other modulated windows, such as the square, triangle, B-spline and Gaussian are under study with regard to the time-frequency characteristics of generalized interpolating wavelets. By carefully designing the interpolating Lagrange and Sinc functionals, we can obtain smooth interpolating scaling functions with an arbitrary order of regularity.

Intepolating Wavelets

The basic characteristics of interpolating wavelets of order D discussed in reference [12] require that, the primary scaling function, $\phi$, satisfies the following conditions.

(1) Interpolation:

$$\phi(k) = \begin{cases} 1, k = 0 \\ 0, k \neq 0 \end{cases} k \in Z \quad (19)$$

where Z denotes the set of all integers.

(2) Self-Induced Two-Scale Relation: $\phi$ can be represented as a linear combination of dilates and translates of itself, with a weight given by the value of $\phi$ at k/2.

$$\phi(x) = \sum_k \phi(k/2)\phi(2x - k) \quad (20)$$

This relation is only approximately satisfied for some interpolating wavelets discussed in the later sections. However, the approximation can be made arbitrarily accurate.

(3) Polynomial Span: For an integer $D \geq 0$, the collection of formal sums symbol $\Sigma C_k \phi(x-k)$ contains all polynomials of degree D.

(4) Regularity: For a real V>0, $\phi$ is Hölder continuous of order V.

(5) Localization: $\phi$ and all its derivatives through order [V] decay rapidly.

$$|\phi^{(r)}(x)| \leq A_s(1+|x|)^s, x \in R, s > 0, 0 \leq r \leq [V] \quad (21)$$

where [V] represents the maximum integer that does not exceed V.

In contrast to most commonly used wavelet transforms, the interpolating wavelet transform possesses the following characteristics:

1. The wavelet transform coefficients are generated by the linear combination of signal samplings, $$S_{j,k}=2^{-j/2}f(2^{-j}k), W_{j,k}=2^{-j/2}[f(2^{-j}(k+\tfrac{1}{2}))-(P_jf)(2^{-j}(k+\tfrac{1}{2}))] \quad (22)$$

instead of the convolution of the commonly used discrete wavelet transform, such as $$W_{j,k}=\int_R \Psi_{j,k}(x)f(2^{-j}k)dx \quad (23)$$

where the scaling function, $\phi_{j,k}(x)=2^{1/2}\phi(2^jx-k)$, and wavelet function, $\psi_{j,k}(x)=\tfrac{1}{2}\psi(2^jx-k)$, $P_jf$ as the interpolant $2^{-j/2}\Sigma f(2^{-j}k)\phi_{j,k}(x)$.

2. A parallel-computing mode can be easily implemented. The calculation and compression of coefficients does not depend on the results of other coefficients. For the halfband filter with length N, the calculation of each of the wavelet coefficients, $W_{j,k}$, does not exceed N+2 multiply/adds.

3. For a D-th order differentiable function, the wavelet coefficients decay rapidly.

4. In a mini-max sense, threshold masking and quantization are nearly optimal approximations for a wide variety of regularity algorithms.

Theoretically, interpolating wavelets are closely related to the following functions:

Band-Limited Shannon Wavelets

The $\pi$ band-limited function, $\phi(x)=\sin(\pi x)/(\pi x)\in C''$ in Paley-Wiener space, generates the interpolating functions. Every band-limited function $f\in L^2(R)$ can be reconstructed using the equation $$f(x) = \sum_k f(k)\frac{\sin\pi(x-k)}{\pi(x-k)} \quad (24)$$

where the related wavelet function—Sinclet is defined as (see FIG. 10)

$$\psi(x) = \frac{\sin\pi(2x-1)-\sin\pi(x-1/2)}{\pi(x-1/2)} \quad (25)$$

Interpolating Fundamental Splines

The fundamental polynomial spline of degree D, $\eta^D(x)$, where D is an odd integer, has been shown by Schoenberg (1972), to be an interpolating wavelet (see FIG. 11). It is smooth with order R=D-1, and its derivatives through order D-1 decay exponentially [59]. Thus, $$\eta^D(x) = \Sigma_k \alpha^D(k)\beta^D(X-k) \quad (26)$$

where $\beta^D(x)$ is the B-spline of order D defined as $$\beta^D(x) = \sum_{j=0}^{D+1}\frac{(-1)^j}{D!}\binom{D+1}{j}\left(x+\frac{D+1}{2}-j\right)^D U\left(x+\frac{D+1}{2}-j\right) \quad (27)$$

Here U is the step function $$U(x) = \begin{cases} 0, x < 0 \\ 1, x \geq 0 \end{cases} \quad (28)$$

and $\{\alpha^D(k)\}$ is a sequence that satisfies the infinite summation condition $$\Sigma_k \alpha^D(k)\beta^D(n-k)=\delta(n) \quad (29)$$

Deslauriers-Dubuc Functional

Let D be an odd integer, D>0. There exist functions $F_D$ such that if $F_D$ has already been defined at all binary rationals with denominator $2^j$, it can be extended by polynomial interpolation, to all binary rationals with denominator $2^{j+1}$, i.e. all points halfway between previously defined points [9, 13]. Specifically, to define the function at $(k+\frac{1}{2})/2^j$ when it is already defined at all $\{k2^{-j}\}$, fit a polynomial $\pi_{j,k}$ to the data $(k'/2^j, F_D(k'/2^j)$ for $k' \in \{2^{-j}[k-(D-1)/2], \ldots, 2^{-j}[k+(D+1)/2]\}$. This polynomial is unique $$F_D = \left(\frac{k+1/2}{2^j}\right) \equiv \pi_{j,k}\left(\frac{k+1/2}{2^j}\right) \quad (30)$$

This subdivision scheme defines a function which is uniformly continuous at the rationals and has a unique continuous extension; $F_D$ is a compactly supported interval polynomial and is regular; It is the auto-correlation function of the Daubechies wavelet of order D+1. It is at least as smooth as the corresponding Daubechies wavelets (roughly twice as smooth).

Auto-Correlation Shell of Orthonormal Wavelets

If $\tilde{\phi}$ is an orthonormal scaling function, its auto-correlation $\phi = \tilde{\phi} * \tilde{\phi}(-.)$ is an interpolating wavelet (FIG. 12) [40]. Its smoothness, localization and the two-scale relation are inherited from $\tilde{\phi}$. The auto-correlations of Haar, Lamarie-Battle, Meyer, and Daubechies wavelets lead to, respectively, the interpolating Schauder, interpolating spline, $C^\infty$ interpolating, and Deslauriers-Dubuc wavelets.

Lagrange Half-Band Filters

Ansari, Guillemot, and Kaiser [1] used Lagrange symmetric halfband FIR filters to design the orthonormal wavelets that express the relation between the Lagrange interpolators and Daubechies wavelets [7]. Their filter corresponds to the Deslauriers-Dubuc wavelet of order D=7 (2M–1), M=4. The transfer function of the halfband symmetric filter h is given by $$H(z) = \frac{1}{2} + zT(z^2) \quad (31)$$

where T is the trigonometric polynomial. Except for $h(0)=\frac{1}{2}$, at every even integer lattice point $h(2n)=0$, $n \neq 0$, $n\delta Z$. The transfer function of the symmetric FIR filter $h(n)=h(-n)$, has the form $$H(z) = 1/2 + \sum_{n=1}^{M} h(2n-1)(Z^{1-2n} + Z^{2n-1}) \quad (32)$$

The concept of an interpolating wavelet decomposition is similar to "algorithm a trous", the connection having been found by Shensa [42]. The self-induced scaling and interpolation conditions are the most important characteristics of interpolating wavelets. From the following equation $$f(x) = \Sigma_n f(n)\phi(x-n) \quad (33)$$

and Equation (19), the approximation to the signal is exact on the discrete sampling points, which does not hold in general for commonly used non-interpolating wavelets.

Generalized Interpolating Wavelets

Interpolating wavelets with either a Lagrange polynomial shell or Sinc functional shell are discussed in detail. We call these kinds of window modulated wavelets generalized interpolating wavelets, because they are more convenient to construct, processing and extend to higher dimensional spaces.

Generalized Lagrange Wavelets

Three kinds of interpolating Lagrange wavelets, Halfband Lagrange wavelets, B-spline Lagrange wavelets and Gaussian-Lagrange DAF wavelets, are studied here as examples of the generalized interpolating wavelets.

Halfband Lagrange wavelets can be regarded as extensions of the Dubuc interpolating functionals [9, 13], the auto-correlation shell wavelet analysis [40], and halfband filters [1]. B-spline Lagrange Wavelets are generated by a B-spline-windowed Lagrange functional which increases the smoothness and localization properties of the simple Lagrange scaling function and its related wavelets. Lagrange Distributed Approximating Functionals (LDAF)-Gaussian modulated Lagrange polynomials, have been successfully applied for numerically solving various linear and nonlinear partial differential equations. Typical examples include DAF-simulations of 3-dimensional reactive quantum scattering and the solution of a 2-dimensional Navier-Stokes equation with non-periodic boundary conditions. In terms of a wavelet analysis, DAFs can be regarded as particular scaling functions (wavelet-DAFs) and the associated DAF-wavelets can be generated in a number of ways [20, 21, 22, 65, 66, 67].

Halfband Lagrange Wavelets

A special case of halfband filters can be obtained by choosing the filter coefficients according to the Lagrange interpolation formula. The filter coefficients are given by $$h(2n-1) = \frac{(-1)^{n+M-1} \prod_{m=1}^{2M}(M+1/2-m)}{(M-n)!(M+n-1)!(2n-1)} \quad (34)$$

These filters have the property of maximal flatness in Fourier space, possessing a balance between the degree of flatness at zero frequency and the flatness at the Nyquist frequency (half sampling).

These half-band filters can be utilized to generate the interpolating wavelet decomposition, which can be regarded as a class of the auto-correlated shell of orthogonal wavelets, such as the Daubechies wavelets [7]. The interpolating wavelet transform can also be extended to higher order cases using different Lagrange polynomials, as [40]

$$P_{2n-1}(x) = \prod_{m=-M+1, m \neq n}^{M} \frac{x-(2m-1)}{(2n-1)(2m-1)} \quad (35)$$

The predictive interpolation can be expressed as $$\Gamma S_j(i) = \sum_{n=1}^{M} P_{2n-1}(0)[S_j(i+2n-1) + S_j(i-2n+1)], \quad (36)$$

$$i = 2k+1$$

where $\Gamma$ is a projection and $S_j$ is the jth layer low-pass coefficients. This projection relation is equivalent to the subband filter response of $$h(2n-1) = P_{2n-1}(0) \quad (37)$$

The above-mentioned interpolating wavelets can be regarded as the extension of the fundamental Deslauriers- Dubuc interactive sub-division scheme, which results when M=2. The order of the Lagrange polynomial is D=2M−1=3 (FIG. 15(*a*)).

It is easy to show that an increase of the Lagrange polynomial order D, will introduce higher regularity for the interpolating functionals (FIG. 16(*a*)). When D→+∞, the interpolating functional tends to a band-limited Sinc function and its domain of definition is on the real line. The subband filters generated by Lagrange interpolating functionals satisfy the properties:

(1) Interpolation: h(ω)+h(ω+π)=1

(2) Symmetry: h(ω)=h(−ω)

(3) Vanishing Moments: $\int_R x^p \phi(x) dx = \delta_p$

Donoho outlines a basic subband extension to obtain a perfect reconstruction. He defines the wavelet function as $$\psi(x) = \phi(2x-1) \tag{38}$$

The biorthogonal subband filters can be expressed as $$\tilde{h}(\omega) = 1,\ g(\omega) = e^{-i\omega},\ \tilde{g}(\omega) = e^{-i\omega}\overline{h(\omega+\pi)} \tag{39}$$

However, the Donoho interpolating wavelets have some drawbacks. Because the low-pass coefficients are generated by a sampling operation only, as the decomposition layer increases, the correlation between low-pass coefficients become weaker. The interpolating (prediction) error (high-pass coefficients) strongly increases, which is deleterious to the efficient representation of the signal. Further, it can not be used to generate a Riesz basis for $L^2(R)$ space.

Swelden has provided an efficient and robust scheme [56] for constructing biorthogonal wavelet filters. His approach can be utilized to generate high-order interpolating Lagrange wavelets with higher regularity. As FIG. 13 shows, $P_0$ is the interpolating prediction process, and the $P_1$ filter is called the updating filter, used to smooth the down-sampling low-pass coefficients. If we choose $P_0$ to be the same as $P_1$, then the new interpolating subband filters can be depicted as $$\begin{cases} h_1(\omega) = h(\omega) \\ \tilde{h}_1(\omega) = 1 + \tilde{g}(\omega)\overline{P(2\omega)} \\ g_1(\omega) = e^{-i\omega} - h(\omega)P(2\omega) \\ \tilde{g}_1(\omega) = \tilde{g}(\omega) \end{cases} \tag{40}$$

The newly developed filters $h_1$, $g_1$, $\tilde{h}$, and $\tilde{g}$ also generate the biorthogonal dual pair for a perfect reconstruction. Examples of biorthogonal lifting wavelets with regularity D=3 are shown in FIG. 14. FIG. 15 gives the corresponding Fourier responses of the equivalent subband decomposition filters.

B-Spline Lagrange Wavelets

Lagrange polynomials are natural interpolating expressions for functional approximations. Utilizing a different expression for the Lagrange polynomials, we can construct other forms of useful interpolating wavelets as follows. We define a class of symmetric Lagrange interpolating functional shells as $$P_M(x) = \prod_{i=-M, i\neq 0}^{M} \frac{x-i}{-i} \tag{41}$$

It is easy to verify that this Lagrange shell also satisfies the interpolating condition on discrete, integer points, $$P_M(k) = \begin{cases} 1, k = 0 \\ 0, \text{otherwise} \end{cases} \tag{42}$$

However, simply defining the filter response as $$h(k) = P(k/2)/2, k = -M, M \tag{43}$$

leads to non-stable interpolating wavelets, as shown in FIG. 16.

Including a smooth window, which vanishes at the zeros of the Lagrange polynomial, will lead to more regular interpolating wavelets and equivalent subband filters (as shown in FIGS. 16 and 17). We select a well-defined B-spline function as the weight window. Then the scaling function (mother wavelet) can be defined as an interpolating B-Spline Lagrange functional (BSLF)

$$\phi_M(x) = \frac{\beta^N(x/\eta)}{\beta^N(0)} P_M(x) \tag{44}$$

$$= \frac{\beta^N(x/\eta)}{\beta^N(0)} \prod_{i=-M, i\neq 0}^{M} \frac{x-i}{-i}$$

where N is the B-spline order and, η is the scaling factor to control the window width. To ensure coincidence of the zeroes of the B-spline and the Lagrange polynomial, we set $$2M = \eta \times (N+1) \tag{45}$$

To ensure the interpolation condition, the B-spline envelope degree M must be odd number. It is easy to show that if B-spline order is N=4k+1, η can be any odd integer (2k+1); if N is an even integer, then η can only be 2. When N=4k−1, we can not construct an interpolating shell using the definition above. From the interpolation and self-induced scaling properties of the interpolating wavelets, it is easy to verify that $$h(k) = \phi_M(k/2)/2, k = -2M+1, 2M-1 \tag{46}$$

Gaussian-Lagrange DAF Wavelets

We can also select a class of distributed approximation functional—Gaussian-Lagrange DAFs (GLDAF) as our basic scaling function to construct interpolating wavelets as:

$$\phi_M(x) = W_\sigma(x) P_M(x) \tag{47}$$

$$= W_\sigma(x) \prod_{i=-M, i\neq 0}^{M} \frac{x-i}{-i}$$

where $W_\sigma(x)$ is a window function. It is chosen to be a Gaussian, $$W_\sigma(x) = e^{-x/2\sigma^2} \tag{48}$$

because it satisfies the minimum frame bound condition in quantum physics. Here σ is a window width parameter, and $P_M(x)$ is the Lagrange interpolation kernel. The DAF scaling function has been successfully introduced as an efficient and powerful grid method for quantum dynamical propagations [40]. Using Swelden's lifting scheme [32], a wavelet basis is generated. The Gaussian window in our DAF-wavelets efficiently smoothes out the Gibbs oscillations, which plague most conventional wavelet bases. The following equation shows the connection between the B-spline window function and the Gaussian window [34]:

$$\beta^N(x) \cong \sqrt{\frac{6}{\pi(N+1)}} \exp\left(\frac{-6x^2}{N+1}\right) \quad (49)$$

for large N. As in FIG. 21, if we choose the window width $$\sigma = \eta\sqrt{(N+1)/12} \quad (50)$$

the Gaussian-Lagrange wavelets generated by the lifting scheme will be similar to the B-spline Lagrange wavelets. Usually, the Gaussian-Lagrange DAF displays a slightly better smoothness and more rapid decay than the B-spline Lagrange wavelets. If we select more sophisticated window shapes, such as those popular in engineering (Bartlett, Hanning, Hamming, Blackman, Chebychev, and Bessel windows), the Lagrange wavelets can be generalized further. We shall call these extensions Bell-windowed Lagrange wavelets.

Generalized Sinc Wavelets

As we have mentioned above, the π band-limited Sinc function, $$\phi(x) = \sin(\pi x)/(\pi x) C^\infty \quad (51)$$

in Paley-Wiener space, constructs an interpolating function. Every π band-limited function $f \in L^2(R)$ can be reconstructed by the equation $$f(x) = \sum_k f(k) \frac{\sin\pi(x-k)}{\pi(x-k)} \quad (52)$$

where the related wavelet function—Sinclet is defined as (see FIG. 10)

$$\psi(x) = \frac{\sin\pi(2x-1) - \sin\pi(x-1/2)}{\pi(x-1/2)} \quad (53)$$

The scaling Sinc function is the well-known ideal low-pass filter, which possesses the ideal square filter response as $$H(\omega) = \begin{cases} 1, & |\omega| \leq \pi/2 \\ 0, & \pi/2 < |\omega| \leq \pi \end{cases} \quad (54)$$

Its impulse response can be generated as $$h[k] = \int_{(-\pi/2,\pi/2)} e^{jk\omega} d\omega 2\pi = \sin(\pi k/2)/(\pi k) \quad (55)$$

The so-called half-band filter possess a non-zero impulse only at the odd integer sampler, h(2k+1), while at even integers, h[2k]=0 unless a k=0.

However, this ideal low-pass filter is never used in application. Since the digital filter is an IIR (infinite impulse response) solution, its use as a digital cutoff FIR (finite impulse response) will produce Gibbs phenomenon (overshot effect) in Fourier space, which degrades the frequency resolution (FIG. 20). The resulting compactly supported Sinc scaling and wavelet functions, as well as their biorthogonal dual scaling and wavelet functions, are shown in FIG. 21. We see that the regularity of the cutoff Sinc is obviously degraded with a fractal-like shape, which leads to poor time localization.

B-Spline Sinc Wavelets

Because the ideal low-pass Sinc wavelet can not be implemented "ideally" by FIR (finite impulse response) filters, to eliminate the cutoff singularity, a windowed weighting technique is employed to adjust the time-frequency localization of the Sinc wavelet analysis. To begin, we define a symmetric Sinc interpolating functional shell as $$P(x) = \frac{\sin(\pi x/2)}{\pi x} \quad (56)$$

Utilizing a smooth window, which vanishes gradually at the exact zeros of the Sinc functional, will lead to more regular interpolating wavelets and equivalent subband filters (as shown in FIGS. 22 and 23). For example, we illustrate using a well-defined B-spline function as the weight window. Then the scaling function (mother wavelet) can be defined as an interpolating B-spline Sinc functional (BSF)

$$\phi_M(x) = \frac{\beta^N(x/\eta)}{\beta^N(0)} P(x) \quad (57)$$

$$= \frac{\beta^N(x/\eta)}{\beta^N(0)} \frac{\sin(\pi x/2)}{\pi x}$$

where N is the B-spline order and, η is the scaling factor to control the window width. To ensure the coincidence of the zeroes of the B-spline and the Sinc shell, we set $$2M+1 = \eta \times (N+1)/2 \quad (58)$$

To maintain the interpolation condition, h(2k)=0, k≠0, it is easy to show that when the B-spline order N=4k+1, η maybe any odd integer (2k+1). If N is an even integer, then η can only be 2. FIG. 24 shows a mother wavelet comparison for a B-spline Sinc and a Guassian Sinc for N=4 and Θ=2. When N=4k−1, we can not construct interpolating shell using the definition above. The admissibility condition can be expressed as $$\begin{cases} \eta = 2, & N = 2i \\ \eta = 2k+1, & N = 4i+1 \end{cases} \quad (59)$$

From the interpolation relation $$\phi(k) = \begin{cases} 1, k = 0 \\ 0, k \neq 0 \end{cases}, k \in Z \quad (60)$$

and the self-induced two-scale relation $$\phi(x) = \sum_k \phi(k/2)\phi(2x - k) \qquad (61)$$

it is easy to show that $$h(k)=\phi_M(k/2)/2, k=2M+1, 2M-1 \qquad (62)$$

Gaussian-Sinc DAF Wavelets

We can also select a class of distributed approximation functionals, i.e., the Gaussian-Sinc DAF (GSDAF) as our basic scaling function to construct interpolating scalings, $$\phi_M(x) = W_\sigma(x)P(x) \qquad (63)$$
$$= W_\sigma(x)\frac{\sin(\pi x/2)}{\pi x}$$

where $W_\sigma(x)$ is a window function which is selected as a Gaussian, $$W_\sigma(x) = e^{-x^2/2\sigma^2} \qquad (64)$$

Because it satisfies the minimum frame bound condition in quantum physics, it significantly improves the time-frequency resolution of the Windowed-Sinc wavelet. Here σ is a window width parameter, and P(x) is the Sinc interpolation kernel. This DAF scaling function has been successfully used in an efficient and powerful grid method for quantum dynamical propagations [40]. Moreover, the Hermite DAF is known to be extremely accurate for solving the 2-D harmonic oscillator, for calculating the eigenfunctions and eigenvalues of the Schrodinger equation. The Gaussian window in our DAF-wavelets efficiently smoothes out the Gibbs oscillations, which plague most conventional wavelet bases. The following equation shows the connection between the B-spline and the Gaussian windows [34]:

$$\beta^N(x) \cong \sqrt{\frac{6}{\pi(N+1)}} \exp\left(\frac{-6x^2}{N+1}\right) \qquad (65)$$

for large N. As in FIG. 15, if we choose the window width $$\sigma = \eta\sqrt{(N+1)/12} \qquad (66)$$

the Gaussian Sinc wavelets generated by the lifting scheme will be similar to the B-spline Sinc wavelets. Usually, the Gaussian Sinc DAF displays a slightly better smoothness and rapid decay than the B-spline Lagrange wavelets. If we select more sophisticated window shapes, the Sinc wavelets can be generalized further. We call these extensions Bell-windowed Sinc wavelets. The available choices can be any of the popularly used DFT (discrete Fourier transform) windows, such as Bartlett, Hanning, Hamming, Blackman, Chebychev, and Besel windows.

Adaptive Boundary Adjustment

The above mentioned generalized interpolating wavelet is defined on the domain (R). Many engineering applications involve finite length signals, such as image and isolated speech segments. In general, we can define these signals on C[0,1]. One could set the signal equal to zero outside [0,1], but this introduces an artificial "jump" discontinuity at the boundaries, which is reflected in the wavelet coefficients. It will degrade the signal filtering and compression in multi scale space. Developing wavelets adapted to "life on an interval" is useful. Periodization and symmetric periodization are two commonly used methods to reduce the effect of edges. However, unless the finite length signal has a large flat area around the boundaries, these two methods cannot remove the discontinuous effects completely [4,6,11].

Dubuc utilized an iterative interpolating function, $F_D$ on the finite interval to generate an interpolation on the set of dyadic rationals $D_j$. The interpolation in the neighborhood of the boundaries is treated using a boundary-adjusted functional, which leads to regularity of the same order as in the interval. This avoids the discontinuity that results from periodization or extending by zero. It is well known that this results in weaker edge effects, and that no extra wavelet coefficients (to deal with the boundary) have to be introduced, provided the filters used are symmetric.

We let $K_j$ represent the number of coefficients at resolution layer j, where $K_j = 2^j$. Let $2^j > 2D+2$, define the non-interacting decomposition. If we let $j_0$ hold the non-interaction case $2^{j_0} > 2D+2$, then there exist functions $$\phi_{j,k}^{Interval}, \psi_{j,k}^{Interval},$$

such that for all $f \in C[0,1]$, $$f = \sum_{k=0}^{2^{j_0}-1} S_{j_0}(k)\phi_{j_0,k}^{Interval} + \sum_{j \geq j_0}\sum_{k=0}^{2^j-1} W_j(k)\psi_{j,k}^{Interval} \qquad (67)$$

The $$\phi_{j,k}^{Interval}, \psi_{j,k}^{Interval},$$

are called the interval interpolating scalings and wavelets, which satisfy the interpolation conditions $$\begin{cases} \phi_{j,k}^{Interval}(2^{-j}n) = 2^{j/2}\delta_{k,n}, & 0 \leq n < K_j \\ \psi_{j,k}^{Interval}(2^{-j-1}n) = 2^{j/2}\delta_{2k+1,n}, & 0 \leq n < K_{j+1} \end{cases} \qquad (68)$$

The interval scaling is defined as $$\phi_{j,k}^{Interval} = \begin{cases} \phi_{j,k}^{Left}, & 0 \leq k \leq D \\ \phi_{j,k}|_{[0,1]}, & D < k < 2^j - D - 1 \\ \phi_{j,k}^{Right}, & 2^j - D - 1 \leq k < 2^j \end{cases} \qquad (69)$$

where $\phi_{j,k}|_{[0,1]}$ is called the "inner-scaling" which is identical to the fundamental interpolating function, and $$\phi_{j,k}^{Right} \text{ and } \phi_{j,k}^{Left}$$

are the "left-boundary" and the "right-boundary" scalings, respectively. Both are as smooth as $\phi_{j,i|[0,1]}$. Interval wavelets are defined as $$\psi_{j,k}^{Interval} = \begin{cases} \psi_{j,k}^{Left}, 0 \le k < \lfloor D/2 \rfloor \\ \psi_{j,k}|_{[0,1]}, \lfloor D/2 \rfloor \le k < 2^j - \lfloor D/2 \rfloor \\ \psi_{j,k}^{Right}, 2^j - \lfloor D/2 \rfloor \le k < 2^j \end{cases} \quad (70)$$

$\psi_{j,k}|_{[0.1]}$ is the inner-wavelet, and $$\psi_{j,k}^{Left} \text{ and } \psi_{j,k}^{Right}$$

are the left and right-boundary wavelets, respectively, which are of the same order regularity as the inner-wavelet [13].

The corresponding factors for the Deslauriers-Dubuc interpolating wavelets and f=2, and the order of the Lagrange polynomial is D=2M−1=3. The interpolating wavelet transform can be extended to high order cases by two kinds of Lagrange polynomials, where the inner-polynomials are defined as [14]

$$P_{2n-1}(x) = \prod_{m=-M+1, m \ne n}^{M} \frac{x - (2m-1)}{(2n-1)-(2m-1)} \quad (71)$$

This kind of polynomial introduces the interpolation in the intervals according to $$P_j S(i) = \sum_{n=1}^{M} P_{2n-1}(0)[S_j(i+2n-1) + S_j(i-2n+1)], \quad (72)$$

$$i = 2k+1$$

and the boundary polynomials are $$L_d(x) = \prod_{m=0, m \ne d}^{2M-1} \frac{x-m}{d-m}, 0 \le d \le D \quad (73)$$

which introduce the adjusted interpolation on the two boundaries of the intervals. That is, $$P_j S(i) = \sum_{d=0}^{D} L_d(i/2) S_j(i+2d-1), \quad (74)$$

$$i = 2k+1, 0 \le k \le \lfloor D-1 \rfloor / 2$$

The left boundary extrapolation outside the intervals is defined as $$P_j S(-1) = \sum_{d=0}^{D} L_d(-1/2) S_j(2d), \quad (75)$$

$$i = 2k+1, 0 \le k \le \lfloor D-1 \rfloor / 2$$

and the right boundary extrapolation is similar to the above. The boundary adjusted interpolating scaling is shown in FIG. 25.

Although Dubuc shows the interpolation is almost twice differentiable, there still is a discontinuity in the derivative. In this disclosure, a DAF-wavelet based boundary adjusted algorithm is introduced. This technique can produce an arbitrary smooth derivative approximation, because of the infinitely differentiable character of the Gaussian envelope. The boundary-adjusted scaling functionals are generated as conveniently as possible just by window shifting and satisfy the following equation.

$$\phi_m(x) = W(x-2m)P(x), m = -\lfloor (M-1)/2 \rfloor, \lfloor (M-1)/2 \rfloor \quad (76)$$

where $\phi_m(x)$ represents different boundary scalings, W(x) is the generalized window function and p(x) is the symmetric interpolating shell. When m>0, left boundary functionals are generated; when m<0, we obtain right boundary functionals. The case m=0 represents the inner scalings mentioned above.

One example for a Sinc-DAF wavelet is shown in FIG. 26. We choose the compactly-supported length of the scaling function to be the same as the halfband lagrange wavelet. It is easy to show that our newly developed boundary scaling is smoother than the commonly used Dubuc boundary interpolating functional. Thus it will generate a more stable boundary adjusted representation for finite-length wavelet transforms, as well as a better derivative approximation around the boundaries. FIG. 27 is the boundary filter response comparison between the halfband Lagrange wavelet and our DAF wavelet. It is easy to establish that our boundary response decreases the overshoot of the low-pass band filter, and so is more stable for boundary frequency analysis and approximation.

Applications of GSIWs

Eigenvalue Solution of 2D Quantum Harmonic Oscillator

As discussed in Ref. [22], a standard eigenvalue problem of the Schrodinger equation is that of the 2D harmonic oscillator, $$\left[ -\frac{\hbar^2}{2m} \sum_{i=1}^{2} \frac{\partial^2}{\partial x_j^2} + \frac{1}{2}\left(x_1^2 + x_2^2\right) \right] \Phi_k(x_1, x_2) = E_k \Phi_k(x_1, x_2) \quad (77)$$

Here $\Phi_k$ and $E_k$ are the kth eigenfunction and eigenvalue respectively. The eigenvalues are given exactly by $$E_{k_1,k_2} = 1 + k_1 + k_2, 0 \le k \le \infty 0 \le k_1 \le k_2 \quad (78)$$

with a degeneracy ($k_d$=k+1) in each energy level $E_k$=1+k. The 2D version of the wavelet DAF representation of the Hamiltonian operator was constructed and the first 21 eigen values and eigenfunctions obtained by subsequent numerical diagonalization of the discrete Sinc-DAF Hamiltonian. As shown in Table 1, all results are accurate to at least 10 significant figures for the first 16 eigenstates. It is evident that DAF-wavelets are powerful for solving eigenvalue problems.

TABLE 1

Eigenvalues of the 2D harmonic oscillator

| $k = k_x + k_y$ | $k_d$ | Exact Solution | Sinc-DAF Calculation |
|---|---|---|---|
| 0 | 1 | 1 | 0.99999999999835 |
| 1 | 2 | 2 | 1.99999999999952 |
|   |   |   | 1.99999999999965 |
| 2 | 3 | 3 | 2.99999999999896 |
|   |   |   | 2.99999999999838 |
|   |   |   | 2.99999999999997 |
| 3 | 4 | 4 | 3.99999999999943 |
|   |   |   | 3.99999999999947 |
|   |   |   | 3.99999999999986 |
|   |   |   | 3.99999999999994 |
| 4 | 5 | 5 | 4.99999999999907 |
|   |   |   | 4.99999999999953 |
|   |   |   | 4.99999999999989 |
|   |   |   | 5.00000000000674 |
|   |   |   | 5.00000000000813 |
| 5 | 6 | 6 | 5.99999999999982 |
|   |   |   | 6.00000000000018 |
|   |   |   | 6.00000000000752 |
|   |   |   | 6.00000000000801 |
|   |   |   | 6.000000000011972 |
|   |   |   | 6.00000000012005 |

Target Extraction

Military target extraction, including such applications as high-resolution radar (aerial photograph) imaging, radar echo, and remote sense detection, is a difficult subject. National Defense Agencies (e.g., the Navy, Army, and Air Force) have great interest in technical advances for reconnaissance, earlier warning and target recognition. Some of our DAF-wavelet schemes represent a significant breakthrough for these very difficult tasks. Compared with other methods, our algorithm possesses a very high resolution for target localization and high efficiency for clutter/noise suppression, as well as computational efficiency.

Detecting a military target in a low luminance environment is challenging work for image processing. To improve the target discrimination, the visibility of differences between a pair of images is important for modern image restoration and enhancement. We construct a method for detectability using a multiple channel enhancement technique. The images were captured on a color monitor at a viewing distance giving 95 pixels per degree of visual angle and an image size of 5.33*5.05 degrees. The mean luminance of the images was about 10cd/m²[39]. Using our newly developed visual enhancement techniques, visual targets can be extracted very accurately in a low-luminance environment for detection and warning. The technique combines the response of human vision system (HVS) with multiresolution enhancement and restoration methods. The simulation of tank-target detection in a low-luminance environment is shown in FIG. 28.

Image Filtering

Image de-noising is a difficult problem for signal processing. Due to the complicated structure of image and background noise, an optimal filtering technique does not currently exist. Generally, the possible noise sources include photoelectric exchange, photo spots, image communication error, etc. Such noise causes the visual perception to generate speckles, blips, ripples, bumps, ringing and aliasing. The noise distortion not only affects the visual quality of images, but also degrades the efficiency of data compression and coding. De-noising and smoothing are extremely important for image processing.

We use a DAF-wavelet to generate a more efficient, human-vision-system-based image processing technique, which processes the advantages of 1) long range de-correlation for convenience of compression and filtering; 2) high perceptual sensitivity and robustness; 3) filtering that takes account of the human visual response. It therefore can enhance the most important visual information, such as edges, while suppressing the large scale of flat regions and background; 4) it can be carried out with real-time processing.

Biorthogonal interpolating wavelets and corresponding filters are constructed based on Gauss-Lagrange distributed approximating functionals (DAFs). The utility of these DAF wavelets and filters is tested for digital image de-noising in combination with a novel blind restoration technique. This takes account of the response of human vision system so as to remove the perceptual redundancy and obtain better visual performance in image processing. The test results for a color photo are shown in FIG. 29. It is evident that our Color Visual Group Normalization technique yields excellent contrast and edge-preservation and provides a natural color result for the restored image [48].

Imaging Enhancement

Mammograms are complex in appearance and signs of early disease are often small and/or subtle. Digital mammogram image enhancement is particularly important for solving storage and logistics problems, and for the possible development of an automated-detection expert system. The DAF-wavelet based mammogram enhancement is implemented in the following manner. First we generate a perceptual lossless quantization matrix $Q_{j,m}$ to adjust the original transform coefficients $C_{j,m}(k)$. This treatment provides a simple human-vision-based threshold technique for the restoration of the most important perceptual information in an image. For grayscale image contrast stretching, we appropriately normalize the decomposition coefficients according to the length scale, L, of the display device [16] so that they fall in the interval of [0,1] of the device frame $$NC_{j,m}(k) = Q_{j,m} C_{j,m}(k)/L. \tag{79}$$

We then use a nonlinear mapping to obtain the desired contrast stretching $$\overline{NC_{j,m}} = \gamma_{j,m} X_{j,m}(NC_{j,m}) \tag{80}$$

where the constant $y_{j,m}$ and function $X_{j,m}$ are appropriately chosen so that the desired portion of the grayscale gradient is stretched or compressed.

Figure 30A:
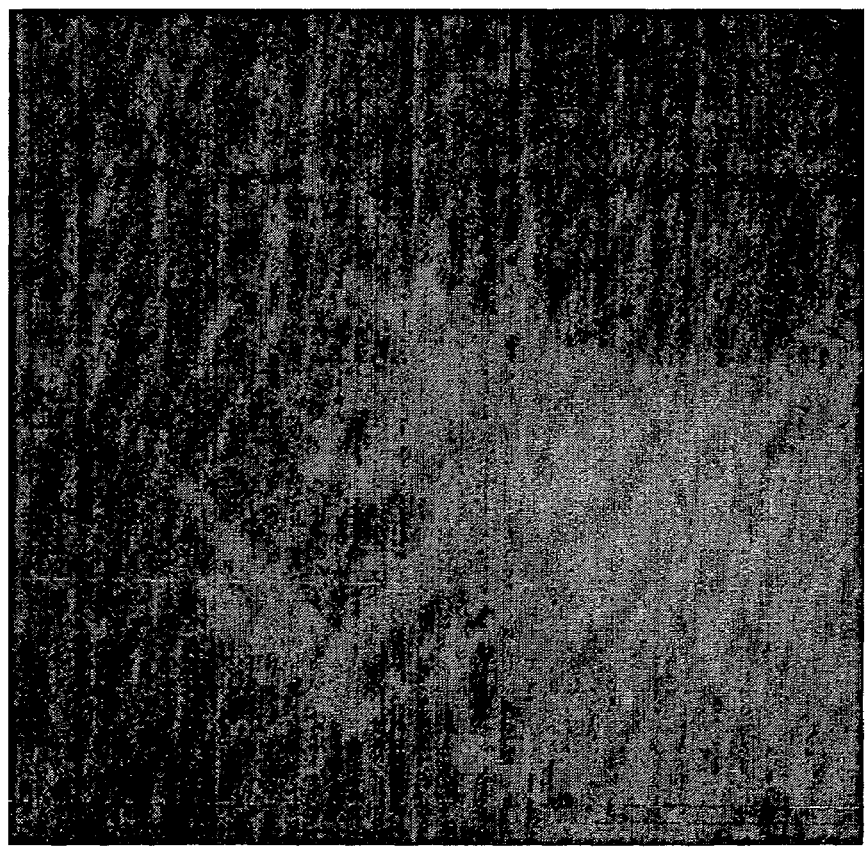
Figure 30B:
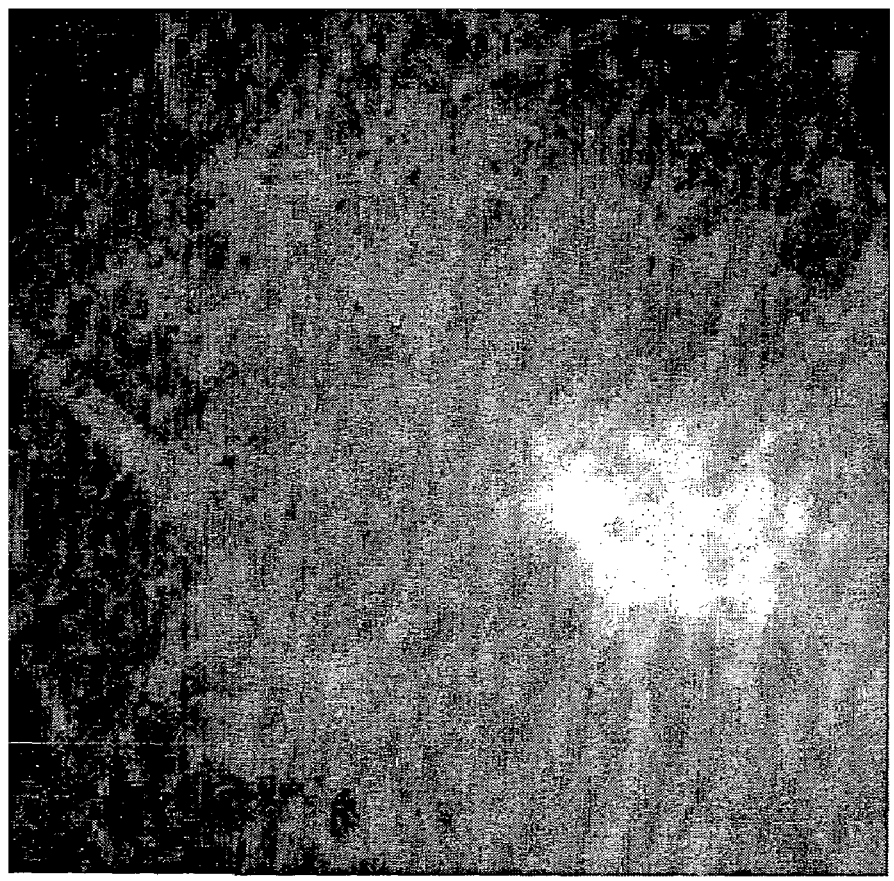
Figure 30C:
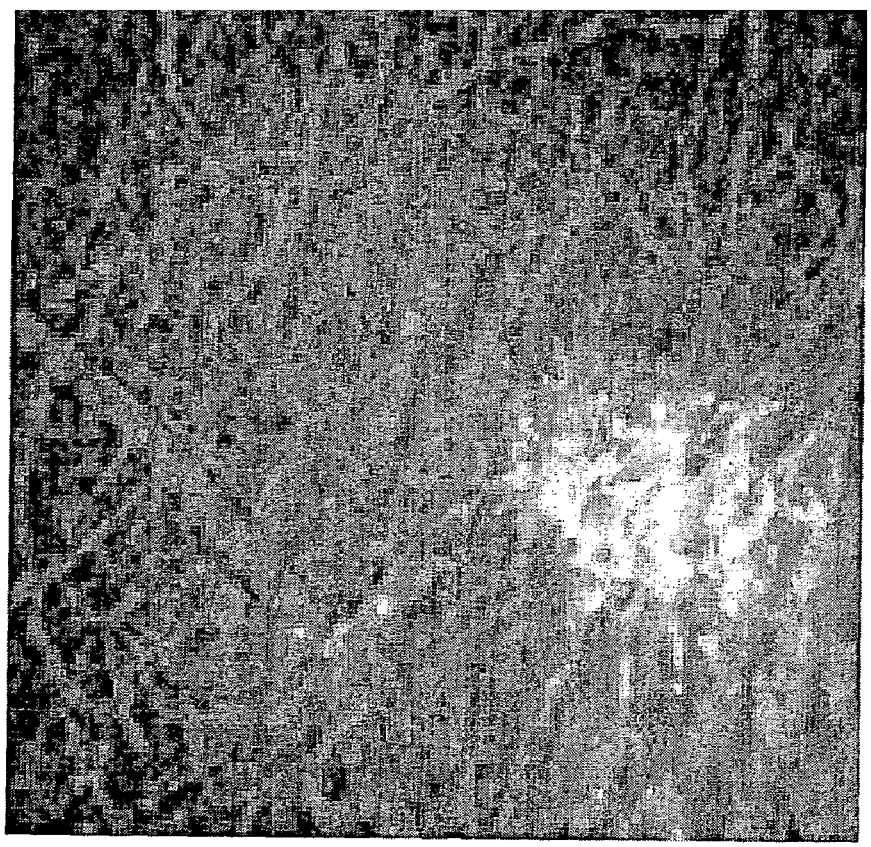
Figure 31A:
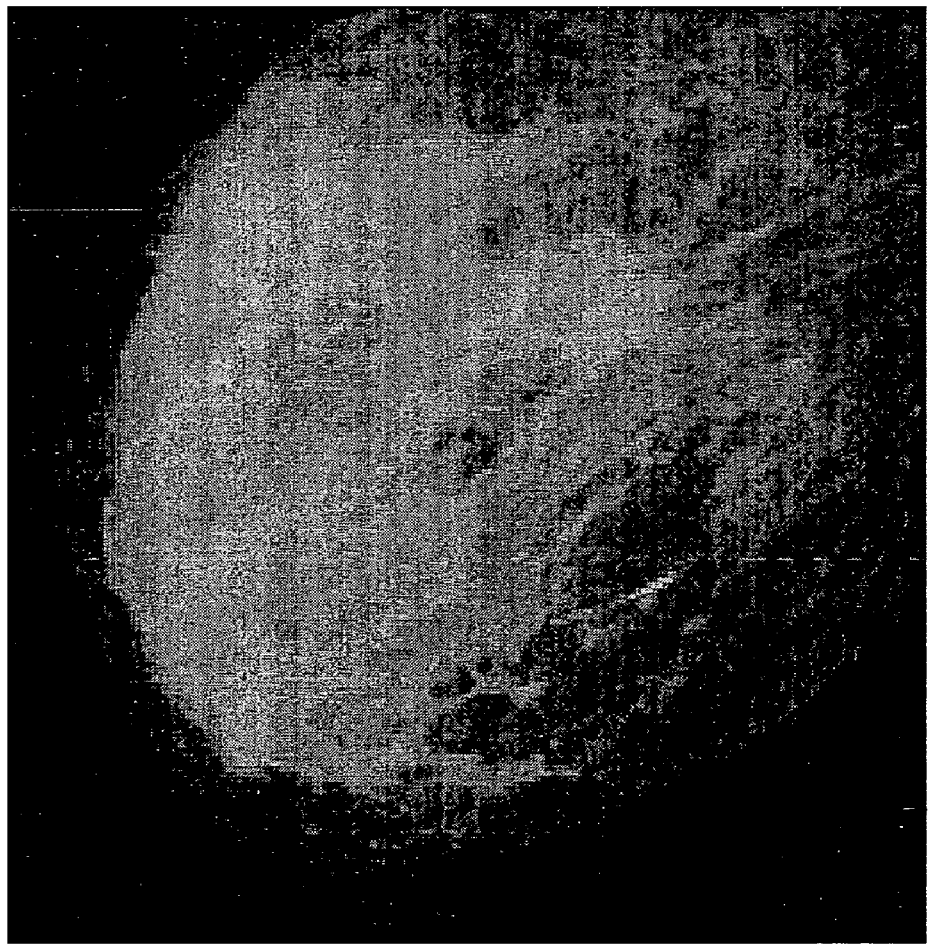
Figure 31B:
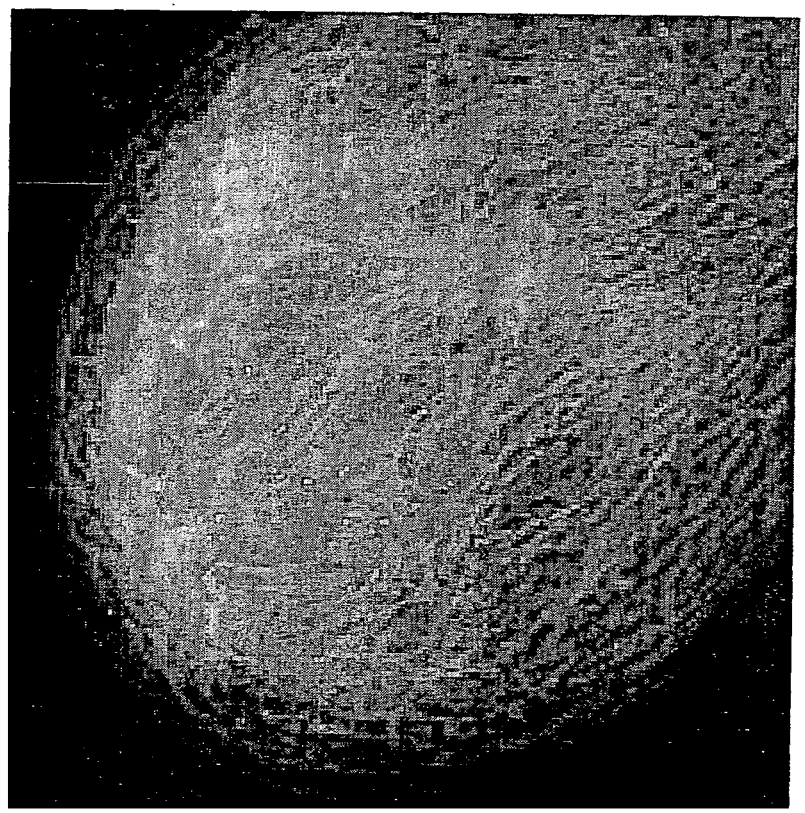

To test our new approach, low-contrast and low quality breast mammogram images are employed. A typical low quality front-view image is shown in FIG. 30(a). The original image is coded at 512×512 pixel size with 2 bytes/pixel and 12 bits of gray scale. We have applied our edge enhancement normalization and device-adapted visual group normalization. As shown in FIG. 30(b), and FIG. 30(c), there is a significant improvement in both the edge representation and image contrast. In particular, the domain and internal structure of high-density cancer tissues are more clearly displayed. FIG. 31(a) is an original 1024×1024 side-view breast image which has been digitized to a 200 micron pixel edge with 8 bits of gray scale. The enhanced image result is shown in FIG. 31(b). In this case we again obtain a significant improvement in image quality as described herein.

CONCLUSION

In summary, a new class of wavelets—generalized symmetric interpolating wavelets were described, which are generated by a window modulated interpolating shell. Due to the absence of a complicated factorization process, this kind of interpolating wavelet is easily implemented and possesses very good characteristics in both time (space) and spectral domains. The stable boundary adjustment can be generated by a window shifting operation only. It overcomes the overshoot of the boundary response introduced by other boundary processing, such as Dubuc Lagrange wavelet and Daubechies boundary filters. Many successful applications of DAF-wavelets have been reported to illustrate its practicality and its mathematical behavior.

REFERENCES

[1] R. Ansari, C. Guillemot, and J. F. Kaiser, "Wavelet construction using Lagrange halfband filters," IEEE Trans. CAS, vol. 38, no.9, pp. 1116–1118, 1991.
[2] R. Baraniuk, D. Jones, "Signal-dependent time-frequency analysis using a radially Gaussian kernel," Signal Processing, Vol. 32, pp. 263–284, 1993.
[3] C. M. Brislawn, "Preservation of subband symmetry in multirate signal coding," IEEE Trans. SP, vol. 43, no.12, pp. 3046–3050, 1995.
[4] C. K. Chui, An Introduction to Wavelets, Academic Press, New York, 1992.
[5] C. K. Chui, Wavelets: A Tutorial in Wavelet Theory and Applications, Academic Press, New York, 1992.
[6] A. Cohen, I. Daubechies, and J. C. Feauveau, "Biorthogonal bases of compactly supported wavelets," Comm. Pure Appl. Math., Vol. 45, pp. 485–560, 1992.
[7] I. Daubechies, "Orthonormal bases of compactly supported wavelets", Comm. Pure and Appl. Math., vol. 41, no.11, pp. 909–996, 1988.
[8] I. Daubechies, "The wavelet transform, time-frequency localization and signal analysis," IEEE Trans. Inform. Theory, Vol. 36, No. 5, pp. 961–1003, September 1990.
[9] G. Deslauriers, S. Dubuc, "Symmetric iterative interpolation processes," Constructive Approximations, vol. 5, pp. 49–68, 1989.
[10] A. P. Dhawan and E. Le Royer, "Mammographic feature enhancement by computerized image processing,". Comput. Methods and Programs in Biomed., vol. 27, no. 1, pp. 23–35, 1988.
[11] D. L. Donoho, "De-noising by soft-threshold," IEEE Trans. Information Theory, vol. 41, no.3, pp. 613–627, 1995.
[12] D. L. Donoho, "Interpolating wavelet transform," Preprint, Stanford Univ., 1992.
[13] S. Dubuc, "Interpolation through an iterative scheme", J. Math. Anal. and Appl., vol. 114, pp. 185~204, 1986.
[14] A. Frishman, D. K. Hoffman, D. J. Kouri, "Distributed approximating functional fit of the H3 ab initio potential-energy data of Liu and Siegbahn," J. Chemical Physics, Vol. 107, No.3, pp. 804–811, July 1997.
[15] L. Gagnon, J. M. Lina, and B. Goulard, "Sharpening enhancement of digitized mammograms with complex symmetric Daubechies wavelets," preprint.
[16] R. Gordon and R. M. Rangayan, "Feature enhancement of film mammograms using fixed and adaptive neighborhoods," Applied Optics, vol. 23, no. 4, pp. 560–564, February 1984.
[17] A. Harten, "Multiresolution representation of data: a general framework," SIAM J. Numer. Anal., vol. 33, no.3, pp. 1205–1256, 1996.
[18] C. Herley, M. Vetterli, "Orthogonal time-varying filter banks and wavelet packets," IEEE Trans. SP, Vol. 42, No. 10, pp. 2650–2663, October 1994.
[19] C. Herley, Z. Xiong, K. Ramchandran and M. T. Orchard, "Joint Space-frequency Segmentation Using Balanced Wavelet Packets Trees for Least-cost Image Representation," IEEE Trans. Image Processing, vol. 6, pp. 1213–1230, September 1997.
[20] D. K. Hoffman, N. Nayar, O. A. Sharafeddin, and D. J. Kouri, "Analytic banded approximation for the discretized free propagator," J. Physical Chemistry, vol. 95, no.21, pp. 8299–8305, 1991.
[21] D. K. Hoffman, A. Frishman, and D. J. Kouri, "Distributed approximating functional approach to fitting multi-dimentional surfaces," Chemical Physics Lett., Vol. 262, pp. 393–399, 1996.
[22] D. K. Hoffman, G. W. Wei, D. S. Zhang, D. J. Kouri, "Shannon-Gabor wavelet distributed approximating functional," Chemical Pyiscs Letters, Vol. 287, pp.119–124, 1998.
[23] L. C. Jain, N. M. Blachman, and P. M. Chapell, "Interference suppression by biased nonlinearities," IEEE Trans. IT, vol. 41, no.2, pp. 496–507, 1995.
[24] N. Jayant, J. Johnston, and R. Safranek, "Signal compression based on models of human perception", Proc. IEEE, vol. 81, no.10, pp. 1385–1422, 1993.
[25] M. A. Kon, L. A. Raphael, "Convergence rates of multi scale and wavelet expansions I & II," manuscript, 1998.
[26] J. Kovacevic, and M. Vetterli, "Perfect reconstruction filter banks with rational sampling factors," IEEE Trans. SP, Vol. 41, No. 6, pp. 2047–2066, June 1993.
[27] J. Kovacevic, W. Swelden, "Wavelet families of increasing order in arbitrary dimensions," Submitted to IEEE Trans. Image Processing, 1997.
[28] S. Lai, X. L1, and W. F. Bischof, "On techniques for detecting circumscribed masses in mammograms," IEEE Trans. Med. Imag., vol. 8, no. 4, pp. 377–386, 1989.
[29] A. F. Laine, S. Schuler, J. Fan and W. Huda, "Mammographic feature enhancement by multi scale analysis," IEEE Trans. MI, vol. 13, pp. 725–740, 1994.
[30] J. Lu, and D. M. Healy, Jr., "Contrast enhancement via multi scale gradient transform," preprint.
[31] J. Lu, D. M. Healy Jr., and J. B. Weaver, "Contrast enhancement of medical images using multi scale edge representation," Optical Engineering, in press.
[32] S.Mallat, "A theory for multiresolution signal decomposition: the wavelet representation," IEEE Trans. PAMI, Vol. 11, No.7, pp. 674–693, July 1989.
[33] S. Mallat, and S. Zhong, "Characterization of Signals from multi scale edges," IEEE Trans. PAMI, vol. 14, no. 7, pp. 710–732, 1992.
[34 Y.Meyer, Wavelets Algorithms and Applications, SIAM Publ., Philadelphia 1993.
[35] M. Nagao and T. Matsuyama, "Edge preserving smoothing," Comput. Graphics and Image Processing, vol. 9, no. 4, pp. 394–407, 1979.
[36] K. Ramchandran, M. Vetterli, "Best wavelet packet bases in a rate-distortion sense," IEEE Trans. Image Processing, Vol. 2, No.2, pp. 160–175, April 1993.

[37] K. Ramchandran, Z. Xiong, K. Asai and M. Vetterli, "Adaptive Transforms for Image Coding Using Spatially-varying Wavelet Packets," IEEE Trans. Image Processing, vol. 5, pp. 1197–1204, July 1996.

[38] O. Rioul, M. Vetterli, "Wavelet and signal processing," IEEE Signal Processing Mag., pp. 14–38, October 1991.

[39] A. M. Rohaly, A. J. Ahumada, and A. B. Watson, "Object detection in natural backgrounds predicted by discrimination performance and models," Vision Research, Vol. 37, pp. 3225–3235, 1997.

[40] N. Saito, G. Beylkin, "Multi scale representations using the auto-correlation functions of compactly supported wavelets," IEEE Trans. Signal Processing, Vol. 41, no.12, pp. 3584–3590,1993.

[41] A. Scheer, F.R.D. Velasco, and A. Rosenfield, "Some new image smoothing techniques," *IEEE Trans. Syst., Man. Cyber.*, vol. SMC-10, no. 3, pp. 153–158, 1980.

[42] M. J. Shensa, "The discrete wavelet transform: wedding the a trous and Mallat algorithms", IEEE Trans. SP, vol. 40, no.10, pp. 2464–2482, 1992.

[43] Zhuoer Shi and Zheng Bao, "Group-normalized processing of complex wavelet packets," *Science in China, Ser. E*, Vol. 40, No. 1, pp. 28–43, February 1997.

[44] Z. Shi, Z. Bao, "Group-normalized wavelet packet signal processing", Wavelet Application IV, SPIE, vol. 3078, pp. 226–239, 1997.

[45] Z. Shi, Z. Bao, "Fast image coding of interval interpolating wavelets," Wavelet Application IV, SPIE, vol. 3078, pp. 240–253, 1997.

[46] Zhuoer Shi, G. W. Wei, D. J. Kouri, and D. K. Hoffman, "Perceptual image processing using Gaussian-Lagrange distributed approximating functional wavelets", submitted to IEEE SP Letter, 1998.

[47] Zhuoer Shi, G. W. Wei, D. J. Kouri, D. K. Hoffman, and Z. Bao, "Lagrange wavelets for signal processing", Submitted to IEEE Trans. IP, 1998.

[48] Zhuoer Shi, G. W. Wei, D. J. Kouri, D. K. Hoffman, and Z. Bao, "Visual multiresolution color image restoration", Submitted to IEEE Trans. PAMI, 1998.

[49] Zhuoer Shi, G. W. Wei, D. J. Kouri, D. K. Hoffman, "Perceptual normalized subband image restoration", IEEE Symposium on Time-frequency and Time-scale Analysis, N.144, Pittsburgh, Pa., Oct. 6–9, 1998.

[50] Zhuoer Shi, Z.Bao, "Group normalized wavelet packet transform," IEEE Trans. CAS II, in press, 1998.

[51] Zhuoer Shi, Z. Bao, "Slow-moving ship target extraction using complex wavelet packet," submitted to IEEE Trans. SP, 1998.

[52] Zhuoer Shi, Z. Bao, L.C. Jiao, "Normalized wavelet packet image processing," submitted to IEEE Trans. IP, 1998.

[53] Zhuoer Shi, Z. Bao, L.C.Jiao, "Wavelet packet based ECG filtering," submitted to IEEE Trans. BE, 1998.

[54] Zhuoer Shi, G. W. Wei, D. J. Kouri, D. K. Hoffman, "Perceptual multiresolution enhancement", Submitted to IEEE ICASSP, 1998.

[55] Zhuoer Shi, D. J. Kouri, D. K. Hoffman, "Mammogram Enhancement Using Generalized Sinc Wavelets", Submitted to IEEE Trans. MI, 1998.

[56] W. Swelden, "The lifting scheme: a custom-design construction of biorthogonal wavelets," Appl. And Comput. Harmonic Anal., vol. 3, no.2, pp.186–200, 1996.

[57] P. G. Tahoces, J. Correa, M. Souto, C. Gonzalez, L. Gomez, and J. J. Vidal, "Enhancement of chest and breast radiographs by automatic spatial filtering," *IEEE Trans. Med. Imag.*, vol. 10, no. 3, pp. 330–335, 1991.

[58] T. D. Tran, R. Safranek, "A locally adaptive perceptual masking threshold model for image coding," Proc. ICASSP, 1996.

[59] M. Unser, A. Adroubi, and M. Eden, "The $L_2$ polynomial spline pyramid," IEEE Trans. PAMI, vol. 15, no. 4, pp. 364–379, 1993.

[60] P. Vaidyanathan, T. Chen, "Role of anti-causal inverse in multirate filter-banks—Part I: system-theoretic fundamentals," IEEE Trans. SP, Vol. 43, No. 5, pp. 1090–1102, May 1995.

[61] P. Vaidyanathan, T. Chen, "Role of anti-causal inverse in multirate filter-banks-Part II: the FIR case, factorizations, and biorthogonal lapped transforms," IEEE Trans. SP, Vol. 43, No. 5, pp. 1103–1115, May 1995.

[62] M. Vetterli, C. Herley, "Wavelet and filter banks: theory and design," IEEE Trans. SP, Vol. 40, No. 9, pp. 2207–2232, September 1992.

[63] J. D. Villasenor, B. Belzer, and J. Liao, "Wavelet filter evaluation for image processing," IEEE Trans. IP, vol. 4, no. 8, pp 1053–1060, 1995.

[64] A. B. Watson, G. Y. Yang, J. A. Solomon, and J. Villasenor, "Visibility of wavelet quantization noise," IEEE Trans. Image Processing, vol. 6, pp.1164–1175, 1997.

[65] G. W. Wei, D. S. Zhang, D. J. Kouri, and D. K. Hoffman, "Lagrange distributed approximating Functionals," Physical Review Letters, Vol. 79, No. 5, pp. 775–779, 1997. [66] G. W. Wei, D. J. Kouri, and D. K. Hoffman, "Wavelets and distributed approximating functionals," submitted to Phys. Rev. Lett.

[67] G. W. Wei, S. C. Althorpe, D. J. Kouri, D. K. Hoffman, "An application of distributed approximating functional-wavelets to reactive scattering," J. Chemical Physics, Vol. 108, No. 17, pp. 7065–7069, May 1998.

[68] Z. Xiong, K. Ramchandran and M. T. Orchard, "Space-frequency Quantization for Wavelet Image Coding," IEEE Trans. Image Processing, vol. 6, pp. 677–693, May 1997.

Dual Window Selective Averaging Filter

Introduction

Local averaging is one of the simplest filtering techniques. It preserves the mean gray level while suppressing the variability in flat regions. However, simple linear local averaging is undesirable for image smoothing because it is incapable of preserving image edges. Linear local averaging filters are essentially low pass filters, which tend to blur the edges and fine structures in the original image. In order to preserve the edges while achieving some degree of smoothing, it is desirable to employ nonlinear filters. A number of nonlinear selective averaging methods [1–8] have been devised for this purpose. The basic idea for these methods is to select only a portion of the gray level values in the local window to use in a (weighted) average. In references [3–5], an alpha-trimmed mean filter ($\alpha$-TMF), which uses a "median basket" to select a predetermined number of pixels above and below the median pixel to the sorted pixels of the moving window, was proposed.

The values in the basket are averaged to give the $\alpha$-TMF filtering output. An asymmetric way to select the averaging pixels whose values are close to that of the median pixel was presented in references [4–6] and was named the modified trimmed mean filter (MTMF) in reference[4]. Recently, we developed a generalization of the $\alpha$-TMF, which we denoted as GTMF [8].

It employs the same way to select the pixels from the window for inclusion in the median basket. However, the selected pixels and the center pixel in the window are weighted and averaged to give the filtering output. It has been shown [8] that the GTMF performs better than other well known filters for the removal of either impulse noise or additive noise.

A new nonlinear filtering technique is disclosed, called the "dual window selective averaging filter" (DWSAF), to remove additive noise (e.g., Gaussian noise). Assuming implicitly that the ideal image is piecewise flat, two normal concentric moving windows and a pixel container are employed to determine the values to be used in replacing the gray level value of the center pixel $I_c$. Three steps are employed in this filtering algorithm. First, the GTMF is implemented within the smaller window $W_S$ to give an intermediate output $G_c$ at the center pixel of the window. Second, only the gray level values close to $G_c$ are selected from the larger window $W_L$ and put to the container C. Third, if the number of pixels in C equals zero, the final DWSAF output $D_c$ is just $G_c$, otherwise, the gray level values in C are averaged to give the final DWSAF output $D_c$.

In contrast to the α-TMF, the GTMF also includes the center pixel $I_c$ in the averaging operation and its weight is usually larger than those of other pixels in the median basket, which is important for the removal of additive noise. A threshold T based on the GTMF output $G_c$ is used to select the pixels for the container. A pixel is selected for inclusion in the container if its value is in the range of $[G_c-T, G_c+T]$. When T=0, the DWSAF is equivalent to the GTMF within the smaller window, and when T=255 (for an 8 bpp gray scale image), it becomes a simple moving average within the larger window.

Generalized Alpha-Trimmed Mean Filter

The implementation of the generalized trimmed mean filter (GTMF) has been described in detail in [17]. The pixels $\{I_1, I_2, \ldots, I_{m-1}, I_m, I_{m+1}, \ldots, I_n\}$ in the local window associated with a pixel $I_c$, have been arranged in an ascending (or descending) order, with $I_m$ being the median pixel. The key generalization to median filtering introduced in the alpha-trimmed mean filter (α-TMF) [18] is to design a median basket to combine a group of pixels whose gray level values are close to the median value of the window.

An averaging operation is then utilized to generate an adjusted replacement $A_c$ for $I_c$. For example, a 3-entry median basket α-TMF is implemented according to $$A_c = \frac{I_{m-1} + I_m + I_{m+1}}{3}. \tag{81}$$

It is evident that a single-entry median basket α-TMF is equivalent to the median filter and a n-entry median basket α-TMF is equivalent to the simple moving average filter.

In general, the α-TMF outperforms the median filter. However, it is still not optimal when filtering either the additive noise corrupted images or highly impulse noise corrupted images. For example, when removing additive noise, the α-TMF does not take the $I_c$ as a special pixel. As is well known, for an image corrupted by additive noise, $I_c$ has the largest probability of being the closest to the true value among all the pixels in the window. Neglecting the influence of the center pixel is a mistake if one desires to filter additive noise. Another difficulty for the α-TMF, when it is used to remove impulse noise from highly corrupted images, is that the pixels selected for the median basket may also be corrupted by impulse noise. It is therefore unreasonable for all the pixels in the basket to have the same weight.

The GTMF uses a median basket to collect a group of pixels from the sorted pixel values of the window associated with $I_c$, in the same way as the α-TMF.

The values of the selected pixels and $I_c$ are then weighted and averaged to give the GTMF output.

For a 3-entry median basket, the output of the GTMF is given by $$G_c = \frac{w_1 I_{m-1} + w_2 I_m + w_3 I_{m+1} + w_c I_c}{w_1 + w_2 + w_3 + w_c}, \tag{82}$$

where $G_c$ is the GTMF output, $w_1$, $w_2$, $w_3$, and $w_c$ are the weights. It is interesting to see that when $w_c=0$ and $w_1=w_2=w_3\neq 0$, the GTMF reduces to the α-TMF. When $w_1=w_2=w_3=0$, it becomes the standard median filter. Since the GTMF takes the center pixel $I_c$ into account, we expect that it should also work better for removing additive noise.

Dual Window Selective Averaging Filter

In this section, we will discuss how to implement our dual window selective averaging filter (DWSAF), based on the GTMF. The standard selective averaging algorithm [2] is not optimal because it only computes the average (or weighted average) of the gray level values close to that of the center pixel in a window. However, sometimes it is unreasonable to choose the gray level value of the center pixel as a criteria because the pixel may be highly corrupted. Using the standard selective averaging algorithm to treat such a pixel will result in it remaining highly corrupted.

The key idea of the DWSAF is to find an alternative criteria for the standard selective averaging algorithm to use. In reference [4], a modified trimmed mean filter (MTMF) was proposed to average only those pixels whose gray level values fall within the range $[M_c-q, M_c+q]$, where $M_c$ is the median value ($M_c=I_m$) and q is a preselected threshold.

Here, we propose a new filtering algorithm which employs two different sizes of concentric moving windows $W_S$ and $W_L$, and a pixel container C. Three steps are involved in the filtering technique. First, the GTMF is employed in the smaller window $W_S$ according to Equation (82) to give an intermediate output $G_c$, which is used as the criteria for the standard selective averaging algorithm.

Second, from the larger window $W_L$, only the pixels with gray level values close to $G_c$ are selected and placed in a container C. In doing so, a switching threshold T is employed to determine if a pixel in $W_L$ is close enough to $G_c$. We determine if a pixel $I_k$ in $W_L$ belongs to C as follows:

$$I_k \in C, \text{ if } |I_k - G_c| < T \tag{83}$$

where T is the threshold.

Third, if the number of pixels N in the container C is greater than zero, the gray level values of the pixels in the container are averaged with the same weight for all pixels to give the final output of the DWSAF. If N=0, the final output equals $G_c$. We summarize this as $$D_c = \begin{cases} A_c, & \text{if } N \neq 0 \\ G_c, & \text{if } N = 0 \end{cases}, \tag{84}$$

where $D_c$ is the output of the DWSAF to replace $I_c$ and $A_c$ is the average of the gray level values in the container. The reason for employing two windows is as follows. As in the case of median filter, the implementation of the GTMF using a larger window blurs the image more than using a smaller window. However, the output of the GTMF in a smaller window can be used as a criteria to improve the filtering result by use of the standard selective averaging algorithm in the larger window.

This reduces the image blurring because we only average those gray level values that are close to the GTMF output. For different choices of the threshold T, the DWSAF can be made to be either a GTMF with respect to the smaller window $W_S(T=0)$ or a simple moving average within the larger window $W_L(T=255$ for an 8 bpp gray-scale image).

The DWSAF algorithm can be employed iteratively, which generally improves its performance. If the weight wC of the center pixel is too high, the output values at some pixels may remain close to their original input values after a number of iterations, and thus some isolated impulse-like noise may be present. Numerical experimentation shows that changing the threshold T to zero after a number of iterations greatly alleviates this problem.

Numerical Experiments

Two numerical examples are presented here for testing our filtering algorithm. The first one is a standard one-dimensional blocked signal, which is shown in FIG. 32(a). We degrade it with Gaussian noise of mean square error MSE=1.00 and mean average error MAE=0.80 (see FIG. 33(b)). The sizes of the two moving windows we used are 7 and 19 for $W_S$ and $W_L$ respectively. The weights for the 3-entry basket which we used for the GTMF are $w_1=w_3=0$, $w_2=3$ and $w_c=$. The switching threshold is chosen to be T=1.5. To obtain improved filtering results, the DWSAF algorithm is implemented recursively.

Figure 32C:
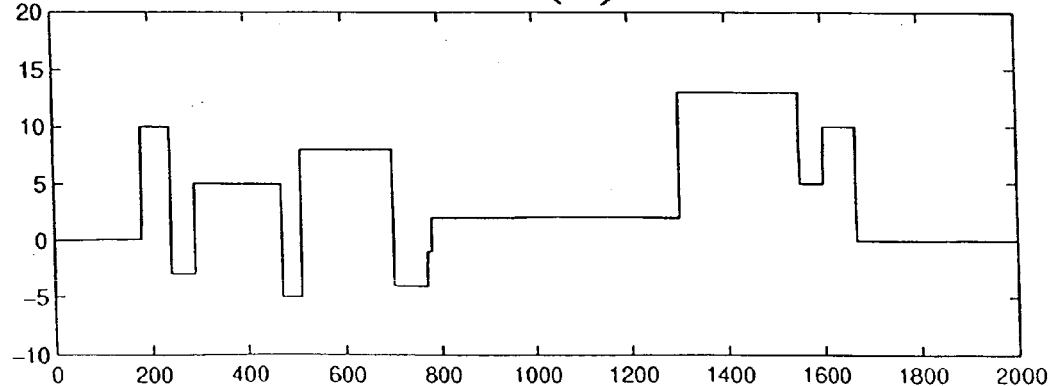

In FIG. 32(c), we show the filtered signal. It is seen from FIG. 32(c) that the filtered result is in excellent agreement with the original noise-free signal. The MSE and MAE of our filtered result are 6.19E-2 and 6.49E-3 respectively! The DWSAF is extremely efficient and robust for removing additive noise from blocked signals.

Figure 33A:
Figure 34A:

To further confirm the usefulness of the algorithm, we next consider a two-dimensional benchmark 8 bit, 512\times 512, "Lena" image, which has been degraded with two different amounts of Gaussian noise. FIG. 33(a) shows the corrupted Lena image with peak signal-to-noise ratio PSNR=22.17 dB and FIG. 34(a) shows the corrupted image with PSNR=18.82 dB. Since the original noise-free image is not exactly piecewise flat, it is not desirable to produce a filtering performance as efficient as in the first example. However, we expect that the DWSAF will yield improved results.

Figure 33B:
Figure 34B:

The sizes of the two windows for both corrupted images are 3 for $W_S$ and 5 for $W_L$. Three-entry median basket is used for both corrupted images, and the weights are $w_1:w_2:w_3:w_c=1:1:1:10$ for the image shown in FIG. 33(a) and $w_1:w_2:w_3:w_c=1:1:1:50$ for the image shown in FIG. 34(a). The initial switching threshold T is 50 for both corrupted images, and is changed to 0 after the first iteration for the lower noise image and after the second iteration for the higher noise image. FIGS. 33(b) and 34(b) show the filtered images produced by our numerical algorithm. Comparing them with the degraded images, it is clear that the algorithm can effectively remove noise and significantly preserve edges simultaneously. For a quantitative evaluation of the performance of the algorithm, the PSNR, mean square error (MSE) and mean absolute error (MAE) comparison for different filtering algorithms are listed in TABLE 2.

TABLE 2

Comparative Filtering Results for Lena Image Corrupted with Different Amount of Gaussian Noise

| Algorithm* | Noisy Image I | | | Noisy Image II | | |
|---|---|---|---|---|---|---|
| | PSNR | MSE | MAE | PSNR | MSE | MAE |
| No Denoising | 22.17 dB | 394.37 | 15.97 | 18.82 dB | 853.07 | 23.71 |
| Median (3 × 3) | 29.38 dB | 75.09 | 6.26 | 27.60 dB | 112.97 | 7.72 |
| Median (5 × 5) | 28.60 dB | 89.66 | 6.53 | 27.39 dB | 118.41 | 7.53 |
| α-TMF (3 × 3) | 29.84 dB | 67.46 | 6.07 | 28.13 dB | 100.10 | 7.04 |
| MTMF (3 × 3) | 29.91 dB | 66.46 | 5.79 | 28.23 dB | 97.74 | 7.39 |
| New Approach | 30.69 dB | 55.50 | 5.34 | 28.96 dB | 82.69 | 6.45 |

*All results are implemented recursively for optimal PSNR performance. The threshold used for the MTMF algorithm is optimized to q = 65 for image I and q = 100 for image II.

The PSNR is increased about 8.52 dB for the lower noise image and 10.14 dB for the higher noise image, both of which are better than the best median, α-TMF and MTMF filtering results.

CONCLUSIONS

In this disclosure, a new filtering algorithm for removing additive noise from a corrupted image is presented. In comparison to standard filtering schemes, the DWSAF algorithm employs two concentric moving windows to determine the gray level value used to replace that of the center pixel. Employing the larger window does not lead to significant blurring of the image because of the effect of the smaller window. The GTMF is used in the smaller window for obtaining the criterion for standard selective averaging in the larger window. Numerical examples show that the proposed filtering algorithm is both efficient and robust for recovering blocked signals contaminated with additive noise.

REFERENCES

[1] A. Scher, F. R. D. Velasco, and A. Rosenfeld, "Some new image smoothing techniques," IEEE. Trans. Syst. Man, Cybern., Vol. SMC-10, pp. 153–158, 1980.
[2] A. Rosenfeld and A. C. Kak, Digital Picture Processing, New York: Academic Press, 1982, Vol. 1.
[3] J. B. Bednar and T. L. Watt, "Alpha-trimmed means and their relationship to median filters," IEEE Trans. Acoust., Speech, and Signal Processing, Vol. ASSP-32, pp. 145–153, 1984.
[4] Y. H. Lee, S. A. Kassam, "Generalized median filtering and related nonlinear filtering techniques," IEEE Trans. Acoust., Speech, and Signal Processing, Vol. ASSP-33, pp. 672–683, 1985.
[5] S. R. Peterson, Y. H. Lee, and S. A. Kassam, "Some statistical properties of alpha-trimmed mean and standard type M filters," IEEE Trans. Acoust., Speech, and Signal Processing, Vol. ASSP-36, pp. 707–713, 1988.
[6] P. K. Sinha and Q. H. Hong, "An improved median filter", IEEE Trans. Medical Imaging, Vol. 9, pp. 345–346, 1990.
[7] X. You and G. Grebbin, "A robust adaptive estimator for filtering noise in images", IEEE Trans. Image Processing, Vol. 4, pp. 693–699, 1995.
[8] D. S. Zhang, Z. Shi, D. J. Kouri, D. K. Hoffman, "A new nonlinear image filtering technique," Optical Engr., Submitted.

Arbitrary Dimension Extension of Symmetric DAF

Introduction

The distributed approximating functional (DAF) approach to the time evolution of wave packets is a powerful, new method aimed at taking advantage of the local nature of the potential in the coordinate representation for ordinary chemical collisions, and the localized nature of the kinetic energy in this same representation. These features of the Hamiltonian lead to a highly band-pass expression for the propagator, specific to a restricted class of wave packets (DAFs). With control of the parameters which determine it, the DAF class can be made to include the wave packets of interest in any particular time-dependent quantum problem. Because the propagator is banded, its application to the propagation on the grids (1) scales like the number of grid points, N, in any dimension (which is the ultimate for any grid methods; the scaling constant depends on the band width); (2) requires reduces communication time when implemented on massively parallel computer; and (3) minimizes the storage requirement for the propagator.

In general, DAF can be regarded as a radial interpolating basis, as well as the scaling function. The corresponding DAF wavelets can be implemented using generalized DAFs. As a kind of radial basis functional (RBF), DAF neural networks are constructed and applied in signal processing.

We presented the derivation of the DAFs independent of the choice of coordinates and show how the Hermite functions becomes generalized for arbitrary numbers of degrees of freedom and choice fo orthogonal coordinates. We discuss the properties of the generalized "DAF polymonals" associate with different coordinate and numbers of degrees of freedom, and how angular momentum conservation leads to a radial propagator for spherical waves. Symmetric quincunx-DAF Dirichlet classes are carefully designed for hyper spherical surface representation.

DAF Theory

The theory of fundamental distributed approximating functional is based on the Hermite function representation of the 1D $\delta$ function which is $$\delta(x|\sigma) = \frac{1}{\sigma\sqrt{2\pi}} \exp\left(\frac{-x^2}{2\sigma^2}\right) \sum_{n=0}^{\infty} \left(\frac{-1}{4}\right)^n \frac{1}{n!} H_{2n}\left(\frac{x}{\sqrt{2}\sigma}\right) \tag{85}$$

The function $H_{2n}$ is the Hermite polynomial of even order, 2n. The quantity $\sigma$ is the width of the Gaussian window of the Hermite polynomial. The qualitative behavior of one particular Hermite DAF is shown in FIG. 1(a). The Hermite polynomial H is generated by the usual recursion $$H_n(x) = \begin{cases} 1, & n=0 \\ 2x, & n=1 \\ 2xH_{n-1}(x) - 2(n-1)H_{n-2}(x), & n>1 \end{cases} \tag{86}$$

The predominant advantage of the Hermite polynomial approximation is its high-order derivative preservation (which leads to a smooth approximation). This disclosure expands and tests the approach of Madan and Milne (1994) for pricing contingent claims as elements of a separable Hilbert space. We specialize the Hilbert space basis to the family of Hermite polynomials and use the model to price options on Eurodollar futures. Restrictions on the prices of Hermite polynomial risk for contingent claims with different times to maturity are derived. These restrictions are rejected by our empirical tests of a four-parameter model. The unrestricted results indicate skewness and excess kurtosis in the implied risk-neutral density. These characteristics of the density are also mirrored in the statistical density estimated from a time series on LIBOR. The out-of-sample performance of the four-parameter model is consistently better than that of a two-parameter version of the model.

The Hermite polynomial are given in terms of their generator by $$H_n(x)\exp(-x^2) = (-1)^n \frac{d^n}{dx^n} \exp(-x^2) = (-1)^n \nabla_x^n \exp(-x^2) \tag{87}$$

$\nabla_x$ where x is the x component of the gradient operator. This equation provides two equivalent and useful ways in which the above function can be expressed as $$\delta(x-x'|\sigma) = \tag{88}$$
$$\frac{1}{\sigma\sqrt{2\pi}} \sum_{n=0}^{\infty} \left(\frac{-1}{4}\right)^n \frac{1}{n!} [2\sigma^2]^n \nabla_x^{2n} \exp(-(x-x')^2/2\sigma^2)$$

or $$\delta(x-x'|\sigma) = \tag{89}$$
$$\frac{1}{\sigma\sqrt{2\pi}} \sum_{n=0}^{\infty} \left(\frac{-1}{4}\right)^n \frac{1}{n!} [2\sigma^2]^n \nabla_{x'}^{2n} \exp(-(x-x')^2/2\sigma^2)$$

where in the second equation $\nabla_x^{2n}$ has been replaced by $\nabla_{x'}^{2n}$. The two are equivalent because the derivative acts on an even function of (x-x').

The simple practical implementation is truncating the sum at some maximum value M/2 to obtain $$\delta_M(x-x'|\sigma) = \tag{90}$$
$$\frac{1}{\sigma\sqrt{2\pi}} \sum_{n=0}^{M/2} \left(\frac{-1}{4}\right)^n \frac{1}{n!} [2\sigma^2]^n \nabla_x^{2n} \exp(-(x-x')^2/2\sigma^2)$$

as indicated by the notation, the distributed approximating functional $\delta_M(x|\sigma)$ depend upon the M and $\sigma$, nut it does not depend upon the coordinate system per se. Here it is easy to show that $$\lim_{M\to\infty} \delta_M(x-x'|\sigma) = \delta(x-x') \tag{91}$$

for any fixed M. The availability of two independent parameters, either of which can be used to generate the identity kernel or Dirac delta function, can be viewed as the source of robustness of the DAFs as computational tools. See e.g., D. K. Hoffman, D. J. Kouri, "Distributed approximating functional theory for an arbitrary number of particles in a coordinate system-independent formalism," J. Physical Chemistry, Vol. 97, No. 19, pp. 4984–4988, 1993. A simple expression of Hermite DAF is as $$\delta_M(x|\sigma) = \frac{1}{\sigma\sqrt{2\pi}} \exp\left(\frac{-x^2}{2\sigma^2}\right) \sum_{n=0}^{M/2} \left(-\frac{1}{4}\right)^n \frac{1}{n!} H_{2n}\left(\frac{x}{\sqrt{2\sigma}}\right) \quad (92)$$

Arbitrary DAF Extension in Multi-Dimension Space

Tensor-product extension

Different selections of interpolating shells result in different DAFs. Theoretically, this kind of functional can be regarded as the smoothing operator or the scaling function in wavelet theory. It can be used to generate the corresponding wavelets (differential functionals) for signal analysis. The discrete wavelet transform is implemented using filterbanks. Hoffman and Kouri gave a tensor-product extension of DAF in multi-dimensional Hilbert space. It can be explained in detail as following. Consider a Dirichlet system which can be represented in a general configuration space by a vector R with an arbitrary number N of Cartesian components, $x_1, x_2, \ldots, X_N$. By "Cartesian" we mean that the "tensor" volume element for the space is given by $$dX = \prod_{j=1}^{N} dx_j \quad (93)$$

Thus, an arbitrary function, $\Psi(X)$, in Hibert space can be represented by $$\Psi(X) = \int \delta(X - X') \Psi(X') dX' \quad (94)$$

where $\delta(X-X')$ is the $\delta$ function in N-dimension space which can be written in the form $$\delta(X - X') = \prod_{j=1}^{N} \delta(x_j - x_j') \quad (95)$$

Using the tensor product to substitute the 1D scalar variable, we can obtain the expression in N-dimensional Hilbert space as $$\delta(X - X'|\sigma) = \quad (96)$$
$$(\sigma\sqrt{2\pi})^{-N} \sum_{n=0}^{\infty} \left(-\frac{1}{4}\right)^n \frac{1}{n!} [2\sigma^2]^n \nabla_x^{2n} \exp(-(X-X')^2/2\sigma^2)$$

where the expression $$\sum_{n=0}^{\infty} (\cdot) = \sum_{n_1=0}^{\infty} \sum_{n_2=0}^{\infty} \cdots \sum_{n_N 0}^{\infty} (\cdot) \quad (97)$$

and the multi-variable $$n! = \prod_{j=1}^{N} n_j! \quad (98)$$

In multi-dimensional Hilbert space $$n = \prod_{j=1}^{N} n_j \quad (99)$$

The gradient operation is $$\nabla_x^{2n} = \frac{d^{n_1}}{dx_1^{n_1}} \frac{d^{n_2}}{dx_2^{n_2}} \cdots \frac{d^{n_N}}{dx_N^{n_N}} \quad (100)$$

where $\nabla_x^2$ is the N-dimensional Laplacian operator.

$$(X - X')^2 = \sum_{j=1}^{N} (x_j - x_j')^2 \quad (101)$$

The advantage of this expression is that it is independent of the particular choice of coordinate system and we can use whatever coordinate are convenient for a particular problem (e.g. Cartesian, cylindrical polar, spherical polar, hyperspherical, elliptical, etc., as the case might be). The generalized interpolating matrix is hyper-square and can be separated by different directional vector.

Tensor-Product Extension

DAF define a class of symmetric interpolants. Besides the tensor-product extension, it could be with more interesting shapes. To preserve the symmetry property, any DAF or DAF-like interpolaitng functional is expressed as $$\delta(x) = \delta(|x|) \quad (102)$$

Therefore the fundamental variable for DAF processing is |x|. The extended norm-preserved quincunx solution is implemented by the following substitution in N-D space $$|X| = \left(\sum_{j=1}^{N} |x_j|^p\right)^{1/q} \quad (103)$$

As p=q; the N-D space multi-variable becomes to the $1^p$ norm $$\|X\|_p = \left(\sum_{j=1}^{N} |x_j|^p\right)^{1/p} \quad (104)$$

When p equals to ½, the contour of the 2D quincunx DAF is a pseudo-diamond shape.

The practical truncated shape is represented by the following formula:

$$w(x, y) = e^{-(|x|+|y|)} \quad (105)$$

$$w(x, y) = e^{-(|x|+|y|)^2/(2\sigma^2)} \quad (106)$$

$$w(x, y) = e^{-(x^2+y^2)/(2\sigma^2)} \quad (107)$$

$$w(x, y) = e^{-\sqrt{x^2+y^2}/(2\sigma^2)} \quad (108)$$

CONCLUSION

A new algorithm for impulse noise removal was presented. A group of significant values in the neighboring window of one pixel are bundled and weighted to obtain a modified luminance estimation (MLE). A threshold selective-pass technique is employed to determine whether any given pixel should be replaced by its MLE. Iterative processing improves the performance of our algorithm for highly corrupted images. Numerical experiments show that our technique is extremely robust and efficient to implement, and leads to significant improvement over other well-known methods.

Lagrange Wavelets for Signal Processing

Introduction

The theory of interpolating wavelets based on a subdivision scheme has attracted much attention recently. It possesses the attractive characteristic that the wavelet coefficients are obtained from linear combinations of discrete samples rather than from traditional inner product integrals. Mathematically, various interpolating wavelets can be formulated in a biorthogonal setting. Harten has described a kind of piecewise biorthogonal wavelet construction method [12]. Swelden independently has developed essentially this method into the well known "lifting scheme" theory [32], which can be regarded as a special case of the Neville filters [19]. Unlike the previous method for constructing biorthogonal wavelets, which relies on explicit solution of coupled algebraic equations [10], the lifting scheme enables one to construct a custom-designed biorthogonal wavelet transforms assuming only a single low-pass filter without iterations.

Generally speaking, the lifting-interpolating wavelet theory is closely related to: the finite element technique for the numerical solution of partial differential equations, the subdivision scheme for interpolation and approximation, multi-grid generation and surface fitting techniques. The most attractive feature of the approach is that discrete samplings are made which all identical to wavelet multi-resolution analysis. Without any of the pre-conditioning or post-conditioning processes required for accurate wavelet analysis, the interpolating wavelet coefficients can be implemented using a parallel computational scheme.

Lagrange interpolation polynomials are commonly used for signal approximation and smoothing, etc. By carefully designing the interpolating Lagrange functionals, one can obtain smooth interpolating scaling functions with arbitrary order of regularity. In this disclosure, we will present three different kinds of biorthogonal interpolating Lagrange wavelets (Halfband Lagrange wavelets, B-spline Lagrange wavelets and Gaussian-Lagrange DAF wavelets) as specific examples of generalized interpolating Lagrange wavelets.

Halfband Lagrange wavelets can be regarded as an extension of Dubuc interpolating functionals [8, 11], auto-correlation shell wavelet analysis [26], and halfband filters [1]. B-spline Lagrange Wavelets are generated by a B-spline-windowed Lagrange functional which increases the smoothness and localization properties of the simple Lagrange scaling function and related wavelets.

Lagrange Distributed Approximating Functionals (LDAF)-Gaussian modulated Lagrange polynomials have been successfully applied for numerically solving various linear and nonlinear partial differential equations [40]. Typical examples include DAF-simulations of 3-dimensional reactive quantum scattering and 2-dimensional Navier-Stokes fluid flow with non-periodic boundary conditions. In terms of wavelet analysis, DAFs can be regarded as particular scaling functions (wavelet-DAFs); the associated DAF-wavelets can be generated in a number of ways [41]. Both DAFs and DAF-wavelets are smooth and decay rapidly in both the time and frequency representations. One objective of the present work is to extend the DAF approach to signal and image processing by constructing new biorthogonal DAF-wavelets and their associated DAF-filters using the lifting scheme [32].

As an example application of Lagrange wavelets, we consider image processing, de-noising and restoration. This application requires dealing with huge data sets, complicated space-frequency distributions and complex perceptual dependent characteristics. De-noising and restoration play an important role in image processing. Noise distortion not only affects the visual quality of images, but also degrades the efficiency of data compression and coding.

To explicit the time-frequency characteristics of wavelets, an earlier group normalization (GN) technique [28, 29] has been utilized to re-scale the magnitudes of various subband filters and obtain normalized equivalent decomposition filters (EDFs). The group normalization process corrects the drawback that the magnitudes of the transform coefficients do not correctly reflect the true strength of the various signal components.

Moreover, in order to achieve the best noise-removing efficiency, the human vision response is best accounted for by a perceptual normalization (PN) based on the response property of the Human Vision System (HVS). The concept of visual loss-less quantization, introduced by Watson [39], is utilized to construct the visual loss-less matrix, which modifies the magnitudes of the normalized wavelet coefficients.

Perceptual signal processing has the potential of overcoming the limits of the traditional Shannon Rate-distortion (R-D) theory for perception-dependent information, such as images and acoustic signals. Previously, Ramchandran, Vetterli, Xiong, Herley, Asai, and Orchard have utilized a rate-distortion compromise for image compression [14, 23, 24, and 42]. Our recently derived Visual Group Normalization (VGN) technique [31] can likely be used with rate-distortion compromise to generate a so-called Visual Rate-Distortion (VR-D) theory to further improve image processing.

Softer Logic Masking (SLM) is an adjusted de-noising technique [29], designed to improve the filtering performance of Donoho's Soft Threshold (ST) method [9]. The SLM technique efficiently preserves important information, particularly at an edge transition, in a manner particularly suited to human visual perception.

Interpolating Wavelets

The basic characteristics of interpolating wavelets of order D discussed in reference [10] require that the primary scaling function, $\phi$, satisfies the following conditions.

(1) Interpolation:

$$\phi(k) = \begin{cases} 1, k = 0 \\ 0, k \neq 0 \end{cases} \quad k \in Z \tag{109}$$

(2) Self-induced Two-Scale Relation: φ can be represented as a linear combination of dilates and translates of itself, while the weight is the value of φ at a subdivision integer of order 2.

$$\phi(x) = \sum_k \phi(k/2)\phi(2x-k) \tag{110}$$

This is only approximately satisfied for some of the interpolating wavelets discussed in the later sections; however, the approximation can be made arbitrarily accurate.

(3) Polynomial Span: For an integer D≥0, the collection of formal sums, symbolized by $\Sigma C_k \phi(x-k)$, contains all polynomials of degree D.

(4) Regularity: For real V>0, φ is Hölder continuous of order V.

(5) Localization: φ and all its derivatives through order $\lfloor V \rfloor$ decay rapidly.

$$|\phi^{(r)}(x)| \leq A_s(1|x|)^{-s}, x \in R, s > 0, 0 \leq r \leq \lfloor V \rfloor \tag{111}$$

where $\lfloor V \rfloor$ represents the maximum integer which does not exceed V.

Interpolating wavelets are particularly efficient for signal representation since their multiresolution analysis can be simply realized by discrete sampling. This makes it easy to generate a subband decomposition of the signal without requiring tedious iterations. Moreover, adaptive boundary treatments and non-uniform samplings can be easily implemented using interpolating methods.

Compared with commonly used wavelet transforms, the interpolating wavelet transform possesses the following characteristics:

1. The wavelet transform coefficients are generated by linear combination of signal samplings, instead of the commonly used convolution of wavelet transform, such as $$W_{j,k} = \int_R \psi_{j,k}(x) f(x) dx \tag{112}$$

where $\psi_{j,k}(x) = 2^{1/2} \psi(2^j x - k)$.

2. A parallel-computing algorithm can be easily constructed. The calculation and compression of coefficients are not coupled. For the halfband filter with length N, the calculation of the wavelet coefficients, $W_{j,k}$, does not exceed N+2 multiply/adds for each.

3. For a D-th order differentiable function, the wavelet coefficients decay rapidly.

4. In a mini-max sense, threshold masking and quantization are nearly optimal for a wide variety of regularization algorithms.

Theoretically, interpolating wavelets are closely related to the following wavelet types:

Band-Limit Shannon Wavelets

The π band-limited function, (x)=sin(x)/(x)C in Paley-Wiener space, constructs interpolating functions. Every band-limited function $fL^2(R)$ can be reconstructed by the equation $$f(x) = \sum_k f(k) \cdot \frac{\sin \pi (x-k)}{\pi (x-k)} \tag{113}$$

where the related wavelet function (the Sinclet) is defined as (see FIG. 35)

$$\psi(x) = \frac{\sin \pi (2x-1) - \sin \pi (x - 1/2)}{\pi (x - 1/2)} \tag{114}$$

Interpolating Fundamental Spline

The fundamental polynomial spline of degree D, $\eta^D(x)$, where D is an odd integer, has been shown by Schoenberg (1972) to be an interpolating wavelet (see FIG. 36). It is smooth with order R=D−1, and its derivatives through order D−1 decay exponentially [34]. Thus $$\eta^D(x) = \sum_k \alpha^D(k) \beta^D(x-k), \tag{115}$$

where $\beta^D(x)$ is the B-spline of order D defined as $$\beta^D(x) = \tag{116}$$

$$\sum_{j=0}^{D+1} \frac{(-1)^j}{D!} \binom{D+1}{j} \left(x + \frac{D+1}{2} - j\right)^D U\left(x + \frac{D+1}{2} - j\right)$$

Here U is the step function $$U(x) = \begin{cases} 0, x < 0 \\ 1, x \geq 0 \end{cases} \tag{117}$$

and $\{\alpha^D(k)\}$ is the sequence that satisfies the infinite summation condition $$\sum_k \alpha^D(k) \beta^D(n-k) = \delta(n) \tag{118}$$

Deslauriers-Dubuc Functional

Let D be an odd integer, and D>0. There exist functions, $F_D$, such that if $F_D$ has already been defined at all binary rationals with denominator $2^j$, it can be extended by polynomial interpolation, to all binary rationals with denominator $2^{j+1}$, i.e. all points halfway between previously defined points [8, 11]. Specially, to define the function at $(k+\frac{1}{2})/2^j$ when it is already defined at all $\{k2^{-j}\}$, fit a polynomial $\pi_{j,k}$ to the data $(k'/2^j)$, $F_D$ $(k'/2^j)$ for $k' \in \{2^{-j}[k-(D-1)/2], \ldots, 2^{-j}[k+(D+1)/2]\}$. This polynomial is unique $$F_D\left(\frac{k+1/2}{2^j}\right) \equiv \pi_{j,k}\left(\frac{k+1/2}{2^j}\right) \tag{119}$$

This subdivision scheme defines a function that is uniformly continuous at the rationals and has a unique continuous extension. The function $F_D$ is a compactly supported interval polynomial and is regular; it is the auto-correlation function of the Daubechies wavelet of order D+1. This function is at least as smooth as the corresponding Daubechies wavelets.

Auto-Correlation Shell of Orthonormal Wavelets

If $\check{\phi}$ is an orthonormal scaling function, its auto-correlation $\phi(x) = \int \check{\phi}(t) * \check{\phi}(x-t) dt$ is an interpolating wavelet (FIG. 37) [26]. Its smoothness, localization and two-scale relations derive from $\check{\phi}$. The auto-correlation of Haar, Lamarie-Battle, Meyer, and Daubechies wavelets lead, respectively, to the interpolating Schauder, interpolating spline, $C^\infty$ interpolating, and Deslauriers-Dubuc wavelets.

Lagrange Half-Band Filters

Ansari, Guillemot, and Kaiser [1] have used Lagrange symmetric halfband FIR filters to design the orthonormal wavelets that express the relation between the Lagrange interpolators and Daubechies wavelets [6]. Their filter corresponds to the Deslauriers-Dubuc wavelet of order D=7 (2M−1), M=4. The transfer function of the halfband symmetric filter h is given by $$H(z) = \frac{1}{2} + zT(z^2) \tag{120}$$

where T is a trigonometric polynomial. Except for h(0)=½, at every even integer lattice h(2n)=0, n≠0, n∈2. The transfer function of the symmetric FIR filter h(n)=h(−n), has the form $$H(z) = \frac{1}{2} + \sum_{n=1}^{M} h(2n-1)(z^{1-2n} + z^{2n-1}) \tag{121}$$

The concept of an interpolating wavelet decomposition is similar to that of "algorithm a trous," the connection having been found by Shensa [27]. The self-induced scaling conditions and interpolation condition are the most important characteristics of interpolating wavelets. According to the following equation $$f(x) = \Sigma_n f(n) \phi(x-n) \tag{122}$$

the signal approximation is exact on the discrete sampling points, which does not hold in general for commonly used non-interpolating wavelets.

Lagrange Wavelets

Halfband Lagrange Wavelets

The halfband filter is defined as whose even samples of the impulse response are constrained such as h(0)=½ and h(2n)=0 for n=±1, ±2, . . . A special case of symmetric halfband filters can be obtained by choosing the filter coefficients according to the Lagrange interpolation formula. The filter coefficients are then given by $$h(2n-1) = \frac{(-1)^{n+M-1} \prod_{m=1}^{2M} (M+1/2-m)}{(M-n)!(M+n-1)!(2n-1)} \tag{123}$$

These filters have the property of maximal flatness. They possess a balance between the degree of flatness at zero frequency and flatness at the Nyquist frequency (half sampling).

These half-band filters can be utilized to generate the interpolating wavelet decomposition, which can be regarded as a class of auto-correlated shell orthogonal wavelets such as the Daubechies wavelets [6]. The interpolating wavelet transform can also be generated by different Lagrange polynomials, such as [26] according to $$P_{2n-1}(x) = \prod_{m=-M+1, m\neq n}^{M} \frac{x-(2m-1)}{(2n-1)-(2m-1)} \tag{124}$$

The predicted interpolation can be expressed as $$\Gamma S_j(i) = \sum_{n=1}^{M} P_{2n-1}(0)[S_j(i+2n-1) + S_j(i-2n+1)], \tag{125}$$

$$i = 2k+1$$

Γ where r is a projection and the $S_j$ are the jth layer low-pass coefficients. This projection relation is equivalent to the subband filter response of $$h(2n-1) = P_{2n-1}(0) \tag{126}$$

The above-mentioned interpolating wavelets can be regarded as an extension of the fundamental Deslauriers-Dubuc interactive sub-division scheme (factorized as M=2, while the order of Lagrange polynomial is D=2M−1=3) (FIG. 40(a)).

Figure 41A:
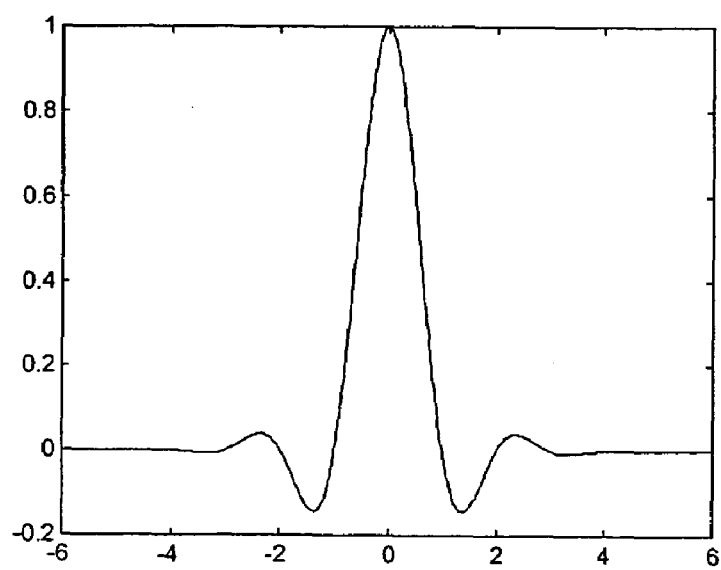
Figure 41B:
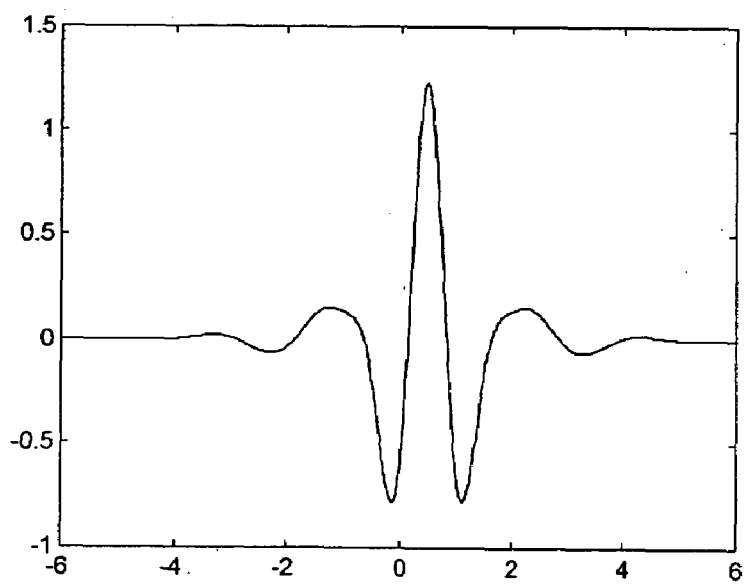
Figure 41C:
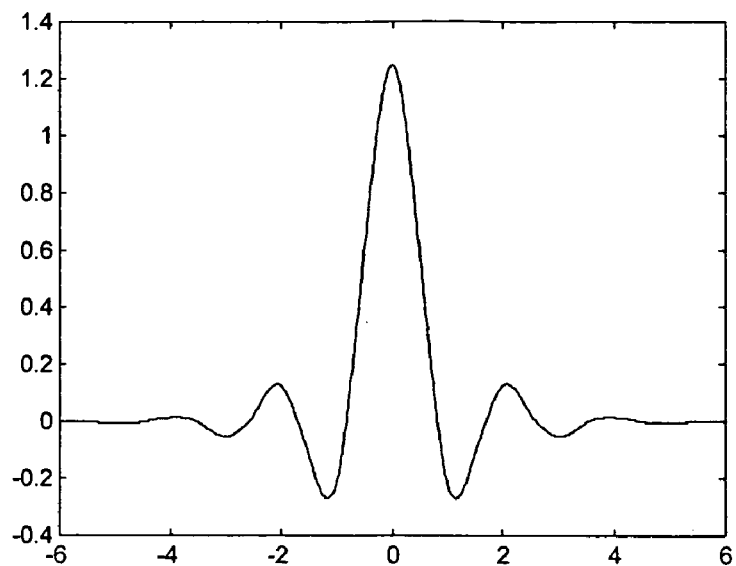
Figure 41D:
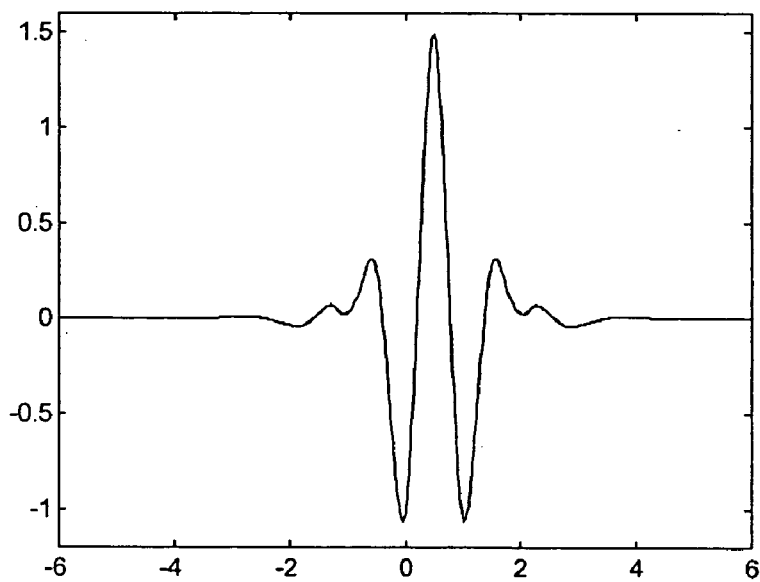

It is easy to verify that an increase of the Lagrange polynomial order will introduce higher regularity in the interpolating functionals (FIG. 41(a)). When D→+∞, the interpolating functional becomes the -band-limited Sinc function and its domain of definition is the real line. The subband filters generated by Lagrange interpolating functionals satisfy (1) Interpolation: h(ω)+h(ω+π)=1
(2) Symmetry: h(ω)=h(−ω)
(3) Vanishing Moments $\int_R x^P \phi(x) dx = \delta_p$ Donoho outlines a basic subband extension for perfect reconstruction. He defines the wavelet function as $$\psi(x) = \phi(2x-1) \tag{127}$$

The biorthogonal subband filters can be expressed as $$\tilde{h}(\omega) = 1, \; g(\omega) = e^{i\omega}, \; \tilde{g}(\omega) = e^{-i\omega} \overline{h(\omega+\pi)} \tag{128}$$

However, the Donoho interpolating wavelets have some drawbacks, because the low-pass coefficients are generated by a sampling operation only, as the decomposition layer increases, the correlation between low-pass coefficients becomes weaker. The interpolating (prediction) error (high-pass coefficients) strongly increases, which destroys the compact representation of the signal. Additionally, it does not lead to a Riesz basis for $L^2(R)$ space.

Swelden has provided, by far, the most efficient and robust scheme [32] for constructing biorthogonal wavelet filters. His approach is to generate high-order interpolating Lagrange wavelets with increased regularity. As FIG. 38 shows, $P_0$ is the interpolating prediction process, and $P_1$ the so-called the updating filter, makes the down-sampling low-pass coefficients smoother. If we choose $P_0$ to be the same as $P_1$, then the new interpolating subband filters can be depicted as $$\begin{cases} h_1(\omega) = h(\omega) \\ \tilde{h}_1(\omega) = 1 + \tilde{g}(\omega)\overline{P(2\omega)} \\ g_i(\omega) = e^{-i\omega} - h(\omega)P(2\omega) \\ \tilde{g}_1(\omega) = \tilde{g}(\omega) \end{cases} \quad (129)$$

The newly developed filters $h_1, g_1, \tilde{h}_1$, and $\tilde{g}_1$ also construct the biorthogonal dual pair for perfect reconstruction. Examples of generated biorthogonal lifting wavelets with different regularity are shown in FIG. 39, FIG. 40 and FIG. 41.

Baseline Lagrange Wavelets

Lagrange polynomials are natural interpolating expressions. Utilizing a different expression for the Lagrange polynomials, we can construct other types of interpolating wavelets.

We define a class of symmetric Lagrange interpolating functional shells as $$P_M(x) = \prod_{i=-M, i\neq 0}^{M} \frac{x-i}{-i} \quad (130)$$

It is easy to verify that this Lagrange shell also satisfies the interpolating condition on discrete integer points, since $$P_M(k) = \begin{cases} 1, & k = 0 \\ 0, & \text{otherwise} \end{cases} \quad (131)$$

However, simply defining the filter response as $$h(k) = P(k/2)/2, k = -M, M \quad (132)$$

will lead to non-stable interpolating wavelets, as shown in FIG. 43.

Utilizing a smooth window, which vanishes at the zeros of the Lagrange polynomial, will lead to more regular interpolating wavelets and equivalent subband filters (as in FIGS. 44 and 45). If we select a well-defined B-spline function as the weight window, then the scaling function (mother wavelet) can be defined as an interpolating B-Spline Lagrange functional (BSLF)

$$\phi_M(x) = \frac{\beta^N(x/\eta)}{\beta^N(0)} P_M(x) \quad (133)$$

-continued $$= \frac{\beta^N(x/\eta)}{\beta^N(0)} \prod_{i=-M, i\neq 0}^{M} \frac{x-i}{-i}$$

where N is the B-spline order, and $\eta$ is the scaling factor to control the window width. To ensure coincidence of the zeroes of the B-spline and the Lagrange polynomial, we set $$2M = \eta \times (N+1) \quad (134)$$

To preserve the interpolation condition, the B-spline envelope factor M must be odd number. It is easy to show that when the B-spline order is $N=4k+1$, $\eta$ can be any odd integer $(2k+1)$. If N is an even integer, then $\eta$ can only be 2. When $N=4k-1$, we cannot construct an interpolating shell according to the above definition.

From the interpolation and self-induced scaling of the interpolating wavelets, it is easy to establish that $$h(k) = \phi_M(k/2)/2, k = -2M+1, 2M-1 \quad (135)$$

Gaussian-Lagrange DAF Wavelets

We can also select a distributed approximating functional-Gaussian Lagrange DAF (GLDAF) as our basic scaling function to construct interpolating wavelets. These are $$\phi_M(x) = W_\sigma(x) P_M(x) \quad (136)$$

$$= W_\sigma(x) \prod_{i=-M, i\neq 0}^{M} \frac{x-i}{-i}$$

where $W_\sigma(x)$ is a window function which is selected to be a Gaussian, $$W_\sigma(x) = e^{-x^2/2\sigma^2} \quad (137)$$

because it satisfies the minimum frame bound condition in quantum physics. Here $\sigma$ is a window width parameter, and $P\backslash v(x)$ is the Lagrange interpolation kernel. The DAF scaling function has been successfully introduced as the basis for an efficient and powerful grid method for quantum dynamical propagations [40]. Using the lifting scheme [32], a wavelet basis is generated. The Gaussian window in our DAF-wavelets efficiently smooths out the Gibbs oscillations, which plague most conventional wavelet bases. The following equation shows the connection between the B-spline function and the Gaussian window [34]:

$$\beta^N(x) \cong \sqrt{\frac{6}{\pi(N+1)}} \exp\left(\frac{-6x^2}{N+1}\right) \quad (138)$$

for large N. As in FIG. 46, if we choose the window width to be $$\sigma = \eta \sqrt{(N+1)/12} \quad (139)$$

the Gaussian Lagrange wavelets generated by the lifting scheme will be much like the B-spline Lagrange wavelets. Usually, the Gaussian Lagrange DAF based wavelets are smoother and decay more rapidly than B-spline Lagrange wavelets. If we select more sophisticated window shapes, the Lagrange wavelets can be generalized further. We shall call these extensions Bell-windowed Lagrange wavelets.

Visual Group Normalization

It is well known that the mathematical theory of wavelet transforms and associated multiresolution analyses has applications in signal processing and engineering problems, where appropriate subband filters are the central entities. The goal of wavelet signal filtering is to preserve meaningful signal components, while efficiently reducing noise components. To this end, we use known magnitude normalization techniques [28, 29] for the magnitudes of filter coefficients to develop a new perceptual normalization to account for the human vision response.

From a signal processing point of view, wavelet coefficients can be regarded as the results of the signal passing through equivalent decomposition filters (EDF). The responses of the EDF $LC_{j,m}(\omega)$) are the combination of several recurrent subband filters at different stages. As shown in FIG. 40, the EDF amplitudes of different sub-blocks are different. Thus the magnitude of the decomposition coefficients in each of the sub-blocks will not exactly reproduce the true strength of the signal components. Stated differently, various EDFs are incompatible with each other in the wavelet transform. To adjust the magnitude of the response in each block, the decomposition coefficients are re-scaled with respect to a common magnitude standard. Thus EDF coefficients, $C_{j,m}(k)$, on layer j and block m should be multiplied by a magnitude scaling factor, $\lambda_{j,m}$, to obtain an adjusted magnitude representation [28]. This factor can be chosen as the reciprocal of the maximum magnitude of the frequency response of the equivalent filter on node (j,m)

$$\lambda_{j,m} = \frac{1}{\sup_{\omega \in \Omega}\{|LC_{j,m}(\omega)|\}}, \qquad \Omega = [0,2\pi] \qquad (140)$$

This idea was recently extended to Group Normalization (GN) of wavelet packets for signal processing [29].

An image can be regarded as the result of a real object processed by a human visual system. The latter has essentially many subband filters. The responses of these human filters to various frequency distributions are not at all uniform. Therefore, an appropriate normalization of the wavelet coefficients is necessary. Actually, the human visual system is adaptive and has variable lens and focuses for different visual environments. Using a just-noticeable distortion profile, we can efficiently remove the visual redundancy from decomposition coefficients and normalize them with respect to a standard of perception importance as shown in FIGS. 42(*a*–*b*). A practical, simple model for perception efficiency has been presented by Watson, et al. [5] for data compression. This model is adapted here to construct the "perceptual lossless" response magnitude $Y_{j,m}$ for normalizing according to the visual response function [39], $$Y_{j,m} = a10^{k\left(\log \frac{2^j f_0 d_m}{R}\right)^2} \qquad (141)$$

where $\alpha$ defines the minimum threshold, k is a constant, R is the Display Visual Resolution (DVR), $f_0$ is the spatial frequency, and $d_m$ is the directional response factor. Together with the magnitude normalized factor $\lambda_{j,m}$, this leads to the perceptual lossless quantization matrix $$Q_{j,m} = 2Y_{j,m}\lambda_{j,m} \qquad (142)$$

This treatment provides a simple, human-vision-based threshold technique [39] for the restoration of the most important perceptual information in an image. For gray-scale image processing, the luminance (magnitude) of the image pixels is the principal concern. We refer to the combination of the above mentioned two normalizations as the Visual Group Normalization (VGN) of wavelet coefficients.

Masking Technique

Masking is essential to many signal-processing algorithms. Appropriate masking will result in reduction of noise and undesired components. Certainly, it is very easy to set up masking if the spectral distribution of a signal and its noise is known. However, in most cases, such prior knowledge is not available. Statistical properties of the signal and its noise are assumed so that the noise is taken to be relatively more random than the signal in each subband. Hard logic masking and soft logic masking techniques are discussed in the following two subsections.

Hard Logic Masking

The Visual Group Normalization method provides an efficient approach for re-normalizing the wavelet decomposition coefficients so that various subband filters have appropriate perceptual impulse responses. However, this algorithm alone does not yield the best SNR in real signal processing. Essentially, various noise and/or interference components can be embedded in different nodes of the subband decomposition tree. To achieve SNR-improved reconstruction of the signal and/or image, a filtering process is needed to reduce the noise and preserve the main signal information. Noise due to random processes has a comparatively wide-band distribution over the decomposition tree, whereas mechanical noise can have a narrow-band distribution over a few specific subband components. Therefore, time-varying masking techniques are utilized to reduce noise. We discuss a few useful masking methods in the rest of this subsection.

Single Dead-Zone Threshold Masking

A single zone threshold masking is the simplest masking method. With a given decomposition tree, a constant threshold r is selected for our magnitude normalized wavelet decomposition coefficients $NC_{j,m}(k)$. That is, if the absolute value of $NC_{j,m}(k)$ is greater than the threshold r, the original decomposition coefficient will be kept; otherwise it will be set to zero. That is $$C_{j,m}(k) = \begin{cases} C_{j,m}(k) & |NC_{j,m}(k)| > r \\ 0 & |NC_{j,m}(k)| < r \end{cases} \qquad (143)$$

This approach is similar to the Pass-Band Selection technique of Ref [43], used in a FFT framework. However, in the present approach, the decomposition coefficients are re-scaled using the visual group normalization. Therefore, even with a single zone masking, it is expected that for a given noisy signal the present wavelet analysis will achieve a better SNR than that of a single-band FFT method.

Adaptive Node Mean/Variance Threshold Masking

In practice, we hope the threshold r can be adaptively adjusted to the strength of the noisy environment. Thus the threshold r should be set higher to suppress a noisier signal, and in general, r should vary as a function of the statistical properties of the wavelet decomposition coefficients, the simplest and most important of which are the mean and second variance. These are incorporated in the present work.

We define the mean and second variance of the magnitude of the normalized coefficients on node (j,m) as $$\eta_{j,m} = \frac{1}{N_j} \sum_{k=0}^{N_j-1} NC_{j,m}(k) \quad (144)$$

and $$\sigma_{j,m} = \left( \frac{1}{N_j} \sum_{k=0}^{N_j-1} [NC_{j,m}(k) - \eta_{j,m}]^2 \right)^{\frac{1}{2}} \quad (145)$$

where $N_j = 2^{-j}N$ and N is the total length of a filter. A masking is then set according to the following analysis:

(1) Introduce a factor $|\alpha|<1$, $\alpha \in R$.

(2) Set the corresponding wavelet transform coefficients, $C_{j,m}(k)$, to zero, if the inequality, $|NC_{j,m}(k)| < |\eta_{j,m} + \alpha \sigma_{j,m}|$ holds. This implies that the magnitude of the normalized coefficients $NC_{j,m}(k)$ is less than the mean, $\eta_{j,m}$, within the statistical deviation of $\alpha \sigma_{j,m}$, and hence that $NC_{j,m}(k)$ as a noise component.

(3) Retain the corresponding wavelet transform coefficients, $C_{j,m}(k)$, for reconstruction, satisfying the inequality, $|NC_{j,m}(k)| \geq |\eta_{j,m}|$. This implies that the magnitude of $NC_{j,m}(k)$ is greater than the mean, $\eta_{j,m}$, within the statistical deviation of $\alpha \sigma_{j,m}$. We consider such a $NC_{j,m}(k)$ as a target component. The rules (2) and (3) are summarized as $$C_{j,m(k)} = \begin{cases} C_{j,m}(k) & |NC_{j,m}(k)| \geq |\eta_{j,m} + \alpha \sigma_{j,m}| \\ 0 & |NC_{j,m}(k)| < |\eta_{j,m} + \alpha \sigma_{j,m}| \end{cases} \quad (146)$$

Adaptive Whole Tree Threshold Masking

For certain applications, it is possible that all $NC_{j,m}(k)$ on a particular node (j,m) have essentially the same values. The aforementioned adaptive node mean/variance threshold masking technique becomes invalid in such a case. We use an adaptive whole-tree threshold masking method for this situation. The basic procedure is very similar to Method 2, except that the mean and second variance are calculated for the whole tree T, according to $$\eta = \frac{1}{N} \sum_{j} \sum_{m} \sum_{k=0}^{N_j-1} NC_{j,m}(k) \quad (147)$$

and $$\sigma = \left( \frac{1}{N} \sum_{j} \sum_{m} \sum_{k=0}^{N_j-1} [NC_{j,m}(k) - \eta]^2 \right)^{\frac{1}{2}} \quad (j,m) \in T \quad (148)$$

The corresponding reconstruction coefficients are selected by the rules $$C_{j,m(k)} = \begin{cases} C_{j,m}(k) & |NC_{j,m}(k)| \geq |\eta + \alpha \sigma| \\ 0 & |NC_{j,m}(k)| < |\eta + \alpha \sigma| \end{cases} \quad (149)$$

Constant False Alarm Masking

In certain applications, such as radar signals generated from a given environment, it is useful to select an alarm threshold, r, based on the mean value of multiple measurements of the background signal. This approach is similar to a background-contrasted signal processing in which only the differences of the signal's optimal tree decomposition coefficients $NC_{j,m}(k)$, and $NC_{j,m}^B(k)$, the background decomposition coefficients of the same tree structure, are used for background-contrasted signal reconstruction.

Softer Logic Masking

The various maskings discussed above can be regarded as hard logic masking, which are similar to a bias-estimated dead-zone limiter. Jain [16] has shown that a non-linear dead-zone limiter can improve the SNR for weak signal detection $$\eta(y) = sgn(y)(|y| - \delta_+^\beta - 1 \leq \beta \leq 1 \quad (150)$$

where $\delta$ is a threshold value. Donoho has shown that the $\beta=1$ case of the above expression is a nearly optimal estimator for adaptive NMR data smoothing and de-noising [9]. Independently, two of the present authors (Shi and Bao) in a previus work [28] have utilized hard logic masking to extract a target from formidable background noise efficiently.

The various threshold cutoffs of multiband expansion coefficients in hard logic masking methods are very similar to the cutoff of a FFT expansion. Thus, Gibbs oscillations associated with FFTs will also occur in the wavelet transform using a hard logic masking. Although hard logic masking methods with appropriate threshold values do not seriously change the magnitude of a signal after reconstruction, they can cause considerable edge distortions in a signal due to the interference of additional high frequency components induced by the cutoff. The higher the threshold value, the larger the Gibbs oscillation will be. Since image edges are especially important in visual perception, hard logic masking can only be used for weak noise signal (or image) processing, such as electrocardiogram (ECG) signal filtering, where relatively small threshold values are required. In this disclosure, we use a Soft Logic Masking (SLM) method. In our SLM approach, a smooth transition band near each masking threshold is introduced so that any decomposition coefficients, which are smaller than the threshold value will be reduced gradually to zero, rather than being exactly set to zero. This treatment efficiently suppresses possible Gibbs oscillations and preserves image edges, and consequently improves the resolution of the reconstructed image. The SLM method can be expressed as $$\hat{C}_{j,m}(k) = sgn(C_{j,m}(k))(|C_{j,m}(k)| - \delta)_+^\beta \times S(\overline{NC_{j,m}(k)}) \quad (151)$$

where $\hat{C}_{j,m}(k)$ are the decomposition coefficients to be retained in the reconstruction and quantity is defined as $$\overline{NC_{j,m}(k)} = \frac{|NC_{j,m}(k)|}{\max_{(j,m) \in T} \{|NC_{j,m}(k)|\}} \quad (152)$$

The softer logic mapping, S:[0,1][0,1], is a non-linear, monotonically increasing sigmoid functional. A comparison of the hard and softer logic masking functionals is depicted in FIG. 47.

In 2D image processing, it is often important to preserve the image gradient along the xy-direction. For this purpose, we modify the aforementioned softer logic functional to $$\hat{C}_{j,m}(k) = C_{j,m}(k) S\left(\frac{NC_{j,m}(k) - \zeta}{1 - \zeta}\right) \quad (153)$$

where $\zeta$ is a normalized adaptive threshold. For an unknown noise level, an useful approximation to $\zeta$ is given by $$\zeta = \gamma_{upper} \hat{\sigma} \sqrt{2 \log NN} \quad (154)$$

where $\hat{\sigma}$ is a scaling factor conveniently chosen as $\hat{\sigma} = 1/1.349$. The quantity $\gamma_{upper}$ is an upper frame boundary of the wavelet transform, i.e. the upper boundary singular value of the wavelet decomposition matrix. Using arguments similar to those given by Donoho [9], one can show that the above Softer Logic Masking reconstruction is a nearly optimal approximation in the minimax error sense.

Experimental Results

To test our new approaches, standard benchmark 512×512 Y-component images are employed. Generally, the possible noise sources include photoelectric exchange, photo spots, the error of image communication, etc. The noise causes the visual perception to generate speckles, blips, ripples, bumps, ringings and aliasing. The noise distortion not only affects the visual quality of the images, but also degrades the efficiency of data compression and coding. De-noising and smoothing are extremely important for image processing.

The traditional image processing techniques can be classified as two kinds: linear or non-linear. The principle methods of linear processing are local averaging, low-pass filtering, band-limit filtering or multi-frame averaging. Local averaging and low-pass filtering only preserve the low band frequency components of the image signal. The original pixel strength is substituted by an average of its neighboring pixels (within a square window). The mean error may be improved but the averaging process will blur the silhouette and finer details of the image. Band-limited filters are utilized to remove the regularly appearing dot matrix, texture and skew lines. They are useless for noise whose correlation is weaker. Multi-frame averaging requires that the images be still, and the noise distribution stationary. These conditions are violated for motion picture images or for a space (time)-varying noisy background.

The traditional image quality is characterized by a mean square error (MSE), which possesses the advantage of a simple mathematical structure. For a discrete signal $\{s(n)\}$ and its approximation $\{\hat{s}(n)\}$, n=0, ..., N, the MSE can be defined to be $$MSE = \frac{1}{N} \sum_{n=0}^{N-1} [\hat{s}(n) - s(n)]^2 \quad (155)$$

However, the MSE based evaluation standard, (such as PSNR=log[(255'255)/MSE]), can not exactly evaluate the image quality if one neglects the effect of human perception. The minimum MSE rule will cause strong undulations of the image level and destroy the smooth transition information around the pixels. Commonly used regularization methods may degrade the image edges and result in visual blur.

Generally, unsatisfactory traditional image processing is always defined on the whole space (time) region, which does not localize the space (time)-frequency details of the signal. New theoretical research shows that non-Guassian and non-stationary characteristics are important components in human visual response. Human visual perception is more sensitive to image edges which consist of sharp-changes of the neighboring gray scale because it is essentially adaptive and has variable lens and focuses for different visual environments. To protect edge information as well as remove noise, modem image processing techniques are predominantly based on non-linear methods. Before the smoothing process, the image edges, as well as perceptually sensitive texture must be detected. The commonly used non-linear filtering approaches include median filtering, and weighting average, etc. Median filtering uses the median value within the window instead of the original value of the pixel. This method causes less degradation for slanted functions or square functions, but suppresses the signal impulses, which are shorter than half of the window length. This will degrade the image quality. The most serious shortcomings of weighting average method are that the weighting-window is not adaptive, and large-scale, complicated calculations are required to generate pixel values. If the window is made wider, more details will be removed.

More efficient human-vision-system-based image processing techniques possess the advantages of 1) large range de-correlation for convenience of compression and filtering; 2) high perceptual sensitivity and robustness; 3) filtering according to human visual response. It therefore can enhance the most important visual information, such as edges, while suppressing the large scale of flat regions and background. In addition 4) it can be carried out with real-time processing.

The space (time)-scale logarithmic response characteristic of the wavelet transform is similar to the HVS response. Visual perception is sensitive to narrow band low-pass components, and is insensitive to wide band high frequency components. Moreover, from research in neurophysiology and psychophysical studies, the direction-selective cortex filtering is very much like a 2D-wavelet decomposition. The high-pass coefficients of the wavelet transform can be regarded as the visible difference predictor (VDP).

Utilizing the modified wavelet analysis-Visual Group-Normalized Wavelet Transform (VGN-WT) presented in this disclosure, we can correct the drawback that the raw magnitudes of the transform coefficients do not exactly yield the perceptual strength of digital images. By use of the soft logic masking technique, the non-linear filtering provides edge-preservation for images, which removes the haziness encountered with commonly used filtering techniques.

The first test result is for the so-called "Lena" image, which possesses clear sharp edges, strong contrast and brightness. The second picture tested is "Barbara". The high texture components and consequently high frequency edges in the Barbara image create considerable difficulties for commonly used filtering techniques. A simple low-pass filter will smooth out the noise but will also degrade the image resolution, while a simple high-pass filter can enhance the texture edges but will also cause additional distortion.

We choose 2D half-band Lagrange wavelets as the testing analysis tools for image processing. The four 2D wavelets are shown in FIG. 48.

As shown in FIG. 49(a) and FIG. 50(a) respectively, adding Gaussian random noise degrades the original Lena and Barbara images. The median filtering (with a 3×3 window) result of Lena is shown in FIG. 49(b). If it is edge-blurred with low visual quality, the speckled noise has been changed into bumps. This phenomenon is even more serious for the Barbara image, which has many textures and edges. These features always create severe difficulties for image restoration. As shown in FIG. 49(c) and FIG. 50(c), it is evident that our perceptual DAF wavelet technique yields better contrast and edge-preservation results and provides high quality visual restoration performance.

CONCLUSION

This disclosure discusses the design of interpolating wavelets based on Lagrange functions, as well as their application in image processing. A class of biorthogonal Lagrange interpolating wavelets is studied with regard to its application in signal processing (especially for digital images). The most attractive property of the interpolating wavelets is that the wavelet multiresolution analysis is realized by discrete sampling. Thus pre- and post-conditioning processings are not needed for an accurate wavelet analysis. The wavelet coefficients are obtained from linear combinations of sample values rather than from integrals, which implies the possibility of using parallel computation techniques.

Theoretically, our approach is closely related to the finite element technique for the numerical solution of partial differential equations, the subdivision scheme for interpolation approximations, multi-grid methods and surface fitting techniques. In this disclosure, we generalize the definition of interpolating Lagrange wavelets and produce three different biorthogonal interpolating Lagrange wavelets, namely Halfband Lagrange wavelets, B-spline Lagrange wavelets and Gaussian-Lagrange DAF wavelets.

Halfband Lagrange wavelets can be regarded as an extension of Dubuc interpolating functionals, auto-correlation shell wavelet analysis and halfband filters. B-spline Lagrange Wavelets are generated by B-spline windowing of a Lagrange functional, and lead to increased smoothness and localization compared to the basic Lagrange wavelets.

Lagrange Distributed Approximating Functionals (LDAF) can be regarded as scaling functions (wavelet-DAFs) and associated DAF-wavelets can be generated in a number of ways [41]. Both DAFs and DAF-wavelets are smoothly decay in both time and frequency representations. The present work extends the DAF approach to signal and image processing by constructing new biorthogonal DAF-wavelets and associated DAF-filters using a lifting scheme [32].

In the first part of our image processing application, we combine two important techniques, the coefficient normalization method and softer logic visual masking based on Human Vision Systems (HVS). The resulting combined technique is called Visual Group Normalization (VGN) processing [31]. The concept of Visual Loss-less Quantization (VLQ) presented in [39] can lead to a potential breakthrough compared to the traditional Shannon rate-distortion theory in information processing.

We also employ a modified version of Donoho's Soft Threshold method for image restoration, termed the Softer Logic Perceptual Masking (SLM) technique, for dealing with extremely noisy backgrounds. This technique better preserves the important visual edges and contrast transition portions of an image than the traditional Donoho method and is readily adaptable to human vision.

Computational results show that our Lagrange wavelet based VGN processing is extremely efficient and robust for digital image blind restoration and yields the best performance of which we are aware, when applied to standard Lena and Barbara images.

REFERENCES

[1] R. Ansari, C. Guillemot, and J. F. Kaiser, "Wavelet construction using Lagrange halfband filters," IEEE Trans. CAS, vol. 38, no.9, pp. 1116–1118, 1991.

[2] R. Baraniuk, D. Jones, "Signal-dependent time-frequency analysis using a radially Gaussian kernel," Signal Processing, Vol. 32, pp. 263–284, 1993.

[3] C. M. Brislawn, "Preservation of subband symmetry in multirate signal coding," IEEE Trans. SP, vol. 43, no.12, pp. 3046–3050, 1995.

[4] C. K. Chui, An Introduction to Wavelets, Academic Press, New York, 1992.

[5] C. K. Chui, Wavelets: A Tutorial in Wavelet Theory and Applications, Academic Press, New York, 1992.

[6] I. Daubechies, "Orthonormal bases of compactly supported wavelets", Comm. Pure and Appl. Math., vol. 41, no. 11, pp. 909–996, 1988.

[7] I. Daubechies, "The wavelet transform, time-frequency localization and signal analysis," IEEE Trans. Inform. Theory, Vol. 36, No. 5, pp. 961–1003, September 1990.

[8] G. Deslauriers, S. Dubuc, "Symmetric iterative interpolation processes," Constructive Approximations, vol. 5, pp. 49–68, 1989.

[9] D. L. Donoho, "De-noising by soft-threshold," IEEE Trans. Information Theory, vol. 41, no. 3, pp. 613–627, 1995.

[10] D. L. Donoho, "Interpolating wavelet transform," Preprint, Stanford Univ., 1992.

[11] S. Dubuc, "Interpolation through an iterative scheme", J. Math. Anal. and Appl., vol. 114, pp. 185–204, 1986.

[12] A. Harten, "Multiresolution representation of data: a general framework," SIAM J. Numer. Anal., vol. 33, no. 3, pp. 1205–1256, 1996.

[13] C. Herley, M. Vetterli, "Orthogonal time-varying filter banks and wavelet packets," IEEE Trans. SP, Vol. 42, No. 10, pp. 2650–2663, October 1994.

[14] C. Herley, Z. Xiong, K. Ramchandran and M. T. Orchard, "Joint Space-frequency Segmentation Using Balanced Wavelet Packets Trees for Least-cost Image Representation," IEEE Trans. Image Processing, vol. 6, pp. 1213–1230, September 1997.

[15] D. K. Hoffman, N. Nayar, O. A. Sharafeddin, and D. J. Kouri, "Analytic banded approximation for the discretized free propagator," J. Physical Chemistry, vol. 95, no. 21, pp. 8299–8305, 1991.

[16] L. C. Jain, N. M. Blachman, and P. M. Chapell, "Interference suppression by biased nonlinearities," IEEE Trans. IT, vol. 41, no. 2, pp. 496–507, 1995.

[17] N. Jayant, J. Johnston, and R. Safranek, "Signal compression based on models of human perception", Proc. IEEE, vol. 81, no. 10, pp. 1385–1422, 1993.

[18] J. Kovacevic, and M. Vetterli, "Perfect reconstruction filter banks with rational sampling factors," EEE Trans. SP, Vol. 41, No. 6, pp. 2047–2066, June 1993.

[19] J. Kovacevic, W. Swelden, "Wavelet families of increasing order in arbitrary dimensions," Submitted to IEEE Trans. Image Processing, 1997.

[20] A. F. Laine, S. Schuler, J. Fan and W. Huda, "Mammographic feature enhancement by multiscale analysis," IEEE Trans. MI, vol. 13, pp. 725–740, 1994.

[21] S. Mallat, "A theory for multiresolution signal decomposition: the wavelet representation," IEEE Trans. PAMI, Vol.11, No7, pp. 674–693, July 1989.

[22] Y. Meyer, Wavelets Algorithms and Applications, SIAM Publ., Philadelphia 1993.

[23] K. Ramchandran, M. Vetterli, "Best wavelet packet bases in a rate-distortion sense," IEEE Trans. Image Processing, Vol. 2, No. 2, pp. 160–175, April 1993.

[24] K. Ramchandran, Z. Xiong, K. Asai and M. Vetterli, "Adaptive Transforms for Image Coding Using Spatially-varying Wavelet Packets," IEEE Trans. Image Processing, vol. 5, pp. 1197–1204, July 1996.

[25] O. Rioul, M. Vetterli, "Wavelet and signal processing," EEE Signal Processing Mag., pp. 14–38, October 1991.

[26] N. Saito, G. Beylkin, "Multiscale representations using the auto-correlation functions of compactly supported wavelets," IEEE Trans. Signal Processing, Vol. 41, no. 12, pp. 3584–3590,1993.

[27] M. J. Shensa, "The discrete wavelet transform: wedding the a trous and Mallat algorithms", EEE Trans. SP, vol. 40, no. 10, pp. 2464–2482, 1992.

[28] Z. Shi, Z. Bao, "Group-normalized processing of complex wavelet packets," Science in China (Serial E), Vol. 26, No. 12, 1996.

[29] Z. Shi, Z. Bao, "Group-normalized wavelet packet signal processing", Wavelet Application IV, SPIE, vol. 3078, pp. 226–239, 1997.

[30] Z. Shi, Z. Bao, "Fast image coding of interval interpolating wavelets," Wavelet Application IV, SPIE, vol. 3078, pp. 240–253, 1997.

[31] Z. Shi, G. W. Wei, D. J. Kouri, and D. K. Hoffman, "Perceptual image processing using Gauss-Lagrange distributed approximating functional wavelets," submitted to IEEE SP Letter, 1998.

[32] W. Swelden, "The lifting scheme: a custom-design construction of biorthogonal wavelets," Appl. And Comput. Harmonic Anal., vol. 3, no. 2, pp. 186200, 1996.

[33] T. D. Tran, R. Safranek, "A locally adaptive perceptual masking threshold model for image coding," Proc. ICASSP, 1996.

[34] M. Unser, A. Adroubi, and M. Eden, "The $L_2$ polynomial spline pyramid," IEEE Trans. PAMI, vol. 15, no. 4, pp. 364–379, 1993.

[35] P. Vaidyanathan, T. Chen, "Role of anti-causal inverse in multirate filter-banks-Part I: system-theoretic fundamentals," IEEE Trans. SP, Vol. 43, No. 5, pp. 1090–1102, May 1995.

[36] P. Vaidyanathan, T. Chen, "Role of anti-causal inverse in multirate filter-banks-Part II: the FIR case, factorizations, and biorthogonal lapped transforms," IEEE Trans. SP, Vol. 43, No. 5, pp.1103–1115, May 1995.

[37] M. Vetterli, C. Herley, "Wavelet and filter banks: theory and design," IEEE Trans. SP, Vol. 40, No. 9, pp. 2207–2232, September 1992.

[38] J. D. Villasenor, B. Belzer, and J. Liao, "Wavelet filter evaluation for image processing," IEEE Trans. IP, vol. 4, no. 8, pp1053–1060, 1995.

[39] A. B. Watson, G. Y. Yang, J. A. Solomon, and J. Villasenor, "Visibility of wavelet quantization noise," IEEE Trans. Image Processing, vol. 6, pp. 1164–1175, 1997.

[40] G. W. Wei, D. S. Zhang, D. J. Kouri, and D. K. Hoffman, "Lagrange distributed approximating Functionals," Physical Review Letters, Vol. 79, No. 5, pp. 775–779, 1997.

[41] G. W. Wei, D. J. Kouri, and D. K. Hoffman, "Wavelets and distributed approximating functionals," submitted to Phys. Rev. Lett.

[42] Z. Xiong, K. Ramchandran and M. T. Orchard, "Space-frequency Quantization for Wavelet Image Coding," IEEE Trans. Image Processing, vol. 6, pp. 677–693, May 1997.

[43] S. H. Zhang, Z. Bao, etc. "Target extraction from strong clutter background," Tech. Rep., National Key Lab, of Radar Signal Processing, Xidian University, 1994

Image Enhancement Normalization

Introduction

Medical image, such computed tomography (CT), magnetic resonance image (MRI), X-ray mammogram, ultrasound and angiography, is one of major methods for field diagnosis. In particular, X-ray mammogram is widely recognized as being the only effective method for the early detection of breast cancer. Major advances in screen/film mammograms have been made over the past decade, which result in significant improvements in image resolution and film contrast without much increase in X-ray dose. In fact, mammogram films have the highest resolution in comparison to various other screen/film techniques. However, many breast cancers cannot be detected just based on manunogram images because of poor visualization quality of the image. This is due to the minor difference in X-ray attenuation between normal glandular tissues and malignant disease, which leads to the low-contrast feature of the image. As a result, early detection of small tumors, particularly for younger women who have denser breast tissue, is still extremely difficult.

Mammogram image processing has drawn a great deal of attention in the past decades [1–9]. Most work focuses on noise reduction and feature enhancement. The statistical noise level is relatively low for images obtained by the modern data acquisition techniques. Therefore feature enhancement is more essential for mammogram quality improvement. Since an image noise reduction algorithm was reported earlier [10], we shall focus on image enhancement in this work. In our opinion, there are two basic ideas for mammogram feature improvement. One type of methods is to change image spectrum distribution so as to increase image edge densities. As a result, the image appears sharper. The other approach is the so-called image windowing, in which linear or nonlinear grayscale mappings are defined so as to increase/compress image gradient density according to device.

In an early work, one of present authors realized that the frequency responses of wavelet transform subband filters are not uniform. A magnitude normalization algorithm was proposed to account for this uniform feature [11, 12]. This idea was later extended to group normalization for the wavelet packet transform [13] and visual group normalization for still image noise reduction [10] by present authors. In this work we further extend this idea to achieve image enhancement.

Our first approach is based on a rearrangement of image spectrum distribution by edge enhancement normalization of wavelet coefficients. Our second technique utilized a multiscale functional to obtained device adapted visual group normalization of wavelet coefficients. Numerical experiments indicate that our normalization approach provides excellent enhancement for low quality mammogram image in combination with the use of the biorthogonal interpolating wavelets [10] generated by Gaussian Lagrange distributed approximating functionals [14].

Edge Enhancement Normalization

Mallat and Zhong realized that Wavelet multiresolution analysis provides a natural characterization for multiscale image edges, and those manipulations can be easily achieved by various differentiations [15]. Their idea was extended by Laine et al [7] to develop directional edge parameters based on subspace energy measurement. An enhancement scheme based on complex Daubechies wavelets was proposed by Gagnon et al. [9]. These authors made use of the difference between real part and imaginary part of the wavelet coefficients. One way or another, distorted wavelet transforms are designed to achieve desired edge enhancement.

Our starting point is magnitude normalized or visual group normalized wavelet subband coefficients $NC_{j,m}(k)$ [10, 12]. We define an enhancement functional $E_{j,m}$ $$E_{j,m} = \alpha_{j,m} + \beta_{j,m}\Delta \tag{156}$$

where $\Delta$ is the Laplacian and $-1 \leq \alpha_{j,m} \leq 1$. Coefficients $\alpha_{j,m}$, $\beta_{j,m}$ can be easily chosen so that desired image features are emphasized. In particular it enables us to emphasize an image edge of selected grain size. We note that a slightly modification of $\alpha_{j,m}$ and $\beta_{j,m}$ can result in orientation selected image enhancement. A detailed discussion of this matter will be presented elsewhere. An overall re-normalization is conducted after image reconstruction to preserve the energy of the original image. We call this procedure enhancement normalization.

Device Adapted Visual Group Normalization

Contrast stretching is old but quite efficient method for feature selective image display. Nonlinear stretching has been used by many authors [3, 7, and 16]. Lu and coworkers [16] has recently designed hyperbolic function $g_j(k)$=[tenh(ak+b)+tanh(b)]/[tanh(a−b)+tanh(b)] for wavelet multiscale gradient transformation. Their method works well for moon images. The basic idea is to use gradient operators to shape a fat image data so that desired portion of the image is projected into a screen window. However, in most approaches, the perceptual response of human visual system is not appropriately accounted. The human visual system is adaptive and has variable lens and focuses for different visual environments. We propose a human visual response corrected grayscale gradient mapping technique for selected contrast enhancement.

The human visual system is adaptive and has variable lens and focuses for different visual environments. Using a just-noticeable distortion profile, one can efficiently remove the visual redundancy from the decomposition coefficients [17] and normalize them with respect to the importance of perception. A practical simple model for perception efficiency has been presented to construct the "perceptual lossless" response magnitude $Y_{j,m}$ for normalizing according to visual response, $$Y_{j,m} = a10^{k\left(\log\frac{2^j f_0 d_m}{R}\right)^2} \tag{157}$$

where k is a constant, R is the Display Visual Resolution (DVR), $f_0$ is the spatial frequency, and $d_m$ is the directional response factor. A perceptual lossless quantization matrix $Q_{j,m}$ is [10]

$$Q_{j,m} = 2Y_{j,m}\lambda_{j,m} \tag{158}$$

where $\lambda_{j,m}$ is a magnitude normalized factor. This treatment provides a simple human-vision-based threshold technique for the restoration of the most important perceptual information in an image. For grayscale image contrast stretching, we first appropriately normalize the decomposition coefficients according to the length scale, L, of the display device [16] so that they fall in interval of [0,1] of the device frame $$NC_{j,m}(k) = Q_{j,m}C_{j,m}(k)/L \tag{159}$$

We then use a nonlinear mapping to obtain desired contrast stretching $$\overline{NC_{j,m}} = \gamma_{j,m}X_{j,m}(NC_{j,m}) \tag{160}$$

where constant $\gamma_{j,m}$ and function $X_{j,m}$ is appropriately chosen so that desired portion of the grayscale gradient is stretched or compressed. For example, function $$X_{j,m}(x) = \frac{\tan a_{j,m}(x - b_{j,m}) + \tan a_{j,m}b_{j,m}}{\tan a_{j,m}(1 - b_{j,m}) + \tan a_{j,m}b_{j,m}} \tag{161}$$

can been tuned to stretch any portion the of grayscale gradient. This procedure shall be called device adapted visual group normalization.

Experimental Result

To test our new approaches, low-contrast and low quality breast mammogram images are employed. Mammograms are complex in appearance and signs of early disease are often small or subtle. Digital mammogram image enhancement is particularly important for aiding radiologists and for the development of automatically detecting expert system. A typical low quality front-view image is shown in FIG. 51(a). The original image is coded at 512×512 pixel size with 2 bytes/pixel and 12 bits of gray scale. We have conducted edge enhancement normalization and device adapted visual group normalization. As shown in FIG. 51(b), there is a significant improvement in both edge representation and image contrast. In particular, the domain and internal structure of high-density cancer tissues are clear displayed. FIG. 52(a) is an original 1024×1024 side-view breast image which has been digitized to 200 micron pixel edge with 8 bits of gray scale. Enhanced image result is depicted in FIG. 52(b). In this case we obtain a similar result in the previous one.

CONCLUSION

Edge enhancement normalization (EEN) and device adapted visual group normalization (DAVGN) are proposed for image enhancement without prior knowledge of the spatial distribution of the image. Our algorithm is a natural extension of earlier normalization techniques for image processing. Biorthogonal interpolating distributed approximating functional wavelets are used for our data representation. Excellent experimental performance is found for digital mammogram image enhancement.

REFERENCES

[1] R. Gordon and R. M. Rangayan, "Feature enhancement of film mammograms using fixed and adaptive neighborhoods," *Applied Optics*, vol. 23, no. 4, pp. 560–564, February 1984.

[2] A. P. Dhawan and E. Le Royer, "Mammographic feature enhancement by computerized image processing," *Comput. Methods and Programs in Biomed.*, vol. 27, no. 1, pp. 23–35, 1988.

[3] P. G. Tahoces, J. Correa, M. Souto, C. Gonzalez, L. Gomez, and J. J. Vidal, "Enhancement of chest and breast radiographs by automatic spatial filtering," *IEEE Trans. Med. Imag.*, vol. 10, no. 3, pp. 330–335, 1991.

[4] S. Lai, X. L1, and W. F. Bischof, "On techniques for detecting circumscribed masses in mammograms," IEEE Trans. Med. Imag., vol. 8, no. 4, pp. 377–386, 1989.

[5] M. Nagao and T. Matsuyama, "Edge preserving smoothing," *Comput. Graphics and Image Processing*, vol. 9, no. 4, pp. 394–407, 1979.

[6] A. Scheer, F. R. D. Velasco, and A. Rosenfield, "Some new image smoothing techniques," *IEEE Trans. Syst., Man. Cyber.*, vol. SMC-10, no. 3, pp. 153–158, 1980.

[7] A. F. Laine, S. Schuler, J. Fan, and W. Huda, "Mammographic feature enhancement by multiscale analysis," *IEEE Trans. Med. Imag.*, vol. 13, no. 4, 1994.

[8] J. Lu, D. M. Healy Jr., and J. B. Weaver, "Contrast enhancement of medical images using multiscale edge representation," *Optical Engineering*, in press.

[9] L. Gagnon, J. M. Lina, and B. Goulard, "Sharpening enhancement of digitized mammograms with complex symmetric Daubechies wavelets," preprint.

[10] Zhuoer Shi, G. W. Wei, D. J. Kouri, and D. K. Hoffman, "Percepual image processing using Gaussian-Lagrange distributed approximating functional wavelets," *IEEE SP Lett.*, submitted.

[11] Zhuoer Shi and Zheng Bao, "Group-normalized processing of complex wavelet packets," *Science in China, Ser. E*, Vol. 40, No. 1, pp. 28–43, February, 1997.

[12] Zhuoer Shi and Zheng Bao, "Group-normalized wavelet packet signal processing," SPIE, Vol. 3078, pp. 226–239, 1997

[13) ZhuoerShi and ZhengBao, "Group normalized wavelet-packet transform," *IEEE Trans. CAS II*, in press, 1998.

[14] G. W. Wei, D. S. Zhang, D. J. Kouri and D. K. Hoffman, "Lagrange distributed approximating functionals," *Phys. Rev. Lett.*, vol. 79, no. 5, pp. 775–779, 1997.

[15] S. Mallat, and S. Zhong, "Characterization of Signals from multiscale edges," *IEEE Trans. PAMI*, vol. 14, no. 7, pp. 710–732, 1992.

[16] J. Lu, and D. M. Healy, Jr., "Contrast enhancement via multiscale gradient transform," preprint.

[17] A. B. Watson, G. Y. Yang, J. A. Solomon and J. Villasenor, "Visibility of wavelet quantization noise," *IEEE Trans. Image Processing*, vol. 6, pp. 1164–1175, 1997.

Varying Weight Trimmed Mean Filter for The Restoration of Impulse Corrupted Images

Introduction

Images are often corrupted by impulse noise due to a noisy sensor or channel transmission errors. Impulse interference may be broadly defined as corruption which is random, sparse, and of high or low amplitude relative to local signal values. Impulse noise seriously affects the performance of various signal processing techniques, e.g. edge detection, data compression, and pattern recognition. One of the tasks of image processing is to restore a high quality image from a corrupted one for use in subsequent processing. The goal of image filtering is to suppress the noise while preserving the integrity of significant visual information such as textures, edges and details. Nonlinear techniques have been found to provide more satisfactory results than linear methods. One of the most popular nonlinear filters is the median filter [1–2], which is well-known to have the required properties of suppressing the impulse noise and preserving the edges. However, it is also true that the median filter is not optimal. It suppresses the true signal as well as noise in many applications. Many modifications and generalizations of the median filter have been proposed [3–8] for improving its performance.

In reference [8], we presented a generalized trimmed mean filter (GTMF), which is essentially a generalization to the alpha-trimmed mean filter ($\alpha$-TMF) [5–6]. In GTMF, a "median basket" is employed to select a predetermined number of pixels on both sides of the median value to the sorted pixels of the moving window. The luminance values of the selected pixels and the value of the center pixel in the window are then weighted and averaged to give the filtering output. As mentioned in [8], it is important to have the center pixel participate in the averaging operation when removing additive noise, but one usually sets the weight of the center pixel to zero when filtering impulse-noise-corrupted images.

Although the GTMF outperforms many well known methods in removing highly impulse noise corrupted images, it can be further modified to improve the filtering performance. In GTMF, the averaging weights are predetermined and fixed throughout the filtering procedure. In this disclosure, a varying weight function is designed and applied to GTMF. We give it a new name, varying weight trimmed mean filter (VWTMF). In VWTMF, the argument of the weight function is the absolute difference between the luminance values in the median basket and the median value. Because we only concentrate on filtering impulse-noise-corrupted images in this disclosure, the weight of the center pixel in the moving window is always assumed to be zero. For most effectively removing impulse noise, we combine the VWTMF with a switching scheme [9] as a impulse detector and an iterative procedure [8] is employed to improve the filtering performance.

Varying Weight Trimmed Mean Filter

The pixels $\{I_1, I_2, \ldots, I_{m-1}, I_m, I_{m+1}, \ldots, I_n\}$ in the moving window associated with a pixel $I_c$, have been sorted in an ascending (or descending) order in the same way as in the conventional median filtering technique, with $I_m$ being the median value. The key generalization to the median filter which is introduced in the alpha-trimmed mean filter ($\alpha$-TMF) [5,6] is to design a median basket in which to collect a given number of pixels above and below the median pixel. The values of these pixels are then averaged to give the filtering output, $A_c$, as an adjusted replacement value to $I_c$, according to $$A_c = \frac{1}{2L+1} \sum_{j=m-L}^{m+L} I_j \tag{162}$$

where $L = \lfloor \alpha n \rfloor$, with $0 \leq \alpha \leq 0.5$. It is evident that a single-entry median basket (L=0) $\alpha$-TMF is equivalent to the median filter and a n-entry median basket ($L = \leq \lfloor 0.5 \rfloor$) is equivalent to the simple moving average filter. The generalized trimmed mean filter (GTMF) [8] uses a median basket in the same way as is does in the α-TMF to collect the pixels. The luminance values in the median basket and the center pixel $I_c$ in the window are then weighted and averaged to give the GTMF output:

$$G_c = \frac{w_c I_c + \sum_{j=m-L}^{m+L} w_j I_j}{w_c + \sum_{j=m-L}^{m+L} w_j} \tag{163}$$

where $G_c$ is the GTMF output, and $w_c$ and the $w_j$'s are the weights. It is interesting to see that when $w_c=0$ and all $w_j$'s are equal to each other (nonzero), the GTMF becomes the α-TMF. When all weights except $w_m$ are equal to zero, it becomes the standard median filter. In the GTMF, the values of the weights are predetermined before filtering and are fixed during the filtering procedure. However, it is possible to further improve the GTMF by varying the weights according to absolute difference between the luminance values in the median basket and the median value. For the removal of impulse noise, we set $w_c=0$ and modify the GTMF by varying the weights, so the varying weight trimmed mean filter (VWTMF) is given by $$V_c = \frac{\sum_{j=m-L}^{m+L} w(x_j) I_j}{\sum_{j=m-L}^{m+L} w(x_j)} \tag{164}$$

where, $x_j$ is a value in the range of [0,1] defined by $$x_j = \frac{|I_j - I_m|}{B} \tag{165}$$

with B being the maximum pixel value of a given type of image (e.g., B=255 for a 8 bit gray-scale image). The weight $w(x)$ in Equation (166) is a decreasing function in the range [0,1] and is taken to be $$w(x) = e^{-A\left(\frac{x}{x-1}\right)^2}. \tag{166}$$

The above weight function for A=2 is displayed in FIG. 53. Notice that $w(0)=1$ and $w(1)=0$, $w(x_m)=1$ is always the largest weight and the greater the difference between the pixel value and the median value, the smaller will be the weight. We anticipate that the VWTMF will outperform both the median filter and the α-TMF in suppressing impulse noise, while preserving the image edges. As is well known, the median value has the least probability to be impulse noise corrupted because the impulses are typically presented near the two ends of the sorted pixels. However, the median value may not be optimal because it may differ significantly from the noise-free value. The α-TMF will not perform better than the median filter when treating impulse noise corrupted images in the absence of any other technique (such as the switching scheme) because the corrupted pixels may be also selected to the median basket for the averaging operation. In contrast, the VWTMF which uses a weighted averaging operation can alleviate the shortcomings of both filters. The weight of the median value is the large stand the weights of other luminance values in the median basket vary according to their differences from the median value. If a impulse corrupted pixel $I_j$ happens to be selected for inclusion in the median basket, its contribution to the average will be small because $x_j$ is large. In general, the weight function can assist the VWTMF in eliminating the impulse noise while providing a well adjusted replacement value for the center pixel $I_c$.

It must be noted that although the present implementation of the VWTMF employs Equation (166) as the weight function, other monotonically decaying functions in the range of [0,1] may also be selected.

The Switching Scheme Based Iterative Method

Many algorithms have been proposed to detect and replace impulse noise corrupted pixels of a image [9–12]. In this disclosure, a switching scheme similar to that used in reference [9], based on the VWTMF, is employed to detect impulse noise and recover the noise-free pixels. The filtering output $I_c$, is generated according to the following algorithm $$I'_c = \begin{cases} I_c^{(i)}, & |I_c^{(i)} - V_c| < T \\ V_c, & |I_c^{(i)} - V_c| \geq T \end{cases} \tag{167}$$

where $I_c^{(i)}$ is the initial input value and $V_c$ is given in Equation (164). A threshold T is chosen to characterize the absolute difference between $I_c^{(i)}$ and $V_c$. If the difference is larger the threshold, it implies that the pixel differs significantly from its neighbors. It is therefore identified as an impulse noise corrupted pixel, and is then replaced by $V_c$. If the difference is smaller than the threshold, it implies that the original is similar to its statistical neighbors, and we identify it as noise-free pixel, and it therefore retains its original value.

Iteration of the above scheme will further improve the filtering performance, especially for images that are highly corrupted by impulse noise. The iteration procedure can be expressed as $$I_c(t) = \begin{cases} I_c^{(i)}, & |I_c^{(i)} - V_c(t)| < T \\ V_c(t), & |I_c^{(i)} - V_c(t)| \leq T \end{cases} \tag{168}$$

where $I_c(t)$ is the system output at time t with $I_c(0)=I_c^{(i)}$, $V_c t(t)$ is the VWTMF filtering output given by $$V_c(t) = \frac{\sum_{j=m-L}^{m+L} w(x_j|t-1) I_j(t-1)}{\sum_{j=m-L}^{m+L} w(x_j|t-1)} \tag{169}$$

Note that it is important for the iterative procedure always to compare $V_c(t)$ with the initial input $I_c^{(i)}$ and to update the output with $I_c^{(i)}$ when their absolute difference is less than the threshold T.

Numerical Experiments

The standard 8 bit, gray-scale "Lena" image (size 512×512) is used as an example to test the usefulness of our filtering algorithm. We degraded it with various percentages of fixed-value (0 or 255) impulse noise. The proposed algorithm is compared with the median filtering and α-TMF algorithms, and their peak signal-to-noise ratio (PSNR) performances are listed in TABLE 3.

TABLE 3

Comparative Filtering Results in PSNR for Lena Image Corrupted with Different Amount of Fixed Impulse Noise

| Algorithm* | 15% | 20% | 25% | 30% | 35% | 40% |
|---|---|---|---|---|---|---|
| Median | 32.19 dB | 31.48 dB | 30.69 dB | 29.91 dB | 29.37 dB | 28.75 dB |
| α-TMF | 32.09 dB | 31.30 dB | 30.39 dB | 29.28 dB | 28.38 dB | 27.49 dB |
| VWTMF | 32.31 dB | 31.67 dB | 30.89 dB | 30.12 dB | 29.63 dB | 29.06 dB |
| Median Switch | 35.20 dB | 33.87 dB | 32.91 dB | 31.84 dB | 30.99 dB | 30.29 dB |
| α-TMF Switch | 36.04 dB | 34.93 dB | 33.97 dB | 32.59 dB | 31.67 dB | 30.72 dB |
| VWTMF Switch | 36.34 dB | 35.13 dB | 34.29 dB | 33.15 dB | 32.24 dB | 31.43 dB |

*All algorithms are implemented recursively for optimal performance.

Both direct and switch-based application of the filters are presented in TABLE 3 for comparison, and all algorithms are implemented recursively in a 3×3 window for optimal performance (The same iterative procedure is used for all the switching scheme based algorithms.) A 3-entry median basket (L=1) is used for both α-TMF and VWTMF algorithms. The A used in the VWTMF weight function is 2 for images with 15%, 20%, 25%, and 30% impulse noise, and is 3 with 35% impulse noise, and is 4.5 with 40% impulse noise. The threshold used for the switching schemes is 28.

From TABLE I, it is easy to see that without the switching scheme, the α-TMF performs even worse than the median filter. However, it performs better than the median filter when the switching scheme is used. This reflects the fact that although the α-TMF may not perform well in impulse noise removal, it is a good impulse detector. The VWTMF performs better than either the median filter or the α-TMF, whether the switching scheme is used or not. It is simple, robust and efficient. The VWTMF performs well in removing impulse noise, and is simultaneously a good impulse detector. It is especially efficient for filtering highly impulse noise corrupted images. FIG. 54 shows the original noise-free image, the impulse noise corrupted image (40% impulse noise), and the filtered results for several algorithms. One can observe from FIG. 54 that even if there is no switching scheme employed, the VWTMF performs better than either the median filter or the α-TMF in terms of suppressing noise and preserving edges. The α-TMF performs even worse than the median filter when no switching scheme is employed. Many speckles still remain in the α-TMF filtered image. However, the VWTMF-based switching scheme provides a result that is almost the same as the original noise-free image.

CONCLUSIONS

This disclosure presents a new filtering algorithm for removing impulse noise from corrupted images. It is based on varying the weights of the generalized trimmed mean filter (GTMF) continuously according to the absolute difference between the luminance values of selected pixels in the median basket and the median value. Numerical results show that the VWTMF is robust and efficient for noise removal and as an impulse detector. Although the VWTMF is only used for removing impulse noise in this disclosure, we expect that it also will be useful for removing additive noise.

REFERENCES

[1] A. Rosenfeld and A. C. Kak, Digital Picture Processing, New York: Academic Press, 1982, Vol. 1.

[2] I. Pitas, Digital Image Processing Algorithms, Prentice Hall, 1993.

[3] D. R. K. Brownring, "The weighted median filter," Comm. Assoc. Comput. Mach., Vol. 27, pp. 807–818, 1984.

[4] H. M. Lin and A. N. Willson, "Median filters with adaptive length," IEEE Trans. Circuits Syst., Vol. 35, pp. 675–690, 1988.

[5] J. B. Bednar and T. L. Watt, "Alpha-trimmed means and their relationship to median filters," IEEE Trans. Acoust., Speech, and Signal Processing, Vol. ASSP-32, pp. 145–153, 1984.

[6] Y. H. Lee, S. A. Kassam, "Generalized median filtering and related nonlinear filtering techniques," IEEE Trans. Acoust., Speech, and Signal Processing, Vol. ASSP-33, pp. 672–683, 1985.

[7] P. K. Sinha and Q. H. Hong, "An improved median filter", IEEE Trans. Medical Imaging, Vol. 9, pp. 345–346, 1990.

[8] D. S. Zhang, Z. Shi, D. J. Kouri, and D. K. Hoffman, "A new nonlinear image filtering technique," Optical Engr., Submitted.

[9] T. Sun and Y. Neuvo, "Detail-preserving median based filters in image processing," Pattern Recognition Letter, Vol. 15, pp. 341–347, 1994.

[10] R. Sucher, "Removal of impulse noise by selective filtering," IEEE Proc. Int. Conf. Image Processing, Austin, Tex., November 1994, pp. 502–506.

[11] E. Abreu, M. Lightstone, S. K. Mitra, and K. Arakawa, "A new efficient approach for the removal of impulse noise from highly corrupted images," IEEE Trans. Image Processing, Vol. 5, pp. 1012–1025, 1996.

[12] Z. Wang and D. Zhang, "Restoration of impulse noise corrupted images using long range correlation," IEEE Signal Processing Letter, Vol. 5, pp. 4–7, 1998.

A new Nonlinear Image Filtering Technioue

Introduction

Images are often corrupted by noise that seriously affects the performance of various signal processing techniques, data compression, and pattern recognition. The goal of noise filtering is to suppress the noise while preserving the integrity of significant visual information such as textures, edges and details. Linear local averaging filters are essentially low pass filters. Because the impulse responses of the low pass filters are spatially invariant, rapidly changing signals such as image edges and details, cannot be well preserved. Consequently, impulse noise cannot be effectively removed by linear methods; nonlinear techniques have been found to provide more satisfactory results. Some of the most popular nonlinear filters are the median filter [1], and its various generalizations [2–8], which are well known to have the required properties for edge preservation and impulse noise removal. However, the median filter is not optimal since it is typically implemented uniformly across the image. It suppresses the true signal as well as noise in many applications. In the presence of impulse noise, the median filter tends to modify pixels that are not degraded. Furthermore, it is prone to produce edge jitter when the percentage of impulse noise is large. In order to improve the performance of the median filter, two median based filters, namely the α-trimmed mean (α-TM) [5–6] filter and the modified trimmed mean (MTM [6] filter, which select from the window only the luminance values close to the median value, have been proposed. The selected pixels are then averaged to provide the filtering output. Although superior to the median filter in some applications, these algorithms still have problems. In general, the MTM outperforms the median filter in removing additive noise at the cost of increased computational complexity, but not as well as the median filter in removing impulse noise. The α-TM filter is in general superior to the median filter as an impulse detector, but its performance in removing impulse noise is not so well. As is shown in the test example of this disclosure, the α-TM filter performs even worse than the median filter when no impulse detection techniques are employed. Nevertheless, when the level of impulse noise is high, the α-TM filter is not optimal for detection, since the selected pixels may have a large probability of being corrupted by impulse noise. Removal of additive noise is a problem for the α-TM and MTM filters because of not taking account of the central pixel in the window.

A new filtering technique is disclosed, using what we call a generalized trimmed mean (GTM) filter, which in general outperforms α-TM and MTM filters for images that are highly corrupted by impulse or additive noise. The GTM filter is based on a generalization of the α-TM filter. In addition to the commonly used moving spatial window Φ(m,n), a symmetric median basket is employed to collect a predetermined number of pixels on both sides of the median value of the sorted pixels in the window. The luminance values of the collected pixels and the central pixel in the window are weighted and averaged to obtain an adjusted value G(m,n) for the central pixel (m,n). For the removal of additive noise, it is very useful to have the central pixel participate in the averaging operation because the probability of the luminance value of the central pixel to be the closest to the noise-free value is larger than for the other pixels. However, when impulse noise is presence, we usually set the weight of the central pixel to zero because the impulse-noise-corrupted pixels are independent to the noise-free pixels. For images that are highly corrupted with impulse noise, it is in general effective to require the selected values in the median basket to have different weights in order that the impulses selected for the basket not affect the filtering output very much. Furthermore, in the procedure of impulse noise removal, the proposed filter is combined with a switching scheme [9] to produce an impulse detector to preserve the noise-free pixels exactly, while providing an optimal approximation for the noise-corrupted pixels. Many impulse detection algorithms have been proposed [9–12]. In [9], a median filter-based switching impulse detector is employed. The basic idea is to calculate the absolute difference between the median filtered value and the input value for each pixel. If the difference is larger than a given threshold, the output is the median filtered value; otherwise, the output equals the input value. We do the same except that we replace the median filter with the GTM filter. In order to remove impulse noise effectively, we here propose a new iteration scheme which generally improves the performance of the filter. We use both the output of the last iteration and the initial input as the input in the current iteration calculation. The GTM filter is applied to the output of last iteration to give an intermediate output. If the absolute difference between the initial input and the intermediate output is larger than a predetermined threshold T, the current output is the intermediate output, otherwise, the current output is the initial input. In contrast to the traditional iteration technique, our iteration scheme does not use the output of the last iteration to do the switching operation (the second step).

Generalized Trimmed Mean Filter

In the commonly-used median filtering procedure, the luminance value of a pixel is replaced by the median value in a neighboring spatial window $$\Phi(m,n)=([m-W,m+W]\times n-W,n+W]) \tag{170}$$

The size of this moving square window is thus N=(2W+1)×(2 W+1). Let the median luminance value in this spatial window be denoted as $$M(m,n)=\text{Median}(\{I(i,j)\}|I(i,j))\in\Phi(m,n) \tag{171}$$

where I(i,j) is the luminance value at pixel (i,j). We reorganize the pixels in the window as a new list according to the ascending order of their luminance values $$I'(-\lfloor(N-1)/2\rfloor)\leq \ldots \leq I'(-1)\leq I'(0)\leq I'(1)\leq \ldots \leq I'(\lfloor N+1)/2\rfloor) \tag{172}$$

where I'(0) is the median value in the neighborhood of pixel (m,n), i.e., I'(0)=M(m,n).

The key generalization to median filtering introduced in the alpha-trimmed mean (α-TM) filter [5–6] is to design a symmetric median basket according to luminance value in order to combine a given number of pixels on both sides of the median value of the sorted pixels in the window. The collected pixels are then averaged to give the filtering output, as follows $$A(m,n) = \frac{1}{2L+1}\sum_{i=-L}^{L} I'(i) \tag{173}$$

where L=⌊αN⌋ with 0≤α≤0.5. When α=0, it becomes the median filter, and when a0.5, it becomes the simple moving average. In general, the α-TM filter outperforms the median filter in detecting the impulse. However, its capability of removing the impulse noise is even worse than for the median filter when no additional procedure is employed (such as the switching scheme). When an image is corrupted by high levels of impulse noise, the α-TM filter does not perform well, since the pixels being selected for the median basket now have a large probability of being impulse corrupted. It is therefore unreasonable for the α-TM filter to have the pixels in the basket equally weighted. Another generalization to the median filtering is the so called modified trimmed mean (MTM) filter [6]. In the MTM filter, a container C(m,n) is employed to select the pixels whose luminance values are in the range of [M(m,n)−q, M(m,n)+q], with q being a predetermined threshold. The mean value of the selected values in the container is taken as the filtering output.

$$T(m,n) = \text{Mean}(\{I(i,j)\}|I(i,j)) \gamma C(m,n) \quad (174)$$

Like the α-TM filter, the MTM filter can also be reduced to the median filter (at q=0) or the simple moving average (at q=255 for 8 bpp gray scale image). The MTM filter is useful for removing additive noise but does not perform as well as the median filter when impulse noise removal is required, since impulse noise corrupted pixels are independent of the noise-free pixels.

There is still one problem left for the α-TM and MTM filters where additive noise removal is concerned; they do not take special account of the luminance value of the central pixel in the window. As is well known, the value of the central pixel, in general, has a larger probability of being the closest to its true value than those of all other pixels in the window. We therefore design the generalized trimmed mean (GTM) filter which improves the performance of both the α-TM and MTM filters. In the first step of the new filter in process, we employ the median basket to collect those pixels whose luminance values are close to the median value, in the same way as is done in the α-TM filter. The difference between our algorithm and the α-TM algorithm is that a weighted averaging is performed using the values selected for the median basket, as well as the value of the central pixel (In general, the central pixel is used in removing the additive noise.). Thus, $$G(m, n) = \frac{w_c I(m, n) + \sum_{i=-L}^{L} w_i I'(i)}{w_c + \sum_{i=-L}^{L} w_i} \quad (175)$$

where $w_c$ and $w_i$'s are the weights for the central pixel and the pixels in the median basket respectively. When $w_c=0$ and all $w_i$'s are the same, it becomes the α-TM filter. Where filtering impulse noise corrupted images is concerned, we usually set $w_c=0$ because the amplitude and the position of the impulse is independent of the original true signal. Compared with the α-TM filter, the GTM filter is usually more efficient when highly impulse noise corrupted images are to be filtered. For such an image, the weight $w_0$ for the median value is usually chosen to be higher than those of other pixels in the median basket because the median pixel usually has the least probability to be corrupted by impulse noise. Smaller weights for the pixels other than the median pixel can serve as an adjustment for the filtering output, which is important in the iteration calculation. The problems of applying the α-TM filter to highly impulse noise corrupted images is that the weights for the pixels other than the median pixel are too large, which may give filtering results that are still highly corrupted. As explained above, because the GTM filter includes the central pixel in the averaging operation, it is reasonable to expect that its performance in removing additive noise will be improved compared to the α-TM and MTM filters.

For the removal of impulse noise, a switching scheme [9] based on our GTM filter is employed to detect the impulse noise corrupted pixels. The filtering output I(m,n) for a pixel (m,n) is generated by the following algorithm:

$$I(m, n) = \begin{cases} I_i(m, n), & |I_i(m, n) - G(m, n)| < T \\ G(m, n), & |I_i(m, n) - G(m, n)| \geq T \end{cases} \quad (176)$$

where $I_i$ is the original input pixel value and T is the switching threshold used to test the difference between the original input and output of the GTM filter.

a) If the difference is larger than T, it implies that the pixel differs significantly from its neighbors. It is therefore identified as a noise corrupted pixel, and is replaced by G(m,n).

b) If the difference is smaller than T, it implies the original pixel is similar to its statistical neighbors, and we identify it as noise free, therefore retaining its original input value.

For more seriously impulse-noise-corrupted images, an iterative application of the above procedure is used to improve the filtering performance. The iteration processing can be summarized as $$I(m, n|t) = \begin{cases} I_i(m, n), & |I_i(m, n) - G(m, n|t)| < T \\ G(m, n|t), & |I_i(m, n) - G(m, n|t)| \geq T \end{cases} \quad (177)$$

where I(m,n|t) is the system output at time t, G(m,n|t) is the intermediate output obtained by applying [6] to I(i,j|t−1) with (i,j)∈Φ(m,n). To initialize the algorithm, we set I(i,j|0)=$I_i$(i,j). The above procedure can be expressed compactly as $$I(m,n)|t) = I_i(m,n)S(m,n|t) + G(m,n|t)[1 - S(m,n|t)] \quad (178)$$

where the step function S(m,n |t) is defined by $$S(m, n | t) = \begin{cases} 1, & |I_i(m, n) - G(m, n|t)| < T \\ 0, & |I_i(m, n) - G(m, n|t)| \geq T \end{cases} \quad (179)$$

It is important for the iteration procedure to always compare G(m,n|t) with the initial input $I_i$(m,n) and update the filtering output with $I_i$(m,n) when their difference is less than the threshold T. It is not good to use I(m,n|t−1) instead of $I_i$(m,n) to either do the comparison or updating operation.

Example Applications

To test the proposed filtering technique, the benchmark 8 bpp gray-scale image, "Lena", size 512×512, is corrupted with different percentages of fixed value impulse noise (40% and 60%), and the Gaussian noise with peak signal-to-noise ratio (PSNR) 18.82 dB respectively. The symmetric moving window size is 3×3, with a 3-entry median basket used for both cases. The PSNR, mean square error (MSE) and mean absolute error (MAE) comparisons of several different filtering algorithms are shown in TABLE 4 for impulse noise and TABLE 5 for Gaussian noise.

TABLE 4

Comparative Filtering Results for Lena Image with Fixed Impulse Noise

| | Impulse (40%) | | | Impulse (60%) | | |
|---|---|---|---|---|---|---|
| Algorithm* | PSNR (dB) | MSE | MAE | PSNR (dB) | MSE | MAE |
| No Denoising | 9.29 | 7659.43 | 51.03 | 7.54 | 11467.21 | 76.45 |
| Median (3 × 3) | 28.75 | 86.79 | 4.72 | 23.38 | 298.71 | 7.25 |
| Median (5 × 5) | 28.15 | 99.65 | 5.21 | 26.15 | 157.65 | 6.54 |
| α-TM (3 × 3) | 27.49 | 115.86 | 6.05 | 23.44 | 294.41 | 10.70 |
| Median Switch (3 × 3) [5] | 30.29 | 60.77 | 2.54 | 23.73 | 275.26 | 5.50 |
| α-TM Switch (3 × 3) | 30.72 | 55.15 | 2.33 | 26.66 | 140.31 | 4.52 |
| GTM Switch (3 × 3) | 31.18 | 49.55 | 2.22 | 27.57 | 113.84 | 3.98 |

*All algorithms are implemented recursively for optimal PSNR and MSE performance. All switching algorithms are iterated in the same way and the switching threshold T is 28. Three-entry median basket are used in the α-TM and the new algorithms. The weights for our algorithm are $w_{-1}:w_0:w_1:w_c = 1:14:1:0$.

TABLE 5

Comparative Filtering Results for Lena Image with Gaussian Noise

| Algorithm | PSNR (dB) | MSE | MAE |
|---|---|---|---|
| No Denoising | 18.82 | 853.07 | 23.71 |
| Median (3 × 3) | 27.60 | 112.97 | 7.72 |
| Median (5 × 5) | 27.39 | 118.41 | 7.53 |
| MTM (3 × 3) | 28.23 | 97.74 | 7.39 |
| α-TM (3 × 3) | 28.13 | 100.10 | 7.33 |
| GTM (3 × 3) | 28.38 | 94.48 | 7.04 |

*All algorithms are implemented recursively for optimal PSNR and MSE performance. Three-entry median basket are used in the last two algorithms. The weights for our algorithm are $w_{-1}:w_0:w_1:w_c = 1:1:1:10$. The threshold q for the MTM algorithm is optimized to 100.

Figure 55A:
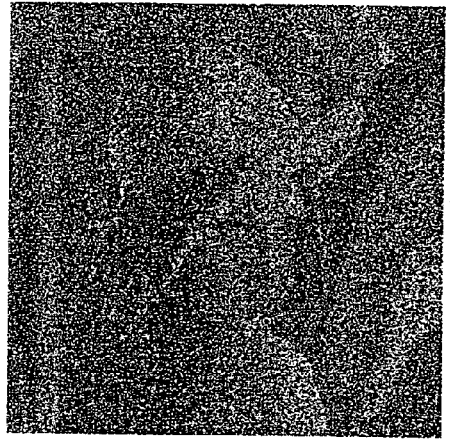
Figure 55B:
Figure 55C:
Figure 55D:
Figure 56A:
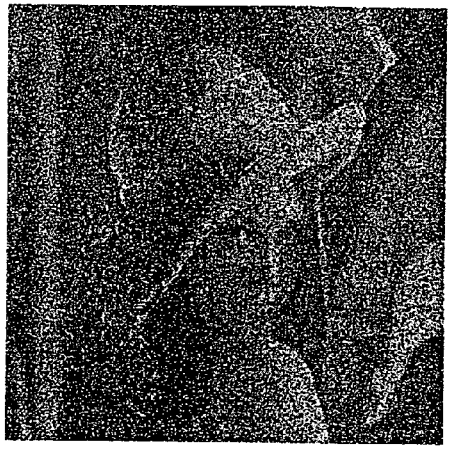
Figure 56B:
Figure 56C:
Figure 56D:

The filtering parameters are also shown in the TABLES 4 and 5. All algorithms are implemented recursively for optimal PSNR and MSE performance. The new iteration scheme proposed in this disclosure also has been implemented with α-TM filter for filtering of impulse noise. It is evident from TABLE 4 that our GTM filter-based switching scheme yields improved results compared to both the median and α-TM filter-based switching schemes. In general, the α-TM filter-based switching scheme performs better than the median filter-based switching scheme. However, without the switching scheme, the α-TM filter performs even worse than the median filter for such highly impulse-noise-corrupted images, showing that although the α-TM filter is a good impulse detector, it is not good at removing impulse noise by itself. As shown in FIG. 55(a), the original Lena image is degraded by adding 60% impulse noise. FIG. 55(b) is the filtering result using the method of Sun and Neuvo [9] with a 3×3 window and switching threshold of T=28. One can observe both blur and speckles on the image; the 3×3 window is not suitable for applying the median filtering algorithms for such a high-noise image. These speckles can be removed by increasing the window size from 3×3 to 5×5 but at the expense of even more blurring after many iterations. FIG. 55(c) shows our filtering result with the same switching threshold. It is seen that our algorithm yields improved results. Because our algorithm is implemented in a 3×3 window, it is possible to preserve more detail of the image than the algorithm of Sun and Neuvo [9] implemented in a 5×5 window with many iterations. The remaining small number of speckles can be removed by filtering using a 5×5 window once (with the same basket-weight vector) and then continuing to iterate using the 3×3 window; see FIG. 55(d). For the 40% impulse noise corrupted Lena image in FIG. 56(a), the filtering performance is compared with commonly used median filters having different window size. In order to remove the speckles from the image, the median filters must introduce some blurring and aliasing to the image FIGS. 56(b) and 56(c)), while our filtering result is significantly improved (FIG. 56(d)) in comparison. For the filtering of highly impulse-noise-corrupted images, the performance is usually improved when the median value is given a larger weight than other pixels in the median basket. TABLE 5 shows that it is reasonable to include the luminance value of the central pixel in the averaging operation for the removing of Gaussian noise. With a weight of the central pixel larger than those of other pixels in the median basket, improving iteration performance can be obtained in removing additive noise.

CONCLUSIONS

In this disclosure, we present a new algorithm for image-noise removal. A given number of significant luminance values on both sides of the median value of the sorted pixels in the neighboring window are bundled with the central pixel and weighted to obtain a modified luminance estimate (MLE) for the central pixel. For the removal of impulse noise, a threshold selective-pass technique is employed to determine whether the central pixel should be replaced by its MLE. A new iterative processing is designed to improve the performance of our algorithm for highly impulse noise corrupted images. For effectively removing additive noise, it is useful for the filtering technique to include the value of the central pixel as one of the values being averaged. Numerical experiments show that our technique is simple, robust and efficient, and leads to significant improvement over other well-known methods.

REFERENCES

[1] A. Rosenfeld and A. C. Kak, *Digital Picture Processing*, New York: Academic Press, Vol. 1, 1982.
[2] H. M. Lin and A. N. Willson, "Median filters with adaptive length," *IEEE Trans. Circuits Syst.*, Vol. 35, pp. 675–690, June 1988.
[3] D. R. K. Brownrigg, "The weighted median filter," *Comm. Assoc. Comput. Mach.*, Vol. 27, pp. 807–818, 1984.
[4] S.-J. Ko and Y. H. Lee, "Center weighted median filters and their applications to image enhancement," *IEEE Trans. Circuits Syst.*, Vol. 38, pp. 984–993, September 1991.
[5] J. B. Bednar and T. L. Watt, "Alpha-trimmed means and their relationship to median filters," *IEEE Trans. Acoust. Speech, Signal Processing*, Vol. ASSP-32, pp. 145–153, 1984.
[6] Y. H. Lee and S. A. Kassam, "Generalized median filtering and related nonlinear filtering techniques," *IEEE Trans. Acoust., Speech, Signal Processing*, Vol. ASSP-33, pp. 672–683, 1985.
[7] S. Peterson, Y. H. Lee, and S. A. Kassam, "Some statistical properties of the alpha-trimmed mean and standard type M filters," *IEEE Trans. Acoust., Speech, and Signal Processing*, Vol. ASSP-36, pp. 707–713, 1988.
[8] W.-R. Wu and A. Kundu, "A new type of modified trimmed mean filter," in *Nonlinear Image Processing II.*, E. R. Dougherty, G. R. Arce, and C. G. Boncelet, Jr., Eds. San Joes, California: SPIE, 1991, Vol. 1451, pp. 13–23.

[9] T. Sun, Y. Neuvo, "Detail-preserving median based filters in image processing," *Pattern Recognition Letter*, Vol. 15, pp. 341–347, April 1994.

[10] R. Sucher, "Removal of impulse noise by selective filtering", *IEEE Proc. Int. Conf Image Processing*, Austin, Tex., November 1994, pp. 502–506.

[11] E. Abreu, M. Lightstone, S. K. Mitra, and K. Arakawa, "A new efficient approach for the removal of impulse noise from highly corrupted images," *IEEE Trans. Image Processing*, vol. 5, pp. 1012–1025, June 1996.

[12] Z. Wang, D. Zhang, "Restoration of impulse noise corrupted images using long-range correlation," *IEEE Signal Processing Letter*, Vol. 5, pp. 4–7, January 1998.

Biomedical Signal Processing Using a new Class of Wavelets

Introduction

In general, signal filtering and processing may be regarded as a kind of approximation problem with noise suppression. According to DAF theory [1], a signal approximation in DAF space can be expressed as $$\hat{g}(x) = \sum_i g(x_i) \delta_\alpha(x - x_i) \quad (180)$$

where the $\delta_\alpha(x)$ is a generalized symmetric Delta functional sequence. We choose it as a Gauss modulated interpolating shell, or the so-called distributed approximating functional (DAF) wavelet. The Hermite-type DAF wavelet is given in the following equation [2].

$$\delta_M(x|\sigma) = \frac{1}{\sigma} \exp\left(\frac{-x^2}{2\sigma^2}\right) \sum_{n=0}^{M/2} \left(\frac{-1}{4}\right)^n \frac{1}{\sqrt{2\pi}\, n!} H_{2n}\left(\frac{x}{\sqrt{2}\,\sigma}\right) \quad (181)$$

The function $H_{2n}$ is the Hermite polynomial of even order, 2n. The qualitative behavior of one particular Hermite DAF is shown in FIG. 57.

Different selections of interpolating shells result in different DAFs. Theoretically, this kind of functional can be regarded as the smoothing operator or the scaling function in wavelet theory. It can be used to generate the corresponding wavelets (differential functionals) for signal analysis. The discrete wavelet transform is implemented using filterbanks.

Additionally, the continuous type of DAF wavelet is used to construct DAF wavelet neural nets. The DAF wavelet neural nets possess a modified form the commonly used DAF approximation, given as $$\hat{g}(x) = \sum_i w(i) \delta_\alpha(x - x_i) \quad (182)$$

The weights w(i) of the nets determine the superposition approximation $\hat{g}(x)$ to the original signal $g(x) \in L^2(R)$. It is easy to show that the weights of the approximation nets, w(i), are closely related to the DAF sampling coefficients $g(x_i)$. If the observed signal is limited to an interval I containing a total of N discrete samples, I={0, 1, ..., N−1}, the square error of the signal is digitized according to $$E_A = \sum_{n=0}^{N-1} [g(n) - \hat{g}(n)]^2 \quad (183)$$

This cost function is commonly used for neural network training in a noise-free background and is referred to as the minimum mean square error (MMSE) rule. However, if the observed signal is corrupted by noise, the network produced by MMSE training causes an unstable reconstruction, because the MMSE recovers the noise components as well as the signal. MMSE may lead to Gibbs-like undulations in the signal, which is especially harmful for calculating accurate derivatives. Thus, we present a novel regularization design of the cost function for network training. It generates edge-preserved filters and reduces distortion. To achieve this, an additional smooth derivative term, $E_n$ is introduced to modify the original cost function. The new cost function is $$E = E_A + \lambda E_r \quad (184)$$
$$= \sum_k [g(k) - \hat{g}(k)]^2 + \lambda \int_R \left[\frac{\partial' \hat{g}(x)}{\partial x'}\right]^2 dx$$

The factor $\lambda$ introduces a compromise between the orders of approximation and smoothness. To increase the stability of the approximation system further, an additional constraint in state space is taken to be $$E_W = \frac{\sum_i |w(i)|^2}{\sum_i |g(x_i)|^2} \quad (185)$$

Thus the complete cost function utilized for DAF wavelet neural net training is given by $$E = E_A + \lambda E_r + \eta E_W \quad (186)$$
$$= \sum_k [g(k) - \hat{g}(k)]^2 + \lambda \int_R \left[\frac{\partial' \hat{g}(x)}{\partial x'}\right]^2 dx + \eta \frac{\sum_i |w(i)|^2}{\sum_i |g(x_i)|^2}$$

Mammogram Enhancement

Medical imaging, including computed tomography (CT), magnetic resonance imaging (MRI), X-ray mammography, ultrasound and angiography, includes some of the most useful methods for diagnosis. In particular, X-ray mammograms are widely recognized as being the most effective method for the early detection of breast cancer. Major advances in mammograms have been made over the past decade, which have resulted in significant improvements in image resolution and film contrast without much increase in X-ray dosage. In fact, mammogram films have the highest resolution in comparison of various other screen/film techniques. However, many breast cancers cannot be detected based on mammogram images because of the poor visualization quality of the image. There are also many false positives that result in substantial stress to patients and their families. Both types of difficulties are substantially due to the minor differences in X-ray attenuation between normal glandular tissues, benign formations and malignant disease, which leads to the low-contrast feature of the image. As a result, early detection of small tumors, particularly for younger women who have denser breast tissue, is still extremely difficult.

Mammogram image processing has recently drawn a great deal of attention [3–8]. Most work focuses on noise reduction and feature enhancement. The statistical noise level is relatively low for images obtained by modern data acquisition techniques. Therefore feature enhancement is more essential for mammogram quality improvement. Since an image noise reduction algorithm was reported earlier [9, 10], we shall focus on image enhancement in this work. In our opinion, there are two basic approaches for mammogram feature improvement. One type of method changes the image spectrum distribution so as to increase image edge densities. As a result, the image appears sharper. The other approach is the so-called image windowing, in which linear or nonlinear grayscale mappings are defined so as to increase/compress the image gradient density. In an earlier work, one of present authors realized that the frequency responses of wavelet transform subband filters are not uniform. A magnitude normalization algorithm was proposed to account for this non-uniform feature. This idea was later extended to group normalization for the wavelet packet transform [11, 12] and to visual group normalization for still-image noise reduction [13] by the present authors. In this work we further extend this idea to achieve image enhancement.

Our first approach is based on a rearrangement of the image spectrum distribution by an edge enhancement normalization of the wavelet coefficients. Our second technique utilizes a multiscale functional to obtain a device-adapted visual group normalization of the wavelet coefficients. Numerical experiments indicate that our normalization approach, in combination with the use of the DAF wavelets [13], provides excellent enhancement for low quality mammogram images.

To test our new approaches, low-contrast and low quality breast mammogram images are employed. Mammograms are complex in appearance and signs of early disease are often small or subtle. Digital mammogram image enhancement is particularly important for aiding radiologists in long distance consultation, image storage and retrieval, and for the possible development of automatic detecting expert systems. FIG. 58(*a*) is an original 1024×1024 side-view breast image which was obtained from the Mammographic Image Analysis Society (MIAS) and has been digitized to 8 bits of gray scale. The enhanced image result is depicted in FIG. 58(*b*), and shows significant improvement in image quality.

ECG Filtering

Automatic diagnosis of electrocardiogram (ECG or EKG) signals is an important biomedical analysis tool. The diagnosis is based on the detection of abnormalities in an ECG signal. ECG signal processing is a crucial step for obtaining a noise-free signal and for improving diagnostic accuracy. A typical raw ECG signal is given in FIG. 59. The letters P, Q, R, S, T and U label the medically interesting features. For example, in the normal sinus rhythm of a 12-lead ECG, a QRS peak follows each P wave. Normal P waves show 60–100 bpm with <10% variations. Their heights are <2.5 mm and widths <0.11 s in lead II. A normal PR interval ranges from 0.12 to 0.20s (3–5 small squares). A normal QRS complex has a duration of <0.12s (3 small squares). A corrected QT interval (QTc) is obtained by dividing the QT interval with the square root of the preceding R–R' interval (normally QTc=0.42s). A normal ST segment indicates no elevation or depression. Hyperkalaemia, hyperacute myocardial infarction and left bundle can cause an extra tall T wave. Small, flattened or inverted T waves are usually caused by ischaemia, age, race, hyperventilation, anxiety, drinking iced water, LVH, drugs (e.g. digoxin), pericarditis, PE, intraventricular conduction delay (e.g. RBBB) and electrolyte disturbance [20].

An important task of ECG signal filtering is to preserve the true magnitudes of the P, Q, R, S, T, and U waves, protect the true intervals (starting and ending points) and segments, and suppress distortions induced by noise. The most common noise in an ECG signal is AC interference (about 50 Hz–60 Hz in the frequency regime). Traditional filtering methods (low-pass, and band-elimination filters, etc.) encounter difficulties in dealing with the AC noise because the signal and the noise overlap the same band. As a consequence, experienced doctors are required to carry out time-consuming manual diagnoses.

Based on a time varying processing principle, a non-linear filter [14] was recently adopted for ECG signal de-noising. Similar to the selective averaging schemes used in image processing, the ECG is divided into different time segments. A sample point classified as "signal" is smoothed by using short window averaging, while a "noise" point is treated by using long window averaging. Window width is chosen according to the statistical mean and variance of each segment. However, this calculation is complicated and it is not easy to select windows with appropriate lengths. The regularized spline network and wavelet packets were later used for adaptive ECG filtering [12, 15], which is not yet efficient and robust for signal processing. In our present treatment, regularized DAF neural networks are used to handle a real-valued ECG signal. We utilize our combined group-constraint technique to enhance signal components and suppress noise in successive time-varying tilings.

The raw ECG of a patient is given in FIG. 60(*a*). Note that it has typical thorn-like electromagnetic interference. FIG. 60(*b*) is the result of a low-pass filter smoothing. The magnitudes of the P and R waves are significantly reduced and the Q and S waves almost disappear completely. The T wave is enlarged, which leads to an increase in the QT interval. Notably, the ST segment is depressed. Such a low-pass filtering result can cause significant diagnostic errors. FIG. 60(*c*) is obtained by using our DAF wavelet neural nets. Obviously, our method provides better feature-preserving filtering for ECG signal processing.

REFERENCES

[1] D. K. Hoffman, G. W. Wei, D. S. Zhang, D. J. Kouri, "Shannon-Gabor wavelet distributed approximating functional," Chemical Phyiscs Letters, Vol. 287, pp. 119–124, 1998.

[2] D. S. Zhang, G. W. Wei, D. J. Kouri, and D. K. Hoffman, "Numerical method for the nonlinear Fokker-Planck equation," Phys. Rev. E, Vol. 56, No. 1, pp. 1197–1206, 1997.

[3] A. P. Dhawan and E. Le Royer, "Mammographic feature enhancement by computerized image processing," Comput. Methods and Programs in Biomed., vol. 27, no. 1, pp. 23–35, 1988.

[4] L. Gagnon, J. M. Lina, and B. Goulard, "Sharpening enhancement ofdigitized mammograms with complex symmetric Daubechies wavelets," preprint.

[5] S. Lai, X. L1, and W. F. Bischof, "On techniques for detecting circumscribed masses in mammograms," IEEE Trans. Med. Imag., vol. 8, no. 4, pp. 377–386, 1989.

[6] A. F. Laine, S. Schuler, J. Fan, and W. Huda, "Mammographic feature enhancement by multiscale analysis," IEEE Trans. Med. Imag., vol. 13, no. 4, 1994.

[7] J. Lu, D. M. Healy Jr., and J. B. Weaver, "Contrast enhancement of medical images using multiscale edge representation," Optical Engineering, in press.

[8] P. G. Tahoces, J. Correa, M. Souto, C. Gonzalez, L. Gomez, and J. J. Vidal, "Enhancement of chest and 7breast radiographs by automatic spatial filtering," IEEE Trans. Med. Imag., vol. 10, no. 3, pp. 330–335, 1991.

[9] M. Nagao and T. Matsuyama, "Edge preserving smoothing," Comput. Graphics and Image Processing, vol. 9, no. 4, pp. 394–407, 1979.

[10] A. Scheer, F. R. D. Velasco, and A. Rosenfield, "Some new image smoothing techniques," IEEE Trans. Syst., Man. Cyber., vol. SMC-10, no. 3, pp. 153–158, 1980.

[11] Z. Shi and Z. Bao, "Group-normalized wavelet packet signal processing," Proc. SPIE, Vol. 3078, pp. 226–239, 1997.

[12] Z. Shi, Z. Bao, L. C. Jiao, "Nonlinear ECG filtering by group normalized wavelet packets", IEEE International Symposium on Information Theory, Ulm, Germany, 1997

[13] Z. Shi, G. W. Wei, D. J. Kouri, D. K. Hoffman, "Perceptual normalized subband image restoration," IEEE Symp. On Time-frequency and Time-scale Analysis, N. 144, pp. 469–472, Pittsburgh, Penn., Oct. 6–9, 1998.

[14] Z. Shi, "Nonlinear processing of ECG signal," B. Sc. Thesis, xidian Univ., 1991.

[15] Z. Shi, L. C. Jiao, Z. Bao, "Regularized spline networks," LJCNN'95, Beijing, China. (also J. Xidian Univ., Vol. 22, No. 5, pp. 78–86, 1995.)

[16] M. Unser, A. Aldroubi, and M. Eden, "B-spline signal processing: part I-theory," IEEE Trans. SP, Vol. 41, No. 2, pp. 821–833, February 1993

[17] M. Unser, A. Aldroubi, and M. Eden, "B-spline signal processing: part II-Efficient design and applications," IEEE Trans. SP, Vol. 41, No. 2, pp. 834–848, February 1993.

[18] A. B. Watson, G. Y. Yang, J. A. Solomon and J. Villasenor, "Visibility of wavelet quantization noise," IEEE Trans. Image Processing, vol. 6, pp. 1164–1175, 1997.

[19] G. W. Wei, D. S. Zhang, D. J. Kouri, and D. K. Hoffman, "Lagrange distributed approximating Functionals," Phys. Rev. Lett., Vol. 79, No. 5, pp. 775–779, 1997.

[20] The reader is referred to the website homepages-enterprise-net/djenkins.

Visual Group Normalization Using Gaussian-Lagrange DAFWs

Introduction

Distributed approximating functionals (DAFs) were introduced as a powerful grid method for quantum dynamical propagations [1]. DAFs can be regarded as scaling functions and associated DAF-wavelets are generated in a number of ways [2]. DAF-wavelets are smooth and decaying in both time and frequency domains and have been used for numerically solving linear and nonlinear partial differential equations with extremely high accuracy and computational efficiency. Typical examples include simulations of 3D reactive quantum scattering and 2D Navier-Stokes equation with non-periodic boundary conditions. The present work extends the DAF approach to image processing by constructing interpolating DAF-wavelets[3]. An earlier Group normalization (GN) technique [4] and human vision response [5] are utilized to normalize the equivalent decomposition filters (EDFs) and perceptual luminance sensitivity. The combined DAF Visual Group Normalization (VGN) approaches achieve robust image restoration result.

Interpolating DAF Wavelets

Interpolating wavelets are particularly efficient for calculation since their multiresolution spaces are identical to the discrete sampling spaces. Adaptive boundary treatments and irregular samplings can be easily implemented using symmetric interpolating solutions. We design the interpolating scaling function as an interpolating Gaussian-Lagrange DAF (GLDAF) [6]

$$\phi_M(x) = W_\sigma(x) P_M(x) \tag{187}$$

$$= W_\sigma(x) \prod_{i=-M, j \neq 0}^{M} \frac{x-i}{-i}$$

where $W_\sigma(x)$ is selected as a Gaussian window since it satisfies the minimum-frame-bound condition in quantum physics. Quantity $\sigma$ is width parameter. $P_M(x)$ is the Lagrange interpolation kernel. DAF dual scaling and wavelet functions are constructed for perfect reconstruction [3]. The Gaussian window efficiently smoothes out the oscillations, which plague many wavelet bases.

Visual Group Normalization

Wavelet transform is implemented by a tree-structure filtering iteration. The coefficients can be regarded as the output of a single equivalent decomposition filters EDF). Clearly, the decomposition coefficients cannot exactly represent the actual signal strength. As an adjusted solution, wavelet coefficients, $C_m(k)$, in block m should multiply with a magnitude scaling factor, $\lambda_m$. We define this factor as the reciprocal of the maximum magnitude of the EDF frequency response [4] (where $LC_m$ is m-th EDF response).

$$\lambda_{j,m} = \frac{1}{\sup_{\omega \in \Omega}\{|LC_{j,m}(\omega)|\}}, \quad \Omega = [0, 2\pi] \tag{188}$$

It is easy to find out that DAF's possess smaller sidelobes, which induce less frequency leakage distortion.

An image is human-vision-dependent source. Using a just-noticeable distortion profile, we can efficiently remove the visual redundancy as well as normalize the coefficients in respect to perception importance. A mathematical model for "perception lossless" matrix $Y_m$ has been presented in [5] and is used as perceptual normalization combined with the EDF magnitude normalization. (Noted here we use $\lambda_m$ for magnitude normalization not the wavelet "basis function amplitude" in [5], because the digital image decomposition is completely operated using filter banks) We denote the combination of the two normalized operations as Visual Group Normalization (VGN).

Experimental Results

To test our approaches, two benchmark 512×512 Y-component images are employed (Barbara with much texture and high frequency edges, while Lena with large area of flat region). The PSNR comparison results are shown in Table 3. It is evident that our technique yields better performance.

REFERENCES

[1] D. K. Hoffman, N. Nayar, O. A. Sharafeddin, and D. J. Kouri, "Analytic banded approximation for the discretized free propagator," *J. Physical Chemistry*, vol. 95, no. 21, pp. 8299–8305, 1991

[2] Z. Shi, D. J. Kouri, G. W. Wei, and D. K. Hoffman, "Generalized symmetric interpolating wavelets," *Computer Phys. Commun.*, in press.

[3] Z. Shi, G. W. Wei, D. J. Kouri, D. K. Hoffman, "Perceptual Normalized Subband Image Restoration," *IEEE Symp. On Time-frequency and Time-scale Analysis*, N. 144, pp. 469–472, Pittsburgh, Penn., Oct. 6–9, 1998.

[4] Z. Shi, Z. Bao, "Group-normalized wavelet packet signal processing", *Wavelet Application IV, Proceeding*. SPIE, Vol. 3078, pp. 226–239, Orlando, Fla., USA, 1997

[5] Andrew B. Watson, Gloria Y. Yang, Joshua A Solomon, and John Villasenor "Visibility of wavelet quantization noise," *IEEE Trans. Image Processing*, vol. 6, pp. 1164–1175, 1997.

[6] G. W. Wei, D. S. Zhang, D. J. Kouri, and D. K. Hoffman, "Lagrange distributed approximating Functionals," *Physical Review Letters*, Vol. 79, No. 5, pp. 775–779, 1997

[7] D. L. Donoho, "De-noising by soft-threshold," *IEEE Trans. Information Theory*, vol. 41, no. 3, pp. 613–627, 1995

Nonlinear Quincunx Filters

Introduction

The possible image noises include photoelectric exchange, photo spots, the error of image communication, etc. The noise causes the speckles, blips, ripples, bumps, ringings and aliasing that not only affects the visual quality, but also degrades the efficiency of data compression and coding. Developing de-noising and smoothing technique is important.

The popularly used noise model is Gaussian, since it is easy for linear (stationary) analysis. In practice, the further physical environments are more accurately modeled as impulsive, which characterized by heavy-tailed non-Gaussian distributions. Such noises include atmospheric noise (due to a lightening spike and spurious radio emission in radio communication), ice cracking and aquatic animal activity in sonar and marine communication, and relay switching noise in telephone channels. Moreover, a great variety of synthetic noise sources (such as automatic ignitions, neon lights, and other electronic devices) are also impulsive. Impulsive interference may be broadly defined as signal corruption that is random, sparse, and of high or low amplitude relative to nearby uncorrupted signal values. The performance of filter systems developed under the assumption of Gaussian condition are severely degraded by the non-Gaussian noise due to large deviations from normality in the tails. Independent on the physical environment, relatively infrequently occurring and non-stationary are the important features of impulse noise that we can not obtain an accurate statistical description. Therefore, it is impossible to design an optimal linear filtering systems based on the generalized likelihood ratio (GLR) principles. Consequently, by first suppressing the impulsive component and then operating on the modified signal with traditional linear system, near-optimal performance is obtained. The non-Gaussian nature of the impulse noise dictates that the suppression filter be nonlinear and robust due to the presence of impulses. Traditional image processing is always defined on the whole space (time) region, which does not localize the space (time)-frequency details of the signal. The mean error may be improved, but the averaging process will blur the silhouette and finer details.

New research shows that non-Gaussian and non-stationary characterize the human-visual-response (HVS) based image processing. Human visual perception is more sensitive to image edges which consist of sharp-changes of the neighboring gray scale because it is essentially adaptive and has variable lenses and focuses for different visual environments. To protect edge information as well as remove noise, modern image processing techniques are predominantly based on non-linear methods. Before the smoothing process, the image edges, as well as perceptually sensitive texture must be detected. Some of the most popular nonlinear solutions are the median filter [1] and its generalizations [2, 3], that possess the required properties for impulse noise removal. However, the median filter is not optimal since it is typically implemented uniformly across the image. It suppresses the true signal as well as the noise in many applications. In the presence of impulse noise, the median filter tends to modify pixels that are not degraded by noise. Furthermore, it is prone to produce edge jitter when the percentage of impulse noise is large.

A significant characteristic of the impulse noise is that only a portion of the pixels are corrupted and the rest are totally impulse-noise-free. The key point for filter design is the need to preserve the noise-free pixels exactly, while providing an optimal approximation for the noise-corrupted pixels. An impulse detector is required to determine the noise-corrupted pixels [4–8]. In [4], a median filter-based switching scheme is used to design the impulse detector. The basic idea is to calculate the absolute difference between the median filtered value and the original input value for each pixel. If the difference is larger than a given threshold, the output is the median filtered value; otherwise, the output is the original input value. However, using a single median filtered value can not increase the detection probability of impulse noise. In addition, median estimation is not optimal for high-percentage impulse-degraded image restoration. In this disclosure, we propose a so-called "median radius" to design a collecting basket. The "basket members", whose luminance values are close enough to median value, are weighted averaging to generate an adjustable impulse detector (optimal estimator). Noted here our technique is not the previously presented α-trim solutions [2]. For α-trim filtering, the median is calculated at first, then the pixels in a neighboring window are ordered according to the absolute difference from the median value (from minimum to maximum). The first three (or several) pixels (close to median) are weighted averaging to substitute the observed pixel luminance. In our method, we only collect the weighted pixels which are within the "median radius" (α-trim member may exceed this domain) for averaging. Additionally, a switching threshold is introduced to determine whether the observed pixel need filtering or not. Only the noise-corrupted one is changed.

To improve the filtering performance, a "quincunx moving window" is presented to define the arbitrary shaped neighborhood (traditional window is the trivial square shape). The research in neurophysiology and psychophysical studies shows that the direction-selective cortex filtering mimics the human vision system (HVS). These studies have found a redial frequency selectivity that is essentially symmetric with bandwidths nearly constant at one octave [12]. This feature is much like the 2-D quincunx decomposition. Theoretical analysis and simulation show that our quincunx filtering technique is quite robust and efficient for different noise background.

The disclosure is organized as follows: In Section I, the mathematical model of noise is described. In Section III, the image processing technique based on a quincunx filter is studied. Section IV concerns the arbitrary shape extension of the quincunx filter. A simulation is given in Section V. Section VI contains the conclusion.

Noise Model

Additive Random Noise

For a 2-D digital image, we assume the noise-free image value at pixel (m,n) is s(m,n), and I(m,n) is the observed image representation. If the observation model is a random noise corrupted case, the pixel value can be depicted as $$I(m,n)=s(m,n)+w(m,n) \quad (189)$$

where w(m,n) is the noise components, and its magnitude is random. Normally we assume w(m,n) is a Gaussian process with zero mean and standard deviation $\sigma_w$. For a non-stationary process, $\sigma_w$ is time-varying. The important characteristic of such noise is that all pixels may be degraded and the noise amplitude is statistically non-uniform.

Impulsive Noise

Normally, impulse noise is a result of a random process that the value of the corrupted pixel is either the minimum or a maximum value of a display instrument. The overall noise character could be positive (maximum), negative (minimum) or mixture (salt and pepper). The characteristic of such kind of noise is that the pixels are degraded with probability p. The noise model is expressed as $$v(m, n) = \begin{cases} e(m, n), & \text{with } p \\ I(m, n), & \text{with } 1 - p \end{cases} \quad (190)$$

where e(m,n) is a binary random number. For an 8-bit gray scale image representation (0=minima; 255=maxima), its value is $$e(m, n) = \begin{cases} 0, & \text{with } p_0 \\ 255, & \text{with } 1 - p_0 \end{cases} \quad (191)$$

The probability of the black (minimum) value is $p_0$ and the probability of the white (maximum) value is $1-p_0$. Normally for the positive impulse case, $p_0=0$; for the negative impulse case, $p_0=1$; and for the salt and pepper, $p_0=\frac{1}{2}$. Any alternation style can be obtained by different selection of the probability $p_0$.

More complex impulsive noise models are generated by a random magnitude degradation selection. The random value impulse noise array v(m,n) is represented as $$v(m,n)=z(m,n)r(m,n) \quad (192)$$

where the impulse generation r(m,n) is a random process representing an ever-present impulse component with standard deviation $\sigma_r$, and z(m,n) is a switching sequence of ones and zeros. Impulse noise seriously affects the performance of various signal-processing techniques, e.g. edge detection, data compression, and pattern recognition. A median filter is the commonly used nonlinear technique for impulse noise removal.

Assume we have fixed a median window (possibly with any size) for median filtering. Let $N_{m,n}$ denote the number of impulse-corrupted pixels in median window $\Phi(m,n)$ of node (m,n). If the window size is W(conventionally the 3×3 or 5×5 square window), then it is known that the error measure is $$E\{x_{med} \mid x_{med} = e(m, n)\} = \frac{E\{x_{med}\}}{1 - Pr[x_{med} = s(m, n)]} \quad (193)$$

where median estimation probability $Pr[x_{med}=s(m,n)]=Pr[N_{m,n} \leq (W-1)/2]$ is given in [5]. It is easy to conclude that when the corruption probability p is much higher, most possibly that $N_{m,n}>(W-1)/2$. This implies that the convincing probability (CP) of the median filtering ($Pr[x_{med}=s(m,n)]$) is very small (e.g. with small probability, the output of a median filter is close to the original noise-free value). In other words, a traditional median filter is invalid for highly noise-corrupted image processing. For a uniformly noise degraded background, no matter what size the selective window is, statistically the performance of median filtering cannot be optimized (because the probability $Pr[N_{m,n} \leq (W-1)/2]$ is the fixed statistically). Our objective is to improve the performance of nonlinear filtering and reduce the error measure above.

Nonlinear Filters

In the median filtering procedure, the luminance value of a pixel is replaced by the median value in a neighboring spatial square window $$\Phi(m,n)=([m-m_1, m+m_2] \times [n-n_1,n+n_2]) \quad (194)$$

The size of this moving rectangular window is $N=(m_1+m_2+1) \times (n_1+n_2+1)$. The conventional trivial windows are 3×3 or 5×5. Let the median luminance value in this spatial window be denoted as $$M(m,n)=\text{Median}\{I(m',n')|(m',n')|(m',n') \in \Phi\} \quad (195)$$

where I(m',n') is the luminance value at pixel (m',n'). We reorganize the pixels in the window as a new list according to the order of their luminance value.

$$I'(-\lfloor(N-1)/2\rfloor) \leq \ldots \leq I'(0) \leq \ldots \leq I'(N-\lfloor(N+1)/2\rfloor) \quad (196)$$

where I'(0) is exactly the median value in the neighborhood of pixel (m,n), $$I'(0)=M(m,n) \quad (197)$$

The key generalization to median filtering introduced in this disclosure is to design a "basket" according to luminance value in order to combine a group of pixels whose luminance levels are close to the median value of the window $\Phi(m,n)$. For each entry in this basket, a weighted average scheme is utilized to generate an adjusted median value as $$D(m, n) = \frac{\sum_{i \in \Omega} W_i I'(i)}{\sum_{i \in \Omega} W_i} \tag{198}$$

where $\Omega$ is the set of pixels whose luminance values are close to median value in the window. The different design of our method from the α-trimmed filter is that we introduce an adjustable basket. The median distance (MD) $\Lambda$ is defined as the absolute luminance difference between the observed value and the median filtered value M(m,n).

$$\Lambda(m,n) = |I(m,n) - M(m,n)| \tag{199}$$

Only the pixels whose median distances are within a median radius (MR) γ (e.g. $\Lambda(m,n) \leq \gamma$, γ>0), are selected as the "basket member" in $\Omega$ for weighted averaging. Otherwise, their weights are set to zero. Normally, $W_0$ is larger than or equal to the other weights $W_i$, i≠0. We call D(m,n) the modified luminance estimate (MLE) for pixel (m,n). Note that when the basket $\Omega$ contains only one pixel I'(0) or the median radius γ=0, the filter is identical to the median filter, i.e., the median filter is a special case of our presented nonlinear filters.

However, the modified luminance estimate (MLE) is not the ultimate filtered value to substitute the observed pixel. A switching scheme [2] based on MLE is employed to detect the impulse noise. The corresponding filtering output I(m,n) for a pixel (m,n) is generated by the following algorithm:

$$I(m, n) = \begin{cases} I_i(m, n), & |I_i(m, n) - D(m, n)| < T \\ D(m, n), & |I_i(m, n) - D(m, n)| \geq T \end{cases} \tag{200}$$

where $I_i$ is the original input image. A threshold T is used to test the difference between the original pixel value and the MLE value. The difference between the observed value I(m,n) and the adjusted median value D(m,n) from the basket can be regarded as the visible difference predictor (VDP).

a) If the difference is larger than the threshold, it implies that the pixel differs significantly from its neighbors. It is therefore identified as a noise corrupted pixel, and is replaced by D(m,n).

b) If the difference is smaller than the threshold, it implies the original pixel is similar to its statistical neighbors, and we identify it as noise free, therefore retaining its original value. For more seriously noise-corrupted images, an iterative application of the above procedure is required to obtain satisfactory performance. The iteration processing can be depicted as $$I(m, n | t) = \begin{cases} I_i(m, n), & |I_i(m, n) - D(m, n | t - 1)| < T \\ D(m, n | t - 1), & |I_i(m, n) - D(m, n | t - 1)| \geq T \end{cases} \tag{201}$$

where I(m,n|t) is the system output at time t, D(m,n|t−1) is the MLE value of pixel (m,n) at time t−1. To initialize the algorithm, we set I(m,n|0)=$I_i$(m,n). The above procedure can be simply expressed as $$I(m,n|t) = I_i(m,n)S(m,n|t) + D(m,n|t-1)[1 - S(m,n|t)] \tag{202}$$

where the step function S(m,n|t) is defined as $$S(m, n | t) = \begin{cases} 1, & |I_i(m, n) - D(m, n | t - 1)| < T \\ 0, & |I_i(m, n) - D(m, n | t - 1)| \geq T \end{cases} \tag{203}$$

and it determines which value will be assigned to the pixel.

The proposed nonlinear filtering includes two steps; the first step is to obtain the adjusted reference value MLE of the observed pixel using median distance-based algorithm, and the second step is utilizing an active switching process to determine if the observed pixel is substituted by the MLE or not. (Noted for the traditional median filtering or α-trimmed solution, the pixel is only substituted by the reference value without any switching process.) A special nonlinear process is designed to switch between the original pixel and MLE, depending upon the identification of the nature of the pixel. If the pixel is determined as noise-free, the original value should be preserved. Otherwise, it is replaced by the regressively weighted-median value.

Our filtering is like Olympic scoring procedure, the lowest score and highest scores (outside the median radius) are removed and the remaining scores are then averaged to obtain the evaluation of the participant. In our approach, we remove several of the lowest luminance values and several of the highest luminance values from the pixels in the window. The remaining luminance values are then weight-averaged to give the filtering output for the pixel. We may consider the weighted average as assigning different referees different weights in scoring the participants.

Theoretically, the MLE generation increases the probability $$Pr[x_{med} = s(m,n)] = Pr[N_{m,n} \leq (W-1)/2] \tag{204}$$

When the size of median basket is set to M, it equals to that the median window size W increases M times as MW, but with the same noise corrupted number $N_{m,n}$. In this case, the detection probability becomes $$Pr[x_{med} = s(m,n)] = Pr[N_{m,n} \leq (W-1)/2] \tag{205}$$

This implies that the modified filtered output is more likely equal to the original noise-free value.

Quincunx Extension

As shown in FIG. 61, the traditional median or averaging filter considers the pixels in a square region. The most popular size is a 3×3 or 5×5 window, which are used in the most popular papers and software packets (Photoshop and Lview, etc) on image processing. The filtering method or algorithm is applied in the square region (black pixels). One disadvantage of square window processing is that it can not adaptive to different noisy background and exist biases along the coordinate directions, or the spatial distance. This may cause visual distortion.

Actually, besides the basic square window, the median basket (or the operation region) possesses numerous extended solutions. For example, the 5×5 extension is shown in FIG. 62. The traditional square shape approach gives preferential treatment to the coordinate axes and only allows for rectangular divisions of the frequency spectrum. The symmetry axes and certain nonrectangular divisions of the frequency spectrum correspond better to the human vision system (HVS). These are typicallyconcerned with two and three dimensions, as the algebraic conditions in higher dimensions become increasingly cumbersome. The predominant advantages of quincunx filtering is that there is very little biasing along coordinate directions, the sampling is nearly isotropic; i.e. there is no mixing of different scales; computationally excellent compression of discontinuous functions; and a simple representation of operators. In the 5×5 region, the basket size (black dot number) can be (1, 5, 9, 13, 17, 21, and 25). Thus we will have more alternation to offset the influence of over-smoothing caused by large window (5×5) processing.

Moreover, some specially designed quincunx windows are conductive to remove the particular noise along different spatial direction, such as the quantization and thresholding noise of transform filtering and coding (discrete cosine transform (DCT) and wavelet transform (WT), etc.). Because the high-dimensional transforms (such as 2D DCT and wavelet transform) are usually the tensor products from 1D transform (filtering) along different spatial directions, the coefficient error in the transform domain causes the distortion in the physical domain with the shape of the basis function (2D cosine and wavelet function). It usually looks like a small "cross" impulse. Even for the complicated non-separable wavelet transform case, the distortion is just a "rotated cross". Some quincunx windows will match the exact correlation characteristics of transform noise, as well as obtain the optimal performance. These filters can be utilized as a post-processor after the transform-based image processing and thresholding techniques. In the next chapter, we will report our quincunx post-processing results for a wavelet thresholding technique.

Experimental Results

We now present the results of computer simulations to demonstrate the effectiveness of our proposed techniques. Two objective criteria, the signal-to-noise ratio (SNR) and signal-to-impulse ratio (SIR) are used to evaluate and compare the performance. The signal-to-noise ratio, which is given by $$SNR = 10\log_{10}\left(\frac{E\{s^2(m, n)\}}{E\{[s(m, n) - \hat{s}(m, n)]^2\}}\right) \quad (206)$$

is used to evaluate the overall performance of the proposed preprocessor including prediction, nonlinearity and reconstruction capabilities. Another useful quantity, the signal-to-impulse ratio (SIR), is given by $$SIR = 10\log\left(\frac{\sigma_s^2}{\sigma_v^2}\right) \quad (207)$$

The SNR rule is derived from the traditional image quality criterion, which is characterized by a mean square error (MSE). It possesses the advantage of a simple mathematical structure. For a discrete signal $\{s(n)\}$ and its approximation $\{\hat{s}(n)\}$, n=0, ..., N, the MSE can be defined to be $$MSE = \frac{1}{N}\sum_{n=0}^{N-1}[\hat{s}(n) - s(n)]^2 \quad (208)$$

However, the MSE based evaluation standard, such as peak signal-to-noise ratio (PSNR), $$PSNR = \log[(255 \times 255)/MSE] \quad (209)$$

can not exactly evaluate the image quality if one neglects the effect of human perception. The minimum MSE rule will cause undulations of the image level and destroy the smooth transition information around the pixels. Therefore, we use both objective and subjective standards to evaluate our presented filtering results.

The benchmark 8 bpp gray-scale images are corrupted by additive impulse noise and Gaussian noise to test the proposed filtering technique. The practical symmetric quincunx windows are selected as shown in FIG. 63. The peak signal-noise-ratio (PSNR), mean square error (MSE) and mean absolute error (MAE) comparison of different filtering algorithms for both images are shown in TABLE 3 (The amount of noise and the filtering parameters are also shown in TABLE 3.). It is evident that our filtering-based switching scheme yields improved results compared to the median filtering-based switching scheme. In addition, the quincunx extension improves the filtering performance of the nonlinear processing. When noise probability is lower (20%), 5-point diamond (or cross) quincunx filter possesses the better performance. When noise probability is higher (60%), 13-point diamond quincunx filter is testified better. The 9-point square window is suitable for 40% noise-degraded case. The perceptual quality of our algorithm is shown in FIG. 64. The original Lena image is degraded by adding 40% impulse noise in FIG. 64(*a*). FIG. 64(*b*) is the filtering result using our nonlinear filter.

Wavelet noise is a special kind of additive noise generated by coefficient quantization error or thresholding error. Because the restored image is regarded as the linear or quincunx combination of different wavelet functions (scaling and translation), the noise in the physical domain will be "random wavelets". For example, in a tensor-product wavelet transform case, the wavelet noise has a cross shape. Our quincunx filter can be utilized as a post-processor for a wavelet de-noising technique. As shown in FIG. 65, FIG. 65(*a*) is the Gaussian noise-degraded Lena. FIG. 65(*b*) is the denoising result using DAF wavelet thresholding technique. FIG. 65(*c*) is the one-time nonlinear quincunx restoration combined with wavelet thresholding. The result has higher visual quality and 0.65 dB PSNR improvement.

CONCLUSIONS

In this disclosure, we present a nonlinear quincunx filter for impulse or mixed noise removal. A specially designed "median basket" based on median distance is used to collect the "basket members" for calculating the modified median estimate (MLE). A switching scheme is used to detect the impulse noise and preserve the noise-free pixels. Arbitrary shape quincunx windows are introduced to improve the visual filtering performance of our nonlinear filter. The quincunx version takes account of the different correlation structure of the image along different spatial directions, based on the human vision system (HVS). Iterative processing improves the performance of our algorithm for highly corrupted images. Numerical simulations show that the quincunx filtering technique is extremely robust and efficient, and leads to significant improvement in different noise-degraded case. The method can be combined with any restoration technique to constitute a robust restoration method (for example as the post-processor for wavelet thresholding techniques). We compared the performance of these techniques, both subjectively and quantitatively, with the median filter and two of its recently proposed variants. Special attention was given to the ability of these methods to preserve the fine image details, such as edges and thin lines. In the experiments, our filtering gave the best results.

REFERENCES

[1] E. Abreu, M. Lightstone, S. K. Mitra, and K. Arakawa, "A new efficient approach for the removal of impulse noise from highly corrupted images," *IEEE Trans. Image Processing*, vol. 5, pp. 1012–1025, June 1996.
[2] J. B. Bednar, T. L. Watt, "Alpha-trimmed means and their relationship to median filter," IEEE Trans. ASSP, Vol. 32, pp. 145–153, 1984.
[3] D. R. K. Brownrigg, "The weighted median filter," *Comm. Assoc. Comput. Mach.*, Vol. 27, pp. 807–818, 1984.
[4] H. Hwang, R. A. Haddad, "Adaptive median filters: new algorithms and results," IEEE Trans. Image Processing, Vol. 4, No. 4, pp. 499–502, April 1995.
[5] B. I. Justusson, "Median filtering: statistics properties," in *Two-Dimensional Digital Signal Processing, II: Transforms and Median Filters*, Vol. 42, pp. 161–196. New York: Springer Verlag, 1981.
[6] S. R. Kim, A. Efron, "Adaptive robust impulse noise filtering," IEEE Trans. Signal Processing, Vol. 43, No. 8, pp. 1855–1866, August 1995.
[7] S. J. Ko, Y. H. Lee, "Center weighted median filters and their applications to image enhancement," *IEEE Trans. Circuits Syst.*, Vol. 38, pp. 984–993, September 1991.
[8] H. M. Lin, A. N. Willson, "Median filters with adaptive length," *IEEE Trans. Circuits Syst.*, Vol. 35, pp. 675–690, June 1988.
[9] A. Scher, F. R. D. Velasco, and A. Rosenfeld, "Some new image smoothing techniques," IEEE Trans. Systems, Man, and Cybernetics, Vol. SMC-10, No. 3, March 1980.
[10] Z. Shi, G. W. Wei, D. J. Kouri, and D. K. Hoffman, "Perceptual normalized subband image restoration", IEEE Symposium on Time-frequency and Time-scale Analysis, N. 144, pp. 469–472, Pittsburgh, Pa., Oct. 6–9, 1998.
[11] R. Sucher, "Removal of impulse noise by selective filtering", IEEE Proc. Int. Conf. Image Processing, Austin, Tex., November 1994, pp. 502–506.
[12] T. Sun, Y. Neuvo, "Detail-preserving median based filters in image processing," *Pattern Recognition Letter*, Vol. 15, pp. 341–347, April 1994.
[13] T. D. Tran, R. Safranek, "A locally adaptive perceptual masking threshold model for image coding," *IEEE Proc. ICASSP*, pp. 1882–1885, 1996.
[14] Z. Wang, D. Zhang, "Restoration of impulse noise corrupted images using long-range correlation," *IEEE Signal Processing Letter*, Vol. 5, pp.4–7, January 1998.
[15] X. You, G. Grebbin, "A robust adaptive estimator for filtering noise in images," IEEE Trans. Image Processing, Vol. 4, No. 5, pp. 693–699, May 1995.

Visual Multiresolution Color Image Restoration

Introduction

Images are often contaminated by noise. Generally, the possible noise sources of images are photoelectric exchange, photo spots, imperfection of communication channel transmission, etc. The noise causes speckles, blips, ripples, bumps, ringing and aliasing for visual perception. These distortions not only affect the visual quality of images, but also degrade the efficiency of data compression and coding. De-noising and restoration are extremely important for image processing.

The traditional image processing techniques can be classified into two kinds: linear or non-linear. The principle methods of linear processing are local averaging, low-pass filtering, band-limit filtering or multi-frame averaging. Local averaging and low-pass filtering only preserve the low-band components of the image signal. The original voxel is substituted by an average of its neighboring voxels (within a square window). The mean error may be improved but the averaging process blurs the silhouette and details of the image. Band-limited filters can be utilized to remove the regularly appearing dot matrix, texture and skew lines. But they are useless for irregularly distributed noise. Multi-frame averaging requires the images be still, and the noise distribution be stationary, which is not the case for motion picture images or for a space (time)-varying noisy background. Generally, traditional image processing is always defined on the whole space (time) region, which cannot localize the space (time)-frequency details of a signal. New research evidence shows that non-Guassian and non-stationary processes are important characteristics for the human visual response.

Moreover, traditional image quality is evaluated by the mean square error (MSE), which possesses the advantage of a simple mathematical structure. For a discrete signal $\{s(n)\}$ and its approximation $\{\hat{s}(n)\}$, n=0, ..., N−1, the MSE can be defined as $$MSE = \frac{1}{N}\sum_{n=0}^{N-1}[\hat{s}(n)-s(n)]^2 \tag{210}$$

However, a MSE based measure, (such as PSNR=log[(255× 255)/MSE]), does not exactly evaluate image quality that consistent with human perception. The minimum MSE rule may cause serious oscillatory (no monotonic) behavior in the convergence process, which will destroy the original smooth transition around the pixels. Commonly used regularization methods, such as regularized least squares, may degrade the image details (edges and textures) and result in visual blur.

Human visual perception is more sensitive to image edges which consist of sharp-changes in the neighboring luminance/chrominance scale. Visual perception is essentially adaptive and has variable lenses and focuses for different visual environments. To protect as much as possible the detailed information, while simultaneously removing the noise, modern image processing techniques are predominantly based on non-linear methods. Commonly, prior to nonlinear filtering, the image edges, as well as perceptually sensitive textures, are detected and preserved. The well-known nonlinear filtering approaches include median filtering and weighted averaging, etc. Median filtering uses the median luminance/chrominance value of the pixels within the neighboring window to substitute for the original voxels. This method causes less degradation for the slant or square functions, but suppresses the signal impulses whose widths are shorter than half of the window width. Thus it can degrade image quality. To protect the edges, weighting averages only smooth neighboring pixels with similar luminance/chrominance magnitude. However, a serious shortcoming of these methods is that the width of the weighting-window has to be implemented adaptively. So the large-scale, complicated calculations are required to generate filtering voxels. If the window selected is too wide, more details may be lost.

Human vision system response has attracted much interest for image processing recently [9, 18, 23, 40, 43, 49, 54]. Using some newly developed non-linear methods (such as perceptually optimal stack filtering [18]) satisfactory restoration images can be obtained. However, this type of non-linear filter requires a thorough knowledge of the ideal image and involves lengthy long-time network training, which greatly limits its usefulness.

More efficient, human-vision-system-based image processing techniques possess the advantages of 1) high de-correlation for convenience of compression and filtering; 2) high numerical stability. 3) In addition, in human visual response, the filtering algorithm should enhance perceptually sensitive information, while simultaneously suppressing the non-perceptual-sensitive components. 4) Finally, it can be carried out with real-time processing and is robust.

The space (time)-scale logarithmic response characteristic of the wavelet transform is quite similar to that of the HVS response. Visual perception is sensitive to narrow band, low-frequency components, and insensitive to wide-band, high frequency components. This feature can be dealt with using the constant-Q analysis of wavelet transforms, which possesses fine resolution in the low-band regime, and coarse frequency resolution in the high band regime. The recently discovered biological mechanism of the human visual system shows that both multiorientation and multiresolution are important features of the human visual system. There exist cortical neurons which respond specifically to stimuli within certain orientations and frequencies. The visual system has the ability to separate signals into different frequency ranges. The evidence in neurophysiological and psychophysical studies shows that direction-selective cortex filtering is much like a 2D-wavelet decomposition representation. The high-pass expansion coefficients of a wavelet transform can be regarded as a kind of visible difference predictor (VDP).

The use of wavelets for the task of image restoration and enhancement is a relatively new but rapidly emerging approach [3, 26, 27, 29, 38, 40]. Although there has long been the view that a non-stationary approach may improve results substantially compared to a stationary one, the idea of multiresolution has not been aprevalent one. Instead, adaptive restoration techniques have been used to examine problems in the spatial domain. Various local measures are employed to describe the signal behavior near a pixel. Because local adaptivity is based explicitly on the values of the wavelet coefficients, it is very easy to implement and requires a much smaller effort than the conventional deconvolution filter.

To enhance the performance of wavelet techniques for signal-noise-ratio improvement in signal restoration, it is typical to utilize thresholding techniques in multiscale spaces [13, 26,27,37, 38]. However, for perceptual image processing dependent on the human vision system (HVS), this technique appears not to be optimal. As is well known, the HVS model addresses three main sensitivity variations, namely, the light (luminance/chrominance) level, spatial frequency, and signal content. The visual content of the wavelet coefficients in various subblocks (representing different spatial frequency band) is quite different. Additionally, the contrast level seriously affects the level of a threshold cutoff. Simple multi-channel thresholding methods do not yield perfect perception quality since they are not fully consistent with HVS response. Furthermore, due to the recurrent structure of the subband filters, the coefficient strength in each sub-block is also rapidly varying. In addition to these difficulties, the problem of color image restoration presents a unique problem in that the multiple color channels are not orthogonal. Thus, cross-channel correlation must be exploited in order to achieve optimal restoration results. A number of approaches have been used to handle the color multichannel image restoration problem [2, 3, 31, 49]. However, the re-normalization of the subband response and the HVS has not yet been studied thoroughly.

The present disclosure deals with these issues and seeks to develop an efficient method for noisy color image restoration. We will concentrate on YCrCb channels because they are relatively de-correlated and can be processed independently. Magnitude normalization (MN) is utilized to adjust the wavelet transform coefficients in the different subchannels. Also, different visual weightings are employed in the three luminance-chrominance channels (Y, Cr, Cb) to make the wavelet transform coefficients in these channels better match the vision system response better. These visual weightings have been used before by Waston to generate a perceptual lossless quantization matrix for image compression [49]. For non-standard image brightness level (contrast), visual sensitivity normalization (VSN) is also needed to fix the cutoff threshold. We refer to these combined three normalization processes as Color Visual Group Normalization (CVGN).

In applications, recently developed interpolating Lagrange wavelets [41, 50] are utilized for color image decomposition and reconstruction. This kind of interpolating wavelet displays a slightly better smoothness and more rapidly time-frequency decay than commonly used wavelets. Moreover, the interpolating processing enables us to utilize a parallel calculation structure for efficient real-time implementation. Most importantly, our multiresolution image processing method is extremely robust in not requiring prior knowledge of either an ideal image or noise level.

Color Modulation

Commonly used color models are of three kinds:

(1) Computer Graphics Color Space
CMY: Cyan, Magenta and Yellow
HLS: Hue, Lightness and Saturation
HSV (HSB): Hue, Saturation and Value (Brightness)
RGB: Red, Green and Blue (2) TV Broadcast Signal Color Space
YCrCb: Intensity, Color-red and Color-blue
YIQ: Luminance, In-Phase and Quadrature (3) The CIE (Commission Internationale de Eclairage) Uniform Color Space
CIEXYZ: Standard primaries X, Y and Z
CIELab: Luminance, a value and b value
CIELuv: Luminance, u value and v value
CExyY: x-y coordinate and Luminance A color vector is usually represented by its three components $C=[R, G, B]$ of red, green and blue primary signals (FIG. 66), with each signal being represented with 8-bit precision (i.e. an integer range of [0, 255]). In color cathode ray tube (CRT) monitors and raster graphics devices, the primarily used color model is red, green, and blue (RGB). It is also by far the most commonly used model for computer monitors. The Cartesian coordinate system is employed in this model. The RGB primaries are additive, such that individual contributions of each primary are added for the creation of a new color. The model is based on the tri-stimulus theory of vision and is a hardware-oriented model.

This model can be represented by the unit cube which is defined on R, G, and B axes (FIG. 67). The line that runs from Black (0,0,0) to White (1,1,1) is the gray scale line [56]. The values of R, G and B should be the same (R=G=B) in order to have an achromatic (colorless) pixel. A full view of a colored RGB cube can be seen here. The RGB color model is additive, so that:

Red+Green=Yellow

Red+Blue=Magenta

Green+Blue=Cyan

Red+Green+Blue=White (211)

The color cube can also be projected as a hexagon as FIG. 68, with the lightest point in the middle. This alternative representation is useful for understanding the relationship to other proposed color models. For example, it helps to visualize the color transformations between several other color models (e.g. CMY, HSV, HLS, etc.). With the use of a hexagon, a color RGB cube can be represented [56].

Let RL, GL, and BL, be values of three color primaries that are equal to (or proportional to) the measured luminance of the color primaries. It should be noted that these primaries cannot be displayed directly because most monitors exhibit a nonlinear relationship between the input value of the color signal and the corresponding output luminance. In fact, the nonlinearity for a particularly primary can be approximated by a power law relationship:

$$C_L = C^y, C = [R, G, B] \quad (212)$$

where C is the input value of the primary, $C_L$ is the luminance of the primary, and y is a value that usually falls between 2 and 3, depending on the monitor used. The nonlinearity can also be characterized by more complicated models. In order to account for this nonlinearity, a transform on the linear color primaries of the form $$R = R_L^{1/y}, G = G_L^{1/y}, B = B_L^{1/y}. \quad (213)$$

is typically performed as display on the given monitor. The gamma-corrected coordinates are also used to characterize many device-independent color spaces. One such color space is SMPTE RGB color space, which has been selected as a television standard. The value of γ for this color space is 2.2. All the color images used in this work are taken to be in SMPTE gamma-corrected RGB coordinates.

Since the human vision system (EVS) perceives a color stimulus in terms of luminance and chrominance attributes, rather than in terms of R, G, B values, we propose to transform the image to a luminance-chrominance color space prior to performing the quantization. The color representation scheme used in this work is the CCIR-601-1 eight-bit digital coding standard, comprising a luminance (Y) and chrominance (Cb/Cr) components, with black at luma code 16 and white at luma code 235 (instead of the full 8-bit range of 0 to 255). To this end, we pick the YCrCb component color space that is related to the SMPTE RGB space by a simple linear transformation. Assuming that R, G, B occupy the range 0–255, the transform is given by $$Y = 0.298993R + 0.587016G + 0.113991B$$

$$Cr = 128 + 0.713267(R-Y)$$

$$Cb = 128 + 0.564334(B-Y), \quad (214)$$

where the Y, Cr, and Cb values have been scaled to the range 0–255. Hence forth, 3D color vectors will be assumed to be in YCrCb coordinates. Since YCrCb is a linear transform of a gamma-corrected RGB space, it is also a linear gamma-corrected space: Y is the gamma-corrected luminance component representing achromatic colors, the Cr coordinate describes the red-green variation of the color, and the Cb coordinate describes the yellow-blue variation of the color. The conversion to YCrCb is one of the key factors enabling us to achieve high image quality.

Digital grayscale images typically contain values that represent so-called gamma-corrected luminance Y. Here Y is a power function of luminance, with an exponent of around ½.3. Three gamma-corrected numbers, red, green, and blue components (RGB), are used to represent each pixel in the case of color images. In the case of a gray image, each pixel is represented by a single brightness. In this treatment, each pixel is transformed from the original color representation (for example RGB) to a color representation that consists of one brightness signal and two color signals (such as the well-known TV broadcast color space YCbCr).

TABLE 6

Display resolution comparison

| Display | Resolution (pixels/inch) | Distance (inches) | DVR (pixels/degree) |
|---|---|---|---|
| Computer Display | 72 | 12 | 15.1 |
| Low Quality Printing | 300 | 12 | 62.8 |
| High Quality Printing | 1200 | 12 | 251.4 |
| HDTV | 48 | 72 | 60.3 |

Visual Sensitivity of Wavelet Coefficients

The visibility of wavelet transform coefficients will depend upon the display visual resolution [49] in pixel/degree. Given a viewing distance V in inches and a display resolution d in pixel/inch, the effective display visual resolution (DVR) R in pixel/degree of visual angle is $$R = dV \tan(\pi/180) \approx dV/57.3 \quad (215)$$

A useful measurement is that the visual resolution is the viewing distance in pixels (dV) divided by 57.3. Table 1 provides some illustrative examples. For example, the HDTV assumes 1152 active lines at a viewing distance of 3 picture heights [49].

On each decomposition level, wavelet coefficients are divided into four subblocks, LL, HL, LH, and HH. The detailed subblocks HL, LH and HH represent three different decomposition orientations, horizontal, vertical, and diagonal, respectively. As the layer increases, the bandwidth of the equivalent subband filters decreases by a factor of two, and thus the frequency resolution doubles. Correspondingly, the space (time) resolution (display resolution) decreases by a factor of two. A subblock of wavelet coefficients corresponds to a spatial frequency band. For a display resolution of R pixel/degree, the spatial frequency of level j is $$f = 2^{-j} R. \quad (216)$$

As discussed in section I, the display gamma is 2.3. The R, G, B true color image is modulated into Y, Cr, Cb channels. The model thresholds for three-color channels are different from each other. For example, the just-noticeable quantization threshold of Y is generally about a factor of two below that of Cr, which is in turn about a factor of two below the Cb curve at each spatial frequency. Note that this difference usually declines at higher spatial frequency [49].

The Cb curve is somewhat broader than Y or Cr. This broadening is likely due to the intrusion of a luminance-detecting channel at high frequencies and high contrasts. Because the Cb color axis is not orthogonal to the human luminance axis, the Cb colors do have a luminance component.

The contrast sensitivity declines when the spatial frequency increases, whereas, the size of stimuli decreases. This mode is adapted to construct the "perceptual lossless" response magnitude for normalizing in subblock (j,m) according to the visual response.

Visual Group Normalization

The main objective of wavelet signal filtering is to preserve important signal components, and efficiently reduce noisy components. For perceptual images, it is most important to protect the signal components (always represented by the luminance/chrominance levels) which are sensitive to human eyes. To achieve this goal, we utilize the magnitudes of the filter response and the human vision response.

Magnitude Normalization

Wavelet coefficients can be regarded as the output of the signal passing through equivalent decomposition filters (EDF). The responses of the EDF are the combination of several recurrent subband filters at different stages [19, 28, 34, 37, 38, 40, 41]. The EDF amplitudes of various sub-blocks differ greatly. Thus, the magnitude of the decomposition coefficients in each of the sub-blocks cannot exactly reproduce the actual strength of the signal components. To adjust the magnitude of the response in each block, the decomposition coefficients are re-scaled with respect to a common magnitude standard. Thus EDF coefficients, $C_m(k)$, in block m should be multiplied with a magnitude scaling factor, $\lambda_m$, to obtain an adjusted magnitude representation. We choose this factor to be the reciprocal of the maximum magnitude of the frequency response of the equivalent wavelet decomposition filter on node (j,m)

$$\lambda_{j,m} = \frac{1}{\sup_{\omega \in \Omega}\{|LC_{j,m}(\omega)|\}}, \qquad \Omega = [0, 2\pi] \qquad (217)$$

This idea was recently extended to Group Normalization (GN) of wavelet packets for signal processing [37, 38, 40, 41] and was presented to lead the optimal performance.

Perceptual Lossless Normalization

Because an image can be regarded as a signal source based on the human visual system, using a just-noticeable distortion profile we can efficiently remove the visual redundancy from decomposition coefficients and normalize them with respect to the standard of perceptual importance. A mathematical model for perception efficiency, based on the amplitude nonlinearity in different frequency bands, has been presented by Watson, et al. [49], which can be used to construct the "perceptual lossless" response magnitude $Y_{j,m,v}$ for normalizing visual response in different luminance/chrominance spaces. We extend the definition to luminance/chrominance mode according to $$Y_{j,m} = a_v 10^{k_v\left(\log\frac{2^j f_{0,v} d_{m,v}}{R_v}\right)^2} \qquad (218)$$

where $a_v$ defines the minimum threshold, $k_v$ is a constant, $R_v$ is the Display Visual Resolution (DVR), $f_{0,v}$ is the spatial frequency, and $d_{m,v}$ is the directional response factor, in each luminance/chrominance channel v.

The parameters $d_{LL,v}$, and $d_{HH,v}$ represent the thresholds for orientations LL and HL as frequency shifts relative to threshold for orientations LH and HL. From the nature of dyadic wavelets, the orientation LL possesses a spectrum that is approximately a factor of two lower in spatial frequency than orientation LH or HL. This would suggest a factor of $d_{LL,v}=2$. However, in a vision system response mechanism, at orientation LL the signal energy is spread over all orientations, which implies less visual efficiency than when the energy is concentrated over a narrow range, as is the case for the spectra of orientation HL or LH. Thus, the threshold should be increased, which can be realized by a slight reduction in $f_0$. The final value for $d_{LL,v}$ is therefore less than 2.

For orientation HH, similar effects exist. First, the Cartesian splitting of the spectrum makes the spatial frequency of orientation HH about $\sqrt{2}$ higher than that of the orientations HL, and LH. Thus $d_{HH,v}$ can be taken as $d_{HH,v}=2^{-1/2}$. As we mentioned before, the spectrum along orientation HH is spread over two orthogonal orientations (45° and 135°), which should result in a log threshold increase of about $2^{1/4}$ (a shift of $2^{-1/4}$) or a total prediction of $d_{HH,v}=2^{-3/4}=0.59$. Finally, the well-known oblique effect [49], will cause a final small amount of threshold elevation.

The chromatic channels Cb and Cr are usually each down-sampled by a factor of two in both horizontal and vertical directions, because the sensitivity of human vision to chromatic variation is weaker than it is to luminance variation. In the calculation of the lossless quantization matrix, we should in this case make some correction. For example, if the display visual resolution is known, as the chroma that is down-sampled by two in each dimension, the corrected value will be half of that. This corrected value is used to adjust the perceptual lossless normalization in Cr and Cb channels.

Visual Sensitivity Normalization

Visual sensitivity in each luminance/chrominance channel v is defined as the inverse of the contrast required to produce a threshold response [9], $$S_v=1/C_v \qquad (219)$$

where $C_v$ is generally referred to simply as the threshold. The Michelson definition of contrast, $$C_v=(L_{max,v}-L_{mean,v})/L_{mean,v} \qquad (220)$$

is used, where $L_{max,v}$ and $L_{mean,v}$ refer to the maximum and mean luminances of the waveform in luminance/chrominance channel v. Sensitivity can be thought of as a gain, although various nonlinearities of the visual system require caution in the use of this analogy. The variations in sensitivity as a function of light level are primarily due to the light-adaptive properties of the retina and are referred to as the amplitude nonlinearity of the HVS. The variations as a function of spatial frequency are due to the optics of the eye combined with the neural circuitry; these combined effects are referred to as the contrast sensitivityfunction (CSF). Finally, the variations in sensitivity as a function of signal content referred to as masking, are due to the post-receptoral neural circuitry.

Combining the perceptual lossless normalization, the visual sensitivity normalization and the magnitude normalized factor $\lambda_{j,m}$, we obtain the perceptual lossless quantization matrix $Q_{j,m,v}$ $$Q_{j,m,v} = 2C_v Y_{j,m,v} \lambda_{j,m} \quad (221)$$

This treatment provides a simple human-vision-based threshold technique for the restoration of the most important perceptual information in an image. We call the combination of the above-mentioned three normalizations Color Visual Group Normalization (CVGN) of wavelet transform coefficients.

Results of Example Applications

Our study suggests that the analyzing functions presented in this disclosure can improve the visualization of features of importance to color images. As discussed earlier, the color channel application of the Color Visual Group Normalization (VGN) technique is designed to improve the performance of our interpolating Lagrange wavelet transform [41] in image processing. Utilizing Visual Group Normalization, the raw magnitudes of the transform coefficients in different luminance and chrominance channels can be normalized to represent exactly the visual perceptual strength of signal components in each subband. Moreover, the efficient nonlinear filtering method-softer logic masking (SLM) technique [38], provides robust edge-preservation for image restoration, and removes the haziness encountered with the commonly used hard-logic filtering techniques.

In our study, the original benchmark color photo of Lena was cropped to a matrix size of 512×512. Another color picture is digitized by Kodak digital camera with matrix size 512×768. The original images possess clear edges, strong contrast and brightness. FIG. 69(a) is the typical noisy Lena image degraded by adding Gaussian random noise. A simple low-pass filter smoothes out the noise but also degrades the image resolution, while a simple high-pass filter can enhance the texture edges but will also cause additional distortion. We choose 2D half-band Lagrange wavelets as the multiresolution analysis tools for image processing.

The median filtering (with a 3×3 window) result of Lena is shown in FIG. 69(b), which is edge-blurred with low visual quality. The speckled noise has been changed into bumps. It is evident that our Color Visual Group Normalization technique yields better contrast and edge-preservation results and provides a more natural color description of this image (FIG. 69(c)).

For a second example, the noisy picture, result of median filtering and our result are shown in FIG. 70(a), 70(b) and 70(c), respectively. Our previous conclusion pertain, showing that the CVGN technique is also suitable for image processing of pictures having a different height-width ratio.

CONCLUSIONS

Blind image restoration and de-noising are very difficult tasks. Because of the complex space-frequency distribution and statistical feature of images, there is almost no definite feature discrimination between image and noise background. Even if prior knowledge of the noise is available, a perfect extraction is theoretically impossible. The key problem in signal processing is how to restore images "naturally" from a noisy background or from an encoded quantization space. For a de-noising scheme based on statistical properties, an adaptive signal-dependent transform is needed to generate a concentrated representation of signal components. This is based on the assumption that noise or clutter components in the signal subspace are relatively scattered with lower magnitudes.

The logrithmic frequency band distribution of our wavelet decomposition is matched well with the characteristics of human vision responses to obtain compact signal representation. Both multiorientation and multiresolution are known features of the human visual system. There exist cortical neurons that respond specifically to stimuli within certain orientations and frequencies. The 2-D wavelet decomposition mimics the cortex filtering of the HVS. Visual group normalization is proposed to normalize the frequency response so that the wavelet coefficients can exactly represent the perceptual strength of signal components. The color channel based VGN technique results in a thresholding method that is efficient for visual feature extraction.

We also employ a modified version of a well-known threshold method (termed the Perceptual Softer Logic Masking (PSLM) technique [38, 40]) for image restoration, which dealing with extremely noisy backgrounds. This technique-better preserves the important visual edges and contrast transition portions of an image than does the traditional method, and it is readily adaptable to human vision. The smooth transition around the cut-off region of the filter can efficiently remove the Gibbs' oscillation in the signal reconstruction, and decrease the appearance of ringing and aliasing. A synunetric extension decomposition [6] is utilized to remove non-continuous boundary effects. The interpolation algorithm made possible by use of an interpolating wavelet transform [12, 14, 15, 16, 25, 35, 36, 41] enables us to utilize a parallel computational strategy that is convenient for real-time implementation.

To some extent, color visual group normalization provides a measurement for handling raw filter coefficients in a wavelet transform. The hierarchical filtering of Softer-logic Masking can protect more signal components than a simple single layer nonlinear method. The concept of Visual Lossless Quantization (VLQ) presented in [49] can lead to a potential breakthrough compared to the traditional Shannon rate-distortion theory in information processing. We have compared our approach with the commonly used median filtering method for de-noising. The results show that the proposed method is robust and provides the best quality for color image filtering of which we are aware.

REFERENCES

[1] R. Ansari, C. Guillemot, and J. F. Kaiser, "Wavelet construction using Lagrange halfband filters, "*IEEE Trans. CAS*, vol. 38, no.9, pp. 1116–1118, 1991.

[2] R. Balasubramanian, C. A. Bouman, and J. P. Allebach, "Sequential scalar quantization of color images," *J. Electronic Imaging*, vol. 3, no. 1, pp. 45–59, January 1994

[3] M. R Banham, A. K. Katsaggelos, "Digital image restoration," *IEEE SP Mag.*, pp. 24–41, March 1997

[4] R. Baraniuk, D. Jones, "Signal-dependent time-frequency analysis using a radially Gaussian kernel," *Signal Processing*, Vol. 32, pp. 263–284, 1993.

[5] A. C. Bovic, T. S. Huang, and D. C. Munson, "A generalization of median filtering using linear combinitions of order statistics," *IEEE Trans. ASSP*, vol. 37, pp. 2037–2066, 1989

[6] C. M. Brislawn, "Preservation of subband symmetry in multirate signal coding," *IEEE Trans. SP*, vol. 43, no. 12, pp. 3046–3050, 1995.

[7] C. K. Chui, An Introduction to Wavelets, Academic Press, New York, 1992.

[8] C. K Chui, Wavelets: A Tutorial in Wavelet Theory and Applications, Academic Press, New York, 1992.

[9] S. Daly, "The visible difference predictor: an algorithm for the assessment of image fidelity," in *Digital Images and Human Vision*, pp. 179–206, ed. By A. B. Waston, MIT Press, 1993

[10] I. Daubechies, "Orthonormalbases ofcompactlysupportedwavelets", *Comm. Pure and Appl. Math.*, vol. 41, no. 11, pp. 909–996, 1988.

[11] I. Daubechies, "The wavelet transform, time-frequency localization and signal analysis," *IEEE Trans. Inform. Theory*, Vol. 36, No. 5, pp. 961–1003, September 1990.

[12] G. Deslauriers, S. Dubuc, "Symmetric iterative interpolation processes," *Constructive Approximations*, vol. 5, pp. 49–68, 1989.

[13] D. L. Donoho, "De-noising by sof-threshold," *IEEE Trans. Information Theory*, vol. 41, no. 3, pp. 613–627, 1995.

[14] D. L. Donoho, "Interpolating wavelet transform," Preprint, Stanford Univ., 1992.

[15] S. Dubuc, "Interpolation through an iterative scheme", *J. Math. Anal. and Appl.*, vol. 114, pp. 185–204, 1986.

[16] A. Harten, "Multiresolution representation of data: a general framework," *SIAM J. Numer. Anal.*, vol. 33, no. 3, pp. 1205–1256, 1996.

[17] J. J. Huang, E. J. Coyle, G. B. Adams, "The effect of changing the weighting of errors in the mean absolute error criterion upon the performance of stack filters," *Proc. 1995 IEEE Workshop on Nonlinear Signal and Image Processing*, 1995.

[18] J. J. Huang, E. J. Coyle, "Perceptually Optimal Restoration of Images with Stack Filters," *Proc. 1997 IEEE/EURASIP Workshop on Nonlinear Signal andimage Processing*, Mackinac Island, MI, 1997

[19] C. Herley, M. Vetterli, "Orthogonal time-varying filter banks and wavelet packets," *IEEE Trans. SP*, Vol. 42, No. 10, pp. 2650–2663, October 1994.

[20] C. Herley, Z. Xiong, K. Ramchandran and M. T. Orchard, "Joint Space-frequency Segmentation Using Balanced Wavelet Packets Trees for Least-cost Image Representation," *IEEE Trans. Image Processing*, vol. 6, pp. 1213–1230, September 1997.

[21] D. K. Hoffman, N. Nayar, O. A. Sharafeddin, and D. J. Kouri, "Analytic banded approximation for the discretized free propagator," *J. Physical Chemistry*, vol. 95, no. 21, pp. 8299–8305, 1991.

[22] L. C. Jain, N. M. Blachman, and P. M. Chapell, "Interference suppression by biased nonlinearities," *IEEE Trans. IT*, vol. 41, no. 2, pp. 496–507, 1995.

[23] N. Jayant, J. Johnston, and R. Safranek, "Signal compression based on models of human perception", *Proc. IEEE*, vol. 81, no. 10, pp. 1385–1422, 1993.

[24] J. Kovacevic, and M. Vetterli, "Perfect reconstruction filter banks with rational sampling factors," *IEEE Trans. SP*, Vol. 41, No. 6, pp. 2047–2066, June 1993.

[25] J. Kovacevic, W. Swelden, "Wavelet families of increasing order in arbitrary dimensions," Submitted to IEEE Trans. Image *Processing*, 1997.

[26] A. F. Laine, S. Schuler, J. Fan and W. Huda, "Mammographic feature enhancement by multiscale analysis," *IEEE Trans. MI*, vol. 13, pp. 725–740, 1994.

[27] S. Liu and E. J. Delp, "Multiresolution Detection of Stellate Lesions in Mammograms," *Proc. 1997IEEE International Conference on Image Processing*, October 1997, Santa Barbara, pp. II 109–112.

[28] S. Mallat, "A theory for multiresolution signal decomposition: the wavelet representation," *IEEE Trans. PAMI*, Vol.11, No. 7, pp. 674–693, July 1989.

[29] S. Mallat, S. Zhong, "Characterization ofsignals from multiscale edges," *IEEE Trans. PAMI*, Vol. 14, No. 7, pp. 710–732

[30] Y. Meyer, Wavelets Algorithms and Applications, SIAM Publ., Philadelphia 1993.

[31] M. Orchard, C. Bouman, "Color quantization of images," *IEEE Trans. SP*, vol. 39, no. 12, pp. 2677–2690, December 1991.

[32] K. Ranchandran, M. Vetterli, "Best wavelet packet bases in a rate-distortion sense," *IEEE Trans. Image Processing*, Vol. 2, No. 2, pp. 160–175, April 1993.

[33] K. Ramchandran, Z. Xiong, K. Asai and M. Vetterli, "Adaptive Transforms for Image Coding Using Spatially-varying Wavelet Packets," *IEEE Trans. Image Processing*, vol. 5, pp. 1197–1204, July 1996.

[34] O. Rioul, M. Vetterli, "Wavelet and signal processing," *IEEE Signal Processing Mag.*, pp. 14–38, October 1991.

[35] N. Saito, G. Beylkin, "Multiscale representations using the auto-correlation functions of compactly supported-wavelets," *IEEE Trans. Signal Processing*, Vol. 41, no. 12, pp. 3584–3590,1993.

[36] M. J. Shensa, "The discrete wavelet transform: wedding the a trous and Mallat algorithms", *IEEE Trans. SP*, vol. 40, no. 10, pp. 2464–2482, 1992.

[37] Z. Shi, Z. Bao, "Group-normalizedprocessing ofcomplex waveletpackets," *Science in China* (Serial E), Vol. 26, No. 12, 1996.

[38] Z. Shi, Z. Bao, "Group-normalized wavelet packet signal processing", *Wavelet Application IV, SPIE Proc.*, vol. 3078, pp. 226–239, 1997.

[39] Z. Shi, Z. Bao, "Fast image coding of interval interpolating wavelets," *Wavelet Application IV, SPIE Proc.*, vol. 3078, pp. 240–253, 1997.

[40] Z. Shi, G. W. Wei, D. J. Kouri, and D. K. Hoffman, "Perceptual image processing using Gauss-Lagrange distributed approximating functional wavelets," submitted to *IEEE SP Letter*, 1998.

[41] Z. Shi, G. W. Wei, D. J. Kouri, D. K. Hoffman, and Z. Bao, "Lagrange wavelets for signal processing," submitted to *IEEE Trans. Image Processing*, 1998.

[42] W. Swelden, "The lifting scheme: a custom-design construction of biorthogonal wavelets," *Appl. And Comput. Harmonic Anal.*, vol. 3, no. 2, pp. 186–200, 1996.

[43] T. D. Tran, R. Safranek, "A locally adaptive perceptual masking threshold model for image coding," *Proc. ICASSP*, 1996.

[44] M. Unser, A. Adroubi, and M. Eden, "The $L_2$ polynomial spline pyramid," *IEEE Trans. PAMI*, vol. 15, no. 4, pp. 364–379, 1993.

[45] P. Vaidyanathan, T. Chen, "Role of anti-causal inverse in multirate filter-banks—Part I: system-theoretic fundamentals," *IEEE Trans. SP*, Vol. 43, No. 5, pp. 1090–1102, May 1995.

[46] P. Vaidyanathan, T. Chen, "Role of anti-causal inverse in multirate filter-banks—Part II: the FIR case, factorizations, and biorthogonal lapped transforms," *IEEE Trans. SP*, Vol. 43, No. 5, pp. 1103–1115, May 1995.

[47] M. Vetterli, C. Herley, "Wavelet and filter banks: theory and design," *IEEE Trans. SP*, Vol. 40, No. 9, pp. 2207–2232, September 1992.

[48] J. D. Villasenor, B. Belzer, and J. Liao, "Wavelet filter evaluation for image processing," *IEEE Trans. IP*, vol. 4, no. 8, pp1053–1060, 1995.

[49] A. B. Watson, G. Y. Yang, J. A. Solomon, and J. Villasenor, "Visibility of wavelet quantization noise," *IEEE Trans. Image Processing*, vol. 6, pp. 1164–1175, 1997.

[50] G. W. Wei, D. J. Kouri, and D. K. Hoffman, "Wavelets and distributed approximating functionals," *Computer Phys. Comm.*, in press.

[51] G. W. Wei, D. S. Zhang, D. J. Kouri, and D. K. Hoffman, "Lagrange distributed approximating Functionals," *Physical Review Letters*, Vol. 79, No. 5, pp. 775–779, 1997.

[52] Z. Xiong, K. Ramchandran and M. T. Orchard, "Space-frequency Quantization for Wavelet Image Coding," *IEEE Trans. Image Processing*, vol. 6, pp. 677–693, May 1997.

[53] J. Yoo, K L. Fong, J. J. Huang, E. J. Coyle, and G. B. Adams, "Fast Algorithms for Designing Stack Filters," submitted to *IEEE Trans. on Image Processing*.

[54] C. Zetzsche, E. Barth, and B. Wegmann, "The importance of intrinsically two-dimensional image features in biological vision and picture coding," in *Digital Images and Human Vision*, pp. 109–138, ed. By A. B. Waston, MIT Press, 1993

[55] 5 S. H. Zhang, Z. Bao, etc. "Target extraction from strong clutter background," *Tech. Rep.*, National Key Lab, of Radar Signal Processing, Xidian University, 1994

Mammogram Enhancement Using Generalized Sinc Wavelets

Introduction

Interpolating Distributed Approximating Functionals (DAFs), designed as a set of envelop-modulated interpolants, are generated by Gaussian-modulated Sine, Hermit, or Lagrange functionals [15, 31, 40, 41]. Such DAFs are smooth and decaying in both time and frequencyrepresentations and have been used for numerically solving various linear and nonlinear partial differential equations with extremely high accuracy and computational efficiency. Examples include DAF-simulations of 3-D reactive quantum scattering, the Kuramoto-Sivashinsky equations describing flow pattern dynamics for a circular domain, the sine-Gordon equation near homoclinic orbits, and a 2-D Navier-Stokes equation with non-periodic boundary conditions. Because the interpolating core shell of the fundamental DAF is the interpolating Sinc functional (the ideal low-pass filter), it is naturally useful to construct interpolating wavelets from these DAFs for use in signal processing.

The theory of interpolating wavelets has attracted much attention recently [1, 8, 10, 11, 12, 19, 20, 26, 27, 30, 31, and 32]. It possesses the attractive characteristic that the wavelet coefficients are obtained from linear combinations of discrete samples rather than from traditional inner product integrals. Mathematically, various interpolating wavelets can be formulated in a biorthogonal setting and can be regarded as an extension of the auto-correlation shell wavelet analysis [26], and halfband filters [1]. Harten has described a kind of piecewise polynomial method for biorthogonal interpolating wavelet construction [12]. Swelden independently develops this method as the well-known interpolating "lifting scheme" theory [32], which can be regarded as a special case of the Neville filters [19]. Unlike the previous method for constructing the biorthogonal wavelets, which attempts to explicitly solve the relevant coupled algebraic equations [10], the liffing scheme enables one to construct a custom-designed biorthogonal wavelet transform just assuming a single low-pass filter (such as DAF filter or scaling function) without iterations.

Generally speaking, the lifting-interpolating wavelet theory is closely related to the finite element technique in the numerical solution ofpartial differential equations, the subdivision scheme for interpolation and approximation, multigrid generation and surface fitting techniques. The most attractive feature of the approach is that discrete samplings are made identical to wavelet multiresolution analysis. Without any pre-conditioning or post-conditioning processes for accurate wavelet analysis, the interpolating wavelet coefficients can be implemented using a parallel computational scheme.

In this paper, the Sinc-DAF is employed to construct new biorthogonal interpolating wavelets—DAF wavelets and associated DAF-filters specifically for use in mammogram decomposition. Two kinds ofdifferent biorthogonal interpolating DAF wavelets (B-spline-enveloped Sinc wavelets and Gaussian-enveloped DAF wavelets), as the examples of the generalized interpolating Sinc wavelets, have been discussed thoroughly. Because the finite length cutoff implementation of the Sinc (ideal low-pass) filter causes the Gibbs oscillations, the key idea for the DAF wavelet construction is to introduce bell-shaped weighted windows to improve the characteristics of localization in time-frequency plane, and to ensure perfectly smooth and rapid decay.

To obtain excellent reconstruction quality of a digital mammogram, human visual sensitivity is utilized to construct the visual group normalization (VGN) technique, which is used to re-scale the wavelet decomposition coefficients for perceptual adapted reconstruction according to human perception. Softer Logic Masking (SLM) is an adjusted de-noising technique [29], derived to improve the filtering performance of Donoho's Soft Threshold method [9]. The SLM technique more efficiently preserves important information and edge transition in a manner particularly suited to human visual perception. A nonlinear contrast stretch and enhancement functional is easily realized for wavelet multiscale gradient transformation and feature-sensitive image reconstruction, which enables us to obtain accurate space-localization of the important features of the mammogram. The combined techniques can greatly improve the visualization of low-contrast components of a mammogram, which is important for diagnosis. Additionally, interpolating DAF-wavelet image processing can be implemented as an interpolation method. The coefficient calculations therefore only involve simple add/multiply operations. This is extremely efficient for fast implementation.

As an example application of Sinc-DAF wavelets, we select mammogram image processing, de-noising and enhancement, because ofits huge data size, complicated space-frequency distribution and complex perceptual dependent characteristics. Perceptual signal processing has the potential of overcoming the limits of the traditional Shannon Rate-Distortion (R-D) theory for perception-dependent information, such as images and acoustic signals. Previously, Ramchandran, Vetterli, Xiong, Herley, Asai, and Orchard have utilized a rate distortion compromise for image compression implementation [14, 23, 24, and 42]. Our recently derived Visual Group Normalization (VGN) technique [31] can likely be used with the rate-distortion compromise to generate a so-called Visual Rate-Distortion (VR-D) theory to improve image processing further.

Generalized Sinc Wavelets

Sine Wavelets

The π band-limited Sinc function, $$\phi(x) = \sin(\pi x)/(\pi x) C^\infty \qquad (222)$$

in Paley-Wiener space, constructs the interpolating functionals. Every band-limited function $f \in L^2(R)$ can be reconstructed by the equation $$f(x) = \sum_k f(k) \frac{\sin\pi(x-k)}{\pi(x-k)} \qquad (223)$$

where the related wavelet function—Sinclet is defined as (see FIG. 71)

$$\psi(x) = \frac{\sin\pi(2x-1) - \sin\pi(x-1/2)}{\pi(x-1/2)} \qquad (224)$$

The scaling Sinc function is the well-known ideal low-pass filter which possesses the filter response $$H(\omega) = \begin{cases} 1, & |\omega| \le \pi/2 \\ 0, & \pi/2 < |\omega| \le \pi \end{cases} \qquad (225)$$

Its impulse response can be described as $$h[k] = \frac{1}{2\pi} \int_{-\pi/2}^{\pi/2} e^{jk\omega} d\omega \qquad (226)$$

$$= \sin(\pi k/2)/(\pi k)$$

The so-called half-band filter only possesses non-zero impulses at odd integer samples, h(2k+1), while at even integers, h[2k]=0, except for k=0.

However, this ideal low-pass filter can not be implemented physically. Because the digital filter is an IIR (infinite impulse response) solution, its digital cutoff FIR (finite impulse response) implementation will introduce Gibbs phenomenon (overshot effect) in Fourier space, which degrades the frequency resolution as shown in FIG. 72.

The explicit compactly supported Sinc scaling function and wavelet, as well as their biorthogonal dual scaling function and wavelet, are shown in FIG. 73. We find that the cutoff Sinc has decreased regularity, which is manifested by a fractal-like behavior, which implies poor time localization.

B-Spline Sinc Wavelets

Because the ideal low-pass Sinc wavelet can not be implemented "ideally" by FIR (finite impulse response) filters, a windowed weighting technique is introduced here to eliminate the cutoff singularity, and improve the time-frequency localization of the Sinc wavelets.

First, we define a symmetric Sinc interpolating functional shell as $$P(x) = \frac{\sin(\pi x/2)}{\pi x} \qquad (227)$$

Multiplying by a smooth window, which vanishes gradually at the exact zeros of the Sinc functional, will lead to more regular interpolating wavelets and equivalent subband filters (as shown in FIGS. 74 and 75).

For example, we select a well-defined B-spline function as the weight window. Then the scaling function (mother wavelet) can be defined as an interpolating B-spline Sinc functional (BSF)

$$\phi_M(x) = \frac{\beta^N(x/\eta)}{\beta^N(0)} P(x) \qquad (228)$$

$$= \frac{\beta^N(x/\eta)}{\beta^N(0)} \frac{\sin(\pi x/2)}{\pi x}$$

where N is the B-spline order, η is the scaling factor to control the window width. To ensure coincidence of the zeroes of the B-spline and the Sinc shell, we set $$2M+1 = \eta \times (N+1)/2 \qquad (229)$$

To ensure the interpolation condition, h(2k)=0, k≠0, it is easy to show that when the B-spline order N=4k+1, η can be any odd integer (2k+1). If N is even integer, then η can only be 2. When N=4k−1, we can not construct the interpolating shell using the definition above. The admission condition can be expressed as $$\begin{cases} \eta = 2, & N = 2i \\ \eta = 2k+1, & N = 4i+1 \end{cases} \qquad (230)$$

From the interpolation relation $$\phi(k) = \begin{cases} 1, & k = 0 \\ 0, & k \ne 0 \end{cases} \quad k \in Z \qquad (231)$$

and the self-induced two-scale relation $$\phi(x) = \sum_k \phi(k/2)\phi(2x-k) \qquad (232)$$

it is easy to verify that $$h(k) = \phi_M(k/2)/2, k = 2M+1, 2M-1 \qquad (233)$$

Gaussian-Sinc DAF Wavelets

We can also select a class of distributed approximating functionals, e.g., the Gaussian-Sinc DAF (GSDAF) as our basic scaling function to construct interpolating scalings, $$\phi_M(x) = W_\sigma(x)P(x) \qquad (234)$$

$$= W_\sigma(x)\frac{\sin(\pi x/2)}{\pi x}$$

where $W_\sigma(x)$ is a window function which is selected as a Gaussian, $$W_\sigma(x)e^{-x^2/2\sigma^2} \qquad (235)$$

Because it satisfies the minimum frame bound condition in quantum physics, it will improve the time-frequency resolution of the Windowed-Sinc wavelet. Here $a$ is a window width parameter, and $P(x)$ is the Sinc interpolation kernel. The DAF scaling function has been successfully introduced as an efficient and powerful grid method for quantum dynamical propagations [40]. The Gaussian window in our DAF-wavelets efficiently smoothes out the Gibbs oscillations, which plague most conventional wavelet bases. The following equation shows the connection between the B-spline function and the Gaussian window [34]:

$$\beta^N(x) \cong \sqrt{\frac{6}{\pi(N+1)}} \exp\left(\frac{-6x^2}{N+1}\right) \qquad (236)$$

for large N. As in FIG. 76, if we choose the window width $$\sigma = \eta\sqrt{(N+1)/12} \qquad (237)$$

the Gaussian Sinc wavelets generated by the lifting scheme similar to the B-spline Sinc wavelets. Usually, the Gaussian Sinc DAF displays a slightly better smoothness and rapid decay than the B-spline Lagrange wavelets.

If we select more sophisticated window shapes, the Sinc wavelets can be generalized further. We shall call these extensions Bell-windowed Sinc wavelets. The available choice can be the different kinds of the popularly-used DFT (discrete Fourier transform) windows, such as Bartlett, Hanning, Hamming, Blackman, Chebechev, and Besel windows.

Visual Group Normalization

Filterbank Magnitude Normalization

On each decomposition level, 2-D wavelet coefficients are divided into four sub-blocks, LL, HL, LH, and HH. As usual, L and H represent the low-pass and high-pass subband filtering results, respectively. For example, HL means the signal passes the horizontal high-pass filter first and passes the vertical low-pass filter. Obviously, the detailed sub-blocks HL, LH and HH represent the multiscale difference operation in three different decomposition orientations, horizontal, vertical, and diagonal, respectively. At each level of analysis, the bandwidth of the equivalent subband filters decreases by a factor of two.

Wavelet coefficients can be regarded as the output of the signal passing through equivalent decomposition filters (EDF). The responses of the EDF are the combination of several recurrent subband filters at different stages [19, 28, 34, 37, 38, 40, 41]. The EDF amplitudes of various sub-blocks differ greatly. Thus, the magnitude of the decomposition coefficients in each of the sub-blocks cannot exactly reproduce the actual strength of the signal components. To adjust the magnitude of the response in each block, the decomposition coefficients are re-scaled with respect to a common magnitude standard. Thus EDF coefficients, $C_{j,m}$ (k), in block (j,m) should be multiplied with a magnitude scaling factor, $\lambda_{j,m}$, to obtain an adjusted magnitude representation. Here j represents the decomposition layer, and m denotes the different orientation block (LL, LH, HL or HH).

We choose the normalizing factor to be the reciprocal of the maximum magnitude of the frequency response of the equivalent wavelet decomposition filter on node (j,m)

$$\lambda_{j,m} = \frac{1}{\sup_{\omega \in \Omega}\{|LC_{j,m}(\omega)|\}}, \quad \Omega = [0, 2\pi] \qquad (238)$$

Thus, the magnitude normalized coefficients, $NC_{j,m}(k)$, are defined as $$NC_{j,m}(k) = \gamma_{j,m}C_{j,m}(k) \qquad (239)$$

This idea was recently extended to Group Normalization (GN) of wavelet packets for signal processing [37, 38, 40, 41] and was shown to yield the optimal performance.

Filterband magnitude normalization (FMN) unifies the coefficient strength in each of the subblocks. However, an image is a perceptual signal source. Coefficients with equal magnitude (after FMN) in different frequency channels result in greatly different visual gain (sensitivity) for human eyes. Additional adjustments of the wavelet coefficients are required for visual image processing.

Perceptual Lossless Normalization

The reconstruction visibility of wavelet transform coefficients will depend upon the display visual resolution [39] in pixel/degree. Given a viewing distance in inches and a display resolution d in pixel/inch, the effective display visual resolution (DVR) R in pixel/degree of visual angle is $$R = dV\tan(\pi/180) \approx dV/57.3 \qquad (240)$$

The visual resolution is the viewing distance in pixels (dV) divided by 57.3.

As mentioned above, when the decomposition layer increases, the bandwidth of the equivalent subband filters decreases by a factor of two. Thus the frequency resolution doubles. Correspondingly, the space (time) resolution (displayresolution) decreases by a factoroftwo. A sub-block of wavelet coefficients corresponds to a spatial frequency band. For a display resolution of R pixel/degree, the spatial frequencyf of levelj is $$f = 2^{-j}R \qquad (241)$$

For a Y-channel gray-scale mammogram image, the just-noticeable quantization threshold of Y is generally different at each spatial frequency. The contrast sensitivity declines when the spatial frequency increases (whereas, the size of the stimuli decreases). This fact is used to construct the "perceptual lossless" response magnitude for normalization in subblock (j, m) according to the visual response.

For images based on the human vision system (HVS), using a just-noticeable distortion profile, we can efficiently remove the visual redundancy from decomposition coefficients and normalize them with respect to the standard ofperceptual importance. A simple mathematical model for perception efficiency, based on the amplitude nonlinearity in different frequency bands, has been presented in [39], which can be used to construct the "perceptual lossless" response magnitude $Y_{j,m}$ for normalizing visual response in different luminance/chrominance spaces. We extend the definition to luminance/chrominance modes according to $$Y_{j,m} = a10^{k\left(\log \frac{2^j f_0 d_m}{R}\right)^2} \quad (242)$$

where a defines the minimum threshold, k is a constant, R is the Display Visual Resolution (DVR), $f_0$ is the spatial frequency, and $d_m$ is the directional response factor for each subblock.

The parameters $d_{LL}$, and $d_{HH}$ represent the thresholds for orientations LL and HL as frequency shifts relative to the threshold for orientations LH and HL. From the nature of dyadic wavelets, the orientation LL possesses a spectrum that is approximately a factor of two lower in spatial frequency than orientation LH or HL. This would suggest a factor of $d_{LL}=2$. However, in a vision system response mechanism, at orientation LL the signal energy is spread over all matrix elements, which implies less visual efficiency than when the energy is concentrated over a narrow range, as is the case for the spectra of orientation HL or LH. Thus, the threshold should be increased, which can be achieved by a slight reduction in $f_0$. The final value for $d_{LL}$ is therefore less than 2.

For orientation HH, similar effects exist. First, the Cartesian splitting of the spectrum makes the spatial frequency of orientation HH about $\sqrt{2}$ higher than that of the orientations HL, and LH. Thus $d_{HH}$ can be taken as $d_{HH}=2^{-1/2}$. As we mentioned before, the spectrum along orientation HH is spread over two orthogonal orientations (45° and 135°), which should result in a log threshold increase of about $2^{1/4}$ (a shift of $2^{-1/4}$) or a total threshold factor of $d_{HH}2^{-3/4}=0.59$. Finally, the well-known oblique effect [39], will cause a small amount of threshold elevation.

Visual Sensitivity Normalization

Visual sensitivity is defined as the inverse of the contrast required to produce a threshold response [9], $$S=1/C \quad (243)$$

where C is generally referred to simply as the threshold. The Michelson definition of contrast, $$C=(L_{max}-L_{mean})/L_{mean} \quad (244)$$

is used, where $L_{max}$ and $L_{mean}$ refer to the maximum and mean luminances of the waveform in a luminance channel. Sensitivity can be thought of as a gain, although various nonlinearities of the visual system require caution in the use of this analogy. The variations in sensitivity as a function of light level are primarily due to the light-adaptive properties of the retina and are referred to as the amplitude nonlinearity of the HVS. The variations as a function of spatial frequency are due to the optics of the eye combined with the neural circuitry; these combined effects are referred to as the contrast sensitivity function (CSF). Finally, the variations in sensitivity as a function of signal content, referred to as masking, are due to the post-receptoral neural circuitry.

Combining the perceptual lossless normalization, the visual sensitivity normalization and the magnitude normalized factor $\lambda_{j,m}$, we obtain the perceptual lossless quantization matrix $Q_{j,m}$ $$Q_{j,m}=2CY_{j,m} \quad (245)$$

This treatment provides a simple human-vision-based normalization technique for the restoration of the most important perceptual information in a mammogram image. We call the combination of the above-mentioned three normalizations the Visual Group Normalization (VGN) of wavelet transform coefficients.

Image Processing Techniques

Softer Logic Masking

The main objective of wavelet signal filtering is to preserve important signal components, and efficiently reduce noise components.

After visual group normalization processing, coefficients have been normalized according to human visual sensitivity. An additional filtering algorithm is required for de-noising and removing perceptual redundancy. Hard logic masking is the commonly used nonlinear processing technique. It is similar to a bias estimated dead-zone limiter. Jain [14] has shown that a non-linear dead-zone limiter can improve the SNR for weak signal detection. It can be expressed as $$\eta(y)=sgn(y)(|y|-\delta)^{\beta}_+, -1 \leq \beta \leq 1 \quad (246)$$

where $\delta$ is a threshold value, and y is the measurable value of the coefficient. Donoho shows that the $\beta=1$ case of the above expression is a near optimal estimator for adaptive NMR data smoothing and de-noising [11]. Independently, we utilized the hard logic masking to efficiently extract a target from formidable background noise in a previous work [26, 27, 28].

Various threshold cutoffs of multi-band expansion coefficients in hard logic masking methods are very similar to the cutoff of an FFT expansion. Thus, the Gibbs oscillations associated the FFT will also occur in the wavelet transform using a hard logic masking. Although hard logic masking methods with appropriate threshold values do not seriously change the magnitude of a signal after reconstruction, they can cause considerable edge distortions in a signal due to the interference of additional high frequency components induced by the cutoff. The higher the threshold value, the larger the Gibbs oscillations will be.

Edges are especially important for feature preservation and precise localization for images and biomedical signals. We here present a Softer Logic Masking (SLM) method. In our SLM approach, a smooth transition band near each masking threshold is introduced so that any decomposition coefficients, which are smaller than the threshold value, will be reduced gradually to zero rather than be set to zero. This treatment efficiently suppresses Gibbs oscillations and preserves signal edges, and consequently improves the quality of the reconstructed signal. Our SLM method can be expressed as $$\hat{C}_{j,m}(k)=sgn(C_{j,m}(k))(|C_{j,m}(k)-\delta|)_+ \cdot SOFT(\overline{NC_{j,m}(k)}) \quad (247)$$

where the $\hat{C}_{j,m}(k)$ are the decomposition coefficients to be retained in the reconstruction and the quantity $\overline{NC_{j,m}(k)}$ is defined as $$\overline{NC_{j,m}(k)} = \frac{|NC_{j,m}(k)|}{\max_{(j,m) \in T_{opt}}\{|NC_{j,m}(k)|\}} \quad (248)$$

The softer logic mapping, SOFT:$[0,1] \to [0,1]$, is a non-linear monotonically increasing sigmoid functional. A comparison of the hard and softer logic masking functionals is depicted in FIG. 77.

The softer logic functional can also be taken as the alternated form $$\hat{C}_{j,m}(k) = C_{j,m}(k) SOFT\left(\frac{\overline{NC_{j,m}(k)} - \zeta}{1 - \zeta}\right) \quad (249)$$

where $\zeta$ is a normalized adaptive threshold. For an unknown noise level, an approximation to $\lambda$ is given as $$\zeta = y_{upper} \hat{\sigma} \sqrt{2\log N/N} \quad (250)$$

where $\sigma$ is a scaling factor and can be chosen as $\sigma = 1/1.349$. The quantity $y_{upper}$ is an upper frame boundary of the wavelet packet transform, i.e., the upper boundary singular value of the wavelet transform decomposition matrix. Using arguments similar to those given by Donoho [11], one can show that the above Softer Logic Masking reconstruction is anear optimal approximation in the min-max error sense.

Device Adapted Enhancement

The basic idea is to use gradient operators to shape flat image data so that desired portion of the image is projected onto a screen.

Using visual normalization and softer-logic thresholding, one can efficiently remove the visual redundancy and noisy components from the decomposition coefficients.

For grayscale image contrast stretching, the objective is to improve the perception capability for image components which the human visual system is initially insensitive but is important for diagnosis. In other words, mammogram enhancement increases the cancer detection probability and precision. We first appropriately normalize the decomposition coefficients according to the length scale of the display device so that they fall within the interval of the device frame. Assume that the image coefficients have already been properly scaled by visual group normalization so that the amplitude value $NC_{j,m}(k)$ falls into the dynamic range of the display device:

$$d_{min} \leq NC_{j,m}(k) \leq d_{max} \quad (251)$$

Without loss of generality, we consider the normalized gradient magnitude, $$U_{j,m}(k) = NC_{j,m}(k)/(d_{max} - d_{min}) \quad (252)$$

Mallat and Zhong realized that wavelet multiresolution analysis provides a natural characterization for multiscale image edges, and these can be easily extracted by various differentiations [15]. Their idea was extended by Laine et al [7] to develop directional edge parameters based on a subspace energy measurement. An enhancement scheme based on complex Daubechies wavelets was proposed by Gagnon et al. [9]. These authors made use of the difference between the real and imaginary parts of the wavelet coefficients. One way or another, adjusted wavelet transforms should be designed to achieve desired edge enhancement.

Our starting point is taken to be the magnitude normalized or visual group normalized wavelet subband coefficients $NC_{j,m}(k)$ [10, 12]. We define an enhancement functional $E_{j,m}$ $$E_{j,m} = \alpha_{j,m} + \beta_{j,m} \Delta \quad (253)$$

where $\Delta$ is the Laplacian and $-1 \leq \alpha_{j,m}, \beta_{j,m} \leq 1$. The coefficients $\alpha_{j,m}$, $\beta_{j,m}$ can be easily chosen so that desired image features are emphasized. In particular we can emphasize an image edge of selected grain size. We note that a slight modification of $\alpha_{j,m}$ and $\beta_{j,m}$ can result in orientation selected image enhancement. A detailed discussion of this matter will be presented elsewhere. An overall re-normalization is conducted after image reconstruction to preserve the energy of the original image. We call this procedure enhancement normalization.

Contrast stretching is an old but quite efficient method for feature selective image display. Nonlinear stretching has been used by many authors [3, 7, and 16]. Lu and coworkers [16] have recently designed a hyperbolic function $$g_j(k) = [tanh(ak-b) + tanh(b)]/[tanh(a-b) + tanh(b)] \quad (254)$$

for wavelet multiscale gradient transformation. Their method works well for lunar images. The basic idea is to use gradient operators to shape a flat image so that desired portion of the image is projected into a screen window.

Enhancement Result

Figure 78A:
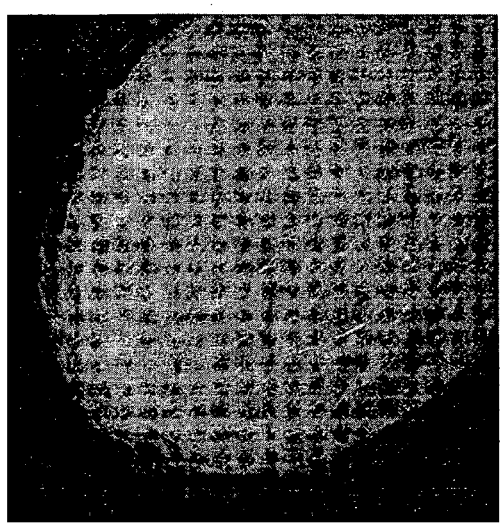
Figure 78B:
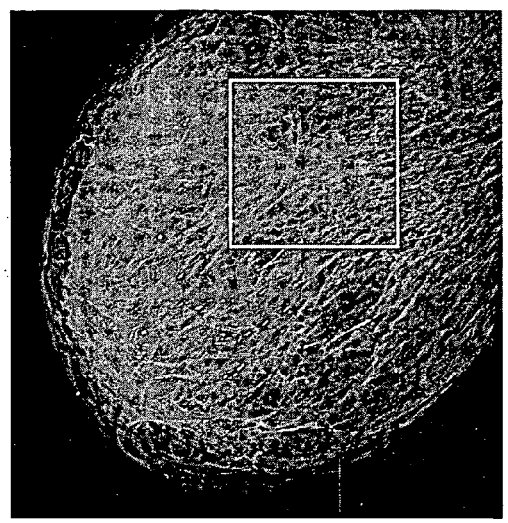

To test our new approaches, digital breast mammogram images are employed. Mammograms are complex in appearance and signs of early disease are often small and/or subtle. Digital mammogram image enhancement is particularly important for aiding radiologists in the development of an automatically detecting expert system. The original image is coded at 768×800 size and a 200-micron pixel edge as shown in FIG. 78(a). As shown in FIG. 78(b), there is a significant improvement in both edge representation and image contrast resulting from DAF-wavelets combined with our Visual Group Normalization (VGN) and non-linear enhancement techniques. In particular, the domain and internal structure of higher-density cancer tissues are clearly displayed. The results are characterized by high-quality image enhancement and good signal averaging over homogeneous regions with minimal resolution degradation of image details.

CONCLUSION

The newly developed DAF-wavelet image processing and enhancement techniques can improve present and future imaging performance for earlier detection of cancer and malignant tumors. It improves the spatio-temporal resolution of biomedical images and enhances the visualization of the perceptually less-sensitive components that are very important for diagnosis, as well as reduces the distortion and blur.

Different image processing techniques (distortion suppression, enhancement, and edge sharpening) can be integrated in a single step process or can be alternatively applied by different coefficient selection. Our biomedical image processing and computer vision research should prove important in meeting hospital needs in image enhancement, image analysis and expert diagnosis.

The method presented can be applied to various types of medical images. These include various X-ray images, Mammography, Magnetic Resonance Imaging (I, Supersonic imaging, etc. Enhanced imaging of internal organs and/or other parts of the human body, for the detection of cancer and other diseases, is of great importance. It has the potential for earlier, cost-effective diagnosis and management of disease, can provide improved visualization ofnormnal versus diseased tissue, and enhance the study of drug diffusion and cellular uptake in the brain.

The method dramatically improves the image quality (in terms of signal to noise improvements and/or contrast differentiation) by de-noising and enhancement, as demonstratedly the digital mammogram example.

REFERENCES

[1] Ansari, C. Guillemot, and J. F. Kaiser, "Wavelet construction using Lagrange halfband filters," IEEE Trans. CAS, vol. 38, no. 9, pp. 1116–1118, 1991.

[2] R. Baraniuk, D. Jones, "Signal-dependent time-frequency analysis using a radially Gaussian kernel," Signal Processing, Vol. 32, pp. 263–284, 1993.

[3] C. M. Brislawn, "Preservation of subband symmetry in multirate signal coding," IEEE Trans. SP, vol. 43, no. 12, pp. 3046–3050, 1995.

[4] C. K. Chui, An Introduction to Wavelets, Academic Press, New York, 1992.

[5] C. K. Chui, Wavelets: A Tutorial in Wavelet Theory and Applications, Academic Press, New York, 1992.

[6] I. Daubechies, "Orthonormal bases of compactly supported wavelets", Comm. Pure and Appl. Math., vol. 41, no. 11, pp. 909–996, 1988.

[7] I. Daubechies, "The wavelet transform, time-frequency localization and signal analysis," IEEE Trans. Inform. Theory, Vol. 36, No. 5, pp. 961–1003, September 1990.

[8] G. Deslauriers, S. Dubuc, "Symmetric iterative interpolation processes," Constructive Approximations, vol. 5, pp. 49–68, 1989.

[9] D. L. Donoho, "De-noising by soft-threshold," IEEE Trans. Information Theory, vol. 41, no. 3, pp. 613–627, 1995.

[10] D. L. Donoho, "Interpolating wavelet transform," Preprint, Stanford Univ., 1992.

[11] S. Dubuc, "Interpolation through an iterative scheme", J. Math. Anal. and Appl., vol. 114, pp. 185~204, 1986.

[12] A. Harten, "Multiresolution representation of data: a general framework," SIAM J. Numer. Anal., vol. 33, no. 3, pp. 1205–1256, 1996.

[13] C. Herley, M. Vetterli, "Orthogonal time-varying filter banks and wavelet packets," IEEE Trans. SP, Vol. 42, No. 10, pp. 2650–2663, October 1994.

[14] C. Herley, Z. Xiong, K. Ramchandran and M. T. Orchard, "Joint Space-frequency Segmentation Using Balanced Wavelet Packets Trees for Least-cost Image Representation," IEEE Page 147 Trans. Image Processing, vol. 6, pp. 1213–1230, September 1997.

[15] D. K. Hoffman, N. Nayar, O. A. Sharafeddin, and D. J. Kouri, "Analytic banded approximation for the discretized free propagator," J. Physical Chemistry, vol. 95, no. 21, pp. 8299–8305, 1991.

[16] L. C. Jain, N. M. Blachman, and P. M. Chapell, "Interference suppression by biased nonlinearities," IEEE Trans. IT, vol. 41, no. 2, pp. 496–507, 1995.

[17] N. Jayant, J. Johnston, and R. Safranek, "Signal compression based on models of human perception", Proc. IEEE, vol. 81, no. 10, pp. 1385–1422, 1993.

[18] J. Kovacevic, and M. Vetterli, "Perfect reconstruction filter banks with rational sampling factors," IEEE Trans. SP, Vol. 41, No. 6, pp. 2047–2066, June 1993.

[19] J. Kovacevic, W. Swelden, "Wavelet families of increasing order in arbitrary dimensions," Submitted to IEEE Trans. Image Processing, 1997.

[20] A. F. Laine, S. Schuler, J. Fan and W. Huda, "Mammographic feature enhancement by multiscale analysis," IEEE Trans. MI, vol. 13, pp. 725–740, 1994.

[21] S. Mallat, "A theory for multiresolution signal decomposition: the wavelet representation," IEEE Trans. PAMI, Vol.11, No. 7, pp. 674–693, July 1989.

[22] Y. Meyer, Wavelets Algorithms and Applications, SIAM Publ., Philadelphia 1993.

[23] K. Ramnchandran, M. Vetterli, "Best wavelet packet bases in a rate-distortion sense," EEE Trans. Image Processing, Vol. 2, No. 2, pp. 160–175, April 1993.

[24] K. Ramchandran, Z. Xiong, K. Asai and M. Vetterli, "Adaptive Transforms for inage Coding Using Spatially-varying Wavelet Packets," EEE Trans. Image Processing, vol. 5, pp. 1197–1204, July 1996.

[25] O. Rioul, M. Vetterli, "Wavelet and signal processing," IEEE Signal Processing Mag., pp. 14–38, October 1991.

[26] N. Saito, G. Beylkin, "Multiscale representations using the auto-correlation functions of compactlysupported-wavelets," IEEE Trans. Signal Processing, Vol. 41, no. 12, pp. 3584–3590,1993.

[27] M. J. Shensa, "The discrete wavelet transform: wedding the a trous and Mallat algorithms", EEE Trans. SP, vol. 40, no. 10, pp. 2464–2482, 1992.

[28] Z. Shi, Z. Bao, "Group-normalized processing ofcomplex wavelet packets," Science in China (Serial E), Vol. 26, No. 12, 1996.

[29] Z. Shi, Z. Bao, "Group-normalized wavelet packet signal processing", Wavelet Application IV, SPIE, vol. 3078, pp. 226~239, 1997.

[30] Z. Shi, Z. Bao, "Fast image coding of interval interpolating wavelets," Wavelet Application IV, SPIE, vol. 3078, pp. 240–253, 1997.

[31] Z. Shi, G. W. Wei, D. J. Kouri, and D. K. Hoffman, "Perceptual image processing using Gauss-Lagrange distributed approximating functional wavelets," submitted to IEEE SP Letter, 1998.

[32] W. Swelden, "The lifting scheme: a custom-design construction of biorthogonal wavelets," Appl. And Comput. Harmonic Anal., vol. 3, no. 2, pp. 186~200, 1996.

[33] T. D. Tran, R. Safranek, "A locally adaptive perceptual masking threshold model for image coding," Proc. ICASSP, 1996.

[34] M. Unser, A. Adroubi, and M. Eden, "The $L_2$ polynomial spline pyramid," IEEE Trans. PAMI vol. 15, no. 4, pp. 364–379, 1993.

[35] P. Vaidyanathan, T. Chen, "Role of anti-causal inverse in multirate filter-banks—Part I: system-theoretic fundamentals," IEEE Trans. SP, Vol. 43, No. 5, pp. 1090–1102, May 1995.

[36] P. Vaidyanathan, T. Chen, "Role of anti-causal inverse in multirate filter-banks—Part II: the FIR case, factorizations, and biorthogonal lapped transforms," IEEE Trans. SP, Vol. 43, No. 5, pp.1103–1115, May 1995.

[37] M. Vetterli, C. Herley, "Wavelet and filter banks: theory and design," IEEE Trans. SP, Vol. 40, No. 9, pp. 2207–2232, September 1992.

[38] J. D. Villasenor, B. Belzer, and J. Liao, "Wavelet filter evaluation for image processing," IEEE Trans. IP, vol. 4, no. 8, pp1053–1060, 1995.

[39] A. B. Watson, G. Y. Yang, J. A. Solomon, and J. Villasenor, "Visibility of wavelet quantization noise," IEEE Trans. Image Processing, vol. 6, pp. 1164–1175, 1997.

[40] G. W. Wei, D. S. Zhang, D. J. Kouri, and D. K. Hoffman, "Lagrange distributed approximating Functionals," Physical Review Letters, Vol. 79, No. 5, pp. 775–779, 1997.

[41] G. W. Wei, D. J. Kouri, and D. K. Hoffman, "Wavelets and distributed approximating functionals," submitted to Phys. Rev. Lett.

[42] Z. Xiong, K. Ramchandran and M. T. Orchard, "Space-frequency Quantization for Wavelet Image Coding," IEEE Trans. Image Processing, vol. 6, pp. 677–693, May 1997.

[43] S. H. Zhang, Z. Bao, etc. "Target extraction from strong clutter background," Tech. Rep., National Key Lab of Radar Signal Processing, Xidian University, 1994

All references (articles and patents) referenced or cited in this disclosure are incorporated herein by reference. Although the invention has been disclosed with reference to its preferred embodiments, from reading this description those of skill in the art may appreciate changes and modification that may be made which do not depart from the scope and spirit of the invention as described above and claimed hereafter.

Dual Propagation Inversion of Fourier and Laplace Signals

Introduction

In many physical and chemical phenomena, two functions are related by an integral equation of the form $$C(x) = \int dx' K(x,x') f(x') \tag{255}$$

where $K(x,x')$ is some sort of "Transform Kernel", and x, x' may be conjugate variables (depending on the transform under consideration). For experimental or computational studies, the function $C(x)$ is typically known only on a finite, discrete set of points. Extracting $f(x')$ from measured or calculated values of $C(x)$ is referred to as "inversion". Famous examples of this inversion problem are the Fourier and Laplace transforms. Although there are well-known, exact mathematical procedures for these inversions, one generally faces serious difficulties in numerically determining the function $f(x')$ from $C(x)$—values known at a finite number of discrete points. In the Laplace transform, for example, the inversion may be unstable due to amplification of noise or other errors in the $C(x_i)$ data [1]. Inverse Fourier transforms can also suffer from slow convergence of the integration, requiring a large range of samples of the $C(x_i)$, so that one is able to obtain only low resolution spectra when a sufficiently long duration time signal is not available [2,3].

A convenient procedure for numerically inverting such an integral equation is disclosed, with the focus here being primarily on real-time spectra. We shall demonstrate the method using a simple Fourier transformation as an example, but the procedure maybe useful for other inversion problems. Our method, termed the "dual propagation inversion"(DPI) method, makes use of the distributed approximating functional (DAF) free propagator [4] to carry out the inversion, but other numerical free propagator techniques (such as the Fast Fourier method [5,6]) may also be used. The Fourier transform is naturally invoked whenever one tries to obtain information in the frequency-domain from a time-domain signal. In general, for real spectra, the time-domain and frequency-domain spectra are related by $$C(t) = \int_{-\infty}^{\infty} d\omega\, e^{-i\omega t} f(\omega) \tag{256}$$

and $$f(\omega) = \frac{1}{2\pi} \int_{-\infty}^{\infty} dt\, e^{i\omega t} C(t) \tag{257}$$

Typical examples of the sorts of problems of interest are the computation of absorption spectra or Raman spectra [7] from the autocorrelation function and the extraction of vibrational frequencies from a molecular dynamics simulated time signal [8]. The difficulty in the direct inversion by Equation (257) is that in order to resolve close-lying frequencies, one needs to know the autocorrelation function (or time signal in general) on a very dense time grid over a long period of time [2,3]. When the time signal is available only on a set of discrete times and for a short time period, this approach becomes inefficient and inaccurate. Several elegant methods, such as the filter-diagonalization technique, developed by Neuhauser [9] and modified by Mandelshtam and Taylor [10], have been proposed for such problems.

In the present approach, we begin by inserting a factor, $\exp[i\alpha(\omega-\omega_0)^2]$, into Equation (256), thereby defining an auxiliary function $$\check{C}(t;\alpha,\omega_0) = \int_{-\infty}^{\infty} d\omega\, e^{i\alpha(\omega-\omega_0)^2} e^{-i\omega t} f(\omega) \tag{258}$$

(Note that Equation (258) can be viewed as a type of Fresnel transform [11] an integral kernel $K(\omega,\omega_0) = \exp[i\alpha(\omega-\omega_0)^2]$). From that viewpoint, the kernel acts on $e^{-i\omega t} f(\omega)$ rather than on $f(\omega)$.) Due to the highly oscillatory nature of the factor $\exp[i\alpha(\omega-\omega_0)^2]$ for large $\alpha$ values, only frequencies sufficiently close to $\omega=\omega_0$ contribute significantly to Equation (258). In fact, it can be shown that in the limit $\alpha \to \infty$, $\check{C}(t;\alpha,\omega_0)$ becomes proportional to $f(\omega)$. The factor, $\exp[i\alpha(\omega-\omega_0)^2]$, can be viewed as a window function that acts as a "filter" so that the auxiliary function, $\check{C}(t;\alpha,\omega_0)$, contains information principally at frequencies near $\omega=\omega_0$. We note that the factor $\exp[i\alpha(\omega-\omega_0)^2]$ also can be expressed as a matrix element of the "free propagator", $\exp[(-i/4\alpha)(d^2/d\omega^2)]$, according to $$e^{i\alpha(\omega-\omega_0)^2} = \tag{259}$$
$$(\pi i/\alpha)^{1/2} \left\langle \omega \left| e^{\frac{-i}{4\alpha}\frac{d^2}{d\omega^2}} \right| \omega_0 \right\rangle = (\pi i/\alpha)^{1/2} e^{\frac{-i}{4\alpha}\frac{d^2}{d\omega_0^2}} \delta(\omega-\omega_0)$$

and the integration over $\omega$ in Equation (258) is equivalent to evaluating the action of $\exp[(-i/4\alpha)(d^2/d\omega)^2)]$ in the continuous "$\omega$"—representation. That is, the introduction of the phase $\exp[i\alpha(\omega-\omega_0)^2]$ is equivalent to freely propagating (in the sense of quantum propagation) the function $e^{-i\omega t} f(\omega)$ for a "duration", $1/(4\alpha)$, in a generalized time. This enables us to write Equation (258) as $$\check{C}(t;\alpha,\omega_0) = (\pi i/\alpha)^{1/2} \exp\left[-\frac{i}{4\alpha}\frac{d^2}{d\omega_0^2}\right](e^{-i\omega_0 t} f(\omega_0)) \tag{260}$$

The function $f(\omega_0)$ then is obtained simply by inverting Equation (260), $$f(\omega_0) = (\alpha/\pi i)^{1/2} e^{i\omega_0 t} e^{\frac{i}{4\alpha}\frac{d^2}{d\omega_0^2}} \check{C}(t;\alpha,\omega_0) \tag{261}$$

This equation indicates that the value of the function $f(\omega_0)$ can be computed by freely propagating the auxiliary function $\check{C}(t;\alpha)$ for a "duration" $1/(4\alpha)$. However, for this equation to be of any use, we need an independent method for calculating the auxiliary function from the experimentally (or theoretically) determined $C(t)$. The function $\check{C}$ ($t;\alpha,\omega_0$) can be calculated directly from the experimentally determined signal, C(t), using the following expression:

$$\check{C}(t_0; \alpha, \omega_0) = e^{-i\omega_0 t_0} e^{-i\alpha \frac{d^2}{dt_0^2}} [e^{i\omega_0 t_0} C(t_0)] \quad (262)$$

This equation is obtained by deriving (and integrating) the auxiliary partial differential equation, $$\frac{\partial}{\partial \alpha}[e^{i\omega_0 t}\check{C}(t; \alpha, \omega_0)] = -i\frac{\partial^2}{\partial t^2}(e^{i\omega_0 t}\check{C}(t; \alpha, \omega_0)) \quad (263)$$

Thus, our procedure consists of propagating the experimental time signal, C(t) (multiplied by exp($i\omega_0 t$)), from t to $t_0$ over the "duration" $\alpha$ to obtain $\check{C}$ ($t_0;\alpha,\omega_0$), and then propagating the resulting $\check{C}(t_0;\alpha,\omega_0)$ from %$\omega_0$ to $\omega$ over the "duration" $1/(4\alpha)$. Clearly, the product of the two "propagation durations" is a constant ($\alpha \times \frac{1}{4} = \frac{1}{4}$), indicating that there exists a reciprocal relationship characteristic of a "time-energy"-like uncertainty principle. In the numerical example we give below, we shall choose $\alpha=\frac{1}{4}\alpha=\frac{1}{2}$; however, this is not necessary and the question of the optimum "duration" for each propagation remains to be explored. We also find it numerically efficient to employ the DAF-free propagator [4], $$\left\langle \omega \left| e^{i\alpha \frac{d^2}{d\omega^2}} \right| \omega_0 \right\rangle = \quad (264)$$

$$\sum_{n=0}^{M/2} b_n \left( \frac{\sigma(0)}{\sigma(\alpha)} \right)^{2n+1} \exp\left[-\frac{(\omega-\omega_0)^2}{2\sigma^2(\alpha)}\right] H_{2n}\left[-\frac{(\omega-\omega_0)}{\sqrt{2}\,\sigma(\alpha)}\right]$$

where $$b_n = (-1)^n / [(2\pi)^{1/2} \sigma(0) n! 2^{2n}] \quad (265)$$

and $$\sigma^2(\alpha) = \sigma^2(0) + 2i\alpha \quad (266)$$

where, $\sigma(0)$ and M are DAF-parameters, and the $H_{2n}$'s are the Hermite polynomials [4,12]. This makes it possible to carry out the two propagations with a single matrix-vector multiplication for each propagation. It should be noted that this DAF-free propagator exactly propagates the DAF representation of a function.

We believe that the dual-propagation inversion scheme we have outlined has several potential advantages. First, the DAF-fitting method on which the scheme is based allows us to effectively filter noise while preserving signal. The method provides a "signature" as a function of the DAF parameters which gives a measure of signal to noise and allows the parameters to be varied to achieve optimum filtering. Second, as already noted, the propagation of the DAF representation of a function using the Hermite DAF propagator is exact. Third, each propagation has associated with it a characteristic width controlled by the Gaussian (see Equations (264) and (266)) and determined by the optimum fit of the input data. These widths control on what domain of t the function C(t) must be known in order to determine a particular value of f($\omega_0$). Finally, DAFs can be used to "pad" (i.e., extend) the initial C(t) dataset in various ways to take advantage of any a priori knowledge one might have.

A detailed comparison of our method with other inversion methods is beyond the scope of this brief report and will be the topic of a subsequent communication. However, we will illustrate the method on a challenging problem, namely extracting a half-sine wave from its discretized and noisy transform. The underlying function, f($\omega$), in our example is then $$f(\omega) = \begin{cases} \sin(\omega), & [0 \le \omega \le \pi] \\ 0, & \text{otherwise} \end{cases} \quad (267)$$

Since f($\omega$) has compact support, the time-signal, C(t)(analytically obtained by Equation (256)) of course, cannot have compact support. In fact, it has a very slow decay with increasing |t|. First, f($\omega$) was computed by our dual propagation using Equations (261) and (262), and the result compared with the truncated sine function, Equation (267). In FIG. 79, we present the auxiliary function, $\check{C}$ (t;$\alpha,\omega_0$), at t=0 and $\alpha=\frac{1}{2}$, as a function of $\omega_0$. We have calculated this function both by direct numerical integration of Equation (258) and by DAF propagation using Equation (262) [13]. The results of the DAF propagation and the direct numerical integration are essentially identical up to the fourth decimal point. The propagation to generate the auxiliary function has been carried out by a highly efficient "one-step DAF-propagation" of duration $\alpha=\frac{1}{2}$. FIG. 80 compares the spectral function, f($\omega$), obtained by the present dual propagation [13] with the original truncated sine-function. It Asian that the two are visually indistinguishable. In this calculation, we assumed discrete "experimental" values of C(t) are known from $-45 \le t \le 45$ on a discrete grid with uniform spacing $\Delta t_0 = \frac{1}{18}$, and the propagation from $\omega_0$ to $\omega$ employs the computed values of $\check{C}$ ($t_0;\alpha,\omega_0$) from $-30 \le \omega_0 \le 35$, with auniform grid spacing of $\Delta\omega_0 = \frac{1}{18}$. We emphasize that one onlyneeds the time signal C(t) for a finite time interval, [$t_{min}, t_{max}$], in order to calculate $\check{C}$ ($t_0;\alpha,\omega_0$) using Equation (262). Although the accuracy increases for longer-time signals, C(t), the length of the time interval is controlled the width of the DAF free propagator matrix (determined by $\sigma/\Delta t_0$). Thus, short-duration time signals can yield an accurate spectrum f($\omega$) for the frequencies filtered out in Equations (258) and (262) in our method. It should also be noted that the present technique does not require a knowledge of the system Hamiltonian, or any diagonalization processes, since it makes direct use of the time signal (or autocorrelation function). Thus, the measured or computed time signals directly yield information in the frequency domain (e.g., optical spectra or normal mode frequencies).

One of the features of DAFs that has been discussed previously is their ability to filter noise from a given function. The free-propagating DAF described here also has this filtering property, which is extremely useful in the present context. When an inversion is carried out for experimental data, the presence of noise in the time signal C(t) will create inaccuracies in the calculated spectrum, f($\omega$). (This problem is especially serious in the inverse Laplace transformation, since statistical errors present in the signal can be easily amplified.) In order to illustrate the filtering feature of our DPI procedure, we added random noise(up to ±20%) to the time signal C(t), and carried out the dual propagation inversion as before. We find that the resulting auxiliary function, $\check{C}$ ($t_0;\alpha,\omega_0$) is very similar to that obtained earlier using the noise-free time signal, confirming that high frequency, random noise is automatically removed by the DPI method. FIG. 81 illustrates this denoising feature of the DPI, using Hermite-DAF free propagators, by comparing the spectrum obtained from the "corrupted" time signal (with ±20% noise) to that obtained from the noise-free time signal. Both time domain signals extend over the range $-45 \leq t \leq 45$, with the same sampling frequency as before. It is seen that the DPI almost completely removes the effects of the noise in the time signal. We also employed a stationary DAF filtering method [14] to remove the noise from the time signal before carrying out the DPI procedure, and obtained a frequency domain spectrum $f(\omega)$ that is visually indistinguishable from that depicted in FIG. 81.

Finally, we explore the consequences of a more severe truncation of the time-domain signal, and therefore carried out the DPI procedure using C(t) over the artificially shortened interval $-5 \leq t \leq 5$. In these calculations, we have treated the noiseless C(t). Our results are shown in FIG. 82, where we compare the inversion result to the exact, original signal. We see that there is relatively little error induced (comparable to that due to introducing noise; see FIG. 81). A common procedure to decrease the aliasing effects caused by the truncation of the time domain signal is to artificially damp C(t) to zero beyond certain times. This is typically done by interpolation or by smoothly joining an exponential decaying analytical "tail". In the case of DAFs, we can add a gap on either side of the truncated C(t), and use DAF-fitting to "fill in" the missing gap values, thereby joining the actual data to an analytical tail function. In the present study, we introduced the gaps $5 \leq |t| \leq 7.5$, and joined the known data between $-5 \leq t \leq 5$ to the analytical tail $$C(t) = -0.040648 \exp(-0.107871|t|) \tag{268}$$

The results of the DPI are compared to the original signal in FIG. 83, and we see that while some aliasing still exists, it is reduced over the entire range of $\omega$. Similar results are obtained when noisy signals are truncated, and then DAF-joined to an analytical decaying tail function. We conclude by noting that we expect even better results will be obtained by using DAFs to periodically (or in other ways) extend the truncated time domain signal. This will be reported elsewhere.

We conclude by briefly considering the Laplace transform problem, namely numerically inverting $$C(t) = \int_0^\infty d\omega\, e^{-\omega t} f(\omega) \tag{269}$$

which our method (in principle) also solves. Here C(t) is analytic in the half-plane (t>0). In the standard way, it is convenient to introduce a new function $$\bar{f}(\omega) = \begin{cases} f(\omega), & \text{for } \omega \geq 0 \\ 0, & \text{for } \omega < 0 \end{cases}$$

to write $$C(t) = \int_{-\infty}^\infty d\omega\, e^{-\omega t} \bar{f}(\omega) \tag{270}$$

Exactly paralleling our previous discussion we then obtain $$\bar{f}(\omega_0) = (\alpha/\pi i)^{1/2} e^{\omega_0 t} e^{\frac{i}{4\alpha}\frac{d^2}{d\omega_0^2}} \check{C}(t; \alpha, \omega_0) \tag{271}$$

where now $$\check{C}(t; \alpha, \omega_0) = \int_{-\infty}^\infty d\omega\, e^{i\alpha(\omega-\omega_0)^2} e^{-\omega t} \bar{f}(\omega) \tag{272}$$

The quantity $\check{C}(t;\alpha,\omega_0)$ obeys the equation $$\frac{\partial}{\partial \alpha}[e^{\omega_0 t}\check{C}(t;\alpha,\omega_0)] = -i\frac{\partial^2}{\partial t^2}[e^{\omega_0 t}\check{C}(t;\alpha,\omega_0)] \tag{273}$$

subject to the initial-value boundary condition $\check{C}(t;\alpha=0,\omega_0)=C(t)$. Equation (273) is identical to Equation (263) except for the sign of the right-hand side. The inversion then proceeds by solving Equation (273), subject to the boundary condition at $\alpha=0$ and propagating the result via Equation (271) to obtain the answer. Although this solves the problem in principle, the first step(that of solving Equation (273) to acceptable accuracy when C(t) is imprecisely known) is a challenge. In the Fourier transform case, we solved the corresponding partial differential equation by means of a second propagation, and indeed we can still write the formal solution to Equation (273) as $$e^{\omega_0 t} C(t;\alpha,\omega_0) = e^{i\alpha\frac{\partial}{\partial t}}[e^{\omega_0 t} C(t)] \text{ for } t > 0 \tag{274}$$

since C(t) is analytic in the half-plane (t>0) and hence its derivatives to all orders uniquely exist in the half-plane. However, using the DAF propagation scheme (at least in a straight-forward manner) presents difficulties near the origin because of the singularity in C(t) at t=0. Various stratagems can be devised for attacking these problems, and they are currently under investigation.

REFERENCES

[1] E. Gallicchio and B. J. Berne, {\it J. Chem. Phys.101, 9909 (1994); ibid. 105, 7064 (1996).
[2] M. R. Wall and D. Neuhauser, J. Chem. Phys. 102, 8011 (1995).
[3] V. A. Mandelshtam and H. S. Taylor, J. Chem. Phys.106, 5085 (1997).
[4] D. K. Hoffman, M. Arnold, and D. J. Kouri, J. Phys. Chem. 97, 1110 (1993); D. J. Kouri and D. K. Hoffman, in {\it Time-Dependent Quantum Molecular Dynamics}, eds. J. Broeckhove and L. Lathouwers (Plenum Press, New York, N.Y., 1992); see also N. Nayar, D. K. Hoffman, X. Ma, and D. J. Kouri, {\it J. Phys. Chem. (\bf 96}, 9637 (1992).
[5] H. J. Nussbaumer, {\it Fast Fourier Transform and Convolution Algorithms}, 2nd. ed. (Springer Verlag, Berlin, 1982).
[6] E. O. Brigham, {\it The Fast Fourier Transform (Prentice-Hall, Englewood Cliffs, N.J., 1974).
[7] E. J. Heller, {\it Accnts. Chem. Res.} {\bf 14), 368 (1981); D. Inre, J. L. Kinsey, A. Sinha, and J. Krenos, (\it J. Phys. Chem.} {\bf 88}, 3956 (1984); E. J. Heller, R. L.

Sundberg, and D. Tannor, {\it J. Phys. Chem.} {\bf 86}, 1822 (1982); S.-Y. Lee and E. J. Heller, {\it J. Chem. Phys.} {\bf 71}, 4777 (1979).

[8] M. D. Feit, J. A. Fleck, and A. Steiger, {\it J. Comp. Phys.} {\bf 47}, 412 (1982); E. J. Heller, E. B. Stechel, and M. J. Davis, {\it J. Chem. Phys.} {\bf 73}, 4720 (1980).

[9] D. Neuhauser, {\it J. Chem. Phys.} {\bf93}, 2611 (1990); {\it ibid} {\bf 100}, 5076 (1994).

[10] V. A. Mandelshtam and H. S. Taylor, {\it Phys. Rev. Lett.} {\bf 78}, 3274 (1997); {\it J. Chem. Phys.} {\bf 107}, 6756 (1997).

[11] F. Gori, {\it Optics Commun.} {\bf 39}, 293 (1981); A. Papoulis, {\it Systems and Transforms with Applications to Optics} (McGraw-Hill, New York, N.Y., 1968); L. Mertz, {\it Transformations in Optics} (Wiley, New York, N.Y., 1965).

[12] D. K. Hoffman, N. Nayar, O. A. Sharafeddin, and D. J. Kouri, {\it J. Phys. Chem.} {\bf 95}, 8299 (1991); D. J. Kouri, W. Zhu, X. Ma, B. M. Pettitt, and D. K. Hoffman, {\it ibid.} {\bf 96}, 9631 (1992); D. K. Hoffman and D. J. Kouri, in {\it Proc. 3rd. Int. Conf. Math. and Num. Aspects of Wave Prop.}, ed. G. Cohen (SIAM, Philadelphia, Pa., 1995) pp. 56–83; M. Arnold, D. K. Hoffman, and D. J. Kouri, unpublished.

[13] The parameters employed are $-45 \leq t\_0 \leq 45$, $M=40$, $\sigma\sigma\hat{\ }\Delta t=2.5$ and \Delta t=$\frac{1}{18}$.

[14] D. K. Hoffman, G. H. Gunaratne, D. S. Zhang, and D. J. Kouri, "Fourier Filtering of Images", {\it CHAOS}, submitted; D. S. Zhang, D. J. Kouri, D. K. Hoffman, and G. H. Gunaratne, "Distributed Approximating Functional Treatment of Noisy Signals", to be published; D. S. Zhang, Z. Shi, G. W. Wei, D. J. Kouri, G. H. Gunaratne, and D. K. Hoffman, "Distributed Approximating Functional Approach to Image Restoration", to be published.

Distributed Approximating Functional Wavelet Nets

Introduction

For real-world signal processing, pattern recognition and system identification, information extraction from a noisy background is the fundamental objective. To obtain an ideal output vector $Y(X, W)$ from the observation input vector X, the system (neural network) should possess the following two kinds of smoothness [6] (where W is the response or the entry of the system, normally for neural networks, called the weight vector).

(a) Functional space smoothness (b) State space smoothness

The degree of smoothness in functional space governs quality of the filtering of the observed (noisy) signal. The smoother the output signal, the more noise is suppressed. State space smoothness implies that a weak fluctuation of the weight vector $W=\{w(i), i=0, L-1\}$, has a small effect on the output signal, which makes the system less sensitive to the input distortion.

For a robust estimation system, the output not only approaches the observed signal value, but also smoothes the signal to suppress the distortion due to noise. Simultaneously, the state space should be smooth to ensure stability. Based on these facts, one finds that the least mean square (LMS) error $$E_A = \int [Y(X) - \hat{Y}(W,X)]^2 dX \tag{275}$$

the regularization constraints of order r $$E_R = \int \left[\frac{\partial^r \hat{Y}(W, X)}{\partial X^r}\right]^2 dX \tag{276}$$

and the condition of the system $$E_W = \frac{\|W\|}{\sum_i |g(x_i)|^2} \tag{277}$$

are the three dominant factors that must be accounted for in designing a robust estimation system.

Distributed Approximating Functionals (DAFs), which can be constructed as a window modulated interpolating shell, were introduced previously as a powerful grid method for numerically solving partial differential equations with extremely high accuracy and computational efficiency [3,9,10]. In this paper, we use the DAF approximation scheme for implementing a neural network.

Compared with other popular networks, DAF nets possess advantages in several areas:

(1) a DAF wavelet is infinitely smooth in both time and frequency domains.

(2) For essentially arbitrary order of the Hermite polynomial, the DAF shells possess an approximately constant shape, while commonly used wavelet functions always become more oscillatory as the regularization order is increased.

(3) The translation invariance of the DAF approximation ensures feature preservation in state space. The signal processing analysis can be implemented in a space spanned by the DAFs directly.

(4) Complicated mathematical operations, such as differentiation or integration, can be carried out conveniently using the DAF interpolating shell.

(5) The identical smoothness of the DAF wavelet space and DAF state space underlie the inherent robustness of the DAF wavelet nets.

Regularized DAF Wavelet Nets

In general, signal filtering may be regarded as a special approximation problem with noise suppression. According to DAF polynomial theory, a signal approximation in DAF space can be expressed as $$\hat{g}(x) = \sum_i g(x_i) \delta_\alpha(x - x_i) \tag{278}$$

where the $\delta_o(x)$ is a generalized symmetric Delta functional. We choose it as a Gauss modulated interpolating shell, or the so-call distributed approximating functional (DAF) wavelet. The Hermite-type DAF wavelet is given in the following equation [10].

$$\delta_M(x \mid \sigma) = \frac{1}{\sigma} \exp\left(\frac{-x^2}{2\sigma^2}\right) \sum_{n=0}^{M/2} \left(-\frac{1}{4}\right)^n \frac{1}{\sqrt{2\pi} n!} H_{2n}\left(\frac{x}{\sqrt{2}\,\sigma}\right) \tag{279}$$

The function $H_{2n}$, is the Hermite polynomial of even order 2n. The qualitative behavior of one particular Hermite DAF is shown in FIG. 84.

The DAF wavelet neural nets possess the alternative feature of the commonly used DAF approximation as $$\hat{g}(x) = \sum_i w(i)\delta_\alpha(x - x_i) \tag{280}$$

The weights w(i) of the nets determine the superposition approximation $\hat{g}(x)$ to the original signal $g(x) \in L^2(R)$. It is easy to show that the weights of the approximation nets, w(i), are closely related to the DAF sampling coefficients $g(x_i)$. The irregular finite discrete time samplers of the original signal are selected for network learning. If the observed signal is limited to an interval I containing a total of N discrete samples, I=(0, 1, ..., N−1}, the square error of the signal is digitized according to $$E_A = \sum_{n=0}^{N-1} [g(n) - \hat{g}(n)]^2 \tag{281}$$

This cost function is commonly used for neural network training in a noise-free background and is referred to as the minimum mean square error (MMSE) rule.

However, if the observed signal is corrupted by the noise, the network produced by MMSE training causes an unstable reconstruction, because the MMSE recovers the noise components as well as the signal. In this case, the signal-noise-ratio (SNR) cannot be improved much. Even for a noise-free signal, MMSE may lead to Gibbs-like undulations in the signal, which is harmful for calculating accurate derivatives. Thus, for more robust filtering, the network structure should be modified to deal with the particular situation. In this paper, we present a novel regularization design of the cost function for network training. It generates edge-preserved filters and reduces distortion. To define the regularity (smoothness) of a signal, we introduce a "Lipschitz index" [6].

Definition 1: Let $f(x) \in L^2(R)$, for any $\alpha > 0$, then if $$|f(x)-f(y)|=O(|x-y|^\alpha) \tag{282}$$

the signal f(x) is said to be unified Lipschitz in the space $L^2(R)$. The constant, $\alpha$, is the Lipschitz index of f(x).

It is easy to show that when the Lipschitz index, $\alpha$, is an integer, the Lipschitz regularity is equivalent to the differentiability of f(x) with same order. For commonly used signals, the Lipschitz index $\alpha > 0$. In the presence of noise distortion, the Lipschitz index always satisfies $\alpha < -1$. This is because the noise causes sudden phase changes at neighboring points. To eliminate non-ideal undulations, we need to preserve the signal trends while making a small MSE approximation. To achieve this, an additional smooth derivative term, $E_r$, is introduced to modify the original cost function. The new cost function is then $$E = E_A + \lambda E_r \tag{283}$$

$$= \sum_k [g(k) - \hat{g}(k)]^2 + \lambda \int_R \left[\frac{\partial^r \hat{g}(x)}{\partial x^r}\right]^2 dx$$

The factor l introduces a compromise between the orders of approximation and smoothness. Generally, the derivative order $r \geq 2$ is used to evaluate the smoothness of the signals. Using the properties of the Hermite DAFs, we find that the derivative term of the regularized cost function $E_r$, can be expressed in a comparatively simple convolution form, $$\frac{\partial^r \hat{g}(x)}{\partial x^r} = \sum_i w(i)\delta_M^{(r)}(x - x_i \mid \sigma) \tag{284}$$

where $\lambda$ is termed a "differentiating DAF" and is given by $$\delta_M^{(r)}(x - x_i \mid \sigma) = \frac{(-1)^r}{2^{r/2}\sigma^{r+1}} \exp\left(\frac{-(x - x_i)^2}{2\sigma^2}\right) \times \tag{285}$$

$$\sum_{n=0}^{M/2} \left(-\frac{1}{4}\right)^n \frac{1}{\sqrt{2\pi}\, n!} H_{2n+r}\left(\frac{x - x_i}{\sqrt{2}\,\sigma}\right)$$

It is exactly the rth derivative of $\delta\sigma$. Because of the infinite smoothness of DAF wavelets, any order derivative can be obtained. The Hermite polynomial H is generated by the usual recursion $$H_n(x) = \begin{cases} 1, & n = 0 \\ 2x, & n = 1 \\ 2xH_{n-1}(x) - 2(n-1)H_{n-2}(x), & n > 1 \end{cases} \tag{286}$$

The predominant advantage of the Hermite polynomial approximation is its high-order derivative preservation (which leads to a smooth approximation).

To increase the stability of the approximation system further, an additional constraint in state space is taken to be $$E_W = \frac{\sum_i |w(i)|^2}{\sum_i |g(x_i)|^2} \tag{287}$$

Thus the complete cost function utilized for DAF wavelet net training is given by $$E = E_A + \lambda E_r + \eta E_W \tag{288}$$

$$= \sum_k [g(k) - \hat{g}(k)]^2 + \lambda \int_R \left[\frac{\partial^r \hat{g}(x)}{\partial x^r}\right]^2 dx + \eta \frac{\sum_i |w(i)|^2}{\sum_i |g(x_i)|^2}$$

Simulations

Two biomedical signal processing applications (for electrocardiogram and electromyography) using the DAF wavelet neural nets are presented in this chapter.

Automatic diagnosis of electrocardiogram (ECG or EKG) signals is an important biomedical analysis tool. The diagnosis is based on the detection of abnormalities in an ECG signal. ECG signal processing is a crucial step for obtaining a noise-free signal and for improving diagnostic accuracy. A typical raw ECG signal is given in FIG. 85. The letters P, Q, R, S, T and U label the medically interesting features. For example, in the normal sinus rhythm of a 12-lead ECG, a QRS peak follows each P wave. Normal P waves rate 60–100 bpm with <10% variations. Their heights are <2.5 mm and widths <0.11s in lead II. A normal PR interval ranges from 0.12 to 0.20s (3–5 small squares). A normal QRS complex has a duration of <0.12s (3 small squares). A corrected QT interval (QTc) is obtained by dividing the QT interval with the square root of the preceding R–R' interval (normally QTc=0.42s). A normal ST segment indicates no elevation or depression. Hyperkalaemia, hyperacute myocardial infarction and left bundle can cause an extra tall T wave. Small, flattened or inverted T waves are usually caused by ischaemia, age, race, hyperventilation, anxiety, drinking iced water, LVH, drugs (e.g. digoxin), pericarditis, PE, intraventricular conduction delay (e.g. RBBB) and electrolyte disturbance [12].

An important task of ECG signal filtering is to preserve the true magnitudes of the P, Q, R, S, T, and U waves, protect the true intervals (starting and ending points) and segments, and suppress distortions induced by noise. The most common noise in an ECG signal is AC interference (about 50 Hz–60 Hz in the frequency regime). Traditional filtering methods (low-pass, and band-elimination filters, etc.) encounter difficulties in dealing with the AC noise because the signal and the noise overlap the same band. As a consequence, experienced doctors are required to carry out time-consuming manual diagnoses.

Based on a time varying processing principle, a non-linear filter [4] was recently adopted for ECG signal de-noising. Similar to the selective averaging schemes used in image processing, the ECG is divided into different time segments. A sample point classified as "signal" is smoothed by using short window averaging, while a "noise" point is treated by using long window averaging. Window width is chosen according to the statistical mean and variance of each segment. However, this calculation is complicated and it is not easy to select windows with appropriate lengths. The regularized spline network and wavelet packets were later used for adaptive ECG filtering [5, 6], which is not yet efficient and robust for signal processing. In our present treatment, regularized DAF networks are used to handle a real-valued ECG signal. We utilize our combined group-constraint technique to enhance signal components and suppress noise in successive time-varying tilings.

Figure 86A:
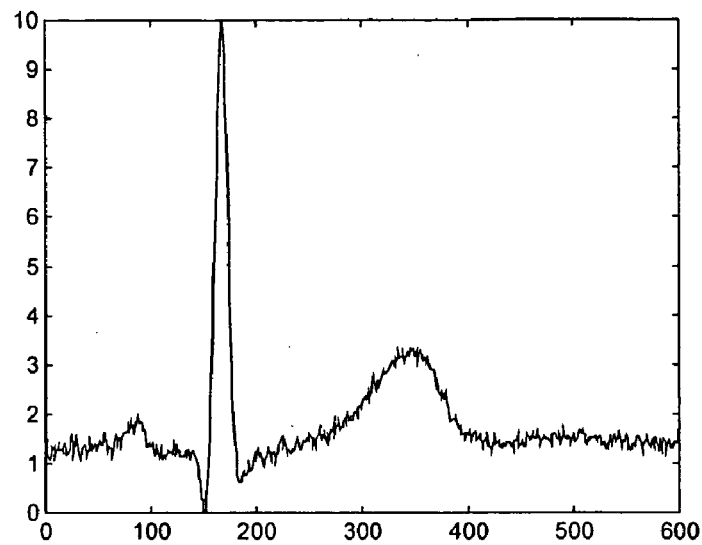
Figure 86B:
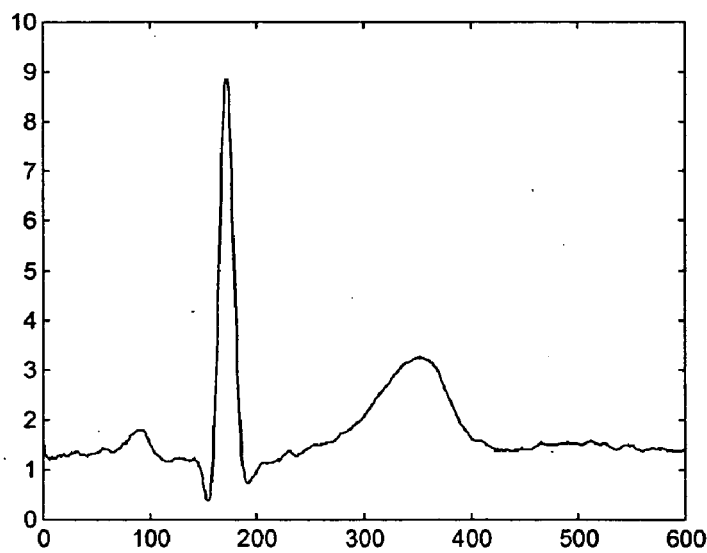
Figure 86C:
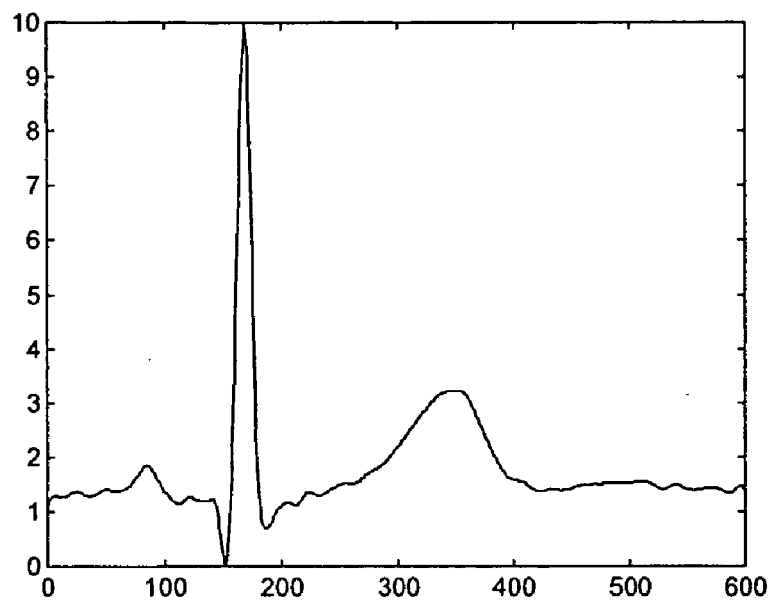

The raw ECG of a patient is given in FIG. 86(a). Note that it has typical thorn-like electromagnetic interference. FIG. 86(b) is the result of a low-pass filter smoothing. The magnitudes of the P and R waves are significantly reduced and the Q and S waves almost disappear completely. The T wave is enlarged, which leads to an increase in the QT interval. Notably, the ST segment is depressed. Such a low-pass filtering result can cause significant diagnostic errors. FIG. 86(c) is obtained by using our DAF wavelet neural nets. Obviously, our method provides better feature-preserving filtering for ECG signal processing.

Another application is for electromyography (EMG) filtering. Surface EMG has been used to evaluate muscle activation patterns in patients with gait disorders since the mid 1900s. In experimental as well as routine recording of muscle action potentials, signal cross-talk from various sources cannot always be avoided [2]. In particular EMG-investigations within the areas of physical science, orthopedics or ergonomics, where the collection of data has to be carried out under field conditions, the measured signals are often incorrect due to movement of the subject. In particular DC off-set-voltages, movement of electrodes and cables, 50 Hz interference and electrostatic interference should all be considered. But even with the utmost case, movement artifacts, particularly in studies of movement, cannot be completely avoided. Thus for a number of quantitative signal processing procedures, an elimination of interference has to be carried out.

Once the raw scanning EMG data are stored in the computer, several processing options are available for improving the signal quality. The first one is removing the DC offset per recorded trace for elimination of movement artifacts. The second option is a moving window smoothing (three points or more) in the time-direction of each trace for noise reduction. The third, a nonlinear median filtering over 3, 5 or 7 points is employed in the depth direction for elimination of non-time-locked activity. The iteration times of median filtering are performed, depending on the quality of the recorded scan [2]. Although a median filter is better for impulse-like noise removal than linear filters (low-pass, high-pass or band-limited) [11], it is not optimal since it is typically implemented uniformly across the image. The median filter suppresses both the noise and the true signal in many applications. It results in amplitude reduction of the sharp signal peak, which is deleterious for diagnostic analysis.

Figure 87C:
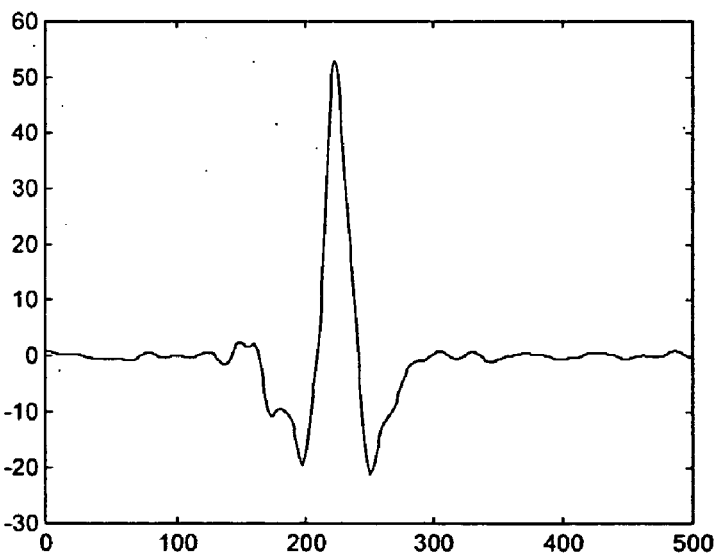

In this paper, we use a DAF wavelet neural network for the adaptive EMG processing. The sampling is irregular to match the time-varying characteristics of EMG. Additional regularization and robust designs enable the optimal smooth approximation of the signal. As shown in FIG. 87, the original measured EMG has many thorn-like noise peaks (FIG. 87(a)). A simple low-pass filtered result is shown in FIG. 86(b). Our newly developed technique results in the solution shown in FIG. 87(c). Again, one should note the presentation of feature details achieved.

CONCLUSION

Regularized DAF wavelet neural networks are proposed for non-stationary biomedical signal processing. The DAF approximation shells possess infinite smoothness in both physical and frequency domains, which enable the high-resolution time-varying analysis of the signal. The optimal signal filtering solution is obtained using a combination of several different contributions to a "cost function". Measured ECG and EMG signals are employed for testing the new technique. The simulations show that our method is both efficient and robust for time-varying filtering.

REFERENCES

[1] D. L. Donoho, "De-noising by soft-threshold," IEEE Trans. Information Theory, vol. 41, no. 3, pp. 613–627, 1995.

[2] T. H. J. M. Gootzen, "Muscle Fibre and Motor Unit Action Potentials," Ph.D. Thesis, Univ. of Nijmegen, 1990.

[3] D. K. Hoffman, G. W. Wei, D. S. Zhang, D. J. Kouri, "Shannon-Gabor wavelet distributed approximating functional," Chemical Pyiscs Letters, Vol. 287, pp. 119–124, 1998.

[4] Z. Shi, "Nonlinear processing of ECG signal," B.Sc. Thesis, Xidian Univ., 1991.

[5] Z. Shi, Z. Bao, L. C. Jiao, "Nonlinear ECG filtering by group normalized wavelet packets", IEEE International Symposium on Information Theory, Ulm, Germany, 1997

[6] Zhuoer Shi, L. C. Jiao, Z. Bao, "Regularized spline networks," IJCNN'95, Beijing, China. (also J. Xidian Univ., Vol. 22, No. 5, pp. 78~86, 1995.)

[7] M. Unser, A. Aldroubi, and M. Eden, "B-spline signal processing: part I-theory," IEEE Trans. SP, Vol. 41, No. 2, pp. 821–833, February 1993

[8] M. Unser, A. Aldroubi, and M. Eden, "B-spline signal processing: part II-Efficient design and applications," IEEE Trans. SP, Vol. 41, No. 2, pp. 834–848, February 1993

[9] G. W. Wei, D. S. Zhang, D. J. Kouri, and D. K. Hoffman, "Lagrange distributed approximating Functionals," Phys. Rev. Lett., Vol. 79, No. 5, pp. 775–779, 1997

[10] D. S. Zhang, G. W. Wei, D. J. Kouri, and D. K. Hoffman, "Numerical method for the nonlinear Fokker-Planck equation," Phys. Rev. E, Vol. 56, No. 1, pp.1197–1206, 1997.

[11] V. R Zschorlich, "Digital filtering of EMG-signals," Electromyogr. Clin. Neurophysiol., Vol. 29, pp. 81–86, 1989.

Perceptual Normalized Subband Image Restoration

Introduction

An earlier group normalization (GN) technique [1] is extended to account for human perceptual responses. The purpose of the GN is to re-scale the magnitudes of various subband filters and obtain normalized equivalent decomposition filters (EDFs). Our human visual system can be regarded as a natural signal and image processing devise—a non-ideal band pass filter. In order to achieve the best noise-removing efficiency, human vision response [2] is accounted for by a perceptual normalization (PN). These approaches are combined with our biorthogonal interpolating filters [3] to achieve excellent perceptual image restoration and de-noising.

The biorthogonal interpolating filters are constructed by Swelden's lifting scheme [4] using Gaussian-Lagrange distributed approximatingfunctionals (DAFs) [5] which were introduced as an efficient and powerful grid method for numerically solving partial differential equations with extremely high accuracy and computational efficiency. From the point of view of wavelet analysis, GLDAFs can be regarded as smooth low pass filters.

Perceptual Normalization

The main objective of wavelet analyses is to provide an efficient $L^2(R)$ representation of a function. For signal and image processing, it is important to preserve the signal components of the corresponding subband filters. Wavelet coefficients can be regarded as the output of the signal passing through the equivalent decompositionfilters (EDFs).

The responses of the EDFs are the combination of several recurrent subband filters at different stages. Wavelet coefficients can be regarded as the output of the signal passing through the equivalent decomposition filters (EDF). The responses of the EDF are the combination of several recurrent subband filters at different stages. As shown in FIG. 88, the EDF amplitudes of our DAF-wavelets in each sub-blocks are different. Thus the magnitude of the decomposition coefficients in each of the sub-blocks cannot exactly reproduce the actual strength of the signal components. To adjust the magnitude of the response in each block, the decomposition coefficients are re-scaled with respect a common magnitude standard. Thus EDF coefficients, $C_m(k)$, in block m should be multiplied with a magnitude scaling factor, $\lambda_m$, to obtain an adjusted magnitude representation [1]. This idea was recently extended to Group Normalization (GN) of wavelet packets for signal processing [1].

The main objective of wavelet signal filtering is to preserve important signal components, and efficiently reduce noisy components. To achieve this goal, we utilize the human vision response to different frequency bands. An image can be regarded as the impulse response of the human visual system. The latter essentially consists of a series of "subband filters". It is interesting to note that, just like the non-uniform response of wavelet subband EDFs, the human "subband filters" also have non-uniform responses to a real object. Using ajust-noticeable perceptual matrix, we can efficiently remove the visual redundancy from decomposition coefficients and normalize them with respect to the standard of perception importance. A mathematical model for perception efficiency has presented by A. B. Watson, etc. [2] and can be used to construct the "perceptual lossless" quantization matrix $Y_m$ for normalizing visual response [2]. This treatment provides a simple human-vision-based threshold technique [6] for the restoration of the most important perceptual information in an image. For gray-scale image processing, the luminance (magnitude) of the image pixels is what we are most concerned with. The combination of the above mentioned group and visual response normalization can be called the Visual Group Normalization (VGN) of wavelet coefficients.

Biorthogonal Interpolating DAF Wavelets

One of most important aspects of wavelet transforms is the wavelets themselves. From the point of view of applications, the stability, regularity, time-frequency localization and computational efficiency are the most important criteria for selecting wavelets. Interpolating wavelets are particularly efficient for basis set construction since their multi-resolution spaces are identical to the discrete sampling spaces. In other words, there is no need for one to compute wavelet expansion coefficients by the usual inner products. This makes it easy to generate subband filters in a biorthogonal setting without requiring tedious iterations. Moreover, adaptive boundary treatments and non-uniform samplings can be easily implemented using interpolating methods. The lifting scheme discussed by Swelden [4] is used in this work for constructing interpolating filters;

We use the interpolating Gaussian-Lagrange DAF (GLDAF) [5]

$$\phi_M(x) = W_\sigma(x) P_M(x)$$

$$= W_\sigma(x) \prod_{i=-M, i \neq 0}^{M} \frac{x-i}{-i}$$

as a scale function for our wavelet construction. Here $W_\sigma(x)$ is a window function and is selected as a Gaussian because it satisfies the minimum frame bound condition in quantum physics. The quantity $\sigma$ is a window width parameter, and $P_M(x)$ is the usual Lagrange interpolation kernel. Biorthogonal dual DAF scaling functions and DAF-wavelets are constructed using Swelden's lifting scheme [4]. The present DAF-wavelets are extremely smooth and rapidly decay in both time and frequency domains. As a consequence, they are free of Gibbs oscillations, which plague most conventional wavelet bases. As plotted in FIG. 89, our scaling functions and wavelets display excellent smoothness and rapid decay.

Demonstrations

We use as benchmarks the 512×512 Y-component Lena and Barbara images to demonstrate the restoration efficiency of the present approach. The socalled "Lena" image possesses clear sharp edges, strong contrast and brightness. The high texture component and consequently high frequency edges in the Barbara image create considerable difficulties for many commonly used filtering techniques. A simple low-pass filter will not only smooth out the high frequency noise but also blur the image edges, while a simple high-pass filter can preserve the texture edges but will also cause additional distortion.

As shown in FIG. 49(*a*) and FIG. 50(*a*), the original Lena and Barbara images are each degraded by adding Gaussian random noise. The median filtering (with a 3×3 window) result is shown in FIG. 49(*b*) and FIG. 50(*b*), which is edge-blurred with low visual quality. It is evident that our perceptual DAF wavelet technique (FIG. 49(*c*) and FIG. 50(*c*)) yields better edge-preservation and provides high visual restoration performance.

REFERENCES

[1] Zhuoer Shi, Z. Bao, "Group-normalized wavelet packet signal processing", Wavelet Application IV, SPIE, Vol. 3078, pp. 226–239, 1997
[2] A. B. Watson, G. Y. Yang, J. A. Solomon, and J. Villasenor "Visibility of wavelet quantization noise," IEEE Trans. Image Proc., vol. 6, pp. 1164–1175, 1997.
[3] Zhuoer Shi, G. W. Wei, D. J. Kouri, and D. K. Hoffman, "Perceptual Image Processing Using Gaussian-Lagrange Distributed Approximating Functional Wavelets," submitted to IEEE SP Letters, 1998.
[4] W. Swelden, "The lifting scheme: a custom-design construction of biorthogonal wavelets," Appl. And Comput. Harmonic Anal., vol. 3, no. 2, pp. 186~200, 1996
[5] G. W. Wei, D. S. Zhang, D. J. Kouri, and D. K. Hoffnan, "Lagrange distributed approximating Functionals," Physical Review Letters, Vol. 79, No. 5, pp. 775~779, 1997
[6] D. L. Donoho, "De-noising by soft-threshold," IEEE Trans. Information Theory, vol. 41, no. 3, pp. 613~627, 1995

Quincunx Interpolating 2D and 3D Wavelets-DAF

Introduction

Nowadays, wavelets has became an important area of research for image processing; however, most of the work done until today, it has been concentrated for the one dimensional case while the multi-dimensional case has been approached using the tensor product or known as well as separable wavelet transform. In this work we discuss a way for constructing "non-separable" wavelets in two and three dimensions using distributed approximating functionals (known as DAF). A recent work published in 1998 proposes a way of constructing wavelets in one dimension called wavelets-DAFs. This work proves that this kind of wavelets improves the accuracy for solving linear and non-linear partial differential equations. Using a non-separable sampling known as Quincunx for the 2D case and FCO for the 3D case (or Quincunx in 3D) allows us to have a better perception for the human visual system. The first section of this disclosure will explain the Quincunx sampling in 2D and 3D (FCO). Then, the second section addresses the construction of the scaling function. The third section explains the way of getting the actual values for the interpolating multidimensional filter.

Nonseparable Lattices

The quincunx lattice is considered as the simplest way of sampling in two dimensions. We need in the 2D case two vectors to define the sampling, one possible value for those vectors is $$d_1 = \begin{pmatrix} 1 \\ 1 \end{pmatrix}$$

and $$d_2 = \begin{pmatrix} 1 \\ -1 \end{pmatrix}$$

which lead to the following dilation matrix $$D = \begin{pmatrix} 1 & 1 \\ 1 & -1 \end{pmatrix} \tag{289}$$

In the Quincunx lattice, the subsampling process rotates the image by 45° and flips the image about the horizontal axis.

As you can see in FIG. 90, the quincunx lattice has a checkerboard pattern. FCO lattice is used for the 3D case. The FCO lattice belongs also to the general checkerboard lattices. One of the possible dilation matrices for the FCO is $$D = \begin{pmatrix} 1 & 0 & 1 \\ 1 & 1 & 0 \\ 0 & 1 & 1 \end{pmatrix} \tag{290}$$

notice that det(D)=M=2, for either quincunx or FCO.

Scaling Function

Due to the fact that the scaling function behaves as generalized delta sequences we use the DAF approach to generate it. The two most important aspects in the design of the scaling function are the decay rate and smoothness. We studied the following functions and their properties. First, the normal function in 2D defined as follows $$N(x, y) = e^{-(x^2+y^2)^2/(2\sigma^2)} \tag{291}$$

which obviously has a Gaussian decay, and its sigma defines the width of the neighborhood points. Another, function considered because of its properties under the Fourier transform is the sinc equation defined as follows $$\mathrm{sinc}\alpha(x^2 + y^2) = \frac{\sin\alpha\pi(x^2 + y^2)}{\alpha\pi(x^2 + y^2)} \qquad (292)$$

The combination of these functions produce the father wavelets which are both smooth and rapidly decaying $$\phi(x, y) = \frac{\sin\alpha\pi(x^2 + y^2)}{\alpha\pi(x^2 + y^2)} e^{-(x^2+y^2)/2\sigma^2} \qquad (293)$$

The next section explain the domain of x and y for Equation (293). FIG. 91 shows the scaling function for the quincunx lattice when $\alpha=\sigma=1$. Equation (293), it is clearly a nonseparable function.

Construction of the Quincunx Interpolating Filter

We want to interpolate the red dot shown on FIG. 92, which coordinates are (½,½). The plane xy is the one that we obtain after we downsample the original lattice using quincunx. Then, this xy plane was rotated by 45° with respect to the original lattice, and it was flipped about the horizontal axis.

The circles in FIG. 92 represent, the values known from function. Those values will be used to approximate the value of the function at the red point (½,½) called P. Those points are labeled depending on the distance with respect to P. For instance, all points labeled "1" have the same distance to P, $(2)^{-(1/2)}$. Those points represent the filter taps. There has been some work on calculating the filter taps for the quincunx in 2D and 3D, already; however, those filter taps are fix for the point at P at (½,½). In our work, we recalculate the filters depending on where in the grid is your new point P. The know values shown on FIG. 92 are fix, but not their labels. For instance, if our point P is located at (⅓,⅓) the values of the filter taps in the grid will change as shown on FIG. 93.

This is something different with respect other works in this area. We calculate the value of those filter taps using Equation (293), wherex andy are the difference between the points on the grid and the point P. The summation of all the values of the filter taps must be 1. In the case when we have only four points to approximate P, when P is located at (½,½) the result is trivial since we have four taps labeled one; therefore they must have the same value. Since their summation must be equal to one we resolve that those taps $T(1)=¼$. However, when we have more points to approximate P, this is not that trivial. Using the DAF theory we have to look for the optimal sigma and alpha to estimate those filter taps. We could even consider different values of sigma depending on which points on the grid we are using to predict the value of the function at P.

The selection of the scaling function was crucial, thinking about computational time. Moreover, since we use DAFs to calculate the filters taps Equation (293) allows us to interpolate the n-derivate of the function at point P.

DAF Approach to Image Restoration

Introduction

Anisotropic diffusion using nonlinear partial differential equations (PDEs) was proposed by Perona and Malik [1] for removal of noise, edge detection, and image enhancement. Considerable theoretical and numerical analyses and improvements have been carried out since its proposal [1–12]. In [1], the restored image is obtained by evolving the original noisy image $u_0(x,y)$ according to the following diffusion equation with a variable diffusion coefficient $$\frac{\partial u(x, y, t)}{\partial t} = \mathrm{div}\,[c(|\nabla u(x, y, t)|)\nabla u(x, y, t)] \qquad (294)$$

where, the initial condition is $u(x,y,0)=u_0(x,y)$, where div defines the divergence operator, and $c(|\nabla u|)$ is a nonincreasing positive diffusion coefficient function. It is interest to see that when c is a constant C, Equation (294) reduces to the heat conduction or isotropic diffusion equation, as follows $$\frac{\partial u(x, y, t)}{\partial t} = C\nabla^2 u(x, y, t) \qquad (295)$$

This equation has been used to identify objects in image processing [13]. However, using the isotropic diffusion for image restoration results in a severe edge-blurring problem, which is the principal reason for introducing anisotropic diffusion. The basic idea of anisotropic diffusion is: [1] for a region with small gradient $|\nabla u|$, the diffusion coefficient c will be large to encourage smoothing this region; for a large $|\nabla u|$ region, c will be small to discourage the diffusion for the purpose of preserving the edges. In [1], Perona and Malik suggested the following two expressions for the diffusion coefficient, $$c(|\nabla u|) = \exp\left[-\left(\frac{|\nabla u|}{k}\right)^2\right] \qquad (296)$$

and $$c(|\nabla u|) = \frac{1}{1 + \left(\frac{|\nabla u|}{k}\right)^2} \qquad (297)$$

where k is a constant used to provide a threshold for noise removal, i.e., to enhance the edges and smooth the homogeneous areas. However, as pointed out by many authors [2,4,6,8], such a procedure Equation (294) with diffusion coefficients given by Equation (296) or Equation (297) is ill posed. When the image is corrupted with Gaussian noise, it can occur that the gradient produced by noise is comparable to that produced by the edges. Application of the anisotropic diffusion equation to such an image will tend to preserve both the image edges and the undesirable noisy edges simultaneous. Nevertheless, in order for the solution of the diffusion equation to be unique, $|\nabla u|c(|\nabla u|)$ must be nondecreasing. Otherwise, the solution may diverge in time for some choices of numerical schemes. The same image with a minor difference amount of noise may lead much different solutions using the same numerical scheme. The solutions of different numerical schemes to the same image with the same amount of noise may also have much difference. To alleviate the ill-posed problem, it is crucial to detect the edges as accurately as possible, but the edges of a image are usually unknown to us. For this purpose, a selective smoothing of the diffusion coefficient in Equation (294) was introduced in [2], as follows:

$$\frac{\partial u(x,y,t)}{\partial t} = div\{c[|\nabla(g(x,y)*u(x,y,t))|] \times \nabla u(x,y,t)\} \quad (298)$$

where g(x,y) is a Gaussian filter to detect the edges and g(x,y)*f(x,y,t) denotes the convolution operation at a given time t. This smoothing operation is not only limited to the use of a the Gaussian filter. In [9], a symmetric exponential filter was proposed, and was claimed to be more accurate for detection the position of edges. It is given by $$g(x,y) = \frac{\beta}{2}\exp(-\beta(|x|+|y|)) \quad (299)$$

Using this smoothing filter, significant improvement in the quality of the restored images was attained [9]. However, Equation (298) has a serious drawback of requiring computation of the convolution because it is required at each time step [8].

We disclose using a recently developed distributed approximating functional (DAF) approach [15–17] to solve the anisotropic diffusion problem. The DAFs used here have several advantages. First, they can be used to spatially discretize the diffusion equation. Previous applications of the DAFs to nonlinear partial differential equations (PDEs) has shown that they are very accurate and stable PDE solvers [18–19]. Second, by proper choice of the parameters, the DAF evaluation of |∇f| in the diffusion coefficient automatically produces smoothing. Third, a periodic boundary condition is added to the image, using DAFs according to a recently developed algorithm [20,22], making it possible to utilize DAFs and many other numerical schemes which require a knowledge of the boundary conditions. Fourth, the DAF can be used as an approximate ideal low pass filter to remove the high frequency noise before performing the time evolution. The success of DAFs applied to the anisotropic diffusion equation is due to their so called "well-tempered" property, which is the most important feature in the DAF theory [17].

Distributed Approximating Functional Formalism

The distributed approximating functionals (DAFs) were introduced as "approximate identity kernels" used to approximate a function and its various derivatives, in terms of a discrete sampling [15–17]. One of the most important properties of one class of commonly used DAFs is the so-called "well-tempered" approximation, which distinguishes them from many other numerical schemes. The "well-tempered" DAFs are constructed such that there are no "special points" in the DAF approximation; i.e., the approximation to a function has a similar order of accuracy both on and off the input grid points. The DAFs also provide a "well-tempered" approximation to the derivatives. As long as the function and its derivatives remain in the "DAF-class", the "well-tempered" property will ensure that they have similar accuracy. In contrast, many other numerical schemes (e.g., basis expansions, wavelets, splines, finite differences, finite elements, etc.), yield exact results for the function on the grid points, but typically at the expense of giving significant worse results for the function off the grid points. Such interpolation methods are always less accurate for the derivatives of the function. The drawback of the interpolative methods is especially distinct when the function is contaminated by noise, since the noise in the signal input data will be kept unchanged. In this case, a filter must be used to eliminate the noise in advance. Another feature of certain DAFs is that since they are approximate integral identity kernels, they yield an integral representation of differential operators. By proper choice of the parameters, the DAFs provide a controllably accurate analytical representation of derivatives on and off the grid points, which is crucial to their success in many applications. One of the most useful realizations of the "well-tempered" DAFs is the Hermite DAF, given by $$\delta_M(z|\sigma) = \frac{\exp(-z^2)}{\sqrt{2\pi}\,\sigma}\sum_{n=0}^{M/2}\left(-\frac{1}{4}\right)^n \frac{1}{n!}H_{2n}(z) \quad (300)$$

where $z=(x-x')/(\sqrt{2}\sigma)$, $H_{2n}(z)$ is the usual (even order) Hermite polynomial, and $\sigma$ and M are the DAF parameters. The HDAF is dominated by its Gaussian factor $\exp(-z^2)$, which serves to control the effective width of the function. In the limit of either M→∞ or σ→0, the Hermite DAF becomes identical to the Dirac delta function. A function f(x) is approximated by the Hermite DAF according to $$f(x) \approx f_{DAF}(x) = \int_{-\infty}^{\infty}\delta_M(x-x'|\sigma)f(x')dx' \quad (301)$$

For function sampling on a discrete, uniform grid, the Hermite DAF approximation to the function at any point x (on or off the grid point) is given by $$f_{DAF}(x) = \Delta\sum_j \delta_M(x-x_j|\sigma)f(x_j) \quad (302)$$

where $\Delta$ is the uniform grid spacing. Only terms in the sum from grid points sufficiently close to x contribute significantly.

Approximations for various linear transformations of a function can also be generated using the Hermite DAF. Especially important cases are derivatives to various orders, given by $$f^{(l)}(x) \approx f_{DAF}^{(l)} = \int_{-\infty}^{\infty}\delta_M^{(l)}(x-x'|\sigma)f(x')dx' \quad (303)$$

where $\delta_M^{(l)}(x-x'|\sigma)$ is the lth derivative of $\delta_M(x-x'|\sigma)$, and $$\delta_M^{(l)}(z|\sigma) = \frac{2^{-1/2}\exp(-z^2)}{\sqrt{2\pi}\,\sigma^{l+1}}\sum_{n=0}^{M/2}\left(-\frac{1}{4}\right)^n \frac{(-1)^l}{n!}H_{2n+l}(z) \quad (304)$$

These expressions can be discretized by quadrature, $$f^{(l)}(x) \approx f_{DAF}^{(l)}(x) = \Delta \sum_j \delta_M^{(l)}(x - x_j \mid \sigma) f(x_j) \qquad (305)$$

Equation (11) and (12) provide convenient methods for calculating derivatives in solving nonlinear partial differential equations (NPDEs).

The HDAF approximation can be easily extended to a multi-dimensional case as a direct product. For two-dimension function f(x,y), one has $$f_{DAF}(x, y) = \Delta_x \Delta_y \sum_{j_1} \delta_{M_x}(x - x_{j_1} \mid \sigma_x) \times \qquad (306)$$
$$\sum_{j_2} \delta_{M_y}(y - y_{j_2} \mid \sigma_y) f(x_{j_1}, y_{j_2})$$

and $$f_{DAF}^{(l+m)}(x, y) = \Delta_x \Delta_y \sum_{j_1} \delta_{M_x}^{(l)}(x - x_{j_1} \mid \sigma_x) \times \qquad (307)$$
$$\sum_{j_2} \delta_{M_y}^{(m)}(y - y_{j_2} \mid \sigma_y) f(x_{j_1}, y_{j_2})$$

where $f_{DAF}^{(l+M)}(x,y)$ denotes lth partial derivative and mth partial derivative of the function with respect to x and y respectively.

The Hermite DAF has the so-called "well-tempered" property [17], and it is a low pass filter. In FIG. 94, we show plots of Hermite DAFs, obtained using two different set of parameters, in FIG. 94(*a*) coordinate space and FIG. 94(*b*) frequency space, respectively. Their first order derivatives are plotted in FIG. 94(*c*), in coordinate space. The solid line is for σ=3.54, M=120 and the dashed line is for σ=2.36, M=30. The solid line is said to be in the less "well-tempered" or more "interpolative" regime, and the dashed line is in the more "well-tempered" (smoothing) regime. In contrast to the sinc function sin(wx)/πx, with w=π/Δ (the ideal interpolator) being the ideal interpolation and w<π/Δ being the low pass filter, the Hermite DAF is highly banded in coordinate space due to the presence of the Gaussian factor, which means that only a small number of values are required on each side of the point x in Equation (294), as is also true for the derivatives of the Hermite DAF. This is clearly seen in FIG. 94(*a*) and FIG. 94(*c*). With proper choice of parameters, the Hermite DAF is an excellent filter (see the dashed line in FIG. 94). For the case far away from interpolation, the DAF approximation is not exact on grids (The Hermite DAF is not equal to 1 at the origin and not equal to 0 at nΔ, n≠0). TheDAF approximation to the function depends not only on the function value at the grid point itself, but also on values at the grid points close to it. The approximation to a function has about the same order of accuracy both on and off the grid points. This "well-tempered" property of DAFs plays an important role in our periodic extension algorithm. Application of the "well-tempered" DAF to approximate the function and its derivatives is relatively insensitive to the presence of noise. As will be seen in this disclosure, the "well-tempered" Hermite DAF serves as a very good smoothing filter to accurately detect the image edges. Application of the "well-tempered" Hermite DAF to the variable of the diffusion coefficient in the anisotropic diffusion Equation (294) avoids the need for an additional smoothing operation. The Hermite DAF will perform the discretization and the smoothing operation on the function simultaneously. Since the "well-tempered" Hermite DAF is also a low pass filter, by proper choice of the DAF parameters, Equation (306) can be used to eliminate the high frequency noise of a signal once the boundary condition is known. However, the boundary condition is usually unknown. In the following section, we will give a brief review of how a periodic boundary condition is imposed, using the DAFs DAF-Based Method of Periodic Extension For a signal of finite length, it is common requirement for many numerical schemes that one know the boundary conditions of the signal in order to avoid "aliasing". Take the noncausal finite impulse response filters (FIRs) as an example. In order to get the desired filtering results, the noncausal FIRs require a knowledge of the signal values in the future, which are impossible to obtain in the advance. Also, there are many numerical analysis algorithms for which it is computationally efficient for the signal to be a given length, which is not usually satisfied in experimental results. In this section, we show how our algorithm is employed to impose a periodic boundary condition for the signal. The algorithm of periodic extension has been discussed in detail in [20] and [22]. We will give a brief description on how it is implemented.

The method is closely related to the DAF extrapolation algorithm presented in [21]. Assume a limited length of a signal $\{f_1, f_2, \ldots, f_{J-1}\}$ is known, and we require it to be periodic with the period K so that K−J+1 values $\{f_J, f_{J+1}, \ldots, f_K\}$ are left to be determined. Since now the signal is periodic, the values $\{f_{K+1}, f_{K+2}, \ldots, f_{K+j-1}\}$ are also known and equal to $\{f_1, f_2, \ldots, f_{J-1}\}$ respectively. Under the assumption that the signal is in the "DAF-class", the unknown values from $f_J$ to $f_K$ can be determined by minimizing the following "cost function", constructed using the "well-tempered" Hermite DAF:

$$C \equiv \sum_p W_p (f(x_p) - f_{DAF}(x_p))^2 \qquad (308)$$

where $W_p$ is a weight related to the grid point $x_p$ and $f_{DAF}(x_p)$ is the DAF approximation to the function at $x_p$. The summation range for "p" is selected according to the problem considered. From Equations (302) and (308), we have $$C \equiv \sum_p W_p \left( f(x_p) - \sum_{t=p-w}^{p+w} \delta_M(x_p - x_t \mid \sigma) f(x_t) \right)^2 \qquad (309)$$

where w is the DAF half bandwidth. We minimize the "cost function" with respect to the variation of the unknowns function according to $$\frac{\partial C}{\partial f(x_l)} = 0, \quad J \leq l \leq K, \qquad (310)$$

Equations (309) and (310) generate a set of linear simultaneous algebraic equations, given by $$\sum_{p=l-w}^{l+w} 2W_p \left( f(x_p) - \sum_{t=p-w}^{p+w} \delta_M(x_p - x_t \mid \sigma) f(x_t) \right) \times \quad (311)$$

$$(\delta_{pl} - \delta_M(x_p - x_l \mid \sigma)) = 0, \ J \le l \le K$$

where $\delta_{pl}$ is the kronecker delta function. These linear algebraic equations can be solved by standard algorithms [18] to predict values of the function in the gap.

Note that it is the "well-tempered" property of the DAFs that makes the above algorithm possible. For interpolation algorithms, the value on each grid point is exact and does not dependent on the values of the function at any other grid points, which means that the "cost function" is always zero for points on the grid. In contrast, the "well-tempered" DAFs are not required to give a exact representation on the grid points. The approximate values on a grid point are related to the nearby values.

We must stress that this periodic extension of an nonperiodic signal is basically different from extrapolation, although they use similar algorithm. The "pseudo-signal" in the extended domain is only used as an aid to treat or analyze the original signal in a way that doesn't significantly disturb the behavior in the known region. In general, one does not obtain true signal in this domain. The beauty of the present periodic extension algorithm is that it provides a boundary condition of the signal without significant "aliasing", as was shown in [20] and [22] Once the periodic signal is obtained, it can be extended as much as desired, depending on the intended numerical application. In contrast, extrapolation is required to accurately predict the true function values in the extended domain.

It must be noted that although we have discussed the algorithm in one dimension, extending it to two or more dimensions is straightforward. The DAF approximation to a function and its derivatives are given in Equations (306) and (307), respectively. However, a direct two-dimensional extrapolation is a time and memory consuming procedure because too many simultaneous algebraic equations must be solved. One alternative to this is to consider the two dimensional patterns as composed of many lines of one-dimensional signals, and then extend each line separately. This procedure is generally less accurate than the direct two dimensional extrapolation algorithm because it only considers the correlation along one direction while neglecting cross correlation. However, for many problems, it is sufficiently accurate, and it is a very economical procedure.

The algorithm presented in this section only refers to periodic extension as an example. However, we note that one can also extend the original signal to any other kinds of boundary conditions, as needed for different numerical applications. Periodic extension is only one case out of many possible ones.

Numerical Examples

Numerical experiments are preformed using the "Lena image", shown in FIG. 95 and in Table 7. We degrade it with Gaussian white noise with peak signal-to-noise ratio (PSNR) of 22.14 dB [FIG. 96(a)] and 18.76 dB [FIG. 97(a)] respectively.

TABLE 7

Comparative Restoration Results in PSNR for Image-Lena Corrupted with Different Amount of Gaussian Noise

| Algorithm | Corrupted image | |
|---|---|---|
| | 22.14 dB | 18.76 dB |
| Median filter (3 × 3) | 27.24 dB | 24.72 dB |
| Median filter (5 × 5) | 26.53 dB | 25.29 dB |
| New approach | 30.14 dB | 28.19 dB |

The PSNR used here is defined to be $$PSNR = \frac{255 \times 255}{MSE} \quad (312)$$

where MSE is the mean-square-error of the noisy image, defined by $$MSE = \frac{1}{N_x N_y} \sum_{i=0}^{N_x-1} \sum_{j=0}^{N_y-1} [S(i,j) - \hat{S}(i,j)]^2 \quad (313)$$

where $S(i,j)$ and $\hat{S}(i,j)$ are the original image and noisy image samples respectively, and $N_x$ and $N_y$ are the number of pixels horizontally and vertically respectively. For the purpose of effectively removing the noise in the homogeneous areas while simultaneously preserving the edges, we choose the following definition of the diffusion coefficient [8]

$$c(s) = \begin{cases} A \dfrac{p(T+\epsilon)^{p-1}}{T}, & s < T \\ A \dfrac{p(s+\epsilon)^{p-1}}{s}, & s \ge T \end{cases} \quad (314)$$

where A, T, $\epsilon$ and p are adjustable parameters. Here we fix A=100, T=5, $\epsilon$=1 and p=0.5 in our numerical applications. The anisotropic diffusion Equation (294) is spatially discretized using the Hermite DAFs according to Equation (307). The more "well-tempered" Hermite DAFs ($\sigma_x/\Delta_x=\sigma_y/\Delta_y=2.36$, $M_x=M_y=30$ for the lower noise image and $M_x=M_y=22$ for the higher noise image) are used to discretize the variable of the diffusion coefficient to remove more noise and accurately detect the edges. A more accurate Hermite DAF ($\sigma\_x/\Delta_x=\sigma_y/\Delta_y=3.54$, $M_x=M_y=120$) is employed to discretize the other part of the spatial differential operation accurately. The fourth order Runge-Kutta method [23] is employed to perform the time evolution. Before carrying out the time propagation, we used the HDAF with $\sigma_x=\sigma_y=2.36$, $M_x=M_y=32$ to remove the high frequencynoise.

Figure 96B:
Figure 97B:

FIG. 96(b) and FIG. 97(b) show the resulting restored Lena images of produced by our numerical algorithm. Comparing them with the degraded images [FIG. 96(a) and FIG. 97(a)] and the original image (FIG. 95), it is clearly seen that the algorithm can effectively remove noise while preserving the edges simultaneously. The PSNR is increased by about 8.00 dB for the lower noise image and 9.43 dB for the higher noise image. The boundary of the image is also effectively preserved, which shows the success of our periodic extension algorithm. As pointed in [9], for noisier images, the Perona-Malik algorithm may produce some noise echos that are larger than the threshold level which can not be removed. However, increasing the threshold level will lead to the edge-blurring problem. By using the algorithm presented in this disclosure, we can effectively avoid the problem by accurately detecting the edges using the "well-tempered" HDAF. The procedure of using the "well-tempered" Hermite DAF to detect the edges automatically avoids having to apply an additional smoothing operation to the variable of the diffusion coefficient. We also test the success of our algorithm for even noiser images and find that it can increase the PSNR enormously (e.g., we have increased the PSNR of the Gaussian noise degraded Lena image from 11.35 dB to 23.10 dB). Computations with the smoothing filter Equation (299) applied to the variable of the diffusion coefficient, (as presented in [9]), shows that the "well-tempered" Hermite DAF is better able to detect and preserve the edges than the exponential filter.

CONCLUSIONS

New computational schemes are disclosed to restore a noise corrupted image based on solving an anisotropic diffusion equation. The distributed approximating functional (DAF) approach introduced in this disclosure has several advantages for application to the anisotropic diffusion equation. First, it provides a periodic boundary condition to the image. Second, it provides a smoothing operation to the variable of the diffusion coefficient. Third, it discretizes the spatial derivatives of the equation as accurately as required for a given application. In addition, before performing the time evolution using the forth order Runge-Kutta method, the DAF can be used to eliminate the high frequency noise from the image. Test results on a noisy Lena image show that it is effective for removing the noise and preserving the edges of the image simultaneously. It can greatly increase the PSNR of the noisy image. The resulting periodic extended images can be implemented with many other numerical schemes which require a knowledge of the signal in an extended domain or prefer a given number of image samples.

REFERENCES

[1] P. Perona and J. Malik, "Scale-space and edge detection using anisotropic diffusion," IEEE Trans. Pattern Anal. Machine Intell., Vol. 12, pp. 629–639, 1990.

[2] F. Catte, P.-L Lions, J.-M. Morel, and T. Coll, "Image selective smoothing and edge detection by nonlinear diffusion;" SIAM J. Numer. Anal., Vol. 29, pp. 182–193, 1992.

[3] L. Alvarez, P.-L Lions, and J.-M Morel, "Image selective smoothing and edge detection by nonlinear diffusion II," SIAM J. Numer. Anal., Vol. 29, pp. 845–866, 1992.

[4] M. Nitzberg and Shiota, "Nonlinear image filtering with edge and corner enhancement," IEEE Trans. Pattern Anal. Machine Intell., Vol. 14, pp. 826–833, 1992.

[5] L. Rudin, S. Osher, and Emad, "Nonlinear total variation based noise removal algorithm," Physica D, Vol. 60, pp. 259–268, 1992.

[6] R. T. Whitaker and S. M. Pizer, "A multi-scale approach to nonuniform diffusion," CVGIP: Image Understanding, Vol. 57, pp. 99–110, 1993.

[7] Y.-L You, M. Kaveh, W. -Y Xu, and T. Tannenbaum, "Analysis and design of anisotropic diffusion for image processing," in IEEE Proc. 1st Int. Conf. Image Processing, Austin, Tex., November, 1994, Vol. II, pp. 497–501.

[8] Y.-L. You, W. Xu, A. Tannenbaum, and M. Kaveh, "Behavior analysis of anisotropic diffusion in image processing", IEEE Trans. image Processing, Vol. 5, pp. 1539–1553, 1996.

[9] F. Torkamani-Azar, K. E. Tait, "Image recovery using the anisotropic diffusion equation," IEEE Trans. Image Processing, Vol. 5, pp. 1573–1578, 1996.

[10] G. Sapiro, "From active contours to anisotropic diffusion: connects between basic PDE's in image processing," in IEEE Proc. 3rd Int. Conf. Image Processing, Lausanne, Switzerland, September 1996, Vol. I, pp. 477–480.

[11] J. Shah, "A common framework for curve evolution, segmentation and anisotropic diffusion," in IEEE Proc. Conf. Computer Vision and Pattern Recognition, San Francisco, Calif., June 1996, pp. 136–142.

[12] S. T. Acton, "Edge enhancement of infrared imagery by way of anisotropic diffusion pyramid," in IEEE Proc. 3rd Int. Conf. Image Processing, Lausnne, Switzerland, September 1996, pp. 865–868.

[13] A. P. Witkin, "Scale-space filtering", in Proc. Int. Joint Conf. Artif Intell., IJCAI, Karlsruhe, West Germany, 1983, pp. 1019–1021.

[14] S. Teboul, L. Blanc-Feraud, G. Aubert, and M. Barlaud, "Variational approach for edge-preserving regularization using coupled PDE's," IEEE Trans. image Processing, Vol. 7, pp. 387–397, 1998.

[15] D. K. Hoffman, M. Arnold, and D. J. Kouri, "Properties of the optimum approximating function class propagator for discretized and continuous wave packet propagations," J. Phys. Chem., Vol. 96, pp. 6539–6545, 1992.

[16] D. J. Kouri, W. Zhu, X. Ma, B. M. Pettitt, and D. K. Hoffman, "Monte carlo evaluation of real-time Feynman path integrals for quantal many-body dynamics: distributed approximating functions and Gaussian sampling," J. Phys. Chem., Vol. 96, pp. 9622–9630, 1992.

[17] D. K. Hoffman, T. L. Marchloro II, M. Arnold, Y. Huang, W. Zhu, and D. J. Kouri, "Variational derivation and extensions of distributed approximating functionals," J. Math. Chem., Vol. 20, pp. 117–140, 1996.

[18] D. S. Zhang, G. W. Wei, D. J. Kouri, and D. K. Hoffman, "Numerical method for the nonlinear Fokker-Planck equation," Phys. Rev. E, Vol. 56, pp. 1197–1206, 1997.

[19] G. W. Wei, D. S. Zhang, D. J. Kouri, and D. K. Hoffman, "Distributed approximating functional approach to Burgers' equation in one and two space dimensions," Comput. Phys. Commun., Vol. 111, pp. 93–109, 1998.

[20] D. K. Hoffman, G. H. Gunaratne, D. S. Zhang, and D. J. Kouri, "FourierFilteringofImages," Chaos, submitted.

[21] A. Frishman, D. K. Hoffman, R. J. Rakauskas, and D. J. Kouri, "Distributed approximating functional approach to fitting and predicting potential surfaces. 1. Atom-atom potentials," Chem. Phys. Lett., Vol. 252, pp. 62–70, 1996.

[22] D. S. Zhang, D. J. Kouri, D. K. Hoffman and G. H. Gunaratne, "Distributed approximating functional treatment of noisy signals", submitted.

[23] W. H. Press, B. P. Flannery, S. A. Teukosky, and W. T. Vetterling, Numerical Recipes—The Art of Scientific Computing," Cambridge Press, Cambridge, 1988.

A Variational Approach to the Dirichlet-Gabor Wavelet-DAF

Introduction

Recently we have introduced several new types of distributed approximating functionals (DAFs) [1–5], and related wavelet bases associated with them [4,6–10]. In the course of that work, it was observed that DAFs could be generated in several ways. The first approach [2,3] leads to a systematic way of approximating a given discrete set of input data with an infinitely smooth function. The most intensively studied DAF of this type is called the Hermite DAF, or HDAF. The fundamental unit of its construction is a product of a Hermite polynomial and its generating function, referenced to an origin that is located at each point, x. A variational method was introduced for deriving such DAFs [3], and they have been applied to a large number of problems, ranging from solving various linear and nonlinear partial differential equations (PDEs) to the entire gamut of signal processing [6,7,11–14]. A distinctive property of the first DAFs is that they are not interpolative on the input grid points [2,3]. That is, the first type of DAF approximation to the function at any grid point, $x_j$, is not exactly equal to the input data value. In place of the interpolative property, this DAF approach to functional approximation has the property that there are no "special points". Said another way, such DAFs deliver similar accuracy for approximating the function either on or off the grid; similarly, the DAF approximation to a function, sampled discretely, yields an approximation to the derivatives of the function comparable in accuracy to the function itself. This is strictly true only for functions belonging to the "DAF-class", which is that set of functions whose Fourier transform is sufficiently contained under the DAF-window in Fourier space [3].

More recently, we have developed another general type of DAF which does interpolate on the grid, but which still can be "tuned" to yield highly accurate derivatives for DAF-class functions [4–7,11–14]. The essence of this approach is to modify an "interpolating shell" (such as that for Lagrange Interpolation [5], etc.) by an appropriate weighting function. By far the most attractive choice has been a Gaussian weight function, which has the property of "regularizing" the interpolation so that it delivers an infinitely smooth approximation to discretely sampled functions [4–7], and the accuracy is ensured so long as the function being considered is in the DAF class. Again, these have been shown to be enormously robust for the class of PDEs and signal processing problems considered earlier [5–7,11–14]. An alternative way of viewing these DAFs results from observing that continuous DAFs constitute two-parameter Dirac delta sequences [4]. That is, they are approximate identity transforms that depend on two adjustable parameters. In the case, e.g., of the HDAFs, the two parameters are the Gaussian width, $\sigma$, and the highest degree polynomial, M (where M is even)

$$\delta_{DAF}^{(M)}(x - x' \mid \sigma) = \tag{315}$$

$$\frac{1}{\sigma}\exp\left[\frac{-(x-x')^2}{2\sigma^2}\right]\sum_{n=0}^{M/2}\left(\frac{-1}{4}\right)^n \frac{1}{\sqrt{2\pi}\, n!} H_{2n}\left(\frac{x-x'}{\sqrt{2}\,\sigma}\right)$$

where, it is easily shown that $$\lim_{M \to \infty} \delta_{DAF}^{(M)}(x - x' \mid \sigma) = \delta(x - x') \tag{316}$$

for any $\sigma > 0$, and also that $$\lim_{\sigma \to \infty} \delta_{DAF}^{(M)}(x - x' \mid \sigma) = \delta(x - x') \tag{317}$$

for and fixed M. The availability of two independent parameters, either of which can be used to generate the identity kernel or Dirac delta function, can be viewed as the source of robustness of the DAFs as computational tools [4].

Of the recently introduced regularized, interpolation DAFs, a potentially very useful one is the Dirichlet-Gabor wavelet-DAF (DGWD). It was constructed by combining a Gaussian with the Dirichlet kernel for generating the Fourier series of a function, to give $$\delta_{DAF}^{(M)}(x - x' \mid \sigma) = C_{M,\sigma} e^{-(x-x')^2/2\sigma^2} \frac{\sin\left[\left(M + \frac{1}{2}\right)\frac{2\pi x}{L}\right]}{2\sin\left(\frac{\pi x}{L}\right)} \tag{318}$$

As with all of the regularized, interpolating DAFs, this product generates a scaling wavelet that at once is infinitely smooth and rapidly decaying in both physical and Fourier space [4]. The constant, $C_{M,\sigma}$, was determined by requiring that the zero frequency Fourier transform $$\hat{\delta}_{DGWD}^{(M)}(0 \mid \sigma),$$

be normalized to unity, that is $$\hat{\phi}(0) = \hat{\delta}_{DGWD}^{(M)}(0 \mid \sigma) = \int_{-\infty}^{\infty} dx\, \delta_{DGWD}^{(M)}(x \mid \sigma) = 1 \tag{319}$$

Then the "father wavelet" basis is generated by translating and scaling, so that [4]

$$\phi_{mn}(x) = a^{-\frac{m}{2}} \phi\left(\frac{x - nb}{a^m}\right) \tag{320}$$

A corresponding "mother wavelet" can be defined as $$\psi(x) = C_{M,\sigma}\left[e^{-x^2/2\sigma^2}\frac{\sin\left[\left(M + \frac{1}{2}\right)\frac{2\pi x}{L}\right]}{2\sin\left(\frac{\pi x}{L}\right)} - \frac{e^{-x^2/2\sigma^2 a^2}}{a}\frac{\sin\left[\left(M + \frac{1}{2}\right)\frac{2\pi x}{aL}\right]}{2\sin\left(\frac{\pi x}{aL}\right)}\right]. \tag{321}$$

Because of the constraint on $\psi(0)$, Equation (320), it is verified that $\psi(x)$ is a "small wave", so its zero frequency transform satisfies $$\hat{\psi}(0) = \int_{-\infty}^{\infty} dx \psi(x) = 0. \qquad (322)$$

The computational usefulness of the DDGWD was shown by several example applications to the solution of differential equations [5,11–14]. A multiresolution analysis has been developed based on these wavelets [4,6,7].

In this disclosure we enquire as to whether these regularized interpolation DAFs can also be obtained in a systematic manner from the same variational principle [3] used for the noninterpolating DAFs; especially the HDAF [2,3]. We shall see that the DGWD can indeed be obtained directly from our variational principle, and the derivation bears a similarity to that used for the Hermite DAFs. In the next Section, we give the detailed derivation of the DGWD from the variational principle.

Variational Principle Applied to the Dirichlet DAF

A general construction of the DAF approximation to a function proceeds by first developing a suitable approximation to the function at every point x in its domain. This is typically accomplished by making a basis set expansion of the form $$f(x'|x) = \sum_j B_j(x'|x) b_j(x). \qquad (323)$$

Here f(x'|x) is an approximation to the function f(x') about the point x, i.e., parameterized byx. The quantity $B_j(x'|x)$ is the jth basis function for the point x and $b_j(x)$ is the corresponding coefficient of this basis function for the expansion centered on the point x. The coefficients $b_j(x)$ remain to be determined as functionals of the known values of f(x). A succinct expression for the DAF approximation can then be given by $$f_{DAF}(x) = f(x|x) \qquad (324)$$

(although, as previously mentioned, other, more general, definitions, e.g. as parameterized delta sequences, are also possible [4]). To complete the definition one must specify how the x-dependent coefficients are to be obtained.

There are various ways that the set of coefficients $\{b_j(x)\}$ can be determined. Perhaps the most straightforward is by the technique of "moving least squares". In this approach one defines a variational function $\lambda(x)$ for the point x of the form $$\lambda(x) = \sum_l \omega(x_l - x) |f(x_l|x) - f(x_l)|^2 \qquad (325)$$

where the summation over l is over all points in the domain of x where the value of the function is known. (We replace the sum by an integral over all continuous regions of the domain where the function is known.) The quantity $\omega(x_r^x)$ is a weight function of arbitrary form, restricted only in that it is non-negative. For concreteness we will take $\omega$ to be of the Gaussian form $$\omega(x) = e^{-x^2/2\sigma^2} \qquad (326)$$

where $\sigma$ is a parameter with units of length. It should be pointed out that, in general, the form of the weight can also vary as a function of x as can the basis functions themselves in both type and number. (For example, we could make $\omega$ vary with x, and/or choose $B_j(x'|x)$ from different complete sets for each distinct value of x.) We then write $$f(x_k|x) = \sum_j B_j(x_k|x) b_j(x) \qquad (327)$$

and determine the optimal values of these coefficients at a particular value of x by minimizing the "cost" function $\lambda(x)$. In general the expansion coefficients can be complex. In anticipation of this eventuality, we minimize the cost function with respect to both the coefficients and their complex conjugates to obtain 2N equations to solve for the real and imaginary parts of the N coefficients. This leads to the set of linear equations $$\sum_{l=-\infty}^{\infty} \omega(x_l - x) B_j^*(x_l|x) f(x_l) = \qquad (328)$$
$$\sum_{j'} \left\{ \sum_{l=-\infty}^{\infty} \omega(x_l - x) B_j^*(x_l|x) B_{j'}(x_l|x) \right\} b_{j'}$$

which can be written compactly as $$A_j = \sum_{j'} C_{jj'} b_{j'} \qquad (329)$$

by defining $$A_j = \sum_{l=-\infty}^{\infty} \omega(x_l - x) B_j^*(x_l|x) f(x_l) \qquad (330)$$

and $$C_{jj'} = \sum_{l=-\infty}^{\infty} \omega(x_l - x) B_j^*(x_l|x) B_{j'}(x_l|x) \qquad (331)$$

We immediately have that $$b_j = \sum_{j'} \left( \underline{C}^{-1} \right)_{jj'} A_{j'} \qquad (332)$$

It is important to recall that all of the quantities in this equation are implicit functions of x.

To proceed we confine our discussion to functions on the real line and represent f(x'|x), our local approximation to the function centered on the point x, as a Fourier series. The basis functions then are $$B_j(x'|x) = \frac{1}{\sqrt{N}} e^{-2\pi i(x'-x)j/N\Delta} \tag{333}$$

where j assumes the N values $-(N-1)/2 \leq j \leq (N-1)/2$. (Note that j takes on integer values for odd N and half-integer values for even N.) Here $\Delta$ is the grid spacing, which is assumed to be uniform. As a function of x', f(x'|x) is obviously periodic with a period domain of $N\Delta$. From Equation (331) it is seen that $\underline{C}$ is a kind of overlap matrix for the basis functions centered at x under the weight function $\omega(x'-x)$, and due to the periodicity of the basis functions, we can express it solely as a function of $\eta = \text{mod}_\Delta(x'-x)$. As we now show, it is possible to invert the matrix $\underline{C}(\eta)$ in closed form. However, it is an approximation to the inverse that, when valid, gives rise to the DAF representation of the function which is of interest to us here.

It is useful to write the sum in Equation (330) in the form $$\sum_{l=-\infty}^{\infty} O_l = \sum_{p=-\infty}^{\infty} \sum_q O_{p,q} \tag{334}$$

where l=Np+q. Here we have divided the grid into domains, each with N points. The p-sum is over all domains and the q-sum is over all points within a given domain. We take the point of origin (i.e., p=0, q=0) to be the grid point closest to x. Then $$x_l - x = (Np+q)\Delta + \eta \tag{335}$$

where $-\Delta/2 \leq \eta \leq \Delta/2$. That is $x+\eta$ is the grid point closest to x. \ This leads to $$C_{jj'} = \frac{1}{N} \sum_{p=-\infty}^{\infty} \sum_{q=0}^{N-1} \omega(x_l - x) e^{2\pi i(q+\eta/\Delta)(j-j')/N} \tag{336}$$

$$= \sum_{q=0}^{N-1} \lambda_{q+\eta/\Delta} \psi_j^{(q+\eta/\Delta)} \psi_{j'}^{(q+\eta/\Delta)*}$$

where $$\lambda_{q+\eta/\Delta} = \sum_{p=-\infty}^{\infty} \omega([Np + q + \eta/\Delta]\Delta) \tag{337}$$

and $$\psi_j^{(q+\eta/\Delta)} = \sqrt{\frac{1}{N}} e^{2\pi i(q+\eta/\Delta)j/N} \tag{338}$$

The quantity $\psi_j(q+\eta/\Delta)$ can be taken as the jth component of an orthonormal basis set of N-vectors indexed on q. That is $$\sum_{j=-(N-1)/2}^{(N-1)/2} \psi_j^{(q+\eta/\Delta)*} \psi_j^{(\bar{q}+\eta/\Delta)} = \delta_{q,\bar{q}} \tag{339}$$

which is a standard result from Fourier theory. From this point of view, Equation (327) simply gives an expression for the $\underline{C}_{jj'}$ matrix element of $\underline{C}(\lambda)$ in its spectral representation.

(Here we have indicated explicitly that the matrix is a function of $\lambda$.) From this it follows immediately that $$\left(\underline{C}(\eta)^{-1}\right)_{jj'} = \sum_q \frac{1}{\lambda_{q+\eta/\Delta}} \psi_j^{(q+\eta/\Delta)} \psi_{j'}^{(q+\eta/\Delta)*} \tag{340}$$

and, further, from Equation 332 that $$b_j(\eta) = \sum_{j'} \left(\underline{C}(\eta)^{-1}\right)_{jj'} A_{j'} \tag{341}$$

$$= \sum_{j'} \sum_q \frac{1}{\lambda_{q+\eta/\Delta}} \psi_j^{(q+\eta/\Delta)} \psi_{j'}^{(q+\eta/\Delta)*} \sum_{l'=-\infty}^{\infty} \omega(x_{l'} - x) \psi_{j'}^{(q'+\eta/\Delta)} f(x_{l'})$$

The sum over j' here produces the Kronecker $\delta_{qq'}$, where $$q' + \eta/\Delta = \text{mod}_N\left(\frac{x_{l'} - x}{\Delta}\right) \tag{342}$$

Summing over q then leads to $$b_j(\eta) = \sum_{l'=-\infty}^{\infty} \frac{1}{\lambda_{q'+\eta/\Delta}} \omega(x_{l'} - x) \psi_j^{(q'+\eta/\Delta)} f(x_{l'}) \tag{343}$$

which is the desired variational expression for the expansion coefficients. Finally, from Equations (324), (327) and (333), we have that $$f_{DAF}(x) = \frac{1}{\sqrt{N}} \sum_{j=-(N-1)/2}^{(N-1)/2} b_j(\eta) \tag{344}$$

$$= \sum_{l'=-\infty}^{\infty} \frac{1}{\lambda_{q'+\eta/\Delta}} \omega(x_{l'} - x) \left[\frac{1}{\sqrt{N}} \sum_{j=-(N-1)/2}^{(N-1)/2} \psi_j^{(q'+\eta/\Delta)}\right] f(x_{l'})$$

$$= \sum_{l'=-\infty}^{\infty} \frac{(-1)^{q'}}{\lambda_{q'+\eta/\Delta}} \left[\frac{\sin(\pi\eta/\Delta)}{N\sin\left(\frac{\pi(q'+\eta/\Delta)}{N}\right)}\right] \omega(x_{l'} - x) f(x_{l'})$$

which is the formal-DAF expression without approximation.

If f(x) is periodic with period $N\Delta$, then $f(x_{l'})$ depends on only q' (i.e., not on p') and the final result of Equation 344 reduces to $$= \sum_{q'=0}^{N-1} (-1)^{q'} \left[\frac{\sin(\pi\eta/\Delta)}{N\sin\left(\frac{\pi(q'+\eta/\Delta)}{N}\right)}\right] f(q'\Delta + \eta + x) \tag{345}$$

where we have made use of Equations (335) and (337). (Recall that $x+\eta$ is the grid point closest to x.) This is just the standard Fourier approximation to a periodic function known on N equally spaced grid points. It is interpolative (i.e., $f_{DAF}(x_1)=f(x_1)$) where $x_1$ is any grid point and hence for which $\eta=0$. This is, of course, the anticipated result for a least-squares fit of a periodic function using a Fourier basis.

If $f(x)$ is not periodic then $f_{DAF}(x)$ is nowhere exact (unless accidentally so), and, in particular, the DAF approximation is not interpolative. The quantity $f(q'\Delta+\eta+x)$ in Equation (345) is replaced by $$\bar{f}_{q'} = \sum_{p'=-\infty}^{\infty} \frac{\omega(x_{l'}-x)}{\lambda_{q'+\eta/\Delta}} f(x_{l'}) \tag{32}$$

which is a weighted average across the infinite grid of functional values on grid points separated by multiples of $N\Delta$.

It is clear that the DAF approximation of Equation (344) (being basically a Fourier sum) suffers from the principal drawback of the Fourier representation, namely that the approximation is not tightly banded. That is (off the grid) all of the N values of $\bar{f}_q$ contribute more or less equivalently to the approximation. Said another way, each grid point contributes through the normalized probability $\omega(x_1-x)/\lambda_{q+\eta/\Delta}$, which falls off much more slowly than $\omega(x_1-x)$ itself as q is varied. To introduce a more tightly banded DAF representation of the function, we now assume that $\underline{C}(\eta)$ can be effectively replaced by a matrix that is independent of $\eta$. In so doing we, of course, ignore variations in $\underline{C}(\eta)$ over the distance of the grid spacing. There are various ways that this can be done. In previous studies, where we employed a polynomial basis set rather than the circular functions of Equation (333), it proved convenient to replace $\underline{C}(\eta)$ by its average. This allowed us to use the properties of orthogonal polynomials to construct the corresponding approximation to $\underline{C}^{-1}$. We referred to the resulting representation of the function as well-tempered because it has the property that for functions where the approximation is applicable (so-called DAF-class functions) the fit is of comparable accuracy both on and off the grid. In contrast, in the present case it is convenient to make an $\eta$-independent approximation to $\underline{C}(\eta)$ for which the grid points are special.

The idea is that as N becomes large and the grid spacing becomes small in such a way that N\Delta is held constant, every point becomes effectively a grid point (assuming continuity of the function to be fit). Then, to controllable accuracy we can replace $\underline{C}(\eta)$ by $\underline{C}(\eta=0)$ to obtain $$\left(\underline{C}(\eta)^{-1}\right)_{jj'} \approx \sum_q \frac{1}{\lambda_q} \psi_j^{(q)} \psi_{j'}^{(q)*} \tag{347}$$

$$b_j \approx \sum_{j'} \sum_q \frac{1}{\lambda_q} \psi_j^{(q)} \psi_{j'}^{(q)*} \sum_{l'=-\infty}^{\infty} \omega(x_{l'}-x) \psi_{j'}^{(q'+\eta/\Delta)} f(x_{l'}) \tag{348}$$

and $$f_{DAF}(x) \approx \frac{1}{\lambda_0} \sum_{l'=-\infty}^{\infty} \omega(x_{l'}-x) \frac{1}{\sqrt{N}} \sum_{j'=-(N-1)/2}^{(N-1)/2} \psi_{j'}^{(q'+\eta/\Delta)} f(x_{l'}) \tag{349}$$

$$= \frac{\Delta}{\lambda_0 L} \sum_{l'=-\infty}^{\infty} \omega(x_{l'}-x) \sum_{j'=-(N-1)/2}^{(N-1)/2} e^{-2\pi i(x_{l'}-x)j'/L} f(x_{l'})$$

where $L=N\Delta$. The applicability of this approximation depends of course on the appropriate choice of the DAF parameters, which has been discussed elsewhere. The sum can be written in terms of the Mth order Dirichlet kernel, $D_M(y)$, defined by $$D_M(y) = \frac{1}{\pi}\left[\frac{1}{2} + \sum_{k=1}^M \cos(ky)\right] = \frac{\sin\left[\left(M+\frac{1}{2}\right)y\right]}{2\pi\sin(y/2)} \tag{350}$$

which leads to the expression $$f_{DAF}(x) = \frac{2\pi\Delta}{\lambda_0 L} \sum_{l'=-\infty}^{\infty} \omega(x_{l'}-x) D_{\frac{N-1}{2}}\left(\frac{2\pi(x_{l'}-x)}{L}\right) f(x_{l'}) \tag{351}$$

This result is parameterized by three quantities L, N (which are related by the grid spacing $\Delta$) and $\sigma$ (see the form of $\omega$ of Equation (326).

Since our approximation $\underline{C}(\eta) \approx \underline{C}(\eta=0)$ is exact on the grid, this approximation is interpolative for functions that are periodic on a domain of length L. If we take the limit $N\to\infty$ and $L\to\infty$ in such a way that $\Delta=L/N$ is fixed, then the approximation assumes the sinc-DAF form $$f_{DAF}(x) = \frac{\Delta}{2\pi} \sum_{l'=-\infty}^{\infty} \omega(x_{l'}-x) \frac{\sin(2\pi(x_{l'}-x)/\Delta)}{(x_{l'}-x)} f(x_{l'}) \tag{352}$$

where we have used the fact that $\lambda_0=1$ in this limit. This result is interpolative on all grid points.

CONCLUSION

We have shown that the variational principle used earlier for generating noninterpolating DAFs (which could be used to generate associated wavelets) can also be used to derive interpolating DAFs, with a Gaussian weight, that were first obtained by multiplying various interpolation shells with a Gaussian, which regularized the function (making it infinitely differentiable) and ensured that it decays rapidly both in physical and Fourier space. We therefore conclude that the interpolating and noninterpolating DAFs are very closely related, corresponding to different ways of solving the moving least squares variational algebraic equations. This result complements the earlier procedure used to construct the interpolating DAFs and provides another framework in which to develop robust approximation and estimation algorithms. Both the interpolating and noninterpolating DAFs, of course, have been shown previously to be computationally robust. [1–2,6–7,11–16]

REFERENCES

[1] G. W. Wei, D. J. Kouri and D. K. Hoffman, Computer Phys. Commun., 112, 1 (1998).
[2] D. K. Hoffman, N. Nayar, O. A. Sharafeddin and D. J. Kouri, J. Phys. Chem., 95, 8299 (1991); D. J. Kouri, W. Zhu, X. Ma, B. M. Pettitt, and D. K. Hoffman, ibid., 96, 1179 (1992).
[3] D. K. Hoffman, T. L. Marchloro, M. Arnold, Y. Huang, W. Zhu, and D. J. Kouri, J. Math. Chem. 20, 117(1996).
[4] Y. Meyer, Wavelets and Operators, Cambridge Stud. Adv. Math.,vol. 37 (Cambridge Univ. Press, Cambridge, UK, 1992).

[5] I. Daubechies, Ten Lectures on Wavelets, CBMS-NSF Series in Applied Mathematics (SIAM, Philadelphia, 1992).
[6] C. K. Chui, An Introduction to Wavelets (Academic Press, San Diego, Calif., 1992).
[7] G. W. Wei, D. J. Kouri, and D. K. Hoffman, to be published.
[8] G. W. Wei, D. S. Zang, D. J. Kouri and D. K. Hoffman, Phys. Rev. Lett. 79,775(1997).
[9] Z. Shi, D. J. Kouri, G. W. Wei, and D. K. Hoffman, Computer Phys. Commun., in press.
[10] Z. Shi, G. W. Wei, D. J. Kouri, and D. K. Hoffman, IEEE Symp, on Time-frequency and Time-scale Analysis, N. 144, pp. 469–472, Pittsburgh, Penn., Oct. 6–9, 1998.
[11] G. W. Wei, D. S. Zhang, D. J. Kouri, and D. K. Hoffman, J. Chem. Phys. 107, 3239 (1997).
[12] D. S. Zhang, G. W. Wei, D. J. Kouri, and D. K. Hoffman, Phys. Rev. E 56, 1197(1997).
[13] G. W. Wei, S. C. Althorpe, D. J. Kouri, and D. K. Hoffman, J. Chem. Phys. 108, 7065 (1998).
[14] G. W. Wei, S. C. Althorpe, D. S. Zhang, D. J. Kouri, and D. K. Hoffman, Phys. Rev. A 57, 3309 (1998).
[15] D. K. Hoffman and D. J. Kouri, in Proc. $3^{rd}$. Internat. Conf. on Math, and Num., Aspects Wave Prop. ed. G. Cohen (SIAM, Philadelphia, 1995), pp. 56–63.
[16] A. Frishman, D. K. Hoffman, and D. J. Kouri, J. Chem. Phys., 107, 804 (1997).

Wavelets, Delta Sequences and DAFs

Introduction

The rapid development and great success of wavelet theory and technology in the last decade [1–7] have stimulated intense interest among mathematicians, engineers, physicists and chemists. New results are regularly reported and applications are found in virtually every discipline of science and engineering [8–10]. The basic theory and construction procedures are regarded as well understood. However, there are areas where the existing wavelet methods encounter difficulties. One such area is computational fluid dynamics and more generally computational chemistry and physics, and in mechanics. Meyer [4] has recently posed the questions "Can wavelets play a part in the study or the understanding of the Navier-Stokes equations?" He concluded that "we still do not know the answer to this question". Since wavelets are intimately and significantly related to spline theory and the theory of approximations, it is likely that wavelet theory can lead to entirely new approaches for scientific and engineering computations, where traditional method are either global or local. It is well known that global spectral methods are accurate and efficient for linear partial differential equations (PDEs), whereas local methods are simple and convenient for nonlinear PDEs. It is extremely important to develop an approach that delivers global method accuracy, while also providing local method flexibility and simplicity, for non-linear PDEs involving singularities, or homoclinic orbits, for which obtaining accurate and stable numerical solutions is still a major challenge [11,12]. Wavelet theory has been intensively studied for this purpose [13–23].

The rapid growth and unprecedented success of wavelets have led most recent researchers to focus more on the exploration of new applications rather than reflecting on the basic concepts. The predominant view of wavelets has been strongly influenced by the belief that there are analysis tools for describing a signal efficiently in time and in frequency simultaneously, thus overcoming the classical limitation of Fourier analysis, which is strictly efficient either in the time or the frequency domain. As pointed out by Flandrin and Goncalves [24], wavelets and wavelet transforms are basically time-scale tools, rather than time-frequency ones. Moreover, as far as time-frequency analysis is concerned, there are many other approaches which are able to outperform both Fourier analysis and wavelets in certain cases. There are other views, which are somewhat less influential and less developed. For example, Holschneider has recognized that a real-valued, non-negative scaling wavelet provides a smoothed version of a function f over the real line R by means of the convoluation product $$\Phi_{a,b}(f) = <\phi_a(b), f> = \int_{-\infty}^{\infty} dt \frac{1}{a} \phi\left(\frac{b-t}{a}\right) f(t) \equiv \phi_a(b) * f \quad (353)$$

Then a wavelet transform given by $$W_{a,b}(f) = -\partial_a \int_{-\infty}^{\infty} dt \frac{1}{a} \phi\left(\frac{b-t}{a}\right) f(t) =$$

$$\int_{-\infty}^{\infty} dt \psi\left(\frac{b-t}{a}\right) f(t) \equiv \psi_a(b) * f \quad (354)$$

Where $\psi(x)=(x\partial+1)\phi(x)$ and $\psi_a(x/\alpha)/\alpha$, provides a mathematical microscopy of at length scale $\alpha$. These are important ideas and they deserve additional study.

In a separate development, Hoffman, Kouri and co-workers [23–29] have presented a powerfil computational method based on distributed approximating functionals (DAFs), for various numerical applications, including solving linear [30] and nonlinear [31] partial differential equations (PDEs), signal analysis and the padding of experimental data. On the real line R, the DAFs are multiparameter delta sequences of the Dirichlet type, constructed using functions of the Schwartz class. The success of both wavelets and DAF's in a variety of applications has led to a search for a connection between them. Indeed, there is a natural connection between the [32] and numerous wavelet-DAFs and DAF-wavelets have been discovered [32,33]. Wavelet-DAFs have been used to obtain results in solving the Navier-Stokes equations [34] with nonperiodic boundary conditions. In fact, underlying both wavelets and DAFs is a common mathematical structure, the theory of distributions, which was initiated by physicists and engineers, and was later presented in a rigorous mathematical for by Schwartz [35]. Korevaar [36] and others. A general distribution analysis of wavelets has been given by Meyer [1], Meyer and Coifman [4]. Daubechies [3] and others [37]. Orthogonal wavelet expansions of the delta distribution are discussed by Walter [38]. However, the role of delta sequences in wavelet theory has hardly been addressed. In particular, a large class of delta sequences can be identified as scale wavelets, and they can be used as multi-resolution wavelet bases, which we call delta-sequence-generated multi-resolution wavelet bases (or DAF-wavelets). The purpose of the present work is to provide a unified description of wavelets, delta sequences and DAFs.

Review of Delta Sequences

The delta distribution or so-called Dirac delta function began with the Heaviside calculus and was informally used by physicists and engineers before Sobolev, Schwartz [35], Korevaar [36] and others put it into a rigorous mathematical form. There are several formal mathematical constructions which have been used in the literature (35,36). We shall take the approach which obtained the delta function as a sequence limit (2).

A sequence of functions $\delta_\alpha(x)\delta-L_1\phi(x)$, is a delta sequence on the domain J if for each $x \in J$ and suitable functions $$\lim_{\alpha \to \alpha 0} \int_J \delta_\alpha(x)\phi(x)dx = \phi(0) \tag{355}$$

where the sequences $\delta_\alpha$ are generalizations of Cauchy sequences and are called fundamental families on J by Korevaar [36].

Two types of delta sequences (the positive type and the Dirichlet type) can be used as the basis of a useful classification scheme. Both types are discussed in the following two subsections. (Moreover, classifying delta sequences according to whether they belong to the Schwartz class or non-Schwartz class is also very useful for various physical and engineering applications.)

Delta Sequences of the Positive Type

Let $\{\delta_\alpha\}$ be a sequence of functions on $(\infty,\infty)$ which are integrable over every bounded interval. A delta sequence $\{\delta_\beta\}$ is of positive type if, for any bounded interval containing the origin, the integral in the $\alpha \to \alpha_0$ limit of the sequence of the functions equals 1. For bounded intervals excluding the origin, the integral of the sequence of functions equals zero in this limit. All members of the sequence are positive semi-definite. To illustrate, we consider first the example of a delta sequence of impulse function.

To approximate idealized physical concepts such as the force density of a unit force at the origin x=0, or a unit impulse at time x=0, one has $$\delta_\alpha(x) = \begin{cases} \alpha & \text{for } 0 < x < 1/\alpha \; \alpha = 1, 2, \ldots \\ 0 & \text{otherwise} \end{cases} \tag{356}$$

as a delta sequence in the limit $\alpha \to \infty$.

A second example is Gauss' delta sequence, given by $$\delta_\alpha(x) = \frac{1}{\sqrt{\pi}\alpha} e^{-x^2/2\alpha^2} \text{ for } \alpha \to 0 \tag{357}$$

and it arises naturally as a distribution solution or so-called weak solution. Gauss' delta sequence has various interesting properties with regard to differentiability, boundedness and Fourier transforms, and is used to generate the "Mexican hat" wavelet. Various other wavelets can also be generated from it as described in later sections of this paper.

A third example is Lorentz's delta sequence, $$\delta_\alpha(x) = \frac{1}{\pi} \frac{\alpha}{x^2 + \alpha^2} \text{ for } \alpha \to 0 \tag{358}$$

which is used in representing the solution of Laplace's equation in the upper half plane. It is also commonly seen in integral equations involving the Green's function of the kinetic energy operator (in the momentum representation).

Other examples included Landau's, Poisson's and Fejer's delta sequences.

A systematic procedure for generating various delta sequences of the positive type is a follows:

$$\rho_\alpha(x) = \frac{1}{\alpha}\rho\left(\frac{x}{\alpha}\right) (\alpha > 0) \tag{359}$$

Delta Sequences of the Dirichlet Type

Definition 4. Let $\{\delta\alpha\}$ be a sequence of functions o $(-\infty, \infty)$ which—every bounded internal. We call $\{\delta\alpha\}$ a delta sequence of the Dirichlet 1. $\int \delta\alpha \to 1$ as $\alpha \to \alpha_0$ For some finite constant $\alpha$.
2. For every constant $\gamma > 0, (\int_\infty^\gamma \int_\gamma^\infty)\delta_\alpha \to 0$ as $\alpha \to \alpha_0$
3. There are positive constants—and—such that $$|\delta_\alpha(x)| \leq \frac{C_1}{|x|} + C_2$$

for all x and $\alpha$.

EXAMPLE 1

Dirichlet's Delta Sequence

An important example of a delta sequence of the Dirichlet type is Dirichlet's delta sequence $$\delta_\alpha(x) = \begin{cases} D_\alpha(x) & \text{for } |x| < \pi \text{ for } \alpha = 0, 1, 2, \ldots \\ 0 & \text{otherwise} \end{cases} \tag{360}$$

where $D_\alpha$ is the Dirichlet kernel given by Equation (350). Dirichlet's delta sequence plays an important role in approximation theory and is the key element in trigonometric polynomial approximations.

EXAMPLE 2

Modified Dirichlet's Delta Sequence

Sometimes there is a slight advantage in taking the last term in $D_\alpha$ with a factor of ½:

$$D_\alpha^*(x) = D_\alpha - \frac{1}{2}\cos(\alpha x) \tag{361}$$

$$= \frac{\sin(\alpha x)}{2\pi\tan\left(\frac{1}{2}x\right)}, \; \alpha = 0, 1, 2, \ldots.$$

This is the so-called modified Dirichlet kernel. The difference $D_\alpha - D_\alpha^*$ tends uniformly to zero on $(-\pi, \pi)$ as $\alpha \to \infty$. They are equivalent with respect to convergence. The expression given by $$\delta_\alpha(x) = \begin{cases} D_\alpha^*(x) & \text{for } |x| < \pi \text{ for } \alpha = 0, 1, 2, \ldots \\ 0 & \text{otherwise} \end{cases} \quad (362)$$

is a delta sequence of Dirichlet type as $\alpha \to \infty$.

EXAMPLE 3

Dirichlet's Continuous Delta Sequence

Dirichlet's continuous delta sequence is given by the following Fourier transform of the characteristic function $X[-\alpha, \alpha]$.

$$\delta_\alpha(x) = \frac{1}{2\pi} \int_{-\infty}^{\infty} \chi[-\alpha, \alpha] e^{-i\xi x} d\xi \quad (363)$$
$$= \frac{\sin(\alpha x)}{\pi x}$$

This converges to the delta distribution as $\alpha \to \infty$. Equation (363) is related to Shannon's sampling theorem in information theory.

EXAMPLE 4

The de la Vallee Poussin Delta Sequence

The de la Vallee Poussin delta sequence is given by the Fourier inverse of the following function $$\hat{\delta}_\alpha(\xi) = \begin{cases} 1 & |\xi| \leq \alpha \\ 2 - \frac{\xi}{\alpha} & \alpha < |\xi| \leq 2\alpha \\ & \text{otherwise} \end{cases} \quad (364)$$

It is easy to show that $$\delta_\alpha(x) = \frac{1}{\pi \alpha} \frac{\cos(\alpha x) - \cos(2\alpha x)}{x^2} \quad (365)$$

is a delta sequence of the Dirichlet type as $\alpha \to \infty$.

EXAMPLE 5

Interpolative Delta Sequence

Let $\{\delta_\alpha\}$ be a sequence and let $\{x_1\}_0^n$ be n+1 zeroes of a Jacobi polynomial in (a, b).

$$\Delta_n(x, y) = \frac{\prod_{i=0}^{n}(x - x_i)}{(x - y)\prod_{i=0}^{n}(y - x_i)} \sum_{i=0}^{n} \delta_n(y - x_i), \, x, y \in (a, b) \quad (366)$$

is a delta sequence as $n \to \infty$. This follows from the fact that $\int \Delta_n(x,y)f(y)dy$ approximations to the Lagrange interpolating formulae which converges as $n \to \infty$ and sup

EXAMPLE 6

Delta Sequences Constructed by Orthogonal Basis Expansions

Let $\{\psi_n\}$ be a complete orthonormal $L^2(a,b)$ basis. Then $$\delta_n(x, y) = \sum_{i=0}^{n} \phi_i(x)\phi_i(y), \, x, y \in (a, b) \quad (367)$$

are delta sequences. In case of trigonometric functions, we again obtain the Dirichlet kernel delta sequences given in the Examples 1 and 3. A Hermite function expansion is given by $$\delta_n(x) = \exp\left(-\frac{x^2}{2}\right) \sum_{k=0}^{n} \left(\frac{-1}{4}\right)^k \frac{1}{\sqrt{2\pi k!}} H_{2k}\left(\frac{x}{\sqrt{2}}\right), \, \forall \in R \quad (368)$$

where $H_{2k}(\pi/\sqrt{2})$ is the usual Hermite polynomial. This delta sequence was studied by Schwartz [44], Korevaar [36] and was independently rediscovered by Hoffman, Kouri and coworkers [25] in a more general form. Various other cases can be found in Walter and Blum's reference [39] and these also have been studied in very general forms by Hoffman, Kouri and coworkers [28].

Wavelets and Delta Sequences

Wavelets have been widely used as an analysis tool for various applications. The essential reason for this is because both orthogonal and nonorthogonal wavelets can provide a decomposition of a function at a variety of different scales. In other words, wavelets form special $L^2(R)$ bases or frames for representing a function at various levels of detail, leading to so-called mathematical microscopies. This turns out to be very efficient for approximating and analyzing functions in many applications. Orthogonal wavelets and multiresolution analysis have been successfully used in a variety of telecommunication and engineering fields [10]. They play a special role in those applications where orthogonality is strongly required. In many other applications, nonorthogonal wavelets, or frames, are also very useful. Generating new types of wavelets has been of great importance in wavelet theory. Most of the delta sequences described in Section II can be regarded as scaling or father wavelets. These father wavelets can also be systematically transformed into mother wavelets. The orthogonal wavelets are briefly reviewed in the first subsection. The connection between delta sequences and wavelets is made in the second subsection. The construction of mother wavelets from various delta sequences is discussed in the last two subsections.

Orthogonal Wavelets

The formal theory of orthogonal wavelets on $L^2(R)$ has been presented in many books [1–3]. An orthogonal wavelets system is usual generated by a single function, either a father wavelet $\phi$ or a mother wavelet $\psi$, by a standard translation and dilation technique $$\phi_{mn}(x) = 2^{-\frac{m}{2}}\phi\left(\frac{x}{2^m} - n\right), \ m, n \in Z; \tag{369}$$

$$\psi_{mn}(x) = 2^{-\frac{m}{2}}\psi\left(\frac{x}{2^m} - n\right), \ m, n \in Z; \tag{370}$$

where the symbol Z denotes the set of all integers. This can be formulated rigorously in terms of a multiresolution analysis, i.e., a nested sequence of subspaces $\{V_m\}$, m ∈ Z such that 1. $\{\phi(x-n))\}$ is an orthogonal basis of $v_0$;
2. $\ldots \subset v_1 \subset v_0 \subset v_{-1} \subset \ldots \subset L^2(R)$;
3. $f(X)\epsilon v_m \leftrightarrow f(2x)\epsilon V_{m-1}$;
4. $\cap_m V_m = \{0\}$ and $\overline{\cup_m V_m} = L^2(R)$ Since $\phi \in V_0 \subset V_{-1}$, it can be expressed as superposition of $\{\phi_{1,n}\}$ which constitute basis for $V_{-1}$ $$\phi(x) = \sum_n a_n \phi_{1,n}, \tag{371}$$

where $\{\alpha_n\}$ is a set of finite coefficients.

For an orthogonal system, the subspace $V_{-1}$ can be further decomposed into its orthogonal projection in $V_0$ and a complement $W_0$ $$V_{-1} V_0 \oplus W_0, \tag{372}$$

where $W_0$ is a subspace spanned by orthogonal mother wavelets $\{\psi\}$. In general, $\psi_{min}$, n∈Z is an orthogonal basis of $W_{-m}$ and $$\bigoplus_{m \in Z} W_m = L^2(R) \tag{373}$$

It follows that $\psi_{min}$, (m, n ∈ Z) is an orthogonal basis of $L^2(R)$. Similarly to Equation (371), the mother wavelet can also be expressed as a superposition of $\{\phi_{1,n}\}$ $$\psi(x) = \sum_n b_n \phi_{1,n}, \tag{374}$$

where $b_n = (-1)^n \alpha_{1-n}$.

Perhaps the simplest example is Haar's wavelet system [2] which is given by $\phi(x) = X_{[0,1]}(x)$, the characteristic function of the interval [0,1]. It obviously has orthogonal translations. The dilation of $\phi(x)$ results in characteristic functions for smaller (or larger) intervals and each of them spans a subspace $V_m$ by translations.

It is not obvious that a multiresolution analysis exists for $\phi$ other than the Haar system. The construction of the first few orthogonal wavelet bases was more or less an art rather than a systematic procedure; it required ingenuity, special tricks and subtle computations. One procedure, due to Meyer [1], is to begin with a spline function $\theta(x) = (1-|x-1|)X_{[0,2]}$ which, by translations, generates a nonorthogonal Riesz basis (a frame of the lease possible redundance. Using both the orthonormality requirement, $$\delta_{0,n} = \phi_{0,0} \phi_{0,n} \phi \tag{375}$$

and the periodicity, $\phi$ can be resolved as $$\hat{\psi}(\xi) = \frac{\sin^2(\xi/2)}{(\xi/2)^2}\left(1 - \frac{2}{3}\sin^2\left(\frac{\xi}{2}\right)\right)^{-\frac{1}{2}} \tag{376}$$

Daubechies presents another approach for constructing orthogonal wavelets. In the Fourier representation, the dilation equation can be written as $$\hat{\psi}(\xi) = m_0(\xi/2)\hat{\psi}(\xi/2) \tag{377}$$

where $m_0$ is a $2\pi$-periodic function. The orthonormality condition then requires $$|m_0(\xi/2)|^2 + |m_0(\xi/2 + \pi)|^2 = 1 \tag{378}$$

It turns out that if the set of expansion coefficients $\alpha_n$ of Equation (371) are chosen as $$a_0 = \nu(\nu-1)/(\nu+1)\sqrt{2}, a_1 = -(\nu-1)/(\nu+1)\sqrt{2}, a_2 = (\nu-1)/(\nu+1)\sqrt{2}, a_3 = \nu(\nu+1)/(\nu+1)\sqrt{2} \ (\nu \in R),$$

then Equation (378) will be satisfied and consequently 0 can be found recursively.

Delta Sequences as Father Wavelets

Let $\{\delta_n\}$ where $\alpha \to \alpha_0$ be a sequence of $C^\infty$ functions on $(-\infty, \infty)$ which are integrable over every bounded interval and 1. $\delta_\alpha(0) = 1$ for each $\alpha$;
2. $\lim \delta_\alpha(\xi) \to 1$ for all $\xi$; $\alpha \to \alpha_0$
3. for every constant $\gamma > 0$, $(\int_{-\infty}^{-\gamma} + \int_\gamma^{2\gamma}) \delta_\alpha \to 0$ as $\alpha \to \alpha_0$;
4. and $\|x\delta_\alpha(x)\|_\infty < \infty$ for all x and $\alpha$.

Then the $\{\delta_n\}$ are delta sequences and each function can be admitted as a father wavelet. We call this class of father wavelets "delta-sequence-generated father wavelets $\phi_\alpha$." The corresponding $\psi_\alpha$ "delta-sequence-generated mother wavelets $\psi_\alpha$" have the Fourier transform property $$\hat{\psi}_\alpha(0) = \int \psi_\alpha(x) dx \tag{379}$$

It is natural to view delta sequences as father wavelets. In particular, if the delta sequence has the structure that $\delta_\alpha = (1/\alpha)\rho(\xi/\alpha)$ and $\int \rho(x)dx = 1$ as is the case for many examples given in Section II), then $\delta_n$ is a sequence of father wavelets at different scales. In contrast to the delta distribution which has only a point support, a function in a delta sequence can have an arbitrary support, depending on the scale. In the limit $\alpha \to \alpha_0$, the delta sequence converges to the delta distribution and the support shrinks down to a point. The resulting delta distribution actually helps to furnish the wavelet multiresolution analysis [37]

$$\{\delta\} \oplus \bigoplus_{m \in Z} W_m = L^2(R), \tag{380}$$

where $\{\delta\}$ is the space spanned by the delta distribution. This is in contrast to Equation (373). Clearly, if a delta sequence is an orthogonal system, such as Dirichlet's continuous delta sequence, for a fixed $\alpha \neq \alpha_0$, we have $$\{\delta_\alpha\} \oplus \bigoplus_{-\infty}^{m=0} W_m = \{\delta\} \oplus \bigoplus_{m \in Z} W_m = L^2(R), \tag{381}$$

where $\{\delta_n\}$ spans the wavelet subspace $V_0$. Hence the orthogonal delta sequence spans the wavelet subspace $\{\delta\} \oplus \oplus_1^\infty W_m$ for an appropriate choice of $\alpha$.

Delta sequence generated mother wavelets can be constructed in many different ways. We discuss two approaches in the next two subsections.

Wavelets Generated by Differentiation Pairs

For a given $C^\infty$ father wavelet $\phi$, we define a family of wavelet generators $$G^{(n)} = x \frac{\partial^n}{\partial x^n} + n \frac{\partial^{n-1}}{\partial x^{n-1}}, n = 0, 1, 2, \ldots, m \qquad (382)$$

for generating a family of m+1 mother wavelets $$\psi_{\alpha,n}(x) = G^{(n)} \phi_\alpha(x) \text{ for } \phi \in C^m \text{ and } n = 0,1,2,\ldots,m \qquad (383)$$

It is noted that this approach is not restricted to the delta-sequence-generated wavelet and is actually a very general and efficient way for creating wavelets from a given $C^m$ father wavelet. The transform prescribed by Holschneider [6], Equation (354), is a special case of our family of wavelet generators.

Our wavelet generators are closely related top the transformation Lie group of translations and dilations. This is because the Fourier images of distributions $$G^n = x \frac{\partial^n}{\partial x^n} + n \frac{\partial^{n-1}}{\partial x^{n-1}} n = 0, 1, 2, \ldots \qquad (384)$$

form an infinite $C^m$ dimensional wavelet Lie algebra with elements $\{X_n = \xi^{n-1} \partial_\xi | n=0,1,2,\ldots\}$ (here we follow the convention that statements concerning the structure of a Lie algebra are made only on the basis of the real Lie algebra). The whole Lie Algebra structure of $\{X_n\}$ is simply given by $$[X_n, X_m] = (m-n)X_{m+n-2} n, m = 0,1,2, \qquad (385)$$

$X_1$ generates a one-parameter non-compact abelian group which is obviously the translation group in momentum space. $X_2$ generates a dilation group. There are two nontrivial invariant subalgebras $$[X_1, X_2] = X_1 \text{ and} \qquad (386)$$

$$[X_1, X_2] = X_1, [X_1, X_3] = 2X_2, [X_2, X_3] = X_3 \qquad (387)$$

$X_1$, $X_2$ are respectively the infinitesimal generators of a two-dimensional translation and dilation group. The third element $X_3$ is a quadratic dilation (superdilation), which allows us to generate another invariant subalgebra, Equation (387). This result indicates that our method of systematically generating wavelets is very general and has a mathematically rigorous foundation. More details will be presented elsewhere [45].

EXAMPLE 1

Mexican Hat Wavelet and Generalizations

If we take Gauss's delta sequence as a father wavelet $$\phi_\alpha(x) = \frac{1}{\sqrt{2\pi}\alpha} e^{-x^2/2\alpha^2},$$

then Equation (383), for n=1, is $$\psi_{\alpha,1}^\gamma(x) = \frac{1}{\sqrt{2\pi}\alpha}\left(1 - \frac{x^2}{\alpha^2}\right) e^{-\frac{x^2}{2\alpha^2}}, \qquad (388)$$

which is the well-known Mexican hat wavelet [3]. Taking n=3 yields $$\psi_{\alpha,3}(x) = \frac{-2}{\sqrt{2\pi}\alpha}\left(\frac{x^4}{\alpha^4} - \frac{6x^2}{\alpha^2} + 3\right) e^{-\frac{x^2}{2\alpha^2}}, \qquad (389)$$

which is an interesting "Mexican superhat wavelet". This wavelet is expected to perform better than the Mexican hat for some application. Since elements of Gauss' delta sequence are $C^\infty$ functions, there are infinitely many Gauss-delta-sequence-generated wavelets given by $$\psi_{\alpha,n}(x) = G^n \frac{1}{\sqrt{2\pi}\alpha} e^{-x^2/2\alpha^2} = \qquad (390)$$

$$\frac{1}{\sqrt{2\pi}\alpha} \frac{(-1)^n}{2} H_{n+1}\left(\frac{x}{\sqrt{2}\alpha}\right) e^{-\frac{x^2}{2\alpha^2}} n = 0, 1, 2, \ldots.$$

It is seen that the celebrated Mexican hat wavelet [3] is just a special case of Equation (390).

It is interesting to note that all higher order Hermite functions ($n \neq 0$) are mother wavelets, while the lowest order Hermite function is a father wavelet. This can be naturally seen from the orthonormality condition $$\int_{-\infty}^{+\infty} \frac{1}{\alpha\sqrt{\pi 2^{n+m+1} n! m!}} H_n\left(\frac{x}{\sqrt{2}\alpha}\right) \qquad (391)$$

$$H_m\left(\frac{x}{\sqrt{2}\alpha}\right) e^{-\frac{x^2}{2\alpha^2}} dx = \delta_{nm}, n, m = 0, 1, 2, \ldots.$$

Here, if the second polynomial if fixed as m=0 to a given constant, then the only case to $H_n$ to give a nonzero integration is n=0 which determines a father wavelet. All other $H_n(n \neq 0)$ give rise to mother wavelets. We point out that this result is not limited to Hermite polynomial. It is generally true for all polynomial systems which form orthogonal $L^2(a, b)$ bases with respect to an appropriate weight. More details about the general connection between wavelets and conventional Hilbert space bases will be given elsewhere [46].

EXAMPLE 2

Shannon's Wavelet Family

Dirichlet's continuous delta sequence is related to the well-known Shannon's father wavelet $$\phi_\alpha(x) = \frac{1}{\pi}\frac{\sin(\alpha x)}{x}.$$

The latter is known for generating an orthogonal basis for a reproducing kernel Hilbert space. A family of (mother) wavelets can be generated by using our wavelet generations, Equation (382)

$$\phi_{\alpha,n}(x) = \left(x\frac{\partial^n}{\partial x^n} + n\frac{\partial^{n-1}}{\partial x^{n-1}}\right)\frac{1}{\pi}\frac{\sin(\alpha x)}{x} \quad (392)$$

$$= \frac{1}{\pi}\sin(\alpha x) \text{ for } n = 0$$

$$= \frac{-\alpha}{\pi}\cos(\alpha x) \text{ for } n = 1$$

$$= \frac{\alpha^2}{\pi}\sin(\alpha x) \text{ for } n = 2$$

$$= \frac{(-1)^q \alpha^{2q}}{\pi}\sin(\alpha x) \text{ for } n = 2q$$

$$= \frac{(-1)^q \alpha^{2q+1}}{\pi}\cos(\alpha x) \text{ for } n = 2q+1.$$

These results are in contract to Shannon's wavelet, $$\frac{1}{\pi x}[\sin(2\pi x) - \sin(\pi x)].$$

Obviously, all of these wavelets can be used to generate orthogonal wavelet bases by the standard method of translations and dilations. It follows that if the starting father wavelet generates an orthogonal system, then, the corresponding wavelets created by our wavelet generators, Equation (382), are also orthogonal systems.

It is very easy to construct various delta-sequence-generated wavelets by applying examples given in Section II to the right hand side of Equation (383).

Wavelets Generated by Difference Pairs

Another simple and efficient way of generating wavelets from delta sequences is to take the difference between two normalized elements in a delta sequence $$\psi_{\alpha,\beta}(x) = \phi_\alpha - \phi_\beta \quad (393)$$

EXAMPLE 1

Hermite Wavelets and the Mexican Hat Wavelet

In case of Hermite's delta sequence, Equation (368), we have $$\psi_{n,n'} = e^{-\frac{x^2}{2}}\sum_{k=0}^{n}\left(\frac{-1}{4}\right)^k \frac{1}{\sqrt{2\pi}k!}H_{2k}\left(\frac{x}{\sqrt{2}}\right) - \quad (394)$$

$$e^{-\frac{x^2}{2}}\sum_{k=0}^{n'}\left(\frac{-1}{4}\right)^k \frac{1}{\sqrt{2\pi}k!}H_{2k}\left(\frac{x}{\sqrt{2}}\right)$$

$$= e^{-\frac{x^2}{2}}\sum_{k=n'}^{n}\left(\frac{-1}{4}\right)^k \frac{1}{\sqrt{2\pi}k!}H_{2k}\left(\frac{x}{\sqrt{2}}\right) \quad (395)$$

This is a general expression for a family of nonorthogonal wavelets. In particular, if n=1'=0, we obtain $$\psi_{1,0}(x) = \frac{1}{2\sqrt{2\pi}}(1-x^2)e^{\frac{-x^2}{2}}. \quad (396)$$

This is, once again, the well-known Mexican Hat Wavelet [3]. The Hermite wavelets described in Equation (396) can easily obtained, within a constant difference, by appropriately choosing n'=n−1 in Equation (394).

EXAMPLE 2

Shannon's Wavelet

We can use Dirichlet's continuous delta sequence as a father wavelet $$\phi_\alpha(x) = \frac{1}{\pi}\frac{\sin(\alpha x)}{x}.$$

Then the corresponding mother wavelets generated by Equation (393) are $$\psi_{\alpha,\beta}(x) = \frac{1}{\pi}\frac{\sin(\alpha x)}{x} - \frac{1}{\pi}\frac{\sin(\beta x)}{x} \text{ for } \alpha \neq \beta \neq 0 \quad (397)$$

This family includes the well-known Shannon's wavelet [3] as a special case $$\psi_{2\pi,\pi}(x) = \frac{1}{\pi x}[\sin(2\pi x) - \sin(\pi x)] \quad (398)$$

It is easy to check that this Shannon's wavelet generates an orthogonal system. Equation (398) is in contrast to the other family of Shannon's wavelets, Equation (392), produced using our wavelet generators.

EXAMPLE 3

Gauss' Wavelets

It is noted that this procedure of generating wavelets is also very general. For example a wavelet can be constructed by combining a pair of functions from the Gauss' delta sequence, $$\psi_{\alpha,\beta}(x) = \frac{1}{\sqrt{\pi}\,\alpha} e^{-x^2/2\alpha^2} - \frac{1}{\sqrt{\pi}\,\beta} e^{-x^2/2\beta^2} \quad \text{for } \alpha \neq \beta \neq 0 \quad (399)$$

Note that this is not a special case of Example 1.

In the case where there is more than one delta parameter, the corresponding wavelets can be generated as differences of cross terms. This will be discussed in detail in Section V.

Distributed Approximating Functionals

Definition 5. A function is said to be of the Schwartz class if it is a $C^\infty$ function and rapidly decaying, $$\sup_{x \in R} |x^i \partial^j \psi_\alpha(x)| < \infty, \quad (400)$$

for $\alpha \neq 0$ and all pairs of i and j. The set of all functions of the Schwartz class is denoted by S.

Definition 6. Distributed Approximating Functionals (DAFs) are families of functions which satisfy the following:
1. They are sequences of Schwartz class functions on the real line R;
2. They are multiple parameter sequences and each parameter independently leads to a sequence of functions which converges to the delta distribution $\delta$
c. They are delta sequences of the Dirichlet type.

Definition 7. A function on $(-\infty, \infty)$ is said to be of the DAF class if it is integrable over every bounded interval and is of at most polynomial growth asymptotically.

Fourier transforms of Schwartz class functions are still Schwartz class functions. DAFs are smooth and rapidly decaying functions in both Fourier space and ordinary space. We note that these properties are crucial to the usefulness of DAFs in various numerical applications. DAFs are a multi-parameter system. The best computational efficiency can only be obtained in certain regions of the parameter space. For Hermite DAFs, we call these well-tempered regions. (Note that well-tempered used here has nothing to do with the tempered distributions which arise naturally in the theory of Fourier transforms.) By well-tempered, we mean that the DAF approximations to a DAF class function are of the same level of accuracy both on and off a grid or DAF approximations of the derivatives of the function have compatible accuracy to that of the function. By compatible accuracy, we mean that the accuracy decreases less than a factor of two as the order of differentiation increases by one. (Note that pointwise differentiability is not required for the DAF class functions because generalized derivatives exist for the DAF convolution of a DAF class function. Certainly generalized derivatives are, in general, not necessarily functions but are distributions. That is how DAFs can lead to distribution solutions to a partial differential equations and why they turn out to be extremelypowerful for approximating functions which have discontinuities and even singularities on a set of measure zero.) An alternative way of understanding the well-tempered region of DAF parameter space is to view it from the wavelet multiresolution analysis point of view. Essentially, there is an interplay of three factors: (i) the DAF expansion of order M (which determines a father wavelet), (ii) a DAF window size $\sigma$ (which determines the scale or correlations), (iii) the DAF central frequency~$1/\Delta$ (which is equivalent to a dilation parameter).

The best computational efficiency is achieved when, for a given M, the DAF window size is proportional to the central frequency, $\sigma \propto \Delta$.

The last condition in our definition of DAFs reflects the fact that the most important DAFs we have discovered so far are delta sequences of the Dirichlet type. From the point of view of approximation theory, delta sequences of the Dirichlet type are, in general, more rapidly ohvergent than those of the positive type [39]. However, for providing unbiased approximations, the delta sequence of the Dirichlet type is applicable to a smaller class of functions' than that of the positive type. Specifically, the function is required to be at lease Holder-continuous or $C^1$. This requirement is not needed for the DAF approximator because DAFs are of Schwartz class. An additional benefit of DAFs being of Dirichlet type is that DAFs are indeed "small waves" [2] and are readily admitted as father wavelets. Corresponding DAF mother wavelets can be generated by the techniques described in the last section.

In parallel to the orthogonal wavelets and nonorthogonal wavelets, there are two classes of DAFs: orthogonal DAFs which are generated by orthogonal basis expansion of the delta distribution and nonorthogonal DAFs which are created by methods of regularization. These are discussed in the following two subsections. It is noted that both orthogonal DAFs and nonorthogonal DAFs are frames, rather than orthogonal father wavelets.

A. DAFs Generated from Orthogonal Systems

One of the most important DAFs is the Hermite DAF (HDAF). It was first introduced in a discrete from [25] by Hoffman, Kouri and coworkers for quantum dynamics and then in a continuous form, by Kouri, Hoffman and coworkers [26], as $$\delta_{HDAF}(x-x' \mid M, \sigma) = \quad (401)$$

$$\frac{1}{\sigma} \exp\left(\frac{-(x-x')^2}{2\sigma^2}\right) \sum_{n=0}^{M/2} \left(-\frac{1}{4}\right)^n \frac{1}{\sqrt{2\pi}\,n!} H_{2n}\left(\frac{x-x'}{\sqrt{2}\,\sigma}\right),$$

where $$H_{2n}\left(\frac{x-x'}{\sqrt{2}\,\sigma}\right)$$

are the usual even Hermite polynomials. While the Hermite expansion of the delta distribution, Equation (368), was discussed by Schwartz [35] and Korevaar [36], the Hermite DAF is very different, at least where applications are concerned, because it is explicitly a two-parameter delta sequence. This has the consequence that the Hermite DAF $\delta_{HDAF}(x-x'|M,\sigma)$ converges to the delta distribution either when the degree of the polynomial M goes to infinity $$\lim_{M \to \infty} \delta_{HDAF}(x-x' \mid M, \sigma) = \delta(x-x') \quad (402)$$

independent of $\sigma \neq 0$ or in the limit $\sigma \to \infty$, $$\lim_{\sigma \to 0} \delta_{HDAF}(x - x' \mid M, \sigma) = \delta(x - x') \quad (403)$$

independent of $0 \leq M < \infty$. Having two independent DAF parameters is crucial to its success in various numerical applications, because adjusting two DAF parameters leads to tunable accuracy within well-tempered regions. Without the introduction of the dilation parameter a in the Hermite expansion of Delta distribution, Equation (368) itself would have very little numerical utility. Well-tempered Hermite DAFs have been used for a variety of numerical applications, including among others, filtering and fitting experimental data and ab initio quantum mechanical potential surface values, padding data on two- and three-dimensional surfaces, resolving eigenvalues of a Hamiltonian solving linear and nonlinear PDEs, and signal processing. Some of these applications involve estimating the derivatives of a function known only on a finite, discrete grid, which are given in our DAF method in the sense of a distribution [25], $$f^{(q)}(x) = \langle \delta_{HDAF}^{(q)}(x - x' \mid M, \sigma), f(x') \rangle \quad (404)$$

$$= (-1)^q \langle \delta_{HDAF}(x - x' \mid M, \sigma), f^{(q)}(x') \rangle, \quad (405)$$

where $\delta_{DAF}^{(q)}(x - x' \mid M, \sigma)$ is given by [25]

$$\delta_{HDAF}^{(q)}(x - x' \mid M, \sigma) = \frac{1}{\sigma^{q+1}} \exp\left(\frac{-(x-x')^2}{2\sigma^2}\right) \quad (406)$$

$$\sum_{n=0}^{M/2} \left(\frac{-1}{4}\right)^n \frac{1}{\sqrt{2^{q+1}\pi} \, n!} H_{2n+q}\left(\frac{x-x'}{\sqrt{2}\,\sigma}\right).$$

As stated earlier, the Hermite DAF is a Schwartz class function for non-zero a and the finite M, the right hand side of Equation (404) exists in a distribution sense of $f^{(q)}$ is not well defined. This situation can occur in solving PDEs for which Hermite DAFs can smooth out the discontinuities and "round off" singularities so as to provide numerical solutions (so called "weak solutions"). This is the case in solving the Fokker-Planck equation when the initial distribution function f is a Dirac delta distribution. Hermite DAFs have successfully estimated the first and second derivatives and integrated the Fokker-Planck equation to an $L_2$ error of the order of $10^{-12}$ [30].

The Fourier space representation of the Hermite DAF is given by [27]

$$\hat{\delta}_{HDAF}(\xi \mid M, \sigma) = \exp\left(-\frac{\xi^2 \sigma^2}{2}\right) \sum_{n=0}^{M/2} \frac{[(\sigma\xi)^2/2]^n}{n!}. \quad (407)$$

This has the important property that $$\hat{\delta}_{HDAF}(0 \mid M, \sigma) = 1 \quad \forall \sigma \neq \infty, M/2 = 1, 2, \ldots. \quad (408)$$

Hence, Hermite DAFs are readily admissible as father wavelets. In parallel with Equations (402) and (403), it is easy to see that Hermite DAFs become a Fourier space all pass filter, i.e., $\hat{\delta}_{HDAF}(\xi \mid M, \sigma)$, whenever $M \to \infty$ or a $\sigma \to 0$. For a given set of Hermite DAF parameters $M \neq \infty, \sigma \neq 0$, $\hat{\delta}_{HDdAF}(\xi \mid M, \sigma)$ is an infinitely smooth, exponentially decaying low pass filter which is extremely useful for signal analysis.

DAFs of Fejer type can be easily generated by using our Hermite DAFs $$\delta_{HDAF,Fej\acute{e}r}(x - x' \mid M, \sigma) = \frac{2}{\sigma(M+2)} \exp\left(\frac{-(x-x')^2}{2\sigma^2}\right) \quad (409)$$

$$\sum_{f=0}^{M/2} \sum_{n=0}^{f} \left(\frac{-1}{4}\right)^n$$

$$\frac{1}{\sqrt{2\pi}\, n!} H_{2n}\left(\frac{x-x'}{\sqrt{2}\,\sigma}\right).$$

A somewhat more general approach is to sum selectively $$\delta_{HDAF,Fej\acute{e}r}(x - x' \mid, M, M', \sigma) = \frac{2}{\sigma(M-M')} \exp\left(\frac{-(x-x')^2}{2\sigma^2}\right) \quad (410)$$

$$\sum_{f=M'/2}^{M/2} \sum_{n=0}^{f} \left(\frac{-1}{4}\right)^n$$

$$\frac{1}{\sqrt{2\pi}\, n!} H_{2n}\left(\frac{x-x'}{\sqrt{2}\,\sigma}\right).$$

We point out that since DAFs are multiparameter delta sequences, averaging over other DAF parameters will also generate DAFs of Fejer type. We shall not, however, give an exhaustive list of these possibilities here.

A particular, special case of our Hermite DAF (for M=2) has been previously discussed by Monaghan and Gingold [47] in terms of a super Gaussian kernel, $$W(x, \sigma) = \frac{1}{\sqrt{2\pi}\,\sigma} \exp\left(-\frac{x^2}{2\sigma^2}\right)\left(\frac{3}{2} - \frac{x^2}{\sigma^2}\right). \quad (411)$$

(Note that this is different from the Mexican hat wavelet.) These authors noted that this super Gaussian kernel gives interpolation error of $O(\sigma^4)$ in numerical integrations and performs better than the Gaussian kernel.

More general DAFs based on orthogonal basis expansions can be constructed in two ways, as described in Ref. [28]. Essentially, for a given positively defined weight function $\omega$ in a domain (a, b), it is possible, by using the standard three term recurrence method, to generate a set of polynomials $P_n$, which is orthonormal under the inner product with respect to the weight $\omega$. This results in very general orthonormal $L^2(a,b)$ bases. All classical polynomial systems, such as Hermite, Legendre, Jacobi, Chebyshev, etc. are special cases of this approach. This procedure of generating arbitrary orthonormal systems is well-known and has been employed by Shizgal [48] for constructing various reproducing kernels, which, when limited to the classical weight function are coincident with the discrete variable representation (DVR) [49]. If the weight function of a general orthonormal basis is chosen to be of the Schwartz class a general DAF can then be constructed by expanding the delta distribution in the domain (a, b). The resulting DAF is an approximate identity kernel and is very similar to the reproducing kernel of Shizgal for a common weight w. However, there are important differences in the philosophies of the two approaches. The grid points in the Shizgal's method are always restricted to the whole set of nodes of the polynomial of highest degree occurring in the expansion. As a result, both the function and its derivatives are approximated in a global manner, necessarily involving all grid points in the domain (a,b). A major advantage in the DAF approach is that there is no restriction on grid selection. It turns out that because of the nature of the Schwartz class DAFs, numerically, the DAF approximation to a function and its derivative at each point x is effectively a localized one, with contributions coming only from near neighbor points, x'. The range of the neighborhood is controlled by the DAF window parameter, a in case of Hermite DAFs. The functional relation determining the contributions of neighboring grid points is given by a pointwise basis set expansion of the delta distribution and controlled by another independent DAF parameter. Therefore, the DAF approach is a pointwise spectral method and its matix representation is banded. It is well-known that, in general, global methods are more accurate than local methods, while local methods are flexible for handling complex boundaries and geometries. Therefore, linear systems with simple boundary conditions are preferably solved by global methods, while nonlinear systems with complex boundaries are usually solved by local methods. However, in a wide range of numerical applications, such as long-term weather predicting, describing shock waves in compressible gas flow, or vortex sheets in high Reynolds number incompressible fluid flow, and studying critical points of Bose-Einstein condensations, one deals with nonlinear PDEs possessing singularities or phase space homoclinic orbits [11,12]. The accuracy of approximations to derivatives becomes particularly important because homoclinic orbit crossing can induce numerical chaos [12]. Hence, it is desirable to have an approach that has global method accuracy and local method flexibility for treating the above mentioned highly demanding systems. Spectral element approaches [50], which combine the spectral method with the finite element method, have been studied for this purpose. A general difficulty in this approach is the interfacial matching between various spectral subdomains. This leads to a great reduction in accuracy. We find that DAFs provide a robust alternative approach for solving such problems.

A second way to construct general DAFs is based on the variational principle also described in Ref. [28]. A cost function $\lambda$ is defined as $$\lambda(\{a_j\}, x) = \sum_k w(x_k - x) \left| f(x_k) - \sum_j a_j(x)\xi_j(x_k - x) \right|^2 \quad (412)$$

where $\omega$ is a positive weight function, $\{\xi_j\}$ is a set of functions and $\{\alpha_j\}$ is a set of expansion coefficients to be determined by local minimization of $\lambda(\{\alpha_j\}; x)$. It turns out that for an arbitrary local integrable function f, the set of coefficients $\{\alpha_j\}$ that minimizes the $\lambda(\{\alpha_j\}; x)$ is the same as that which provides an orthogonal basis expansion of the delta distribution under the same weight $\omega$. We refer the reader to Ref. [28] for more details. It is noted that in this approach, each point can have its own basis set, independent of the basis sets used at neighboring points. This is equivalent to using a different basis for expanding at each grid point. Since this result is very general, we refer to it as the "DAF variational principle." This approach has been shown to be extremely powerful in molecular potential surface fitting [51], as well as in a variety of signal processing applications. Similar approaches exist in the mathematical literature; for example, moving least squares have been discussed by many authors [52].

Orthogonal basis set expansions of the delta distribution have been described in very general form in Ref. [28]. A historical summary of orthogonal basis-derived DAFs can be found in the reference section of Ref. [28].

DAFs Generated by Nonorthogonal Systems

1. Fourier Space Regularization

Definition 8. A tempered distribution on R is a linear mapping T: S→R such that for some positive integer N and a constant C $$|T[\phi]| \leq C \sum_{m+n \leq N} \sup|x^m \partial^n \phi(x)| \; \forall \, \phi \in S \quad (413)$$

The space of all tempered distributions on R is denoted as S'. The examples of tempered distributions are all polynomials and all $L^1$, $L^2$ functions and even the periodic delta distribution $$\sum_{k=-\infty}^{\infty} \delta(x - 2\pi k).$$

However, neither $$\sum_{k=-\infty}^{\infty} \delta^{(k)}(x - 2\pi k)$$

nor $e^{|x|}$ are tempered.

It is obvious that $\int \hat{\omega}_\sigma(\xi) d\xi = 1$ for all $\sigma$. We construct the Shannon Gabor wavelet-DAF as $$\hat{\delta}_{SGWD}(\xi|\sigma,\eta) = \hat{T} * \hat{\omega}_\sigma \quad (417)$$

This is a smoothed function, which has the property that $$\hat{\delta}_{SGWD}(0|\sigma,\eta) = 1 \quad (418)$$

The function $\hat{\omega}_\sigma(\Sigma)$ is a regularizer and $$\hat{\delta}_{SGWD}(\xi|\sigma,\eta) \to \hat{T} \quad (419)$$

as $\sigma \to \infty$. We thus recover exactly the ideal low pass filter function $x_{[-\eta,\eta]}$ in the limit of our regularization. Moreover, for a given $\sigma$, $$\lim_{\eta \to \infty} \hat{\delta}_{SGWD}(\xi | \sigma, \eta) = 1 \; \forall \, \xi \in R \quad (420)$$

as required for DAFs.

The inverse Fourier transform gives the Shannon Gabor wavelet-DAF [33]

$$\delta_{SGWD}(x \mid \sigma, \eta) = \qquad (421)$$

$$F^{-1}[\hat{\delta}_{SGWD}(\xi \mid \sigma, \eta)](x) = 2\pi Tw = \frac{1}{\pi} \frac{\sin(\eta x)}{x} e^{-\frac{x^2}{2\sigma^2}}$$

This is still a two-parameter DAF such that $$\left[\lim_{\eta \to \infty} \delta_{SGWD}(x \mid \sigma, \eta)\right] = \delta(x) \quad \forall \sigma, x \in R \qquad (422)$$

$$\left[\lim_{\sigma \to 0} \delta_{SGWD}(x \mid \sigma, \eta)\right] = \delta(x) \quad \forall \eta, x \in R \qquad (423)$$

The Shannon Gabor wavelet-DAF can be regarded as a Gaussian regularized Dirichlet continuous delta sequence in the coordinate representation.

In numerical applications we choose $$\eta = \frac{\pi}{\Delta}(\Delta = x_n - x_{n-1})$$

for a discrete version of Shannon Gabor wavelet-DAF $$\delta_{SGWD}(x - x_n \mid \sigma, \Delta) = \frac{1}{\Delta} \frac{\sin\left[\frac{\pi}{\Delta}(x - x_n)\right]}{\frac{\pi}{\Delta}(x - x_n)} e^{-\frac{(x-x_n)^2}{2\sigma^2}} \qquad (424)$$

This form has the interpolating property.

EXAMPLE 2

Generalized de la Vallee Poussin DAF

We choose $\hat{T}$ as the following $$\hat{T}_{\eta,\lambda}(\xi) = \begin{cases} 1 & |\xi| \le \eta \\ \lambda\eta - \xi\eta & \eta < |\xi| \le \lambda\eta \\ 0 & \text{otherwise} \end{cases} \qquad (425)$$

where $\eta \ge 0$, $\lambda > 1$. Let $\hat{\delta}_{DAF}(\xi|\sigma,\eta,\lambda) = \hat{T}_{\eta,\lambda} * \hat{\omega}_\sigma$. Then we can construct a corresponding DAF by $$\delta_{DAF}(x, \eta, \lambda, \sigma) = \qquad (426)$$

$$F^{-1}[\hat{\delta} * \hat{w}_\sigma] = 2\pi Tw = \frac{1}{\pi} \frac{\cos(\eta x) - \cos(\lambda \eta x)}{(\lambda - 1)\eta x^2}$$

This DAF reduces to the Shannon Gabor wavelet-DAF, Equation (421), in the limit of $\lambda \to 1$ and to the de la Vallee Poussin DAF [32] when $\lambda = 2$. The latter has been tested for some numerical applications, including solving PDEs [32].

EXAMPLE 3

Arbitrary Schwartz Class Filters

As discussed in Ref [53], to design a general, smoothed filter, which can be low pass, high pass, band pass or band stop, we choose a Schwartz class function $\hat{\omega} \in S$ which satisfies $$\int \hat{\omega}(\xi) d\xi = 1 \qquad (427)$$

and $\hat{\omega} = \sigma \hat{\omega}(\sigma\xi)$. Its Fourier inverse satisfies $$0 \le \omega_\sigma(x) \le 1 \forall x \delta R. \qquad (428)$$

Equation (84) implies that $\omega_\sigma(0) = 1$. Let $\hat{T}_{\alpha_1,\alpha_2,\ldots}(\xi)$ be a piecewise smooth function characterized by a set of parameters $\{\alpha_i\}$ and satisfying $$0 \le \hat{T}_{\alpha_1,\alpha_2,\ldots}(\xi) \le 1 \forall x \in R \qquad (429)$$

Then we have a generalized Schwartz class filter $$\delta_{DAF}(x) = F^{-1}[\hat{T} * \hat{\omega}](x) = 2\pi T(x)\omega(x) \qquad (430)$$

This obviously includes Example 1 and Example 2 as special cases.

Another interesting special case is given by choosing $$\hat{T}_{\eta,\lambda}(\xi) = \begin{cases} 1 & \beta \le |\xi| \le \alpha \quad \alpha \ge \beta > 0 \\ 0 & \text{otherwise} \end{cases} \qquad (431)$$

We then have a smoothed high pass filter $$\delta_{HPF}(x \mid \sigma, \alpha, \beta) = \frac{1}{\pi x}[\sin(\alpha x) - \sin(\beta x)]e^{-\frac{x^2}{2\sigma^2}} \qquad (432)$$

We note that this is equivalent to a DAF-wavelet. Equation (432) reduces to the Shannon Gabor wavelet-DAF when $\beta = 0$.

The method presented in this section is very general for the construction of arbitrary smooth filters and DAFs. (The desired degree of smoothness is obtained by appropriately choosing the regularizer.) We refer the reader to Ref. [53] for more details.

Interpolating Formulae and DAFs

Since a Fourier space convolution leads to a coordinate space product for a certain class of functions, it is clear that regularization in Fourier space by a Schwartz class function is equivalent to a coordinate space regularization, by a Schwartz class function. Therefore, coordinate space S-function regularization of commonly used interpolating kernels leads to smoothed kernels, or DAFs. The most well-known such kernel is the Lagrange interpolating formulae $$L_n(f, x) = \sum_i^n l_i(x) f(x_i) \quad \forall x_i \in (a, b) \qquad (433)$$

where $l_i(x)$ is the well-known Lagrange kernel given by $$l_i(x) = \prod_{j=1, j\neq i}^{n} \frac{x-x_j}{x_i-x_j} \quad \forall\, x_i, x_j \in (a,b) \tag{434}$$

(Note that by using the summation convention, Equation (433), all kernels and DAFs presented in this and the next subsections differ from those in the previous sections by a factor of $1/\Delta$, where $\Delta$ is the grid spacing.) Lagrange interpolating formulae yield polynomial approximations to $f(x)$ when its values are given on a set of n node points $\{x_i\}$. If the nodes are chosen to be equidistant, $x_i=-1+2(i-1)/n-1$, i=1,2, . . . ,n, the n integration gives the famous Newton-Cotes quadrature formulae. We have constructed Lagrange DAFs by introducing a Gaussian weight to the Lagrange interpolating formulae $$\delta_{LDAF}(x-x_i\,|\,\sigma) = \prod_{j=-M, j\neq i}^{M} \frac{x-x_j}{x_i-x_j} e^{-\frac{(x-x_j)^2}{2\sigma^2}} \tag{435}$$

The most important difference between our Lagrange DAF and the Lagrange interpolating formulae is the way in which nodal points $x_i$, $x_j$ are chosen. The nodes xj of the polynomials are always chosen around each central point $x_i\epsilon(a,b)$. Therefore when $x_i$ is close to the boundary a or b, some nodal points $x_j$ will fall outside of (a, b). This causes our Lagrange DAF approximation to have translational symmetry and be asymptotically unbiased in the whole computational domain (a, b). This way of choosing grid points is due to the fact that DAFs are essentially a $(-\infty,\infty)$ domain method rather than a bounded (a, b) domain method. This reflects the nature of the Schwartz space weight function. However, being a $(-\infty,\infty)$ domain method does not mean we have to use the nodes at $\pm\infty$, and it also does not mean that we cannot use it for finite domain (a, b) calculations. On the contrary, the Lagrange DAF is more flexible for arbitrary finite domain computations, because the S-space weight function makes our Lagrange DAF kernel an effectively localized one. The Lagrange DAF matrix is effectively banded. In principle, on a portion (2M+1) of all the grid points which are closest to $x_i$ must be used in constructing an approximation to the kernel $\delta_{LDAF}(x-x_i|\sigma)$. If the nodes are chosen to be equally spaced, then we only need to calculate $\delta_{LDAF}(x-x_i|\sigma)$ once for all $\{x_i\}$ in (a,b).

More general interpolating DAFs can be constructed by using more general Lagrange interpolations. Let $L_i(x)$, i=1,2, . . . ,n be a set of functions satisfying $$L_i(x_j)=\delta_{ij} \tag{436}$$

As a result, the generalized Lagrange formulae $$L_n(f,x) = \sum_{i=1}^{n} f(x_i)L_i(x) \tag{437}$$

will have the interpolating property, so that $$L_n(f,x_m)=f(x_m), m=1,2,\ldots,n$$

providing that the $x_i$ are n distinct nodes. A very efficient way for obtaining $L_i(x)$ of the Lagrange type is to choose a nodal function $\mu_n(x)$ and a basis function $v_i(x)$ defined in an open interval around every node, and which have at least the first derivative at every node, satisfying $$\mu_n(x_i) = 0 \quad 0 < |\mu_n'(x_i)| < \infty \quad \forall\, i = 1, 2, \ldots, n \tag{438}$$

$$v_i(x_i) = 0 \quad 0 < |v_i'(x_i)| < \infty \quad \forall\, i = 1, 2, \ldots, n$$

$$v_i(x_m) \neq 0 \quad \forall\, i \neq m$$

The generalized Lagrange kernels are then obtained by making $$L_i(x) = \frac{\mu_n(x)v_i'(x_i)}{\mu_n'(x_i)v_i(x)}, \quad i = 1, 2, \cdots, n. \tag{439}$$

This satisfies Equation (436) and consequently Equation (437). A corresponding generalized Lagrange DAF can be constructed as $$\delta_{GLDAF} = \frac{\mu_n(x)v_i'(x_i)}{\mu_n'(x_i)v_i(x)} w_i(x), \tag{440}$$

where $\omega_i(x)\epsilon S$ is a Schwartz class function such that $$0 \leq \omega_i(x) \leq 1 \text{ and } \omega_i(x_i)=1 \,\forall x\epsilon R \tag{441}$$

Equation (440) is a general expression for a large class of interpolating DAFs.

EXAMPLE 1

Lagrange Interpolation

The Lagrange kernel, Equation (434) is obtained by choosing $$\mu_n(x) = \prod_{j=1}^{n}(x-x_j) \text{ and} \tag{442}$$

$$v_i(x) = x - x_i, \quad i = 1, 2, \cdots, n, \text{ then}$$

$$L_i(x) = \prod_{j=1, j\neq i}^{n} \frac{x-x_j}{x_i-x_j}.$$

The corresponding DAF given in Equation (435).

EXAMPLE 2

Cardinal Interpolating

Considering a set of equally spaced nodes $\{x_i\}=\{0,+\Delta, \alpha 2\Delta, \ldots \pm\infty\}$ and $$\mu_n(x) = \sin\left(\frac{x}{\Delta}x\right) \text{ and} \tag{443}$$

$$v_i(x) = x - i\Delta, \quad i = 0, \pm 1, \pm 2, \cdots, \pm\infty;$$

-continued then $$L_i(x) = \frac{(-1)^i \sin(\frac{\pi}{\Delta}x)}{\frac{\pi}{\Delta}(x-i\Delta)} \quad i = 0, \pm, \pm 2, \cdots, \pm \infty.$$

This is a different form of the well-known sinc interpolating formulae and a corresponding DAF can be constructed as $$\delta_{SGWD}(x-x_i|\sigma) = \frac{(-1)^i \sin(\frac{x}{\Delta}x)}{\frac{x}{\Delta}(x-i\Delta)} e^{-\frac{(x-i\Delta)^2}{2\sigma^2}} \quad i = 0, \quad (444)$$

$$\pm \Delta, \pm 2\Delta, \cdots, \pm M.$$

This is a different form of the Shannon-Gabor wavelet-DAF. As in the Lagrange DAF case, we only include 2M+1 nodes in the calculation. Later in this subsection, we show that this is also a special case of a generalized Lagrange DAF (derived for evenly distributed nodes).

EXAMPLE 3

Trigonometric Interpolation

Let $|x_i|<1$ and $$v_i(x) = \sin(\frac{\pi}{2}(x-x_i)) \quad x_i = 1, 2, \cdots, n \quad (445)$$

$$\mu_n(x) = \prod_1^n v_i(x);$$

then $$L_i(x) = \frac{\pi \mu_n(x)}{2\mu'_n(x_i)\sin(\frac{\pi}{2}(x-x_i))}.$$

is an interpolating kernel. Obviously it has the general form of a Lagrange interpolation. We construct a corresponding DAF as $$\delta_{SINDAF}(x-x_i|\sigma) = \prod_{j=-M, j\neq i}^{M} \frac{\sin(\frac{\pi}{2}(x-x_j))}{\sin(\frac{\pi}{2}(x_i-x_j))} e^{-\frac{(x-x_j)^2}{2\sigma^2}}. \quad (446)$$

Equation (445) is simplified for the case of equally spaced nodes $$x_i = -1 + \frac{2i}{(2n+1)}, l = 0, 1, 2 \cdots, 2n$$

to give $$l_i(x) = \frac{\sin(\frac{2n+1}{2}\pi(x-\frac{2n-2i+1}{2n+1}))}{(2n+1)\sin(\frac{\pi}{2}(x-\frac{2n-2i+1}{2n+1}))}, i = 1, 2, \cdots, n \quad (447)$$

This is recognized as the Dirichlet kernel arising in Fourier analysis. The corresponding DAF can be written as $$\delta_{DGWPD}(x-x_i|\sigma) = \frac{\sin\frac{\pi}{\Delta}(x-x_i)}{(2n+1)\sin\frac{\pi}{\Delta}\frac{(x-x_i)}{2n+1}} e^{-\frac{(x-x_i)^2}{2\sigma^2}} \quad (448)$$

This is our Dirichlet-Gabor-wavelet-packet-DAF, which was introduced when the connection between DAFs and wavelets was first made [32]. As pointed out in Ref. [62], the Shannon-Gabor-wavelet-DAF can be regarded a special case of Equation (448) because $$\delta_{SGWD}(x-x_i|\sigma) = \lim_{n\to\infty} \frac{\sin\frac{\pi}{\Delta}(x-x_i)}{(2n+1)\sin\frac{\pi}{\Delta}\frac{(x-x_i)}{2n+1}} e^{-\frac{(x-x_i)^2}{2\sigma^2}} \quad (449)$$

$$= \frac{\sin\frac{\pi}{\Delta}(x-x_i)}{\frac{\pi}{\Delta}(x-x_i)_t} e^{-\frac{(x-x_i)^2}{2\sigma^2}}$$

All of the examples in this subsection have been tested by numerical applications. They all have similar levels of numerical accuracy for interpolating functions and for numerically solving linear and nonlinear PDEs. It is noted that the prescription given in Equations (438) and (439) is very general and efficient for constructing interpolation kernels. One can easily write down as many more interpolation expressions as are desired. As a consequence, one can generate various generalized Lagrange DAFs by using Equation (440) with S-class weights satisfying Equation (441). It is beyond the scope of this paper to give an exhaustive list of all possibilities. (It is also true that there are infinitely many orthogonal series expansion DAFs as noted in Ref. [28].)

The connection between interpolation DAF and the "DAF variational purposes. This idea led us to introduce Gaussian regularized Lagrange sampling in Ref. [57].

EXAMPLE 1

Shannon's Sampling

Shannon's sampling theorem is one of the most important mathematical foundations for information theory and various engineering fields. It even influences statistical mechanics and serves as an important motivation for wavelet development. Shannon's sampling theorem addresses the issue of constructing or recovering a continuous function f(x) on the real line$x\in R$ from an infinite, discrete set of known values $\{f(x_n)\}$ $$f(x) = \sum_{n=-\infty}^{\infty} f(x_n) \frac{\sin\eta(x-x_n)}{\eta(x-x_n)}, f \in B_\eta^2, x_n = \frac{n\pi}{\eta} \tag{450}$$

where Bx/x is the Paley-Wiener space of functions band limited to η, i.e., their momentum representations are identically zero outside the band ηh. This theorem provides connections between experimental measurement (which is discrete in nature) and theoretical predictions (which is continuous in nature). The reproducing kernel $$\frac{\sin\eta(x-y)}{\eta(x-y)} = \sum_{n=-\infty}^{\infty} \frac{\sin\eta(x-x_n)}{\eta(x-x_n)} \frac{\sin\eta(y-x_n)}{\eta(y-x_n)} \tag{451}$$

is related to Whittaker's cardinal series $$\frac{\sin\eta(x-x_n)}{\eta(x-x_n)} = \frac{(-1)^n \sin\eta x}{\eta x - n\pi} \tag{452}$$

and to the Dirichlet continuous delta sequence, Equation (363), for appropriate choice of η. It is also known for generating an orthonormal basis for the reproducing kernel Hilbert space Bx/x. By setting η=π, one obtains the well-known Shannon's father wavelet, $$\phi(x) = \frac{\sin\pi x}{\pi x} \tag{453}$$

with the Fourier transform φ(x)=X $_{(-1/,1/2)}$ And the mother wavelet $$\psi(x) = \frac{\sin(2\pi x) - \sin(\pi x)}{\pi x}$$

as discussed in Section III.

Shannon's wavelets are not efficient from a computational point of view because of their slow decay as x becomes large. This is implied from the ideal lowpass property. Mathematical sampling theory emphasizes the fact that expression Equation (450) is exact. However, in the real world, since one cannot actually use infinitely many sampling points, the "exactness" in Equation (450) is not physically realizable. Moreover, there is a well-known paradox [58] regarding the notion of band-limited signals. The usual definition implies that a band-limited signal is an entire function, whose Fourier transform has compact support. However, an entire function cannot have compact support unless it is identically zero in the entire domain. Therefore, it cannot be both band-limited and time-limited, unless it is identically zero. This is in contrast to the fact that physically realizable states are well-behaved Schwartz-space functions, which are effectively, but not exactly, both bandlimited and time-limited [59]. The bandwidths in the frequency and time domains are actually related by the Heisenberg uncertainty principle. To construct a practically useful sampling formula which does not demand infinitely many sampling points while providing as high accuracy as desired for an application, we employ the regularization procedure discussed above and choose $$\omega_\sigma(x) = e^{-\frac{x^2}{2\sigma^2}} \tag{454}$$

to smooth out the Gibbs' oscillations and consequently reduce truncation errors. This leads us to define an interesting Shannon-Gabor father wavelet (SGFW) as $$\Phi(x) = \frac{\sin\pi x}{\pi x} e^{-\frac{x^2}{2\sigma^2}} \tag{455}$$

Note that the Shannon-Gabor father wavelet is different from either the Shannon father wavelet φ or the Gabor wavelet $$e^{\frac{-x^2}{2\sigma^2}} \cos(\alpha x).$$

It is interesting to examine two limiting cases of the Shannon-Gabor father wavelet:

$$\lim_{\sigma\to\infty} \Phi(x) = \frac{\sin\pi x}{\pi x} \tag{456}$$

and $$\lim_{\sigma\to 0} \frac{1}{2\pi\sigma} \Phi(x) = \frac{\sin\pi x}{\pi x} \delta(x) \equiv \delta(x) \tag{457}$$

Shannon's father wavelet is recovered in the first limit (provided W→∞). The second limit, Equation(457), indicates that the Shannon-Gabor father wavelet is a delta sequence. Using this fact, we can construct an interpolating Shannon-Gabor distributed approximating functional (DAF) [33]

$$\delta_{DAF}(x^2 - x_n|\sigma) = \frac{\sin\frac{\pi}{\Delta}(x-x_n)}{\frac{\pi}{\Delta}(x-x_n)} e^{-\frac{(x-x_n)^2}{2\sigma^2}} \tag{458}$$

The advantage of this expression over Shannon's reproducing kernel, Equation (451), is that Equation (458) is effectively banded. The best σ values form numerical purposes are determined by the dilation factor ~Δ(grid spacing). For a given Δ, there is a wide range of o's that deliver excellent numerical results. This Shannon-Gabor wavelet-DAF has been tested on many numerical applications and is extremely accurate and robust for numerical solutions of linear and nonlinear partial differential equations.

EXAMPLE 2

Generalized Lagrange Sampling

Perhaps the most general sampling theorem is due to Paley and Wiener [60]. For an $L_2$ function f which is band-limited to $\eta$, its value f(x) at an arbitrary point x can be exactly recovered from an infinite sent of (not necessarily uniform) discrete "sampling points" $[x_k]$ $$\sup_{k \in Z} \left| x_k - \frac{k\pi}{\eta} \right| < \frac{\pi}{4\eta}, \tag{459}$$

(Note that this implies a value of $\Delta_k$, one then constructs the following Lagrange-type interpolating series $$f(x) = \sum_{-\infty}^{\infty} f(x_k) S_k(x), \quad (x \in R) \tag{460}$$

where $$S_k(x) = \frac{G(x)}{G'(x_k)(x - x_k)} \tag{461}$$

is a Lagrange-type sampling function. Here G(x) is an entire function given by $$G(x) = (x - x_0) \prod_{k=1}^{\infty} \left(1 - \frac{x}{x_k}\right)\left(1 - \frac{x}{x_{-k}}\right), \tag{462}$$

and G' denotes the derivation of G. Equation (460) is called the Paley and Wiener sampling theorem in the mathematical literature and can be regarded as a generalization of the classical Lagrange interpolation formula to the real line (R) for functions of the exponential type. Unlike the classical Lagrange interpolation formula, Equation (460) contains infinitely many terms, and we stress that it yields the exact f(x) for all real x. Thus, the interesting point is that the information of a continuous function (containing a compact set of frequencies) on the real line (R) can be entirely embedded in an infinite, but discrete irregularly placed set of sampling points (grid points). Condition Equation (459) is the best one can have [60]. There will be an aliasing error if the grid mesh is larger than is allowed by condition Equation (459) or if the function f(x) is not band-limited to $\eta$. The major disadvantage of Equation (460) is that it converges slowly. In practice, neither computational nor experimental data can ever be obtained at an infinite set of discrete sampling points. As noted above, from a mathematical point of view, a band-limited (i.e., compact support in Fourier space) function cannot have compact support in the coordinate representation unless it is identically zero. From a physical point of view, physical measurements cannot be conducted for an infinite duration, therefore physically realizable states are the Schwartz-class functions [59], which can be treated as effectively band-limited in both the momentum and coordinate representations. This suggests that one can truncate Equation (460) and still obtain reasonable results. A simple way of achieving this is to introduce a weight function $\omega_k(x)$ into the right hand side of Equation (460). (This approach can be made rigorous by introducing the regularization in the momentum space, as discussed above.) This leads to the approximate equation $$f(x) \approx \sum_{-\infty}^{\infty} f(x_k) S_k(x) w_k(x) \tag{463}$$

A particularly robust weight function on the real line R is the Gaussian $$w_k(x) = e^{-\frac{(x-x_k)^2}{2\sigma_k^2}}, \quad (0 < \sigma < \infty) \tag{464}$$

Note that the approximate Equation (463) becomes exact in the limit that $\sigma_k$ approaches infinity. Moreover, as $\sigma_k$ tends to zero $S^k(x)w_k(x)$ behaves like a "semi-continuous" Dirac delta function, $$\lim_{\sigma_k \to 0^+} \frac{1}{\sqrt{2\pi}\,\sigma} \frac{G(x)}{G'(x_k)(x - x_k)} e^{-\frac{(x-x_k)^2}{2\sigma_k^2}} = \tag{465}$$

$$\frac{G(x)}{G'(x_k)(x - x_k)} \delta(x - x_k).$$

This is effectively a delta function because $$\lim_{x \to x_k} \frac{G(x)}{G'(x_k)(x - x_k)} = 1. \tag{466}$$

Therefore the kernel $S^k(x)\omega_k(x)$ of Equation (463) can be approximated as an integral over $x_k$, then one also obtains exact results as $\sigma_k \to 0^+$. For a finite set of sampling points $\{x_k\}^M_{k=1}$ which are distributed in the nearest neighbor region of point $x_k$ we have the following LDAF expression [29]

$$\delta_{LDAF}(x - x_k | M, \sigma_k) = \prod_{i \neq k}^{M} \frac{x - x_i}{x_k - x_i} e^{-\frac{(x-x_k)^2}{2\sigma_k^2}}. \tag{467}$$

The Lagrange sampling theorem is very general and it includes Shannon's sampling as a special case of $x_k = k\Delta = -x_k$. Then it is seen that Equation (462) becomes $$G(x) = x \prod_{k=-\infty, k \neq 0}^{\infty} \left(1 - \frac{x}{k\Delta}\right) \tag{468}$$

$$= x \prod_{k=1}^{\infty} \left(1 - \frac{x^2}{k^2 \Delta^2}\right) \tag{469}$$

$$= \Delta \frac{\sin\frac{\pi}{\Delta}x}{\pi}. \tag{470}$$

Taking account of $G'(x_k)=(-1^k)$, the Equation (461) gives rise to $$S_k(x) = \frac{(-1)^k \sin\frac{\pi}{\Delta}x}{\frac{\pi}{\Delta}(x-k\Delta)} \tag{471}$$

$$= \frac{\sin\frac{\pi}{\Delta}(x-x_k)}{\frac{\pi}{\Delta}(x-x_k)} \tag{472}$$

Since the derivation is independent of the regularizer ω, it follows that our Shannon-Gabor-wavelet-DAF can be regarded as a special case of our Lagrange DAF.

EXAMPLE 3

Dirichlet (Periodic) Sampling

Both Lagrange-sampling ans Shannon-sampling theorems hod for band limited functions on the entire real axis R. On might wonder what happens for a band limited periodic function. It is reasonable to expect significant reduction in the number of sampling pints required because of the periodicity. This is indeed the case. Star [61] has proved that if a function f(x) satisfies the Dirichlet boundary condition, is periodic in T and band-limited to the highest (radial frequency 2πM/T, then it can be completely reconstructed from a finite (2M+1) set of discrete sampling. (grid) points [61]

$$f(x) = \sum_{k=-M}^{M} f(x_k) \frac{\sin[\frac{\pi}{\Delta}(x-x_k)]}{(2M+1)\sin[\frac{\pi}{T}(x-x_k)]}, \tag{473}$$

where Δ=T/(2M+1) is the sampling interval (grid spacing) and the $x_k=k\Delta$ are the sampling points. Using our standard arguments about the contradiction between the band-limited and the physical world [62,33], and invoking the regularization procedure discussed in earlier sections, we then construct the following approximate sampling formula $$f(x) \approx \sum_{k=-W}^{W} f(x_k) \frac{\sin[\frac{\pi}{\Delta}(x-x_k)]}{(2M+1)\sin[\frac{\pi}{T}(x-x_k)]} e^{-\frac{(x-x_k)^2}{2\sigma^2}}, \tag{474}$$

where W, the computational bandwidth, is smaller than M. The sampling (rid) pints $\{x_k\}$ are distributed around the point of interest, x. Obviously when σ→∞, we recover the exact sampling theorem Equation (473). It is also interestin to examine the limit of M with a fixed Δ:

$$\lim_{M\to\infty} \frac{\sin[\frac{\pi}{\Delta}(x-x_k)]}{(2M+1)\sin[\frac{\pi}{T}(x-x_k)]} e^{-\frac{(x-x_k)^2}{2\sigma^2}} = \tag{475}$$

$$\frac{\sin[\frac{\pi}{\Delta}(x-x_k)]}{\frac{\pi}{\Delta}(x-x_k)} e^{-\frac{(x-x_k)^2}{2\sigma^2}}$$

We call $$\frac{\sin[\frac{\pi}{\Delta}(x-x_k)]}{\frac{\pi}{\sigma}(x-x_k)} e^{-\frac{(x-x_k)^2}{2\sigma^2}}$$

the Shannon-Gabor Wavelet DAF [33] (SGWD), which is a special case of our previous Lagrange DAF [29,62]. Both the DGWD and the SGWD are generalizations of the (infinite grid) sinc-DVR [49,63], X (which is also the semi-continuous Fourier DAF on a grid [25]). The DGWD reduces to the sinc-DVR in the simultaneous limits of M→∞(with fixed Δ) and σ→∞, and the SGWD reduces to the sinc-DVR in the limit of σ→∞:

$$\lim_{M\to\infty,\sigma\to\infty} \frac{\sin[\frac{\pi}{\Delta}(x-x_k)]}{(2M+1)\sin[\frac{\pi}{T}(x-x_k)]} e^{-\frac{(x-x_k)^2}{2\sigma^2}} = \tag{476}$$

$$\lim_{\sigma\to\infty} \frac{\sin[\frac{\pi}{\Delta}(x-x_k)]}{\frac{\pi}{\Delta}(x-x_k)} e^{-\frac{(x-x_k)^2}{2\sigma^2}} = \frac{\sin[\frac{\pi}{\Delta}(x-x_k)]}{\frac{\pi}{\Delta}(x-x_k)}$$

In this sense, our DGW and SGW can be regarded as a DAF-windowed sinc-DVR or a regularized sinc-DVR. Due to the Gabor window, the regularized sinc-DVR matrix is banded. This endows the regularized sinc-DVRs with great potential for applications in large scale computations.

Stark [61] has demonstrated that the Dirichlet sampling theorem can actuallybe derived from Shannon's sampling theorem by appropriately imposing the periodic boundary condition. Therefore, all three sampling theorems are interrelated and both the Shannon sampling theorem and the Dirichlet sampling theorem are special cases of the Lagrange sampling theorem.

EXAMPLE 4

Sampling Theorems in Polar Coordinates

It is not obvious how to generate a sampling theorem in noncartesian coordinates. In polar coordinates, the Fourier-Bessel series plays the role of Fourier series expansion in cartesian coordinates. The notion of a band limited function is still important with band-limited referring to the Fourier-Bessel series expansion of the function which vanishes outside a circle of radius γ. For an isotropic function f(τ) banded limited to γ, Camo [64] showed that $$f(\tau) = \sum_{k=1}^{\infty} f(\alpha_{ik}) S_{ik}(\tau), \text{ and} \qquad (477)$$

$$S_{ik}(\tau) = \frac{2\alpha_{ik} J_i(\tau\gamma)}{\gamma J_{i+1}(\alpha_{ik}\gamma)(\alpha_{ik}^2 - \tau^2)} \qquad (478)$$

where $J_i(-)$ is the ith order cylinder Bessel function of the first kind and $\alpha_{ik}/\gamma$ is the kth zero of $J_i(*)$. This result was extended to a real function $f(\tau,\theta)$ whose ith Hankel transform has compact support:

$$f(\tau, \theta) = \sum_{n=-M}^{M} \sum_{k=1}^{\infty} f\left(\alpha_{ik}, \frac{2\pi n}{2M+1}\right) S_{ik}(\tau) \Theta_n(\theta), \text{ and} \qquad (479)$$

$$\Theta_n(\theta) = \frac{\sin\frac{2M+1}{2}\left(\theta - \frac{2\pi n}{2M+1}\right)}{\left[(2M+1)\sin\frac{1}{2}\left(\theta - \frac{2\pi n}{2M+1}\right)\right]}. \qquad (480)$$

This form is useful for problems with circular boundary conditions. By our regularization argument, w propose a corresponding polar coordinate DAF as $$\delta_{i,M}(\tau - \alpha_{ik}, \theta - \theta_n | \varrho_{ik}, \sigma) = \delta_i(\tau - \alpha_{ik} | \varrho_{ik}) \delta_M(\theta - \theta_n | \sigma) \qquad (481)$$

$$= \frac{2\alpha_{ik} J_i(\tau\gamma)}{\gamma J_{i+1}(\alpha_{ik}\gamma)(\alpha_{ik}^2 - \tau^2)} e^{-\frac{(\tau - \alpha_{ik})^2}{2\sigma_{ik}^2}} \qquad (482)$$

$$\frac{\sin\left[\frac{\pi}{\Delta\theta}(\theta - \theta_n)\right]}{(2M+1)\sin\left[\frac{\pi}{\Delta\theta}\frac{\theta - \theta_n}{2M+1}\right]} e^{-\frac{(\theta - \theta_n)^2}{2\sigma^2}}.$$

This is obviously simply a product of two DAFs. It is noted that because of an irregular distribution of $\alpha_{ik}$, $\partial_{ik}$ is not constant and its appropriate values need to be specified.

Distributed Approximating Functional Wavelets

Efficient and general procedures have been prescribed in previously for constructing "delta sequence generated wavelets" from the various delta sequences descried in previously. These methods are applicable for generating wavelets from the various DAFs described in the last section because DAFs are, at least form the point view of functional analysis, a special subclass of delta sequences. We shall call the resulting wavelets "DAF-wavelets", a terminology introduced in Ref. [32], where various DAF-wavelets were created for the first time by taking the difference of two DAFs. It is clear that the various methods described in the last section enable one to create as many DAFs as desired. Moreover, the methods prescribed in previously will enable one to generate infinitely many DAF wavelets from each DAF. Therefore, we discuss only briefly a few typical DAF-wavelets in this section. However, the discussion in this section is not a simple repetition of Section III because DAFs are multiparameter generalizations of the usual delta sequences. Being a subclass (Schwartz-class) and a multi-parameter generalization of delta sequences facilitates conversion of the DAFs into a wide variety of DAF-wavelets.

DAF-Wavelets Generated by Differential Pairs

A general express for various DAF wavelets produced by our wavelet generators $G^m$ is $$\Psi_{DAF}(x|m, \alpha, \beta, \cdots) = \qquad (483)$$

$$\left(x\frac{\partial^m}{\partial x^m} + m\frac{\partial^{m-1}}{\partial x^{m-1}}\right)\delta_{DAF}(x|\alpha, \beta, \cdots) \, m = 1, 2, \cdots.$$

The DAF $\delta_{DAF}(x|m,\alpha,\beta,\ldots)$ can be any DAF discussed in Section V. The computation is straightforward for all DAFs providing that m is not too large. In the case of Hermite DAFs, Equation (401), we have $$= \frac{1}{\sigma}\exp\left(-\frac{x^2}{2\sigma^2}\right)\sum_{n=0}^{M/2}(-1)^{n+m}\frac{1}{\sqrt{2\pi}\,2^{2n+1}n!}\left[ \qquad (484) \right.$$

$$\left. H_{2n+m+1}\left(\frac{x}{\sqrt{2}\,\sigma}\right) + 4nH_{2n+m-1}\left(\frac{x}{\sqrt{2}\,\sigma}\right)\right]$$

where m, M/2=0,1,2, . . . Here, some simple properties of Hermite functions have been used to simplify the results. The Mexican hat wavelet, $$\frac{1}{\sqrt{2\pi}\,\alpha}\left(1 - \frac{x^2}{\alpha^2}\right)e^{-x^2/2\sigma^2},$$

and the Mexican superhat wavelet $$\frac{-2}{\sqrt{2\pi}\,2}\left(\frac{x^4}{\alpha^4} - \frac{6x^2}{\alpha^2} + 3\right)e^{-x^2/2\sigma^2}$$

are given by $\Psi_{0,1}(x|\sigma)$ and $\Psi_{0,3}(x|\sigma)$ respectively. In general, the series of Gauss-delta-sequence-generated wavelets, Equation (396), are given as a special case of $\Omega_{0,m}(x|\sigma)$, m=0,1,2, . . . .

Since all of our nonorthogonal DAFs have the structure Tw, Equation (483) can be written also as $$\Psi_{DAF}(x|m, \alpha, \beta, \cdots) = \qquad (485)$$

$$x\sum_{t=0}^{m}\frac{m!}{t!(m-t)!}T^{(t)}w^{(m-t)} + m\sum_{t=0}^{m-1}\frac{(m-1)!}{t!(m-t-1)!}T^{(t)}w^{(m-t-1)},$$

for nonorthogonal DAF wavelets. This form may be useful for the implementation of Equation (483).

The moments $M^k$ of DAF-wavelets generated using our wavelet generators $G^m$ can be calculated as $$M_m^k = \int x^k \Psi_{DAF}(x | m, \alpha, \beta, \ldots)dx \qquad (486)$$

$$= \int x^k \left(x\frac{\partial^m}{\partial x^m} + m\frac{\partial^{m-1}}{\partial x^{m-1}}\right)\delta_{DAF}(x | \alpha, \beta, \ldots)dx$$

$$= \begin{cases} 0 & k+1 < m \\ (-1)^m \dfrac{k!}{(k-m)!} & k+1 \geq m, \; k-m+1 \text{ even} \\ \int x^{k-m+1} \delta_{DAF}(x \mid \alpha, \beta, \ldots) dx & \\ 0 & k+1 \geq m, \; k-m+1 \text{ odd} \end{cases}$$

This expression is modified by a constant if the DAF-wavelets are normalized in $L^2(R)$.

DAF Wavelets Generated by Difference Pairs

A second class of DAF-wavelets is generated, in general, by $$\Psi_{DAF}(x|\alpha,\beta,\ldots;\alpha',\beta',\ldots) = \delta_{DAF}(x|\alpha,\beta,\ldots) - \delta_{DAF}(x|\alpha',\beta',\ldots) \quad (487)$$

where at least one comparable pair of parameters, say $\alpha$, $\alpha'$, are different from each other.

For the Hermite DAF, we have $$\Psi_{HDAF}(x \mid M, \sigma; M', \sigma) = \quad (488)$$

$$\frac{1}{\sigma} \exp\left(\frac{-x^2}{2\sigma^2}\right) \sum_{n=M'/2}^{M/2} \left(\frac{-1}{4}\right)^n \frac{1}{\sqrt{2\pi} n!} H_{2n}\left(\frac{x}{\sqrt{2}\,\sigma}\right)$$

The Mexican hat wavelet is obviously a special case of this general expression specifically $\Psi_{HDAF}(x|2,\sigma; 0,\sigma)$.

It is straightforward to generate wavelets from the Hermite DAFs of the Fejér type, Equations (409) and (410). Some simple examples regarding our Dirichlet-Gabor-wavelet-packet DAF and Shannon-Gabor wavelet DAF are given in Refs. [32] and [33] respectively. Since DAFs already have been found to be extremely powerful for a variety of numerical applications, we expect that DAF-wavelets will play an important role in all of those areas where wavelet techniques are applicable. This is currently under investigation.

CONCLUSIONS

The general connection between wavelets and delta sequences (the sequences of functions which converge to the delta distribution) has been spelled out in some detail. Qualitatively, delta sequences are father wavelets (scale functions). If a delta sequence is an orthogonal system, it is found to span the wavelet subspace $V_0$ in a multiresolution analysis. Various delta sequences arising in mathematical, physical and engineering applications are reviewed.

A set of wavelet generators is constructed for converting delta sequences into mother wavelets. These generators are connected with an infinite dimensional Lie algebra which has an extremely simple algebraic structure and includes the algebra of translation and dilation operations as an invariant subalgebra. The corresponding Lie group provides the basis for a mathematical description of wavelets, which is more general than the usual translation and dilation group. A new set of orthogonal wavelets is found in the case of Dirichlet's continuous delta sequence. The well-known Mexican hat wavelet has been shown to be a special case of a variety of the Hermite wavelets, and has been derived by two distinct approaches.

The general connection between wavelet bases and frames and conventional $L^2(a,b)$ polynomial bases was briefly discussed. Essentially, the father wavelet corresponds to the lowest order polynomial and all higher order polynomials are related to the mother wavelets, provided that the polynomials are orthogonal with respect to some weight.

Distributed approximating functionals (DAFs) were defined as mulitparameter delta sequences of the Dirichlet type, constructed using Schwartz-class functions. DAFs were classified as orthogonal and nonorthogonal. The former are constructed by orthogonal basis expansion of the delta distribution, and the latter are constructed by the method of regularization. Both orthogonal and nonorthogonal DAFs are frames. The construction of orthogonal DAFs is briefly reviewed and more details can be found in Ref. [28]. The construction on nonorthogonal DAFs is described in terms of Fourier space regularization. A general and efficient procedure for generating interpolating DAFs is presented. The connection between the DAF approach and mathematical sampling theory is discussed in detail. Various examples are given to illustrate our approaches. Clearly, there are infinitely many more DAFs which can be easily constructed using our approach. For example, the well known formula $\Pi_j \cos(2^{-j}x)$ can be used to generate a DAF. It is not possible in this paper to enumerate all the various possibilities.

A method of creating arbitrarily smoothed and arbitrarily shaped window functions is briefly discussed, based on regularization. Smooth low pass, high pass, band pass and band stop filters are constructed as special cases. The desired degree of smoothness is attainable by using an appropriate ($S$ or $C^m$) regularizing function.

A variety of DAF-wavelets (wavelets generated by using DAFs) is constructed by using either our wavelet generators or the difference method. The Hermite DAF is used to illustrate our approach because in that case, analytical forms can be obtained easily. The Mexican hat wavelet is identified as a special case of the Hermite-DAF wavelets. We expect that various DAF wavelets will play an important role in a wide variety of numerical applications.

All references (articles and patents) referenced or cited in this disclosure are incorporated herein by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for enchancing an image implemented on a digital processing device, comprising the steps of:
    associating actual image data with a grip of points;
    generating an approximation to the actual data at the points using a set of differential approximating functional wavelets to produce a DAF-wavelet approximated image;
    adding points to enhance the approximated image using period data extension so that a value of a largest added point does not exceed the largest known value of a largest actual data value and a value of a lowest added point are not less than a value of the lowest know input data value;
    minimizing boundary discontinuities using well-tempered DAF-wavelets;
    filtering out the noise by using a well-tempered DAF-wavelet-low-band-pass-filter to approximate the total data set;

calculating a disorder parameter as a function of the DAF wavelet parameters, where a change in the disorder parameter as a function of the DAF-wavelet parameters is used as an indicator for the optimum well-tempered DAF-wavelet-low-band-pass-filter to produce a boundary corrected, enhanced and denoised refined approximate image.

2. The method of claim 1, wherein the image is a mammogram.

3. The method of claim 1, wherein the image is a CAT-scan.

4. The method of claim 1, wherein the image is an X-ray image.

5. The method of claim 1, wherein the image is a MRI image.

* * * * *

UNITED STATES PATENT AND TRADEMARK OFFICE
CERTIFICATE OF CORRECTION

PATENT NO.       : 7,272,265 B2
APPLICATION NO.  : 10/454373
DATED            : September 18, 2007
INVENTOR(S)      : Kouri et al.

It is certified that error appears in the above-identified patent and that said Letters Patent is hereby corrected as shown below:

Col 1, Line 17:

ADD after Research --and Grant No. ITA 87-02 from the Dept. of Commerce--

Signed and Sealed this

Eleventh Day of May, 2010

David J. Kappos
*Director of the United States Patent and Trademark Office*